United States Patent
Shi et al.

(10) Patent No.: US 12,363,522 B2
(45) Date of Patent: Jul. 15, 2025

(54) DISCOVERY AND PROVISIONING METHOD, ELECTRONIC DEVICE, AND SYSTEM

(71) Applicant: HUAWEI TECHNOLOGIES CO., LTD., Guangdong (CN)

(72) Inventors: Rui Shi, Shenzhen (CN); Lianxiang Song, Shenzhen (CN); Yule Liang, Beijing (CN); Tao Hao, Shenzhen (CN); Liangliang Ma, Xi'an (CN); Chengbiao Lao, Wuhan (CN); De Liu, Shenzhen (CN); Jirui Wang, Shenzhen (CN); Yuyan Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 17/801,069

(22) PCT Filed: Feb. 20, 2021

(86) PCT No.: PCT/CN2021/077076
§ 371 (c)(1),
(2) Date: Aug. 19, 2022

(87) PCT Pub. No.: WO2021/164769
PCT Pub. Date: Aug. 26, 2021

(65) Prior Publication Data
US 2023/0093016 A1    Mar. 23, 2023

(30) Foreign Application Priority Data

Feb. 21, 2020 (CN) .......................... 202010108410.3
Jun. 3, 2020 (CN) .......................... 202010496523.5
(Continued)

(51) Int. Cl.
*H04W 8/00* (2009.01)
*H04W 12/08* (2021.01)

(52) U.S. Cl.
CPC .......... *H04W 8/005* (2013.01); *H04W 12/08* (2013.01)

(58) Field of Classification Search
CPC ............................ H04W 8/005; H04W 12/08
See application file for complete search history.

(56) References Cited

U.S. PATENT DOCUMENTS

2005/0139680 A1*  6/2005  Anttila ................ H04L 63/18
                                                235/462.46
2013/0223279 A1*  8/2013  Tinnakornsrisuphap ...................
                                                H04W 12/50
                                                370/254
(Continued)

FOREIGN PATENT DOCUMENTS

CN   103916297 A   7/2014
CN   104618988 A   5/2015
(Continued)

OTHER PUBLICATIONS

Extended European Search Report in European Appln No. 21757041.5, dated May 30, 2023, 11 pages.
(Continued)

*Primary Examiner* — Kent Krueger
(74) *Attorney, Agent, or Firm* — Fish & Richardson P.C.

(57) ABSTRACT

A discovery and provisioning method. The method includes: A first device in an unprovisioned state sends a first message through a first antenna, where the first message is used by a second device to discover the first device, and the first message includes a device identifier of the first device; when a distance between the second device and the first device is less than or equal to a preset distance, the second device receives the device identifier sent by the first device; and
(Continued)

after being discovered by the second device, the first device performs provisioning by using a second antenna.

19 Claims, 68 Drawing Sheets

(30) Foreign Application Priority Data

| | | | |
|---|---|---|---|
| Sep. 10, 2020 | (CN) | ......................... | 202010948430.1 |
| Sep. 25, 2020 | (CN) | ......................... | 202011024603.7 |
| Sep. 25, 2020 | (CN) | ......................... | 202011024942.5 |
| Sep. 25, 2020 | (CN) | ......................... | 202011027000.2 |
| Oct. 16, 2020 | (CN) | ......................... | 202011112720.9 |

(56) References Cited

U.S. PATENT DOCUMENTS

| | | | | |
|---|---|---|---|---|
| 2017/0288786 | A1 | 10/2017 | Al-Mousa et al. | |
| 2019/0230613 | A1* | 7/2019 | Kim | ............... H04W 60/00 |
| 2020/0146081 | A1* | 5/2020 | Cho | ............... H04W 76/14 |
| 2021/0400502 | A1* | 12/2021 | Zhang | ............... H04W 76/14 |

FOREIGN PATENT DOCUMENTS

| | | | |
|---|---|---|---|
| CN | 105228147 | A | 1/2016 |
| CN | 105785786 | A | 7/2016 |
| CN | 105897691 | A | 8/2016 |
| CN | 105915413 | A | 8/2016 |
| CN | 105916142 | A | 8/2016 |
| CN | 105916187 | A | 8/2016 |
| CN | 106211029 | A | 12/2016 |
| CN | 106302415 | A | 1/2017 |
| CN | 106507437 | A | 3/2017 |
| CN | 206195775 | U | 5/2017 |
| CN | 107179729 | A | 9/2017 |
| CN | 107431911 | A | 12/2017 |
| CN | 107431923 | A | 12/2017 |
| CN | 107465584 | A | 12/2017 |
| CN | 107493210 | A | 12/2017 |
| CN | 107750058 | A | 3/2018 |
| CN | 108924135 | A | 11/2018 |
| CN | 109039627 | A | 12/2018 |
| CN | 109525976 | A | 3/2019 |
| CN | 109716824 | A | 5/2019 |
| CN | 110519131 | A | 11/2019 |
| CN | 110601870 | A | 12/2019 |
| CN | 110995665 | A | 4/2020 |
| CN | 111586665 | A | 8/2020 |
| CN | 112286147 | A | 1/2021 |
| EP | 3582530 | A1 | 12/2019 |
| WO | 2018004589 | A1 | 1/2018 |
| WO | 2018157512 | A1 | 9/2018 |

OTHER PUBLICATIONS

Office Action in Chinese Appln. No. 202011137695.X, dated Nov. 1, 2021, 31 pages (with English translation).
Office Action in Chinese Appln. No. 202210750819.4, dated Jan. 19, 2023, 10 pages.
International Search Report and Written Opinion in International Appln. No. PCT/CN2021/077076, mailed on Apr. 27, 2021, 19 pages (with English translation).

* cited by examiner

DISCOVERY AND PROVISIONING METHOD, ELECTRONIC DEVICE, AND SYSTEM

CROSS REFERENCE TO RELATED APPLICATIONS

This application is a national stage of International Application No. PCT/CN2021/077076, filed on Feb. 20, 2021, which claims priority to Chinese Patent Application No. 202010108410.3, filed on Feb. 21, 2020, Chinese Patent Application No. 202010496523.5, filed on Jun. 3, 2020, Chinese Patent Application No. 202010948430.1, filed on Sep. 10, 2020, Chinese Patent Application No. 202011024603.7 filed on Sep. 25, 2020, Chinese Patent Application No. 202011024942.5, filed on Sep. 25, 2020, Chinese Patent Application No. 202011027000.2, filed on Sep. 25, 2020 and Chinese Patent Application No. 202011112720.9, filed on Oct. 16, 2020. All of the aforementioned applications are incorporated herein by reference in their entireties.

TECHNICAL FIELD

This application relates to the terminal field, and in particular, to a discovery and provisioning method, an electronic device, and a system.

BACKGROUND

With development of the Internet of Things (Internet of Things, IoT), more intelligent devices are connected to a network. These intelligent devices include data input sensors and command output executors, which are used in many fields such as industrial production, smart home, disaster prevention and monitoring, and logistics tracking. Currently, mainstream access modes for wireless intelligent devices include Wi-Fi, Bluetooth low energy (Bluetooth low energy, BLE), and ZigBee. A process of connecting these devices to the Internet of Things includes device discovery and device provisioning. Device discovery is discovering an ambient intelligent device, and device provisioning is connecting the device to an intelligent device network.

Currently, an intelligent device in a user's home may be discovered by a device in a neighbor's home during provisioning of the device, or even may be directly paired with the device in the neighbor's home. This affects user experience when the user uses the intelligent device.

SUMMARY

This application provides a discovery and provisioning method, an electronic device, and a system, to help prevent a first device from being discovered by or paired with a device in a neighbor's home, which helps improve user experience when a user uses the first device.

According to a first aspect, a system is provided, where the system includes a first device and a second device. The first device includes a first antenna and a second antenna. A wireless transmit power of the first device operating by using the first antenna is less than a wireless transmit power of the first device operating by using the second antenna. The first device is configured to: when the first device is in an unprovisioned state, send a first message through the first antenna, where the first message is used by the second device to discover the first device, and the first message includes a device identifier of the first device. The second device is configured to: when a distance between the second device and the first device is less than or equal to a preset distance, receive the device identifier sent by the first device, where the preset distance is a distance covered by a wireless transmit power of the first antenna in operation. The first device is further configured to: after the first device is discovered by the second device, perform provisioning by using the second antenna.

In this embodiment of this application, the two antennas are disposed in the first device. The first device may use the first antenna for discovery of the first device performed by the second device. In this way, a communication distance for discovering the first device can be greatly reduced, so that a device in a neighbor's home can be prevented from discovering the first device or directly pairing with the first device. When there are a plurality of devices with a same device identifier, inappropriate pairing is also avoided. Switching to the second antenna in a provisioning process helps the first device complete provisioning as soon as possible.

It should be understood that the wireless transmit power of the first device operating by using the first antenna being less than the wireless transmit power of the first device operating by using the second antenna may be understood as a minimum wireless transmit power of the first device operating by using the first antenna being less than a minimum wireless transmit power of the first device operating by using the second antenna.

With reference to the first aspect, in some implementations of the first aspect, the first device is further configured to send a provisioning parameter through the first antenna. The second device is further configured to receive the provisioning parameter when the distance between the second device and the first device is less than or equal to the preset distance. The first device is specifically configured to perform provisioning based on the provisioning parameter by using the second antenna.

In this embodiment of this application, the two antennas are disposed in the first device, and the first device may send the provisioning parameter to the second device through the first antenna. Out-of-band transmission is not needed between the first device and the second device. Therefore, an additional hardware device is not required for out-of-band transmission. This reduces production costs, improves security, and improves user experience.

With reference to the first aspect, in some implementations of the first aspect, the first message includes the provisioning parameter.

In this embodiment of this application, the first device may send the first message through the first antenna, where the first message may include the device identifier and the provisioning parameter of the first device. This helps reduce signaling overheads of the first device.

According to a second aspect, a system is provided, where the system includes a first device and a second device. The first device includes a first antenna and a second antenna. A wireless transmit power of the first device operating by using the first antenna is less than a wireless transmit power of the first device operating by using the second antenna. The first device is configured to: when the first device is in an unprovisioned state, send a first message through the first antenna, where the first message includes a provisioning parameter. The second device is configured to: when a distance between the second device and the first device is less than or equal to a preset distance, receive the provisioning parameter sent by the first device, where the preset distance is a distance covered by the wireless transmit power of the first device when operating by using the first antenna.

The first device is further configured to perform provisioning based on the provisioning parameter by using the second antenna.

The provisioning parameter can be any confidential data that may be leaked if being eavesdropped by a hacker when the confidential data is transmitted in plaintext.

In this embodiment of this application, the two antennas are disposed in the first device, and the first device may send the provisioning parameter to the second device through the first antenna. Out-of-band transmission, which is performed due to the security risk, is not needed between the first device and the second device. Therefore, an additional hardware device is not required for out-of-band transmission. This reduces production costs, improves security, and improves user experience.

With reference to the second aspect, in some implementations of the second aspect, the first device is further configured to send a device identifier of the first device through the first antenna. The second device is further configured to: when the distance between the second device and the first device is less than or equal to the preset distance, receive the device identifier sent by the first device.

In this embodiment of this application, the two antennas are disposed in the first device. The first device may use the first antenna for discovery of the first device performed by the second device. In this way, a communication distance for discovering the first device can be greatly reduced, so that a device in a neighbors home can be prevented from discovering the first device or directly pairing with the first device. Switching to the second antenna in a provisioning process helps the first device complete provisioning as soon as possible.

With reference to the second aspect, in some implementations of the second aspect, the first message includes the device identifier.

In this embodiment of this application, the first device may send the first message through the first antenna, where the first message may include the device identifier and the provisioning parameter of the first device. This helps reduce signaling overheads of the first device.

With reference to the first aspect or the second aspect, in some implementations of the first aspect or the second aspect, for Wi-Fi discovery and provisioning, the provisioning parameter includes a verification code (PIN code).

In this embodiment of this application, the first device may send the PIN code to the second device through the first antenna, and therefore an additional hardware device is not required for out-of-band transmission. This reduces production costs. Security is improved, which helps improve user experience.

It should be understood that the PIN code in embodiments of this application may be referred to as a device verification code, or may be referred to as a device install code.

With reference to the first aspect or the second aspect, in some implementations of the first aspect or the second aspect, the verification code is not encrypted when the first device sends the verification code to the second device.

In this embodiment of this application, when the communication distance between the first device and the second device is within a preset safe distance (for example, 30 cm), it may be considered that the PIN code may be transmitted in plaintext between the first device and the second device, and the first device may not encrypt the PIN code.

With reference to the first aspect or the second aspect, in some implementations of the first aspect or the second aspect, the first device is further configured to negotiate with the second device by using the verification code, to obtain an encryption key.

In this embodiment of this application, the first device may directly send the PIN code to the second device through the first antenna, and the first device may perform identity authentication and key negotiation with the second device by using the PIN code to obtain the encryption key, so that the second device encrypts an SSID of a Wi-Fi router and a password of the Wi-Fi router. In this way, an additional hardware device is not required for out-of-band transmission. This reduces production costs, and security is improved.

With reference to the first aspect or the second aspect, in some implementations of the first aspect or the second aspect, for Wi-Fi discovery and provisioning, the provisioning parameter includes an encryption key.

In this embodiment of this application, the first device may directly send the encryption key to the second device through the first antenna, and therefore the additional hardware device is not required for out-of-band transmission that is performed to ensure security. This reduces production costs, and security is improved. In addition, this can reduce a provisioning latency of the first device, reduce resources occupied in an identity authentication process and a key negotiation process, and help improve user experience.

With reference to the first aspect or the second aspect, in some implementations of the first aspect or the second aspect, the encryption key is not encrypted when the first device sends the encryption key to the second device.

In this embodiment of this application, when the communication distance between the first device and the second device is within a preset safe distance (for example, 30 cm), it may be considered that the encryption key may be transmitted in plaintext between the first device and the second device, and the first device may not encrypt the encryption key.

With reference to the first aspect or the second aspect, in some implementations of the first aspect or the second aspect, the second device is further configured to: after discovering the first device, send, to the first device, a service set identifier SSID of a Wi-Fi router and a password of the Wi-Fi router that are encrypted by using the encryption key, and the first device is specifically configured to connect to the Wi-Fi router according to the SSID and the password.

There are two Wi-Fi discovery and provisioning manners: SoftAP discovery and provisioning, and Wi-Fi sensing discovery and provisioning.

For SoftAP discovery and provisioning, details are as follows.

In some possible implementations, a trigger condition for the first device to switch from the first antenna to the second antenna may be that the first device receives a network access request message sent by the second device.

In some possible implementations, the network access request message may be an authentication request (authentication request, AUTH request).

In some possible implementations, the first message may be a beacon frame or a probe response frame.

In Wi-Fi sensing discovery and provisioning, details are as follows.

With reference to the first aspect or the second aspect, in some implementations of the first aspect or the second aspect, the first device is further configured to: after being discovered by the second device and before the first device connects to the Wi-Fi router, send status information encrypted by using the encryption key to the second device.

In this embodiment of this application, after the first device is discovered, the first device may send the status information of the first device to the second device. For example, after the first device is discovered, a user interface of the second device may display a control interface for an intelligent device, and the user may view a status information change of the first device by using the second device. In this way, a time-consuming provisioning process is performed in background, so that the user is unaware of the process. This helps improve user experience.

With reference to the first aspect or the second aspect, in some implementations of the first aspect or the second aspect, the second device is further configured to: after discovering the first device and before the first device connects to the Wi-Fi router, send a control command encrypted by using the encryption key to the first device.

In this embodiment of this application, after the first device is discovered, the second device may send the control command to the first device. For example, after the first device is discovered, a user interface of the second device may display a control interface for controlling an intelligent device, and the user may send the control command to the first device by using the second device. In this way, the time-consuming provisioning process is performed in background, so that the user is unaware of the process. This helps improve user experience.

With reference to the first aspect or the second aspect, in some implementations of the first aspect or the second aspect, the second device is further configured to display a control interface of the first device on a display screen after discovering the first device and before the first device connects to the Wi-Fi router, where the control interface is used to control the first device; and the second device is specifically configured to send, in response to an operation on the control interface, the control command encrypted by using the encryption key to the first device.

With reference to the first aspect or the second aspect, in some implementations of the first aspect or the second aspect, the second device is further configured to display the control interface of the first device on the display screen after discovering the first device and before the first device connects to the Wi-Fi router, where the control interface is used to control the first device; and the control interface further includes prompt information used to prompt that the first device is being provisioned.

With reference to the first aspect or the second aspect, in some implementations of the first aspect or the second aspect, the second device is further configured to obtain the control interface of the first device based on the device identifier of the first device.

In some possible implementations, the first device may use a Wi-Fi sensing frame sent through the first antenna to carry a Product ID of the first device. After obtaining the Product ID of the first device, the second device may request a control mapping file and a details page (for example, a function or a picture included in the first device) of the first device from a server. After sending, to the first device, the SSID of the Wi-Fi router and the password of the Wi-Fi router that are encrypted by using the encryption key, the second device may display the control interface of the first device based on the control mapping file and the details page.

With reference to the first aspect or the second aspect, in some implementations of the first aspect or the second aspect, the second device is further configured to: before sending the SSID and the password that are encrypted by using the encryption key to the first device, send an identify command encrypted by using the encryption key to the first device; the first device is further configured to obtain and execute the identify command based on the encryption key; and the first device is further configured to send response information to the second device, where the response information is used to enable the second device to prompt that the first device is executing the identify command.

In this embodiment of this application, after receiving the response information of the first device for the identify command, the second device may prompt the user that the first device is executing the identify command. In this way, it is convenient for the user to determine that a device to be provisioned is the first device.

With reference to the first aspect or the second aspect, in some implementations of the first aspect or the second aspect, the first message is a Wi-Fi sensing frame.

With reference to the first aspect or the second aspect, in some implementations of the first aspect or the second aspect, the Wi-Fi sensing frame is a publish frame, a follow-up frame, or a subscribe frame.

With reference to the first aspect or the second aspect, in some implementations of the first aspect or the second aspect, the first device is an Internet of Things IoT device or an intelligent device, or the second device is a mobile phone.

In BLE discovery and provisioning, details are as follows.

With reference to the first aspect or the second aspect, in some implementations of the first aspect or the second aspect, the provisioning parameter includes a key Passkey or out-of-band OOB information, and the first device is specifically configured to perform Bluetooth pairing with the second device based on the Passkey or the OOB information by using the second antenna.

In this embodiment of this application, the first device sends the Passkey or the out-of-band OOB information through the first antenna, and therefore out-of-band transmission between the first device and the second device is not performed. As a result, an additional hardware device is not added to the first device or the second device; and entering the Passkey by the user or numeric comparison is omitted. In this way, user experience is improved and security is ensured.

For legacy pairing (legacy pairing), a first device may send a Passkey to a second device by using a very short distance technology. The first device and the second device may generate a TK by using the Passkey, to perform identity authentication by using the TK. Alternatively, OOB information sent by the first device to the second device by using the very short distance technology may carry the TK. In this case, the first device and the second device may directly perform identity authentication by using the TK.

For secure connection pairing (secure connection pairing), a first device may send a Passkey to a second device by using a very short distance technology, so that the first device and the second device may perform identity authentication by using the Passkey. Alternatively, OOB information sent by the first device to the second device by using the very short distance technology may carry a device address (B) of the first device, a random number (rb), and a confirmation number (Cb). In this case, the first device and the second device may perform identity authentication by using the device address of the first device, the random number, and the confirmation number.

With reference to the first aspect or the second aspect, in some implementations of the first aspect or the second aspect, the Passkey or the OOB information is not encrypted when the first device sends the Passkey or the OOB information to the second device.

In this embodiment of this application, when a communication distance between the first device and the second device is within a preset safe distance, it may be considered that the Passkey or the OOB information may be transmitted in plaintext between the first device and the second device, and the first device may not encrypt the Passkey or the OOB information.

With reference to the first aspect or the second aspect, in some implementations of the first aspect or the second aspect, the first device is further configured to send an encryption key to the second device through the first antenna; and the first device is further configured to: after the first device is discovered by the second device and before the first device is paired with the second device, send status information encrypted by using the encryption key to the second device.

In some possible implementations, the first device sends a second message to the second device, where the second message includes the status information encrypted by using the encryption key.

In some possible implementations, the second message may be a non-connectable advertising packet.

In some possible implementations, the first device is specifically configured to send the status information encrypted by using the encryption key to the second device in response to a status update operation performed by the user on the first device.

With reference to the first aspect or the second aspect, in some implementations of the first aspect or the second aspect, the first device is further configured to send the encryption key to the second device through the first antenna; and the second device is further configured to: after discovering the first device and before pairing with the first device, send a control command encrypted by using the encryption key to the first device.

In some possible implementations, the second device sends a non-connectable advertising packet to the first device, where the non-connectable advertising packet includes the control command encrypted by using the encryption key.

With reference to the first aspect or the second aspect, in some implementations of the first aspect or the second aspect, the second device is further configured to display a control interface of the first device after discovering the first device and before being paired with the first device, where the control interface is used to control the first device; and the second device is specifically configured to: send, in response to an operation on the control interface, the control command encrypted by using the encryption key to the first device.

With reference to the first aspect or the second aspect, in some implementations of the first aspect or the second aspect, the second device is further configured to display the control interface of the first device on a display screen after discovering the first device and before being paired with the first device, where the control interface is used to control the first device; and the control interface further includes prompt information used to prompt that the first device is being provisioned.

In this embodiment of this application, after the first device is discovered by the second device, and before pairing of the first device and the second device completes, the first device and the second device may encrypt the status information or the control command by using the encryption key. The user does not need to wait for device pairing and binding to control the first device. Device connection, pairing, and binding are implemented in background, and a foreground user may directly control the first device by using the second device, which greatly improves user experience.

With reference to the first aspect or the second aspect, in some implementations of the first aspect or the second aspect, the second device is further configured to obtain the control interface of the first device based on the device identifier of the first device after discovering the first device.

With reference to the first aspect or the second aspect, in some implementations of the first aspect or the second aspect, the encryption key is carried in the first message.

In this embodiment of this application, the first device may send the first message through the first antenna, where the first message carries the Passkey (or the out-of-band OOB information) and the encryption key. This helps reduce signaling overheads of the first device.

With reference to the first aspect or the second aspect, in some implementations of the first aspect or the second aspect, the first message is a connectable advertising packet.

In some possible implementations, the first message includes the Passkey (or the out-of-band OOB information), the device identifier of the first device, and the encryption key.

For Bluetooth mesh discovery and provisioning, details are as follows.

With reference to the first aspect or the second aspect, in some implementations of the first aspect or the second aspect, the provisioning parameter includes an authentication value, and the first device is specifically configured to: join a Bluetooth mesh network of the second device based on the authentication value by using the second antenna.

In this embodiment of this application, the first device may transmit the authentication value in plaintext by using a very short distance technology. This avoids a case in which the first device and the second device perform authentication in manners of input OOB and output OOB in an identity authentication process, and there is no need to add an additional input or input hardware device to the first device or the second device. Therefore, a manufacturer does not need to reconstruct a production line, and user assistance in identity authentication is omitted, which improves user experience. In addition, compared with static OOB or no OOB, security of the manner of transmitting the authentication value is higher.

With reference to the first aspect or the second aspect, in some implementations of the first aspect or the second aspect, the authentication value is not encrypted when the first device sends the authentication value to the second device.

In this embodiment of this application, when a communication distance between the first device and the second device is within a preset safe distance, it may be considered that the authentication value may be transmitted in plaintext between the first device and the second device, and the first device may not encrypt the authentication value.

With reference to the first aspect or the second aspect, in some implementations of the first aspect or the second aspect, the first device is further configured to send an encryption key through the first antenna; and the first device is further configured to: after the first device is discovered by the second device and before the first device joins the mesh network, send status information encrypted by using the encryption key to the second device.

In this embodiment of this application, the first device may further transmit the encryption key in plaintext by using a very short distance technology. In this way, after the first device is discovered by the second device and before the first device joins the mesh network, a control command and the status information may be transmitted between the first device and the second device. The user may directly control the first device by using the second device. In this way, the user does not need to wait for provisioning of the first device, which improves user experience.

In some possible implementations, after the first device is discovered by the second device, and before the first device joins the mesh network, the first device sends a second message to the second device, where the second message includes the status information encrypted by using the encryption key.

In some possible implementations, the second message may be a PB-ADV beacon frame.

With reference to the first aspect or the second aspect, in some implementations of the first aspect or the second aspect, the first device is further configured to send the encryption key through the first antenna; and the first device is further configured to: after the first device is discovered by the second device and before the first device joins the mesh network, receive a control command that is encrypted by using the encryption key and that is sent by the second device.

In some possible implementations, after the first device is discovered by the second device, and before the first device joins the mesh network, the first device receives a third message sent by the second device, where the third message includes the control command encrypted by using the encryption key.

In some possible implementations, the third message is a PB-ADV beacon frame.

With reference to the first aspect or the second aspect, in some implementations of the first aspect or the second aspect, the second device is further configured to display a control interface of the first device on a display screen after discovering the first device and before the first device joins the mesh network, where the control interface is used to control the first device; and the second device is specifically configured to send, in response to an operation on the control interface, the control command encrypted by using the encryption key to the first device.

With reference to the first aspect or the second aspect, in some implementations of the first aspect or the second aspect, the second device is further configured to display the control interface of the first device on the display screen after discovering the first device and before the first device joins the mesh network, where the control interface is used to control the first device; and the control interface further includes prompt information used to prompt that the first device is being provisioned.

With reference to the first aspect or the second aspect, in some implementations of the first aspect or the second aspect, the second device is further configured to obtain the control interface of the first device based on the device identifier of the first device after discovering the first device.

In this embodiment of this application, if the first device sends the encryption key to the second device through the first antenna, before the second device discovers the first device and the first device accesses the mesh network, the user may directly control the first device by using the second device. In this way, the user does not need to wait for provisioning of the first device, which helps improve user experience.

With reference to the first aspect or the second aspect, in some implementations of the first aspect or the second aspect, the second device is further configured to: after discovering the first device, send an identify command encrypted by using the encryption key to the first device; the first device is further configured to obtain and execute the identify command based on the encryption key; and the first device is further configured to send response information encrypted by using the encryption key to the second device, where the response information is used to prompt that the first device is executing the identify command.

In this embodiment of this application, the second device may send the identify command encrypted by using the encryption key to the first device. In this way, it can be convenient for the user to determine that the first device to be provisioned is a device close to the second device, and a man-in-the-middle attack by using an amplifier is avoided.

With reference to the first aspect or the second aspect, in some implementations of the first aspect or the second aspect, the first message includes the encryption key.

In this embodiment of this application, the first message carries the encryption key. This helps reduce signaling overheads of the first device.

With reference to the first aspect or the second aspect, in some implementations of the first aspect or the second aspect, the first device is further configured to send a public key of the first device through the first antenna; and the second device is further configured to: when the distance between the second device and the first device is less than or equal to the preset distance, receive the public key of the first device sent by the first device.

In this embodiment of this application, the first device may also transmit the public key of the first device by using the very short distance technology. This avoids that the first device performs out-of-band (out-of-band) transmission in a process of exchanging public keys.

With reference to the first aspect or the second aspect, in some implementations of the first aspect or the second aspect, the first message includes the public key of the first device.

In this embodiment of this application, the first message carries the public key of the first device. This helps reduce signaling overheads of the first device.

With reference to the first aspect, in some implementations of the first aspect, the second device is a mesh gateway, and the system further includes a third device. The third device is configured to: before the second device receives the first message, send first indication information to the mesh gateway, where the first indication information is used to indicate the mesh gateway to start scanning for the first message.

With reference to the first aspect, in some implementations of the first aspect, the third device is further configured to: before the second device connects the first device to the mesh network, send second indication information to the second device in response to an operation by the user, where the second indication information is used to indicate to connect the first device to the mesh network.

With reference to the first aspect or the second aspect, in some implementations of the first aspect or the second aspect, the second device is further configured to send a provisioning invite to the first device; the first device is further configured to: send a provisioning capability to the second device in response to receiving the provisioning invite, receive the public key of the first device sent by the second device, and perform identity authentication with the second device based on the authentication value; and the second device is further configured to distribute provisioning data to the first device.

With reference to the first aspect or the second aspect, in some implementations of the first aspect or the second aspect, the first message is an unprovisioned device beacon frame.

For ZigBee discovery and provisioning, details are as follows.

With reference to the first aspect or the second aspect, in some implementations of the first aspect or the second aspect, the provisioning parameter includes an install code or a pre-configured link key, and the first device is specifically configured to: join a ZigBee network of the second device based on the install code or the pre-configured link key by using the second antenna.

In this embodiment of this application, out-of-band transmission does not need to be performed between the first device and the second device, so that additional hardware costs of the first device are avoided, and a user operation is also omitted. In this way, user experience can be improved and security can be ensured.

With reference to the first aspect or the second aspect, in some implementations of the first aspect or the second aspect, the install code or the pre-configured link key is not encrypted when the first device sends the install code or the pre-configured link key to the second device.

In this embodiment of this application, when a communication distance between the first device and the second device is within a preset safe distance, it may be considered that the install code or the pre-configured link key may be transmitted in plaintext between the first device and the second device, and the first device may not encrypt the install code or the pre-configured link key.

With reference to the first aspect or the second aspect, in some implementations of the first aspect or the second aspect, the first message is a beacon request frame.

In this embodiment of this application, the first device may send the beacon request frame by advertising through the first antenna, and the beacon request frame may carry the install code or the pre-configured link key. In this way, out-of-band transmission does not need to be performed between the first device and the second device, so that additional hardware costs of the first device are avoided, and a user operation is also omitted. As a result, user experience can be improved and security can be ensured.

With reference to the first aspect or the second aspect, in some implementations of the first aspect or the second aspect, the first device is further configured to: before joining the ZigBee network based on the install code or the pre-configured link key, receive a beacon frame sent by the second device, and in response to receiving the beacon frame, switch from the first antenna to the second antenna.

In this embodiment of this application, when receiving the beacon frame (a response to the beacon request frame), the first device may switch from the first antenna to the second antenna. In this way, the first device may join the ZigBee network by using the second antenna.

With reference to the first aspect or the second aspect, in some implementations of the first aspect or the second aspect, the first message is an association request frame.

In this embodiment of this application, the first device may send the association request frame through the first antenna to the second device, and the association request frame may carry the install code or the pre-configured link key. In this way, out-of-band transmission does not need to be performed between the first device and the second device, so that additional hardware costs of an intelligent device are avoided, and a user operation is also omitted. As a result, user experience can be improved and security can be ensured.

With reference to the first aspect or the second aspect, in some implementations of the first aspect or the second aspect, the first device is further configured to: before joining the ZigBee network based on the install code or the pre-configured link key, receive an association response frame sent by the second device; and in response to receiving the association response frame, switch from the first antenna to the second antenna.

In this embodiment of this application, when receiving the association response frame (a response to the association request frame), the first device may switch from the first antenna to the second antenna. In this way, the first device may join the ZigBee network by using the second antenna.

With reference to the first aspect or the second aspect, in some implementations of the first aspect or the second aspect, the system further includes a third device. The first device is further configured to: before sending the first message through the first antenna, send a second message through the second antenna, where the second message is used to query whether there is an ambient device that connects the first device to the ZigBee network. The second device is further configured to send indication information to the third device in response to receiving the second message, where the indication information is used to indicate that the first device needs to join the ZigBee network. The third device is configured to: in response to receiving the indication information, output prompt information and send acknowledge information to the second device, where the prompt information is used to prompt the user to put the first device close to the second device, and the acknowledge information is used to indicate the second device to connect the first device to the ZigBee network. The second device is further configured to send a third message to the first device, where the third message is used to indicate that the second device is the device that can connect the first device to the ZigBee network.

With reference to the first aspect or the second aspect, in some implementations of the first aspect or the second aspect, the first device is further configured to switch from the second antenna to the first antenna in response to receiving the third message.

In this embodiment of this application, when receiving the second message sent by the first device, the second device may send the indication information to the third device (for example, a mobile phone), so that the third device prompts the user to put the first device close to the second device. When the first device receives the third message sent by the second device, the first device may switch to the first antenna to send the association request frame, where the association request frame carries the install code or the pre-configured link key. In this way, the second device can obtain the install code or the pre-configured link key by using a very short distance technology. Out-of-band transmission does not need to be performed between the first device and the second device, so that additional hardware costs of the first device are avoided, and a user operation is also omitted. In this way, user experience can be improved and security can be ensured.

With reference to the first aspect or the second aspect, in some implementations of the first aspect or the second aspect, the second message is a beacon request frame; or the third message is a beacon frame.

With reference to the first aspect or the second aspect, in some implementations of the first aspect or the second aspect, the second device is further configured to send a control command to the first device after the first device joins the ZigBee network and before the second device registers with a cloud server as a proxy of the first device.

In this embodiment of this application, after the first device joins the ZigBee network, and before the second device registers with the cloud server as the proxy of the first device, the user may control the first device by using the second device or the third device. In this way, the user does not need to wait in a process in which the first device is registered with the cloud server, which helps improve user experience.

In some possible implementations, the second device is further configured to send a control command encrypted by using a network key to the first device after the first device joins the ZigBee network and before the second device registers with the cloud server as the proxy of the first device.

With reference to the first aspect or the second aspect, in some implementations of the first aspect or the second aspect, the first device is further configured to send status information to the second device after the first device joins the ZigBee network and before the second device registers with the cloud server as the proxy the first device.

In this embodiment of this application, after the first device joins the ZigBee network, and before the second device registers with the cloud server as the proxy of the first device, the first device may send the status information of the first device to the second device or the third device. In this way, the user does not need to wait in a process in which the first device is registered with the cloud server, which helps improve user experience.

In some possible implementations, the first device is further configured to send the status information encrypted by using the network key to the second device after the first device joins the ZigBee network and before the second device registers with the cloud server as the proxy of the first device.

With reference to the first aspect or the second aspect, in some implementations of the first aspect or the second aspect, the first message includes the install code. The first device is further configured to determine the pre-configured link key based on the install code. The second device is further configured to determine the pre-configured link key based on the install code. The second device is further configured to send the network key encrypted by using the pre-configured link key to the first device. The first device is further configured to decrypt, based on the pre-configured link key, the network key encrypted by using the pre-configured link key, to obtain the network key.

With reference to the first aspect or the second aspect, in some implementations of the first aspect or the second aspect, the first device is an Internet of Things IoT device or an intelligent device, or the second device is an intelligent gateway or a router.

According to a third aspect, a discovery and provisioning method is provided. The method is applied to a first device. The first device includes a first antenna and a second antenna. A wireless transmit power of the first device operating by using the first antenna is less than a wireless transmit power of the first device operating by using the second antenna. The method includes: When the first device is in an unprovisioned state, the first device sends a first message through the first antenna, where the first message is used by a second device to discover the first device, and the first message includes a device identifier of the first device; and the first device performs provisioning by using the second antenna after the first device is discovered by the second device.

With reference to the third aspect, in some implementations of the third aspect, the method further includes: The first device sends a provisioning parameter through the first antenna; and that the first device performs provisioning by using the second antenna includes: The first device performs provisioning based on the provisioning parameter by using the second antenna.

With reference to the third aspect, in some implementations of the third aspect, the first message includes the provisioning parameter.

According to a fourth aspect, a discovery and provisioning method is provided. The method is applied to a first device. The first device includes a first antenna and a second antenna. A wireless transmit power of the first device operating by using the first antenna is less than a wireless transmit power of the first device operating by using the second antenna. The method includes: When the first device is in an unprovisioned state, the first device sends a first message through the first antenna, where the first message includes a provisioning parameter; and the first device performs provisioning based on the provisioning parameter by using the second antenna.

With reference to the fourth aspect, in some implementations of the fourth aspect, the method further includes: The first device sends a device identifier of the first device through the first antenna.

With reference to the fourth aspect, in some implementations of the fourth aspect, the first message includes the device identifier of the first device.

For Wi-Fi discovery and provisioning, details are as follows.

With reference to the third aspect or the fourth aspect, in some implementations of the third aspect or the fourth aspect, the provisioning parameter includes a verification code.

With reference to the third aspect or the fourth aspect, in some implementations of the third aspect or the fourth aspect, the verification code is not encrypted when the first device sends the verification code to the second device.

With reference to the third aspect or the fourth aspect, in some implementations of the third aspect or the fourth aspect, the method further includes: The first device negotiates with the second device by using the verification code, to obtain an encryption key.

With reference to the third aspect or the fourth aspect, in some implementations of the third aspect or the fourth aspect, the provisioning parameter includes an encryption key.

With reference to the third aspect or the fourth aspect, in some implementations of the third aspect or the fourth aspect, the encryption key is not encrypted when the first device sends the encryption key to the second device.

With reference to the third aspect or the fourth aspect, in some implementations of the third aspect or the fourth aspect, that the first device performs provisioning based on the provisioning parameter by using the second antenna includes: After the first device is discovered by the second device, the first device receives a service set identifier SSID of a Wi-Fi router and a password of the Wi-Fi router that are encrypted by using the encryption key and that are sent by the second device; and the first device connects to the Wi-Fi router according to the SSID and the password.

There are two Wi-Fi discovery and provisioning manners: SoftAP discovery and provisioning, and Wi-Fi sensing discovery and provisioning.

For SoftAP discovery and provisioning, details are as follows.

In some possible implementations, a trigger condition for the first device to switch from the first antenna to the second antenna may be that the first device receives a network access request message sent by the second device.

In some possible implementations, the network access request message may be an authentication request (authentication request, AUTH request).

In some possible implementations, the first message may be a beacon frame or a probe response frame.

For Wi-Fi sensing discovery and provisioning, details are as follows.

With reference to the third aspect or the fourth aspect, in some implementations of the third aspect or the fourth aspect, the method further includes: after the first device is discovered by the second device and before the first device connects to the Wi-Fi router, sending status information encrypted by using the encryption key to the second device.

With reference to the third aspect or the fourth aspect, in some implementations of the third aspect or the fourth aspect, the method further includes: after the first device is discovered by the second device and before the first device connects to the Wi-Fi router, receiving a control command that is encrypted by using the encryption key and that is sent by the second device.

With reference to the third aspect or the fourth aspect, in some implementations of the third aspect or the fourth aspect, the method further includes: After the first device is discovered by the second device and before the first device connects to the Wi-Fi router, the first device receives an identify command that is encrypted by using the encryption key and that is sent by the second device; the first device obtains and executes the identify command based on the encryption key; and the first device sends response information to the second device, where the response information is used to enable the second device to prompt a user that the first device is executing the identify command.

With reference to the third aspect or the fourth aspect, in some implementations of the third aspect or the fourth aspect, the first message is a Wi-Fi sensing frame.

With reference to the third aspect or the fourth aspect, in some implementations of the third aspect or the fourth aspect, the Wi-Fi sensing frame is a publish frame, a follow-up frame, or a subscribe frame.

For BLE discovery and provisioning, details are as follows.

With reference to the third aspect or the fourth aspect, in some implementations of the third aspect or the fourth aspect, the provisioning parameter includes a key Passkey or out-of-band OOB information, and that the first device performs provisioning based on the provisioning parameter by using the second antenna includes: The first device performs Bluetooth pairing with the second device based on the Passkey or the OOB information by using the second antenna.

With reference to the third aspect or the fourth aspect, in some implementations of the third aspect or the fourth aspect, the Passkey or the OOB information is not encrypted when the first device sends the Passkey or the OOB information to the second device.

With reference to the third aspect or the fourth aspect, in some implementations of the third aspect or the fourth aspect, the method further includes: The first device sends an encryption key to the second device through the first antenna; and after the first device is discovered by the second device and before the first device is paired with the second device, the first device sends status information encrypted by using the encryption key to the second device.

With reference to the third aspect or the fourth aspect, in some implementations of the third aspect or the fourth aspect, the method further includes: The first device sends the encryption key to the second device through the first antenna; and after the first device is discovered by the second device and before the first device is paired with the second device, the first device receives a control command that is encrypted by using the encryption key and that is sent by the second device.

With reference to the third aspect or the fourth aspect, in some implementations of the third aspect or the fourth aspect, the encryption key is carried in the first message.

With reference to the third aspect or the fourth aspect, in some implementations of the third aspect or the fourth aspect, the first message is a connectable advertising packet.

For Bluetooth mesh discovery and provisioning, details are as follows.

With reference to the third aspect or the fourth aspect, in some implementations of the third aspect or the fourth aspect, the provisioning parameter includes an authentication value; and that the first device performs provisioning based on the provisioning parameter by using the second antenna includes: The first device joins a mesh network of the second device based on the authentication value by using the second antenna.

With reference to the third aspect or the fourth aspect, in some implementations of the third aspect or the fourth aspect, the authentication value is not encrypted when the first device sends the authentication value to the second device.

With reference to the third aspect or the fourth aspect, in some implementations of the third aspect or the fourth aspect, the method further includes: The first device sends an encryption key through the first antenna; and after the first device is discovered by the second device and before the first device joins the mesh network, the first device sends status information encrypted by using the encryption key to the second device.

With reference to the third aspect or the fourth aspect, in some implementations of the third aspect or the fourth aspect, the method further includes: The first device sends the encryption key through the first antenna; and after the first device is discovered by the second device and before the first device joins the mesh network, the first device receives a control command that is encrypted by using the encryption key and that is sent by the second device.

With reference to the third aspect or the fourth aspect, in some implementations of the third aspect or the fourth aspect, the method further includes: The first device receives an identify command that is encrypted by using the encryption key and that is sent by the second device; the first device obtains and executes the identify command based on the encryption key; and the first device sends response information encrypted by using the encryption key to the second device, where the response information is used to prompt that the first device is executing the identify command.

With reference to the third aspect or the fourth aspect, in some implementations of the third aspect or the fourth aspect, the first message includes the encryption key.

With reference to the third aspect or the fourth aspect, in some implementations of the third aspect or the fourth aspect, the method further includes; The first device sends a public key of the first device through the first antenna.

With reference to the third aspect or the fourth aspect, in some implementations of the third aspect or the fourth aspect, the first message includes the public key of the first device.

With reference to the third aspect or the fourth aspect, in some implementations of the third aspect or the fourth aspect, that the first device joins a mesh network of the second device based on the authentication value by using the second antenna includes: The first device receives a provisioning invite sent by the second device; the first device sends a provisioning capability to the second device in response to receiving the provisioning invite; the first device receives the public key of the first device sent by the second device; the first device performs identity authentication with the second device based on the authentication value; and the first device receives provisioning data distributed by the second device.

With reference to the third aspect or the fourth aspect, in some implementations of the third aspect or the fourth aspect, the first message is an unprovisioned device beacon frame.

For ZigBee discovery and provisioning, details are as follows.

With reference to the third aspect or the fourth aspect, in some implementations of the third aspect or the fourth aspect, the provisioning parameter includes an install code or a pre-configured link key; and that the first device performs provisioning based on the provisioning parameter by using the second antenna includes: The first device joins a ZigBee network of the second device based on the install code or the pre-configured link key by using the second antenna.

With reference to the third aspect or the fourth aspect, in some implementations of the third aspect or the fourth aspect, the install code or the pre-configured link key is not encrypted when the first device sends the install code or the pre-configured link key to the second device.

With reference to the third aspect or the fourth aspect, in some implementations of the third aspect or the fourth aspect, the first message is a beacon request frame.

With reference to the third aspect or the fourth aspect, in some implementations of the third aspect or the fourth aspect, the method further includes: Before joining the ZigBee network based on the install code or the pre-configured link key, the first device receives a beacon frame sent by the second device; and in response to receiving the beacon frame, the first device switches from the first antenna to the second antenna.

With reference to the third aspect or the fourth aspect, in some implementations of the third aspect or the fourth aspect, the first message is an association request frame.

With reference to the third aspect or the fourth aspect, in some implementations of the third aspect or the fourth aspect, the method further includes: Before joining the ZigBee network based on the install code or the pre-configured link key, the first device receives an association response frame sent by the second device; and in response to receiving the association response frame, the first device switches from the first antenna to the second antenna.

With reference to the third aspect or the fourth aspect, in some implementations of the third aspect or the fourth aspect, the method further includes: before the first message is sent through the first antenna, sending a second message through the second antenna, where the second message is used to query whether there is an ambient device that connects the first device to the ZigBee network, and receiving a third message sent by the second device, where the third message is used to indicate that the second device is the device that can connect the first device to the ZigBee network.

With reference to the third aspect or the fourth aspect, in some implementations of the third aspect or the fourth aspect, the method further includes: In response to receiving the third message, the first device switches from the second antenna to the first antenna.

With reference to the third aspect or the fourth aspect, in some implementations of the third aspect or the fourth aspect, the second message is a beacon request frame; or the third message is a beacon frame.

With reference to the third aspect or the fourth aspect, in some implementations of the third aspect or the fourth aspect, the method further includes: After the first device joins the ZigBee network and before the second device registers with a cloud server as a proxy of the first device, the first device receives a control command sent by the second device.

With reference to the third aspect or the fourth aspect, in some implementations of the third aspect or the fourth aspect, the method further includes: After the first device joins the ZigBee network and before the second device registers with the cloud server as the proxy of the first device, the first device sends status information to the second device.

With reference to the third aspect or the fourth aspect, in some implementations of the third aspect or the fourth aspect, that the first device joins a ZigBee network of the second device based on the install code or the pre-configured link key by using the second antenna includes: The first device determines the pre-configured link key based on the install code; the first device receives a network key that is encrypted by using the pre-configured link key and that is sent by the second device; and the first device decrypts, based on the pre-configured link key, the network key encrypted by using the pre-configured link key, to obtain the network key.

According to a fifth aspect, a discovery and provisioning method is provided, where the method is applied to a second device. The method includes: When a distance between the second device and a first device is less than or equal to a preset distance, the second device receives a first message sent by the first device, where the first message is used by the second device to discover the first device, and the first message includes a device identifier of the first device; and the second device provisions the first device after the first device is discovered.

With reference to the fifth aspect, in some implementations of the fifth aspect, the method further includes: When the distance between the second device and the first device is less than or equal to the preset distance, the second device receives a provisioning parameter sent by the first device; and that the second device provisions the first device includes: The second device provisions the first device based on the provisioning parameter.

With reference to the fifth aspect, in some implementations of the fifth aspect, the first message includes the provisioning parameter.

According to a sixth aspect, a discovery and provisioning method is provided, where the method is applied to a second device. The method includes: When a distance between the second device and a first device is less than or equal to a preset distance, the second device receives a first message sent by the first device, where the first message includes a provisioning parameter; and the second device provisions the first device based on the provisioning parameter.

With reference to the sixth aspect, in some implementations of the sixth aspect, the method further includes: when the distance between the second device and the first device is less than or equal to the preset distance, receiving a device identifier of the first device sent by the first device.

With reference to the sixth aspect, in some implementations of the sixth aspect, the first message includes the device identifier of the first device.

For Wi-Fi discovery and provisioning, details are as follows.

With reference to the fifth aspect or the sixth aspect, in some implementations of the fifth aspect or the sixth aspect, the provisioning parameter includes a verification code.

With reference to the fifth aspect or the sixth aspect, in some implementations of the fifth aspect or the sixth aspect, the verification code is not encrypted when the first device sends the verification code to the second device.

With reference to the fifth aspect or the sixth aspect, in some implementations of the fifth aspect or the sixth aspect, the method further includes: The second device negotiates with the first device by using the verification code, to obtain an encryption key.

With reference to the fifth aspect or the sixth aspect, in some implementations of the fifth aspect or the sixth aspect, the provisioning parameter includes an encryption key.

With reference to the fifth aspect or the sixth aspect, in some implementations of the fifth aspect or the sixth aspect, the encryption key is not encrypted when the first device sends the encryption key to the second device.

With reference to the fifth aspect or the sixth aspect, in some implementations of the fifth aspect or the sixth aspect, that the second device provisions the first device based on the provisioning parameter includes, after the first device is discovered, sending, to the first device, a service set identifier SSID of a Wi-Fi router and a password of the Wi-Fi router that are encrypted by using the encryption key, so that the first device connects to the Wi-Fi router according to the SSID and the password.

There are two Wi-Fi discovery and provisioning manners: SoftAP discovery and provisioning, and Wi-Fi sensing discovery and provisioning.

For SoftAP discovery and provisioning, details are as follows.

In some possible implementations, a trigger condition for the first device to switch from the first antenna to the second antenna may be that the first device receives a network access request message sent by the second device.

In some possible implementations, the network access request message may be an authentication request (authentication request, AUTH request).

In some possible implementations, the first message may be a beacon frame or a probe response frame.

For Wi-Fi sensing discovery and provisioning, details are as follows.

With reference to the fifth aspect or the sixth aspect, in some implementations of the fifth aspect or the sixth aspect, the method further includes: After the first device is discovered and before the first device connects to the Wi-Fi router, the second device receives status information sent by the first device.

With reference to the fifth aspect or the sixth aspect, in some implementations of the fifth aspect or the sixth aspect, the method further includes: After the first device is discovered and before the first device connects to the Wi-Fi router, the second device sends a control command encrypted by using the encryption key to the first device.

With reference to the fifth aspect or the sixth aspect, in some implementations of the fifth aspect or the sixth aspect, the method further includes: The second device displays a control interface of the first device on a display screen after the first device is discovered and before the first device connects to the Wi-Fi router, where the control interface is used to control the first device; and the second device sends, in response to an operation on the control interface, the control command encrypted by using the encryption key to the first device.

With reference to the fifth aspect or the sixth aspect, in some implementations of the fifth aspect or the sixth aspect, the method further includes: The second device displays the control interface of the first device on the display screen after the first device is discovered and before the first device connects to the Wi-Fi router, where the control interface is used to control the first device; and the control interface further includes prompt information used to prompt that the first device is being provisioned.

With reference to the fifth aspect or the sixth aspect, in some implementations of the fifth aspect or the sixth aspect, the method further includes: obtaining the control interface of the first device based on the device identifier of the first device.

With reference to the fifth aspect or the sixth aspect, in some implementations of the fifth aspect or the sixth aspect, the method further includes: Before sending the SSID and the password that are encrypted by using the encryption key to the first device, the second device sends an identify command encrypted by using the encryption key to the first device; and the second device receives response information sent by the first device, where the response information is used to enable the second device to prompt that the first device is executing the identify command.

With reference to the fifth aspect or the sixth aspect, in some implementations of the fifth aspect or the sixth aspect, the first message is a Wi-Fi sensing frame.

With reference to the fifth aspect or the sixth aspect, in some implementations of the fifth aspect or the sixth aspect, the Wi-Fi sensing frame is a publish frame, a follow-up frame, or a subscribe frame.

For BLE discovery and provisioning, details are as follows.

With reference to the fifth aspect or the sixth aspect, in some implementations of the fifth aspect or the sixth aspect, the provisioning parameter includes a key Passkey or out-of-band OOB information, and that the second device provisions the first device based on the provisioning parameter includes: The second device performs Bluetooth pairing with the first device based on the Passkey or the OOB information.

With reference to the fifth aspect or the sixth aspect, in some implementations of the fifth aspect or the sixth aspect, the Passkey or the OOB information is not encrypted when the first device sends the Passkey or the OOB information to the second device.

With reference to the fifth aspect or the sixth aspect, in some implementations of the fifth aspect or the sixth aspect, the method further includes: When the distance between the second device and the first device is less than or equal to the preset distance, the second device receives an encryption key sent by the first device; and after the first device is discovered and before being paired with the first device, the second device receives status information that is sent by the first device and that is encrypted by using the encryption key.

With reference to the fifth aspect or the sixth aspect, in some implementations of the fifth aspect or the sixth aspect, the method further includes: When the distance between the second device and the first device is less than or equal to the preset distance, the second device receives the encryption key sent by the first device; and after the first device is discovered and before being paired with the first device, the second device sends a control command encrypted by using the encryption key to the first device.

With reference to the fifth aspect or the sixth aspect, in some implementations of the fifth aspect or the sixth aspect, the method further includes: The second device displays a control interface of the first device after the first device is discovered and before being paired with the first device, where the control interface is used to control the first device; and that the second device sends a control command encrypted by using the encryption key to the first device includes: The second device sends, in response to an operation on the control interface, the control command encrypted by using the encryption key to the first device.

With reference to the fifth aspect or the sixth aspect, in some implementations of the fifth aspect or the sixth aspect, the method further includes: The second device displays the control interface of the first device on a display screen after the first device is discovered and before being paired with the first device, where the control interface is used to control the first device; and the control interface further includes prompt information used to prompt that the first device is being provisioned.

With reference to the fifth aspect or the sixth aspect, in some implementations of the fifth aspect or the sixth aspect, the method further includes: The second device obtains the control interface of the first device based on the device identifier of the first device.

With reference to the fifth aspect or the sixth aspect, in some implementations of the fifth aspect or the sixth aspect, the encryption key is carried in the first message.

With reference to the fifth aspect or the sixth aspect, in some implementations of the fifth aspect or the sixth aspect, the first message is a connectable advertising packet.

For Bluetooth mesh discovery and provisioning, details are as follows.

With reference to the fifth aspect or the sixth aspect, in some implementations of the fifth aspect or the sixth aspect, the provisioning parameter includes an authentication value; and that the second device provisions the first device based on the provisioning parameter includes: The second device connects the first device to a mesh network based on the authentication value.

With reference to the fifth aspect or the sixth aspect, in some implementations of the fifth aspect or the sixth aspect, the authentication value is not encrypted when the first device sends the authentication value to the second device.

With reference to the fifth aspect or the sixth aspect, in some implementations of the fifth aspect or the sixth aspect, the method further includes: When the distance between the second device and the first device is less than or equal to the preset distance, the second device receives an encryption key sent by the first device; and after the first device is discovered by the second device and before the first device joins the mesh network, the second device receives status information that is sent by the first device and that is encrypted by using the encryption key.

With reference to the fifth aspect or the sixth aspect, in some implementations of the fifth aspect or the sixth aspect, the method further includes: When the distance between the second device and the first device is less than or equal to the preset distance, the second device receives the encryption key sent by the first device; and after the first device is discovered by the second device and before the first device joins the mesh network, the second device sends a control command encrypted by using the encryption key to the first device.

With reference to the fifth aspect or the sixth aspect, in some implementations of the fifth aspect or the sixth aspect, the method further includes: The second device displays a control interface of the first device on a display screen after the first device is discovered and before the first device joins the mesh network, where the control interface is used to control the first device; and that the second device sends a control command encrypted by using the encryption key to the first device includes: The second device sends, in response to an operation on the control interface, the control command encrypted by using the encryption key to the first device.

With reference to the fifth aspect or the sixth aspect, in some implementations of the fifth aspect or the sixth aspect, the method further includes: The second device displays the control interface of the first device on the display screen after the first device is discovered and before the first device joins the mesh network, where the control interface is used to control the first device; and the control interface further includes prompt information used to prompt that the first device is being provisioned.

With reference to the fifth aspect or the sixth aspect, in some implementations of the fifth aspect or the sixth aspect, the method further includes: The second device obtains the control interface of the first device based on the device identifier of the first device.

With reference to the fifth aspect or the sixth aspect, in some implementations of the fifth aspect or the sixth aspect, the method further includes: After discovering the first device, the second device sends an identify, command encrypted by using the encryption key to the first device; and the second device receives response information sent by the first device, where the response information is used to prompt that the first device is executing the identify command.

With reference to the fifth aspect or the sixth aspect, in some implementations of the fifth aspect or the sixth aspect, the first message includes the encryption key.

With reference to the fifth aspect or the sixth aspect, in some implementations of the fifth aspect or the sixth aspect, the method further includes: when the distance between the second device and the first device is less than or equal to the preset distance, receiving a public key of the first device sent by the first device.

With reference to the fifth aspect or the sixth aspect, in some implementations of the fifth aspect or the sixth aspect, the first message includes the public key of the first device.

With reference to the fifth aspect or the sixth aspect, in some implementations of the fifth aspect or the sixth aspect, that the second device connects the first device to a mesh network based on the authentication value includes: The second device sends a provisioning invite to the first device; the second device receives a provisioning capability sent by the first device; the second device sends the public key of the first device to the first device; the second device performs identity authentication with the first device based on the authentication value; and the second device distributes provisioning data to the first device.

With reference to the fifth aspect or the sixth aspect, in some implementations of the fifth aspect or the sixth aspect, the first message is an unprovisioned device beacon frame.

For ZigBee discovery and provisioning, details are as follows.

With reference to the fifth aspect or the sixth aspect, in some implementations of the fifth aspect or the sixth aspect, the provisioning parameter includes an install code or a pre-configured link key; and that the second device provisions the first device based on the provisioning parameter includes: The second device connects the first device to a ZigBee network based on the install code or the pre-configured link key.

With reference to the fifth aspect or the sixth aspect, in some implementations of the fifth aspect or the sixth aspect, the install code or the pre-configured link key is not encrypted when the first device sends the install code or the pre-configured link key to the second device.

With reference to the fifth aspect or the sixth aspect, in some implementations of the fifth aspect or the sixth aspect, the first message is a beacon request frame.

With reference to the fifth aspect or the sixth aspect, in some implementations of the fifth aspect or the sixth aspect, the first message is an association request frame.

With reference to the fifth aspect or the sixth aspect, in some implementations of the fifth aspect or the sixth aspect, the method further includes: Before receiving the first message, the second device receives a second message sent by the first device, where the second message is used to query whether there is an ambient device that connects the first device to the ZigBee network; the second device sends indication information to a third device in response to receiving the second message, so that the third device prompts a user to put the first device close to the second device, where the indication information is used to indicate that the first device needs to join the ZigBee network; the second device receives acknowledge information sent by the third device, where the acknowledge information is used to indicate the second device to connect the first device to the ZigBee network; and the second device sends a third message to the first device in response to receiving the acknowledge information, where the third message is used to indicate that the second device is the device that can connect the first device to the ZigBee network.

With reference to the fifth aspect or the sixth aspect, in some implementations of the fifth aspect or the sixth aspect, the second message is a beacon request frame; or the third message is a beacon frame.

With reference to the fifth aspect or the sixth aspect, in some implementations of the fifth aspect or the sixth aspect, the method further includes: After the first device joins the ZigBee network and before the second device registers with a cloud server as a proxy of the first device, the second device sends a control command to the first device.

With reference to the fifth aspect or the sixth aspect, in some implementations of the fifth aspect or the sixth aspect, the method further includes: After the first device joins the ZigBee network and before the second device registers with the cloud server as the proxy of the first device, the second device receives status information sent by the first device.

With reference to the fifth aspect or the sixth aspect, in some implementations of the fifth aspect or the sixth aspect, the first message includes the install code; and that the second device connects the first device to a ZigBee network based on the install code or the pre-configured link key includes: The second device determines the pre-configured link key based on the install code; and the second device sends a network key encrypted by using the pre-configured link key to the first device.

According to a seventh aspect, a method for discovery and provisioning of a Wi-Fi device by using Wi-Fi sensing is provided, where the method is applied to a first device. The method includes: The first device sends a first Wi-Fi sensing frame when the first device is in an unprovisioned state, where the first Wi-Fi sensing frame is used to enable a second device to discover the first device; after the first device is discovered by the second device, the first device receives a second Wi-Fi sensing frame sent by the second device, where the second Wi-Fi sensing frame includes a service set identifier SSID of a Wi-Fi router and a password of the Wi-Fi router; and the first device connects to the Wi-Fi router according to the SSID and the password.

In this embodiment of this application, discovery and provisioning of a first device can be performed by using a Wi-Fi sensing technology, and the first device does not need to support a SoftAP. This reduces time consumed in discovery and provisioning, and helps improve user experience.

In some possible implementations, the first Wi-Fi sensing frame may be a publish (Publish) frame, a follow-up frame, or a subscribe (Subscribe) frame, and the second Wi-Fi sensing frame may be a follow-up frame.

With reference to the seventh aspect, in some implementations of the seventh aspect, that the first device sends a first Wi-Fi sensing frame includes: The first device sends the first Wi-Fi sensing frame at a first wireless transmit power; and that the first device connects to the Wi-Fi router includes: The first device connects to the Wi-Fi router at a second wireless transmit power, where the first wireless transmit power is less than the second wireless transmit power.

In this embodiment of this application, the first device may use the first wireless transmit power when sending the first Wi-Fi sensing frame. In this way, a communication distance for discovering the first device can be reduced, so that a device in a neighbor's home can be prevented from discovering the first device, or inappropriate pairing can be avoided when there are a plurality of devices to be provisioned. In this way, user experience can be improved. The first device accesses the Wi-Fi router at the second wireless transmit power, which helps the first device complete provisioning as soon as possible.

With reference to the seventh aspect, in some implementations of the seventh aspect, the first device includes a first antenna and a second antenna; a wireless transmit power of the first device operating by using the first antenna is less than a wireless transmit power of the first device operating by using the second antenna; that the first device sends a first Wi-Fi sensing frame includes: The first device sends the first Wi-Fi sensing frame through the first antenna; and that the first device receives a second Wi-Fi sensing frame sent by the second device includes: The first device receives the second Wi-Fi sensing frame through the second antenna.

In this embodiment of this application, the two antennas are disposed in the first device. The first device may use the first antenna for discovery of the first device performed by the second device. In this way, the communication distance for discovering the first device can be greatly reduced, so that a device in a neighbor's home can be prevented from discovering the first device or inappropriate pairing can be avoided when there are a plurality of devices to be provisioned. Switching to the second antenna in a provisioning process helps the first device complete provisioning as soon as possible.

With reference to the seventh aspect, in some implementations of the seventh aspect, after the first device is discovered by the second device, and before the first device connects to the Wi-Fi router, the method further includes: The first device receives a control command sent by the second device; and the first device executes the control command and sends status information to the second device.

In this embodiment of this application, after the first device is discovered, the second device can immediately control the first device. For example, after the first device is discovered, a user interface of the second device may display a control interface for an intelligent device. A user may control the first device by using the second device in a provisioning process of the first device, and the time-consuming provisioning process is performed in background, so that the user is unaware of the process. This helps improve user experience.

With reference to the seventh aspect, in some implementations of the seventh aspect, after the first device is discovered by the second device, and before the first device connects to the Wi-Fi router, the method further includes: The first device detects a status update operation performed by the user on the first device; and the first device sends updated status information to the second device in response to the operation.

In this embodiment of this application, after the first device is discovered, the first device may send the status information of the first device to the second device. For example, after the first device is discovered, the user interface of the second device may display the control interface for an intelligent device, and the user may view a status information change of the first device by using the second device. The time-consuming provisioning process is performed in background, so that the user is unaware of the process. This helps improve user experience.

In some possible implementations, the first device may use the first Wi-Fi sensing frame to carry a Product ID of the first device. After obtaining the Product ID of the first device, the second device may request a control mapping file and a details page (for example, a function or a picture included in the first device) of the first device from a server. After sending, to the first device, the SSID of the Wi-Fi router and the password of the Wi-Fi router that are encrypted by using the encryption key, the second device may display the control interface of the first device based on the control mapping file and the details page.

With reference to the seventh aspect, in some implementations of the seventh aspect, before the first device receives the second Wi-Fi sensing frame through the second antenna, the method further includes: The first device sends an encryption key to the second device through the first antenna.

In this embodiment of this application, the first device may directly send the encryption key to the second device through the first antenna, and therefore an additional hardware device is not required for out-of-band transmission. This reduces production costs, and security is improved. In addition, this can reduce a provisioning latency of the first device, reduce resources occupied in an identity authentication process and a key negotiation process, and help improve user experience.

With reference to the seventh aspect, in some implementations of the seventh aspect, the encryption key is not encrypted when the first device sends the encryption key to the second device.

In this embodiment of this application, when a communication distance between the first device and the second device is within a preset safe distance (for example, 30 cm), it may be considered that the encryption key may be transmitted in plaintext between the first device and the second device, and the first device may not encrypt the encryption key.

With reference to the seventh aspect, in some implementations of the seventh aspect, the first Wi-Fi sensing frame includes the encryption key.

In this embodiment of this application, the first device may use the first Wi-Fi sensing frame to carry the encryption key. In this way, the second device can obtain the encryption key when discovering the first device, so that the first device does not need to send the encryption key to the second device by sending another message. This reduces signaling overheads of the first device, shortens the provisioning latency of the first device, and improves user experience.

With reference to the seventh aspect, in some implementations of the seventh aspect, before the first device receives the second Wi-Fi sensing frame through the second antenna, the method further includes: The first device sends a verification code to the second device through the first antenna.

In this embodiment of this application, the first device may send the verification code to the second device through the first antenna, and therefore an additional hardware device is not required for out-of-band transmission. This reduces production costs. Security is improved, which helps improve user experience.

With reference to the seventh aspect, in some implementations of the seventh aspect, the verification code is not encrypted when the first device sends the verification code to the second device.

In this embodiment of this application, when the communication distance between the first device and the second device is within the preset safe distance (for example, 30 cm), it may be considered that the verification code may be transmitted in plaintext between the first device and the second device, and the first device may not encrypt the verification code.

With reference to the seventh aspect, in some implementations of the seventh aspect, the first Wi-Fi sensing frame includes the verification code.

In this embodiment of this application, the first device may use the first Wi-Fi sensing frame to carry the verification code. In this way, the second device can obtain the verification code when obtaining a device identifier of the first device, so that the first device does not need to send the verification code to the second device by sending another message. This reduces signaling overheads of the first device.

With reference to the seventh aspect, in some implementations of the seventh aspect, the method further includes: The first device negotiates with the second device by using the verification code, to obtain the encryption key.

In this embodiment of this application, the first device may directly send the verification code to the second device through the first antenna, and the first device may negotiate with the second device by using the verification code to obtain the encryption key, so that the second device encrypts the SSID of the Wi-Fi router and the password of the Wi-Fi router. In this way, an additional hardware device is not required for out-of-band transmission. This reduces production costs, and security is improved.

With reference to the seventh aspect, in some implementations of the seventh aspect, before the first device receives the second Wi-Fi sensing frame sent by the second device, the method further includes: The first device receives an identify command sent by the second device; and the first device executes the identify command and sends response information to the second device, where the response information is used to enable the second device to prompt the user that the first device is executing the identify command.

In this embodiment of this application, after receiving the response information of the first device for the identify command, the second device may prompt the user that the first device is executing the identify command. In this way, it is convenient for the user to determine that a device to be provisioned is the first device.

With reference to the seventh aspect, in some implementations of the seventh aspect, the first Wi-Fi sensing frame is a publish frame, a follow-up frame, or a subscribe frame.

With reference to the seventh aspect, in some implementations of the seventh aspect, the first device is an Internet of Things IoT device or an intelligent device, or the second device is a mobile phone.

According to an eighth aspect, a system for discovery and provisioning of a Wi-Fi device by using Wi-Fi sensing is provided. The system includes a first device and a second device. The first device is configured to send a first Wi-Fi sensing frame when the first device is in an unprovisioned state, where the first Wi-Fi sensing frame is used to enable the second device to discover the first device. The second device is configured to: after discovering the first device, send a second Wi-Fi sensing frame to the first device, where the second Wi-Fi sensing frame includes a service set identifier SSID of a Wi-Fi router and a password of the Wi-Fi router. The first device is further configured to connect to the Wi-Fi router according to the SSID and the password.

With reference to the eighth aspect, in some implementations of the eighth aspect, the first device is further configured to: after the first device is discovered by the second device and before the first device connects to the Wi-Fi router, receive a control command sent by the second device; and execute the control command and send status information to the second device.

With reference to the eighth aspect, in some implementations of the eighth aspect, the first device is further configured to: after the first device is discovered by the second device and before the first device connects to the Wi-Fi router, detect a status upgrade operation performed by a user on the first device, and send updated status information to the second device in response to the operation.

With reference to the eighth aspect, in some implementations of the eighth aspect, the first device is specifically configured to: send the first Wi-Fi sensing frame at a first wireless transmit power; and connect to the Wi-Fi router at a second wireless transmit power, where the first wireless transmit power is less than the second wireless transmit power. The second device is specifically configured to: when a distance between the second device and the first device is less than or equal to a preset distance, receive the first Wi-Fi sensing frame, where the preset distance is a distance covered by the first wireless transmit power.

With reference to the eighth aspect, in some implementations of the eighth aspect, the first device includes a first antenna and a second antenna, and a wireless transmit power of the first device operating by using the first antenna is less than a wireless transmit power of the first device operating by using the second antenna. The first device is specifically configured to: send the first Wi-Fi sensing frame through the first antenna; and receive the second Wi-Fi sensing frame through the second antenna. The second device is specifically configured to: when a distance between the second device and the first device is less than or equal to a preset distance, receive the first Wi-Fi sensing frame, where the preset distance is a distance covered by a wireless transmit power of the first antenna in operation.

With reference to the eighth aspect, in some implementations of the eighth aspect, the first device is further configured to: before receiving the second Wi-Fi sensing frame through the second antenna, send an encryption key to the second device through the first antenna.

With reference to the eighth aspect, in some implementations of the eighth aspect, the encryption key is not encrypted when the first device sends the encryption key to the second device.

With reference to the eighth aspect, in some implementations of the eighth aspect, the first Wi-Fi sensing frame includes the encryption key.

With reference to the eighth aspect, in some implementations of the eighth aspect, the first device is further configured to: before receiving the second Wi-Fi sensing frame through the second antenna, send a verification code to the second device through the first antenna.

With reference to the eighth aspect, in some implementations of the eighth aspect, the verification code is not encrypted when the first device sends the verification code to the second device.

With reference to the eighth aspect, in some implementations of the eighth aspect, the first Wi-Fi sensing frame includes the verification code.

With reference to the eighth aspect, in some implementations of the eighth aspect, the first device is further configured to negotiate with the second device by using the verification code, to obtain the encryption key.

With reference to the eighth aspect, in some implementations of the eighth aspect, the first device is further configured to: before receiving the second Wi-Fi sensing frame sent by the second device, receive an identify command sent by the second device; and execute the identify command and send response information to the second device, where the response information is used to enable the second device to prompt the user that the first device is executing the identify command.

With reference to the eighth aspect, in some implementations of the eighth aspect, the first Wi-Fi sensing frame is a publish frame, a follow-up frame, or a subscribe frame.

With reference to the eighth aspect, in some implementations of the eighth aspect, the first device is an Internet of Things IoT device or an intelligent device, or the second device is a mobile phone.

According to a ninth aspect, a method for discovery and provisioning of a Wi-Fi device by using Wi-Fi sensing is provided, where the method is applied to a second device. The method includes: When a distance between the second device and a first device is less than or equal to a preset distance, the second device receives a first Wi-Fi sensing frame sent by the first device, where the first Wi-Fi sensing frame is used to enable the second device to discover the first device; and after the second device discovers the first device, the second device sends a second Wi-Fi sensing frame to the first device, where the second Wi-Fi sensing frame includes a service set identifier SSID of a Wi-Fi router and a password of the Wi-Fi router, and the SSID and the password is configured to enable the first device to connect to the Wi-Fi router.

With reference to the ninth aspect, in some implementations of the ninth aspect, the method further includes: After the first device is discovered by the second device and before the first device connects to the Wi-Fi router, the second device receives status information sent by the first device.

With reference to the ninth aspect, in some implementations of the ninth aspect, the method further includes: After the first device is discovered by the second device and before the first device connects to the Wi-Fi router, the second device sends a control command to the first device.

With reference to the ninth aspect, in some implementations of the ninth aspect, the method further includes: The second device displays a control interface of the first device on a display screen after the first device is discovered by the second device and before the first device connects to the Wi-Fi router, where the control interface is used to control the first device; and that the second device sends a control command to the first device includes: The second device sends the control command to the first device in response to an operation on the control interface.

With reference to the ninth aspect, in some implementations of the ninth aspect, the method further includes: The second device displays the control interface of the first device on the display screen after the first device is discovered by the second device and before the first device connects to the Wi-Fi router, where the control interface is used to control the first device, and the control interface further includes prompt information used to prompt that the first device is being provisioned.

With reference to the ninth aspect, in some implementations of the ninth aspect, the first Wi-Fi sensing frame further includes a device identifier of the first device. The method further includes: The second device obtains the device identifier of the first device from the first Wi-Fi sensing frame after the second device receives the first Wi-Fi sensing frame sent by the first device; and the second device obtains the control interface of the first device based on the device identifier of the first device.

According to a tenth aspect, a chip is provided. The chip is included in an electronic device. The chip further includes one or more processors, one or more memories, and one or more computer programs. The one or more computer programs are stored in the one or more memories. The one or more computer programs include instructions. When the instructions are executed by the one or more processors, the chip is enabled to perform the discovery and provisioning method according to any one of the third aspect, the fourth aspect, or the seventh aspect.

According to an eleventh aspect, a chip is provided. The chip is included in an electronic device. The chip further includes one or more processors, one or more memories, and one or more computer programs. The one or more computer programs are stored in the one or more memories. The one or more computer programs include instructions. When the instructions are executed by the one or more processors, the chip is enabled to perform the discovery and provisioning method according to any one of the fifth aspect, the sixth aspect, or the ninth aspect.

According to a twelfth aspect, this application provides an electronic device, including one or more sensors, one or more processors, one or more memories, and one or more computer programs. The one or more computer programs are stored in the memory. When the electronic device operates, the processor executes the one or more computer programs stored in the memory, so that the electronic device performs the discovery and provisioning method according to any implementation of the first aspect. Alternatively, the processor executes the one or more computer programs stored in the memory, so that the electronic device performs the discovery and provisioning method according to any one of the third aspect, the fourth aspect, or the seventh aspect.

According to a thirteenth aspect, this application provides an electronic device, including one or more sensors, one or more processors, one or more memories, and one or more computer programs. The one or more computer programs are stored in the memory. When the electronic device operates, the processor executes the one or more computer programs stored in the memory, so that the electronic device performs the discovery and provisioning method according to any implementation of the first aspect. Alternatively, the processor executes the one or more computer programs stored in the memory, so that the electronic device performs the discovery and provisioning method according to any one of the fifth aspect, the sixth aspect, or the ninth aspect.

According to a fourteenth aspect, this application provides a computer storage medium, including computer instructions. When the computer instructions are run on an electronic device, the electronic device performs the discovery and provisioning method according to any one of the third aspect, the fourth aspect, or the seventh aspect; or when the computer instructions are run on the electronic device, the electronic device performs the discovery and provisioning method according to any one of the fifth aspect, the sixth aspect, or the ninth aspect.

According to a fifteenth aspect, this application provides a computer program product. When the computer program product runs on an electronic device, the electronic device performs the discovery and provisioning method according to any one of the third aspect, the fourth aspect, or the seventh aspect, or when the computer program product runs on the electronic device, the electronic device performs the discovery and provisioning method according to any one of the fifth aspect, the sixth aspect, or the ninth aspect.

It may be understood that, the system, the chip, the electronic device, the computer storage medium, and the computer program product provided above are all configured to perform the corresponding method provided above. Therefore, for beneficial effects that can be achieved by the system, the chip, the electronic device, the computer storage medium, and the computer program product, refer to beneficial effects in the corresponding method provided above. Details are not described again herein.

DESCRIPTION OF EMBODIMENTS

Figure 1:
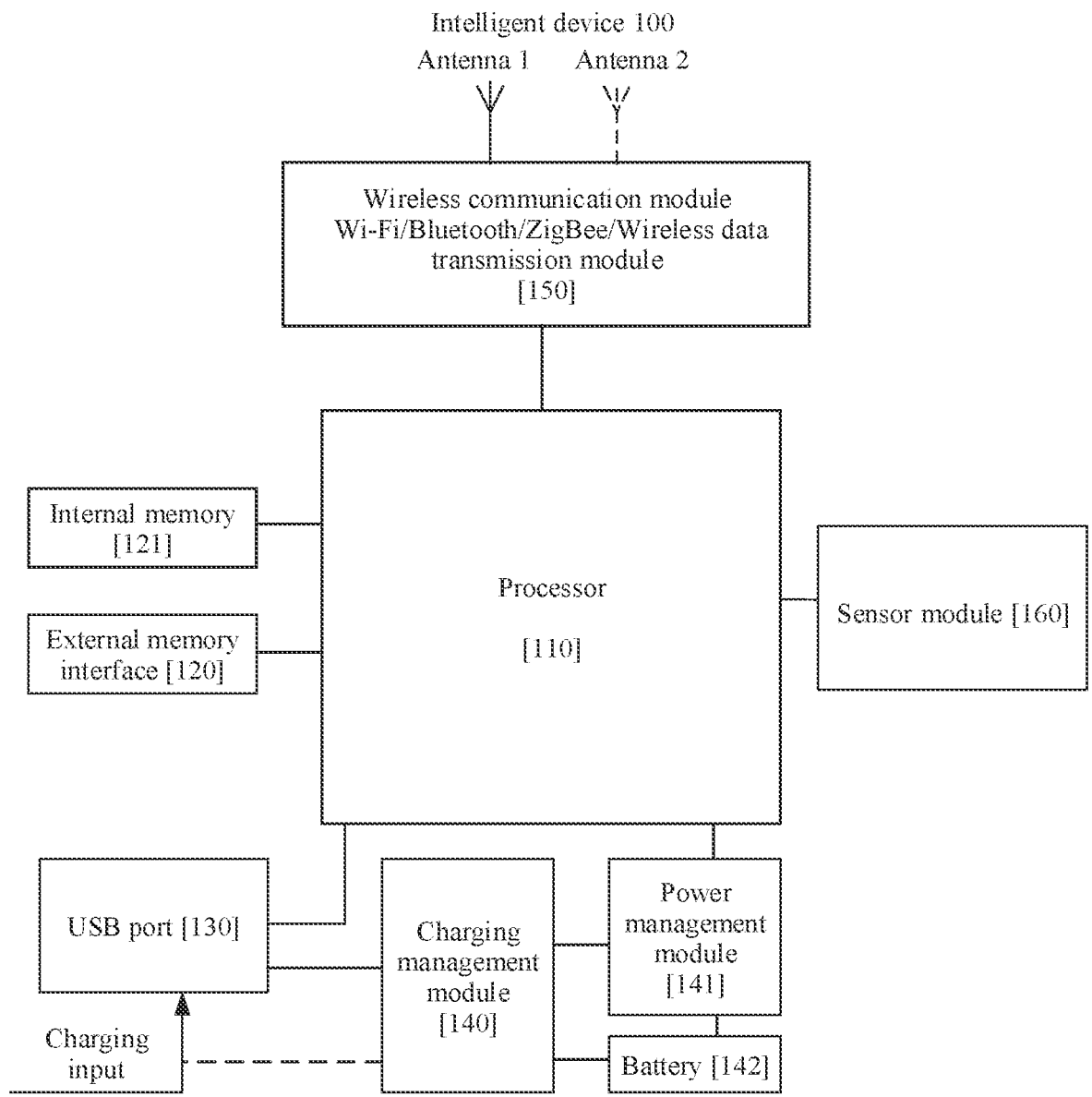
FIG. 1 is a schematic diagram of a structure of an intelligent device according to an embodiment of this application.

Terms used in the following embodiments are merely intended to describe particular embodiments, but are not intended to limit this application. As used in the specification and appended claims of the application, singular expressions "one", "a". "the", "the foregoing", "this", and "the one" are also intended to include expressions such as "one or more", unless the contrary is clearly indicated in its context. It should be further understood that, in the following embodiments of this application, "at least one" or "one or more" means one, two, or more. The term "and/or" is used to describe an association relationship between associated objects and represents that three relationships may exist. For example, A and/or B may represent the following three cases: Only A exists, both A and B exist, and only B exists, where A and B may be singular or plural. The character "/" usually indicates an "or" relationship between associated objects.

Reference to "one embodiment", "some embodiments", or the like described in this specification means that one or more embodiments of this application include a particular feature, structure, or characteristic described in combination with the embodiment. Therefore, in this specification, statements, such as "in an embodiment", "in some embodiments", "in some other embodiments", and "in other embodiments", that appear at different places do not necessarily mean referring to a same embodiment, instead, the statements mean referring to "one or more but not all of the embodiments", unless otherwise specifically emphasized in other ways. Terms "include", "contain", "have", and variants of the terms all mean "include but are not limited to", unless otherwise specifically emphasized in other ways.

The following describes a first device and a second device in embodiments of this application.

The first device in embodiments of this application may be an intelligent device such as an intelligent socket, an intelligent air purifier, an intelligent air conditioner, an intelligent camera, an intelligent alarm clock, an intelligent curtain, a robot vacuum cleaner, an intelligent lamp, or an intelligent sound box. These intelligent devices may establish a connection to the second device by using a wireless communication technology such as Wi-Fi, BLE, Bluetooth mesh, or ZigBee, or these intelligent devices may connect to a Wi-Fi router through the second device, to implement connections between the intelligent devices and a cloud server.

In some embodiments, the second device may be a mobile phone, a Bluetooth BLE gateway, a Bluetooth Mesh gateway, a ZigBee gateway, a tablet computer, or a wearable electronic device having a wireless communication function (such as an intelligent watch). An example embodiment of the second device includes but is not limited to a portable electronic device using iOS®, Android®, Microsoft®, Windows, Linux, or another operating system. The second device may alternatively be another portable electronic device such as a laptop computer (Laptop). It should be further understood that, in some other embodiments, the foregoing electronic device may not be the portable electronic device but a desktop computer.

For example, FIG. 1 is a schematic diagram of a structure of an intelligent device 100. The intelligent device 100 may include a processor 110, an external memory interface 120, an internal memory 121, a universal serial bus (universal serial bus, USB) port 130, a charging management module 140, a power management module 141, a battery 142, an antenna 1, an antenna 2, a wireless communication module 150, a sensor module 160, and the like.

It may be understood that the structure shown in this embodiment of this application does not constitute a specific limitation on the electronic device 100. In some other embodiments of this application, the intelligent device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a video codec, a digital signal processor (digital signal processor. DSP), a baseband processor, a neural-network processing unit (neural-network processing unit, NPU), and/or the like. Different processing units may be independent components, or may be integrated into one or more processors. In some embodiments, the intelligent device 100 may alternatively include one or more processors 110. The controller may generate an operation control signal based on instruction operation code and a time sequence signal, to complete control of instruction reading and instruction execution.

In some embodiments, the processor 110 may include one or more interfaces. The interface may include an inter-integrated circuit (inter-integrated circuit, I2C) interface, an integrated circuit sound (integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like. The USB port 130 is a port that conforms to a USB standard specification, and may be specifically a mini USB port, a micro USB port, a USB type-C port, or the like. The USB port 130 may be configured to connect to a charger to charge the intelligent device 100, or may be configured to transmit data between the intelligent device 100 and a peripheral device.

It may be understood that, an interface connection relationship between the modules shown in this embodiment of this application is merely an example for description, and does not constitute a limitation on the structure of the intelligent device 100. In some other embodiments of this application, the intelligent device 100 may alternatively use an interface connection manner different from the interface connection manner in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the intelligent device 100. The charging management module 140 may further supply power to the intelligent device by using the power management module 141 when the battery 142 is charged.

The power management module 141 is configured to connect the battery 142, the charging management module 140, and the processor 110. The power management module 141 receives an input from the battery 142 and/or an input from the charging management module 140, to supply power to the processor 110, the internal memory 121, an external memory 120, the wireless communication module 150, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the intelligent device 100 may be implemented by using the antenna 1, the antenna 2, the wireless communication module 150, and the like.

The wireless communication module 150 may provide a solution for wireless communication of Wi-Fi, Bluetooth (Bluetooth. BT), a wireless data transmission module (for example, 433 MHz, 868 MHz, or 915 MHz), and the like and that is applied to the intelligent device 100. The wireless communication module 150 may be one or more components integrating at least one communication processor module. The wireless communication module 150 receives an electromagnetic wave through the antenna 1 or the antenna 2, performs processing such as filtering and frequency modulation on an electromagnetic wave signal, and sends the processed signal to the processor 110. The wireless communication module 150 may further receive a to-be-sent signal from the processor 110, perform frequency modulation and amplification on the signal, and convert the signal into an electromagnetic wave for radiation through the antenna 1 or the antenna 2.

In this embodiment of this application, the intelligent device 100 may send a first message through a first antenna. The first message may carry a device identifier or a product identifier of the intelligent device 100, and is used by an ambient second device to discover the intelligent device. The intelligent device 100 may further receive, by using the wireless communication module, a message sent by the second device.

In this embodiment of this application, the intelligent device 100 may send the first message through the first antenna. The first message may carry a provisioning parameter, and the provisioning parameter may be used in a provisioning process of the first device.

The external memory interface 120 may be configured to connect to an external memory card, for example, a micro SD card, to extend a storage capability of the intelligent device 100. The external memory card communicates with the processor 110 through the external memory interface

120, to implement a data storage function. For example, files such as music and a video are stored in the external memory card.

The internal memory 121 may be configured to store one or more computer programs, and the one or more computer programs include instructions. The processor 110 may run the instructions stored in the internal memory 121, so that the intelligent device 100 performs a discovery and provisioning method provided in some embodiments of this application, various applications, data processing, and the like. The internal memory 121 may include a code storage area and a data storage area. The code storage area may store an operating system. The data storage area may store data created during use of the intelligent device 100, and the like. In addition, the internal memory 121 may include a high-speed random access memory, or may include a non-volatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory that is disposed in the processor 110, to enable the intelligent device 100 to perform the discovery and provisioning method provided in embodiments of this application, other applications, and data processing.

Before technical solutions in embodiments of this application are described, an access manner of an intelligent device by using Wi-Fi or Bluetooth BLE is first described.

Figure 2:
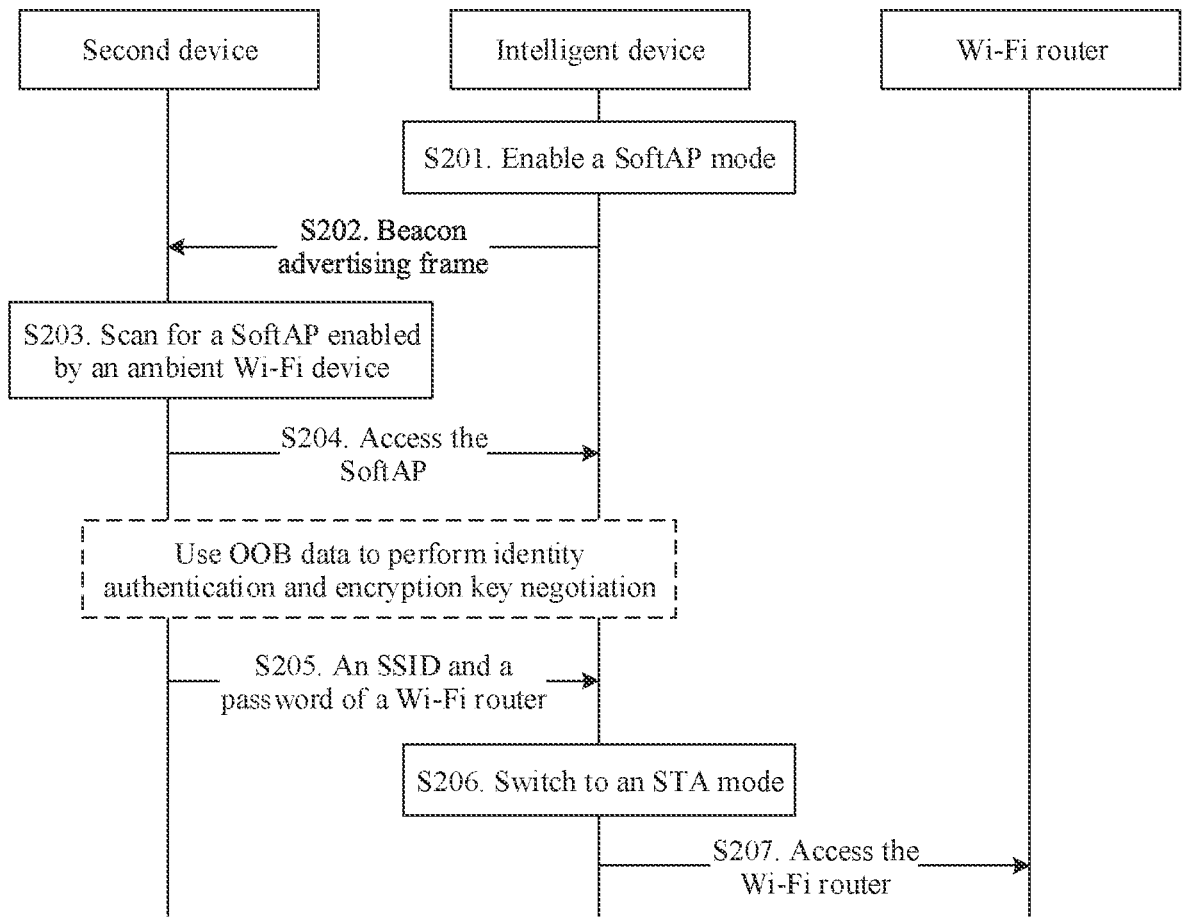
FIG. 2 is a schematic flowchart of discovery and provisioning an intelligent device by using Wi-Fi.

FIG. 2 is a schematic flowchart of discovering and provisioning a first device by using Wi-Fi. The first device may be the intelligent device described in the foregoing embodiment, and a process may include the following steps.

S201. The first device enables a SoftAP mode.

For example, when the first device is powered on and determines that the first device is in an unprovisioned state, the first device may automatically enable the SoftAP mode. After the first device enables the SoftAP mode, the first device is used as a wireless access point, and another device may access a Wi-Fi network provided by the first device.

The SoftAP mode is a technology in which a function of a wireless access point (access point, AP) is implemented by using a Wi-Fi chip and dedicated software. The SoftAP mode may replace an AP in a wireless network, and therefore costs of wireless networking can be reduced.

It should be understood that, if the first device previously completed provisioning, after the first device is powered on, the first device may directly connect to a Wi-Fi router to which the first device was previously connected.

S202. The first device sends a beacon (beacon) frame to an ambient device.

For example, the beacon frame may carry a service set identifier (service set identifier, SSID) of a SoftAP enabled by the first device.

S203. A second device scans the SoftAP enabled by the ambient first device.

It should be understood that S202 and S203 are a process in which the second device passively discovers the first device. Alternatively, the second device may actively discover the first device. For example, the second device sends a probe request (probe request) frame, and the first device sends a probe response (probe response) frame to the second device in response to receiving a probe request frame.

For example, a user may trigger, by using an application (application. APP) on the second device, the second device to scan for a SoftAP enabled by an ambient device. S204. The second device accesses the SoftAP enabled by the first device.

The user may obtain, through an interface of the APP on the second device, a list of devices obtained through scanning by the second device, and the user may select a device from the list. In this way, the second device accesses the SoftAP enabled by the first device.

S205. The second device sends an SSID of a Wi-Fi router and a password of the Wi-Fi router to the first device.

In some scenarios in which a security requirement is not high, the second device may send the SSID of the Wi-Fi router and the password of the Wi-Fi router in plaintext. However, in some scenarios in which security requirement is high, because there is a huge security risk when the second device sends the SSID of the Wi-Fi router and the password of the Wi-Fi router to the first device in plaintext, out-of-band (out of band, OOB) data (PIN code) may be used for identity authentication and encryption key negotiation, and then a provisioning parameter (for example, the SSID of the Wi-Fi router and the password of the Wi-Fi router) is encrypted by using an encryption key. Alternatively, in some scenarios in which a security requirement is not high, the second device may encrypt the SSID of the Wi-Fi router and the password of the Wi-Fi router by using a preset encryption key; or the second device may perform identity authentication and key negotiation with the first device by using a preset PIN code, to obtain the encryption key, and encrypt the SSID of the Wi-Fi router and the password of the Wi-Fi router by using the encryption key.

The SSID of the Wi-Fi router and the password of the Wi-Fi router are an SSID and a password of a Wi-Fi network that the first device needs to join. The second device may access in advance or previously accessed a Wi-Fi network provided by the Wi-Fi router, and therefore the second device stores the SSID and the password of the Wi-Fi router; or the second device does not access the Wi-Fi network, and the user enters the SSID and the password of the Wi-Fi router.

It should be understood that the OOB may enable identity authentication and encryption key negotiation between the first device and the second device in manners such as entering a PIN code and scanning a two-dimensional code on the first device by the user, and using a sound wave, a light wave, or another out-of-band medium (for example, an NFC tag).

For example, the user may use the second device to scan the two-dimensional code on the first device to obtain the PIN code, and the second device may perform identity authentication and encryption key negotiation with the first device based on the PIN code. When the second device sends the SSID of the Wi-Fi router and the password of the Wi-Fi router to the first device, the second device may encrypt the SSID of the Wi-Fi router and the password of the Wi-Fi router by using the encryption key obtained through identity authentication and key negotiation. After obtaining an encrypted SSID of the Wi-Fi router and an encrypted password of the Wi-Fi router, the first device may decrypt the encrypted SSID of the Wi-Fi router and the encrypted password of the Wi-Fi router by using the encryption key, to obtain the SSID of the Wi-Fi router and the password of the Wi-Fi router.

S206. The first device switches from the SoftAP mode to a station (station, STA) mode.

After obtaining the SSID of the Wi-Fi router and the password of the Wi-Fi router from the second device, the first device may switch from the SoftAP mode to the STA mode.

S207. The first device accesses the Wi-Fi router.

The first device may access, by using the SSID of the Wi-Fi router and the password of the Wi-Fi router that are obtained from the second device, the Wi-Fi network provided by the Wi-Fi router, and then access an IoT network, and the first device usually further access a cloud server.

Because the first device such as an intelligent socket, an intelligent lamp, or an intelligent air conditioner does not have a human-machine interaction interface, the first device cannot select a specified wireless access point (wireless access point, AP) and enter a connection password like the second device (such as a mobile phone or a computer). A method for Wi-Fi discovery and provisioning is used to meet a network access requirement of the first device. To be specific, a Wi-Fi module in the first device is notified of a name (SSID) and the password (password, PWD) of the Wi-Fi router in a specific manner, and then the first device connects to a specified AP based on a received SSID of the Wi-Fi router and a received password of the Wi-Fi router.

However, the second device can send the SSID of the Wi-Fi router and the password of the Wi-Fi router to the first device only after the second device connects to the SoftAP of the first device. After obtaining the SSID of the Wi-Fi router and the password of the Wi-Fi router, the first device may connect to the Wi-Fi router and perform registration in a cloud. This process (a process from device discovery to registration completion) takes a long time (about 15 seconds on average). Before registration in the cloud succeeds (or before provisioning succeeds, where provisioning success may mean that the first device connects to the Wi-Fi router and then successfully registers in the cloud), the second device cannot perform a control operation on the first device. In this period, the user can only wait, and cannot perform an operation on the first device by using the second device. Consequently, user experience is poor.

Figure 3:
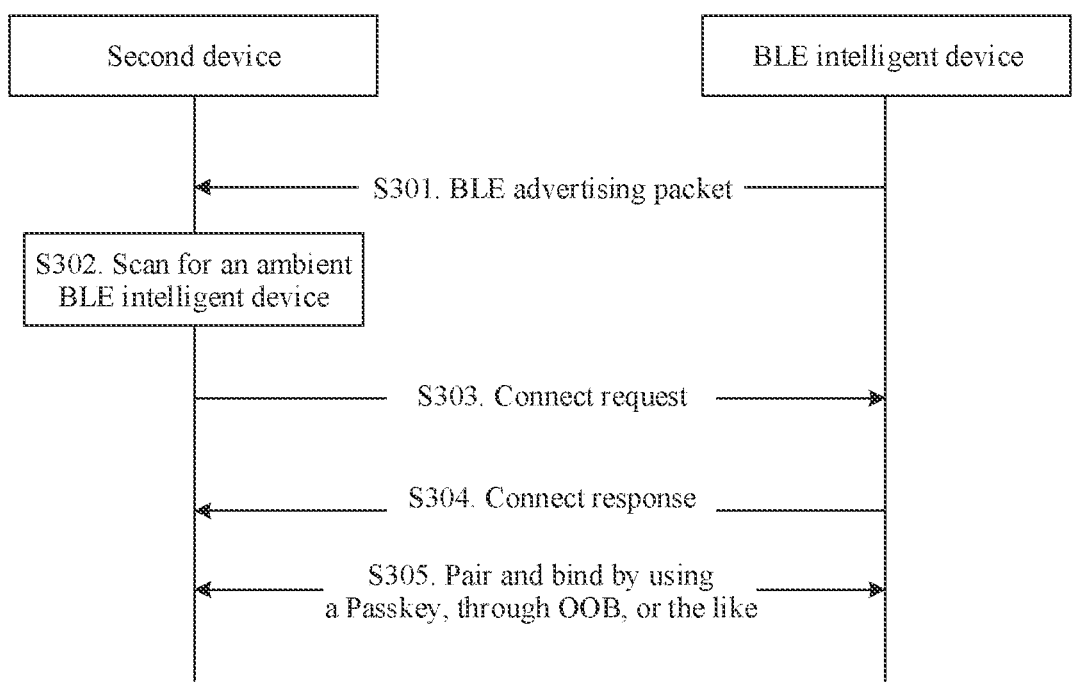
FIG. 3 is a schematic flowchart of discovery and provisioning a BLE intelligent device by using Wi-Fi.

FIG. 3 is a schematic flowchart of discovering and provisioning a first device by using BLE. The process includes the following steps.

S301. The first device (a BLE intelligent device, for example, an intelligent treadmill) sends a discoverable and connectable beacon frame through an advertising channel.

The beacon frame may carry a media access control (media access control, MAC) address of the first device and a device identifier of the intelligent device.

S302. A second device discovers the first device through scanning.

S303. After the second device detects an operation that a user taps to connect to the first device, the second device initiates a connect request to the first device.

S304. The first device sends a connect response to the electronic device after receiving the connect request of the second device.

S305. After a connection is established between the second device and the first device, the second device and the first device perform pairing and binding by using a Passkey, through OOB, or the like.

Similar to the foregoing manner of Wi-Fi discovery and provisioning, in a pairing process, the second device and the BLE intelligent device may be paired and bound by using a Passkey, through OOB, or the like. In this case, user intervention such as out-of-band transmission between the second device and the first device, entering a Passkey by the user, or numeric comparison is required, which affects user experience.

Defects of the foregoing solution are as follows.

(1) The first device may be discovered by a second device in a neighbor's home.

For example, a device in the neighbor's home may discover the first device in the user's home, thereby inappropriate pairing is caused.

(2) The second device may discover a plurality of devices to be provisioned simultaneously, and therefore inappropriate pairing occurs.

For example, there are five intelligent lamps in a living room and a bedroom at home, and the second device may simultaneously discover the five intelligent lamps through scanning. In this case, if the user wants to provision only the intelligent lamp in the living room, for the five intelligent lamps displayed on the second device, the user cannot distinguish between the five intelligent devices. Consequently, the user does not know which intelligent lamp is the intelligent lamp in the living room, and inappropriate pairing may occur.

(3) Out-of-band transmission is performed to improve security. This increases complexity of provisioning, affects user experience, increases production complexity for a product line, and increases production costs.

For example, for Wi-Fi discovery and provisioning, the user needs to scan a two-dimensional code on a robot vacuum cleaner when provisioning the robot vacuum cleaner. This increases provisioning time, and learning costs of the user are high. For another example, some devices perform identity authentication and key negotiation with a second device through OOB during provisioning, to obtain an encryption key. In this case, a PIN code needs to be preset in a first device in a production line, and a two-dimensional code needs to be printed on the first device (PIN codes of different devices of a same model need to be different, and two-dimensional codes cannot be pasted incorrectly). A user may scan the two-dimensional code by using the second device (for example, a mobile phone), so that encryption key negotiation can be performed between the second device and the first device. This also increases production complexity for the product line.

For example, for BLE discovery and provisioning, some devices performs OOB in a manner of NFC during provisioning, and a Passkey or OOB information is preset in an NFC tag (Tag). This requires a manufacturer to reconstruct a product line and requires user intervention.

Bluetooth mesh and ZigBee have the similar defects.

Embodiments of this application provide a discovery and provisioning method. A dual-antenna manner is applied, and a first antenna is used during discovery. In this way, a communication distance for discovery and provisioning can be greatly reduced. Because the communication distance for discovery and provisioning is greatly reduced, a probability that a first device is inappropriately paired can be greatly reduced. For example, a second device may discover only a first device that is within 30 cm of the second device. Alternatively, when the dual-antenna manner is applied, if the communication distance for discovery and provisioning is reduced to a safe distance (for example, within 30 cm), the first device may send a provisioning parameter in plaintext to the second device. In this way, user experience is improved while security is ensured. It should be understood that the safe distance herein means that signal strength is less than or equal to noise strength beyond the distance.

Embodiments of this application provide a method for discovery and provisioning of a Wi-Fi device by using Wi-Fi. A dual-antenna manner is applied, and a first antenna is used during discovery. In this way, a communication distance for discovery and provisioning can be greatly reduced. Because the communication distance for discovery and provisioning is greatly reduced, a probability that a first device is inappropriately paired can be greatly reduced. For example, a second device may discover only a first device that is within 30 cm of the second device. In addition, if the communication distance for discovery and provisioning is reduced to a safe distance (for example, within 30 cm), the first device may send a device verification code (PIN code) or an encryption key in plaintext to the second device. In this way, user experience is improved while security is ensured.

Figure 4:
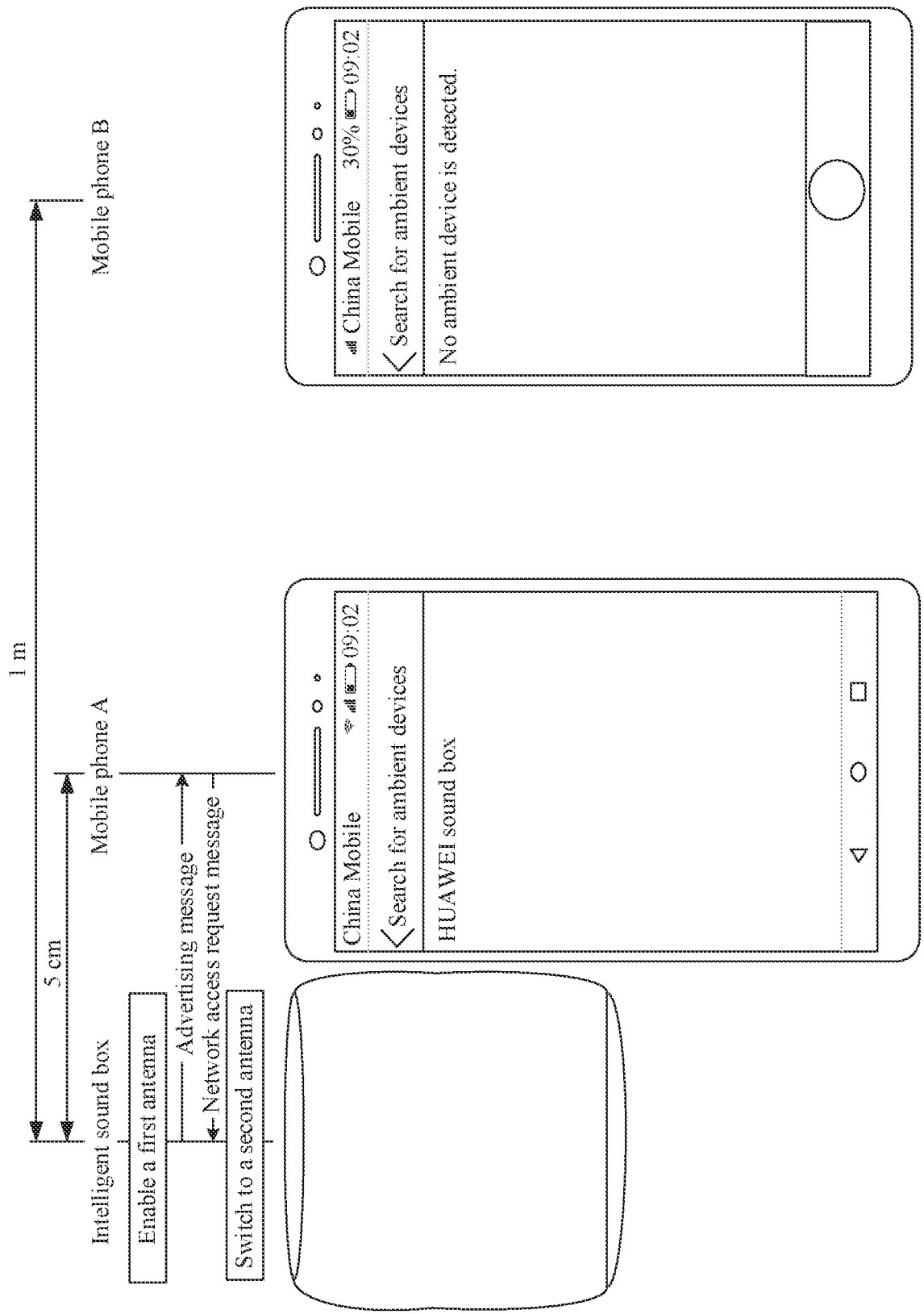
FIG. 4 is a schematic diagram of an application scenario according to an embodiment of this application.

FIG. 4 is a schematic diagram of an application scenario according to an embodiment of this application. As shown in FIG. 4, when an intelligent sound box device needs to connect to a home router and a cloud server based on provisioning information provided by a mobile phone, a mobile phone A may be put within 5 cm of the intelligent sound box (for example, the sound box includes a tag, and the mobile phone is within 5 cm of the tag). After being powered on, the intelligent sound box may enable a first antenna to send a beacon frame (the beacon frame carries an SSID and an encryption key of a SoftAP enabled by the intelligent sound box) to an ambient device. In this case, because a distance between the mobile phone A and the intelligent sound box is less than or equal to a safe distance, an interface of the mobile phone A may show that discovered devices include the intelligent sound box "HUA WEI Sound Box". After the mobile phone A detects an operation of tapping "HUA WEI Sound Box" by a user, the mobile phone A may send a network access request message (for example, an authentication request (authentication request, AUTH request)) to the intelligent sound box. After receiving the network access request message, the intelligent sound box may switch from the first antenna to a second antenna by using a radio frequency switch, to receive, by using the second antenna, an SSID of a Wi-Fi router and a password of the Wi-Fi router that are encrypted by using the encryption key and that are sent by the mobile phone A. The intelligent sound box can decrypt the SSID of the Wi-Fi router and the password of the Wi-Fi router by using the encryption key, to obtain the SSID of the Wi-Fi router and the password of the Wi-Fi router. The intelligent sound box connects to the Wi-Fi router and a cloud server by using the SSID of the Wi-Fi router and the password of the Wi-Fi router.

However, when a mobile phone B is used to search for the intelligent sound box at a location 1 m away from the intelligent sound box, because the mobile phone B is far away from the intelligent sound box, no intelligent device can be found by the mobile phone B.

Embodiments of this application further provide a method for discovery and provisioning of a Wi-Fi device. Discovery and provisioning of a first device can be performed by using a Wi-Fi sensing technology, and the first device does not need to support a SoftAP. This reduces time consumed in discovery and provisioning, and helps improve user experience. In addition, compared with a SoftAP manner, after the first device is discovered by a second device, a user can control the first device by using the second device. In this way, the user does not need to wait for provisioning of the first device.

By using the Wi-Fi sensing technology, after the first device is discovered, the second device can immediately control the first device. For example, after the first device is discovered, a user interface of the second device may display a control interface for an intelligent device. The user may control the first device by using the second device in a provisioning process of the first device, and the time-consuming provisioning process is performed in background, so that the user is unaware of the process. This helps improve user experience.

The Wi-Fi sensing technology is a standard released by the Wi-Fi Alliance. Android provides application programming interface (application programming interface, API) support at a framework (Framework) layer. By using the Wi-Fi sensing technology, in a case in which two Wi-Fi devices are not connected to a same router, the two Wi-Fi devices can directly communicate with each other in a media access control (media access control, MAC) layer rather than a transmission control protocol/internet protocol (transmission control protocol/internet protocol, TCP/IP) layer, and a router for forwarding is not needed.

FIG. 5A to FIG. 5E are a set of graphical user interfaces (graphical user interfaces, GUIs) according to an embodiment of this application.

Figure 5A:
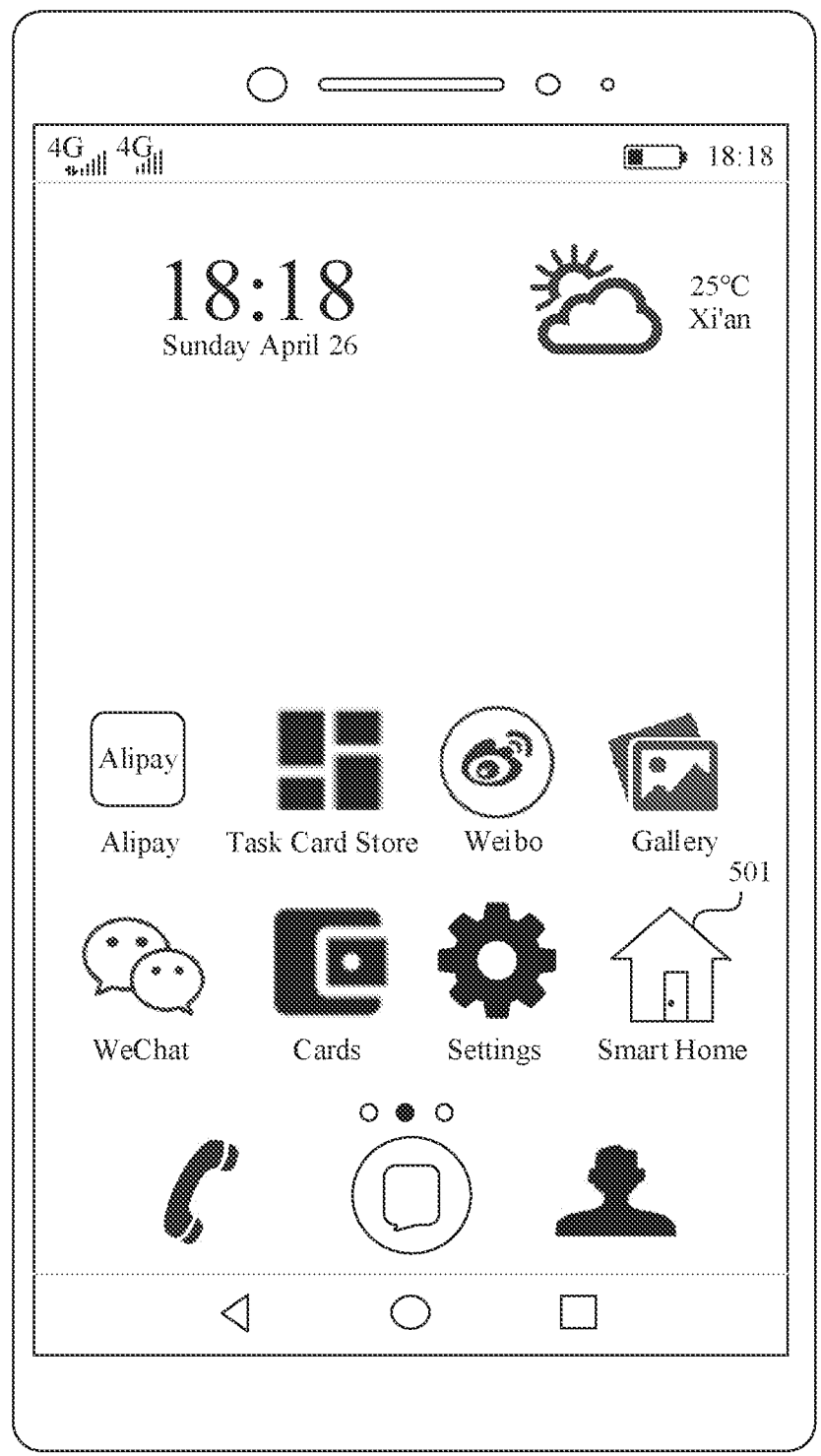
FIG. 5A to FIG. 5E are a set of graphical user interfaces according to an embodiment of this application.

Refer to FIG. 5A. The GUI is a desktop of a mobile phone. The desktop of the mobile phone includes applications such as Alipay, Task Card Store, Weibo, Gallery, WeChat. Cards, Settings, and Smart Home. After the mobile phone detects an operation of tapping a Smart Home icon 501 by a user, the mobile phone may display a GUI shown in FIG. 5B.

Figure 5B:
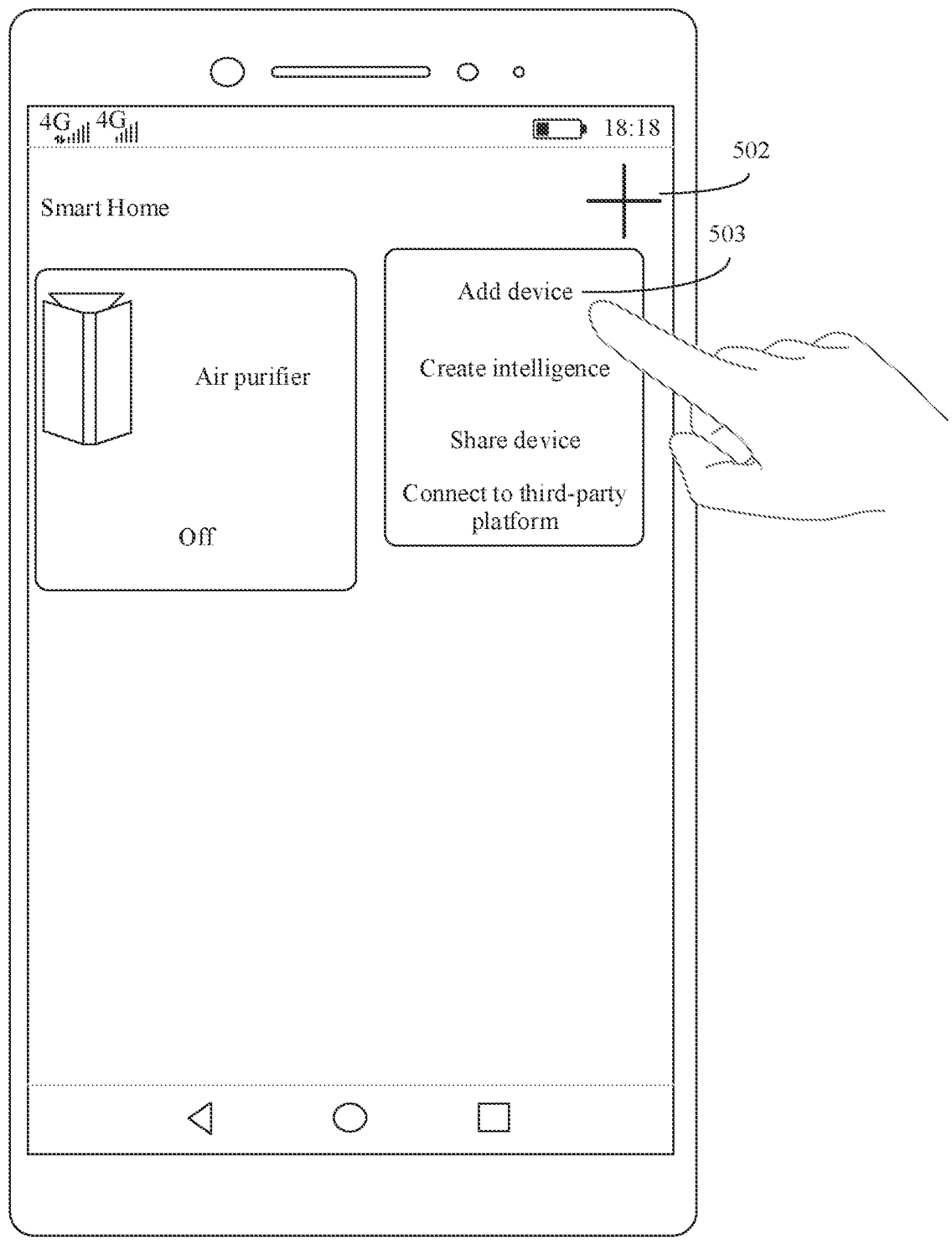

Refer to FIG. 5B. The GUI is a display interface that displays an added device in the Smart Home. The display interface may include a device that connects to a cloud through the mobile phone, for example, an air purifier, and may further display a status of the device, for example, the air purifier is currently in an off state. After detecting the operation of tapping a control 502 by the user, the mobile phone may display a plurality of functional controls, including a control 503 for adding a device, a control for creating intelligence, a control for device sharing, and a control for connecting to a third-party platform. When the user wants to discover and provision a new device (for example, a new intelligent desk lamp), that is, when the user wants to add the new device to a network to control the new device, the user may select the control 503 on the mobile phone and move the mobile phone from a location far away from the intelligent desk lamp to a location close to the intelligent desk lamp. After the intelligent desk lamp is discovered by the mobile phone, the mobile phone may display a GUI shown in FIG. 5C.

Figure 5C:
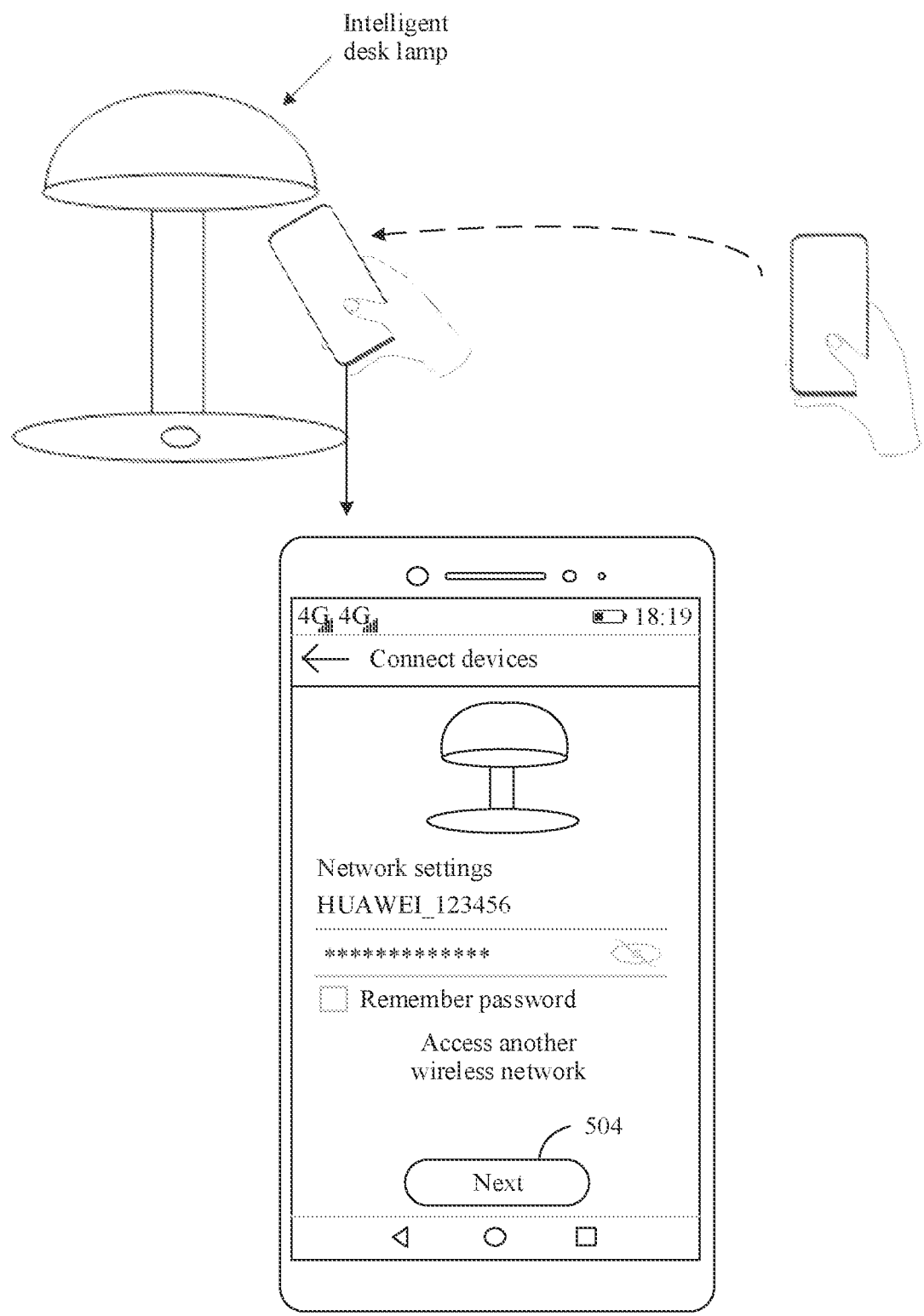

Refer to FIG. 5C. The GUI is a display interface for connecting a device. The mobile phone may discover the ambient intelligent desk lamp by using a very short distance technology and a Wi-Fi sensing technology, and obtain an encryption key of the intelligent desk lamp when the intelligent desk lamp is discovered. After discovering the intelligent desk lamp, the mobile phone displays information about the intelligent desk lamp. In addition, the mobile phone may further display an SSID (HUAWEI_123456) of a Wi-Fi router and a password of the Wi-Fi router on the display interface. After the mobile phone detects an operation of tapping a control 504 by the user, the mobile phone sends, to the intelligent desk lamp through a Wi-Fi sensing channel, the SSID of the Wi-Fi router and the password of the Wi-Fi router that are encrypted by using the encryption key.

It should be understood that after the intelligent desk lamp is successfully discovered by the mobile phone (after the intelligent desk lamp is successfully discovered by the mobile phone, the mobile phone displays the display interface shown in FIG. 5C), the mobile phone does not need to further approach the intelligent desk lamp.

In this embodiment of this application, after receiving a publish frame sent by the mobile phone, the intelligent desk lamp may discover the ambient intelligent desk lamp by using the very short distance technology and the Wi-Fi sensing technology, and obtain the encryption key of the intelligent desk lamp when the intelligent desk lamp is discovered. The sending, by the mobile phone, the publish frame may be triggered by detecting that the user taps the control for adding a device in the application (application. App).

It should be further understood that, in FIG. 5C, the SSID of the Wi-Fi router and the password of the Wi-Fi router that are displayed on the display interface of the mobile phone may be an SSID of a Wi-Fi router connected to the mobile phone and a password of the Wi-Fi router that are automatically displayed by the mobile phone, or may be an SSID of a Wi-Fi router and a password of the Wi-Fi router that are manually entered by the user.

In an embodiment, when the intelligent desk lamp is powered on and is in an unprovisioned state, the intelligent desk lamp may send a Product ID of the intelligent desk lamp to an ambient device. In this case, after receiving the Product ID, the mobile phone may display information about the intelligent device on the display interface shown in FIG. 5C. After receiving the Product ID of the intelligent desk lamp, the mobile phone may further send an identify command to the intelligent desk lamp. The identify command may be used by the user to confirm a to-be-provisioned intelligent desk lamp. For example, after receiving the identify command, the intelligent desk lamp may blink for preset duration. In addition, after receiving a response of the intelligent desk lamp to the identify command, the mobile phone may display a blinking intelligent desk lamp by using an animation on the display interface shown in FIG. 5C, so that the user can determine a to-be-provisioned intelligent desk lamp.

The intelligent desk lamp blinks for the preset duration to identify itself, so that the user can determine the intelligent desk lamp, to prevent attack performed by a hacker by using an amplifier. It should be understood that, identify commands of different devices may be different, and may be vibration, buzzing, LED light blink, and the like.

It should be understood that, after the Wi-Fi sensing channel is established between the intelligent desk lamp and the mobile phone, the intelligent device and the mobile phone may perform identity authentication and encryption key negotiation with a PIN code.

In another embodiment, the intelligent desk lamp includes a first antenna and a second antenna. A wireless transmit power of the intelligent desk lamp operating by using the first antenna is less than a transmit power of the intelligent desk lamp operating by using the second antenna. When the intelligent desk lamp is powered on and is in the unprovisioned state, the intelligent desk lamp may send a Wi-Fi sensing frame to an ambient device through the first antenna. The Wi-Fi sensing frame may carry the Product ID and the encryption key of the intelligent desk lamp. A network coverage area of the first antenna is small when the first antenna works. It may be understood that the network coverage area of the first antenna is safe. To be specific, when the mobile phone can receive a signal transmitted by the first antenna, a distance between the mobile phone and the intelligent desk lamp is a safe distance. Because the intelligent desk lamp sends the Wi-Fi sensing frame through the first antenna, if the mobile phone is to receive the Wi-Fi sensing frame sent by the intelligent desk lamp, the mobile phone needs to be within a safe distance from the intelligent desk lamp (for example, a distance between the mobile phone and the intelligent desk lamp is less than 5 cm). Within the safe distance, the intelligent desk lamp can send the encryption key in plaintext. This ensures security of sending the encryption key and eliminates a need for identity authentication and key negotiation between the intelligent device and the mobile phone through out-of-band transmission, which reduces provisioning time of the intelligent device. In addition, the intelligent desk lamp sends the Product ID and the encryption key to the mobile phone by using the Wi-Fi sensing technology. In this way, the intelligent device does not need to support a SoftAP, and the mobile phone does not need to connect to the SoftAP of the intelligent device. This also helps reduce a latency of discovery and provisioning of the intelligent device.

Figure 5D:
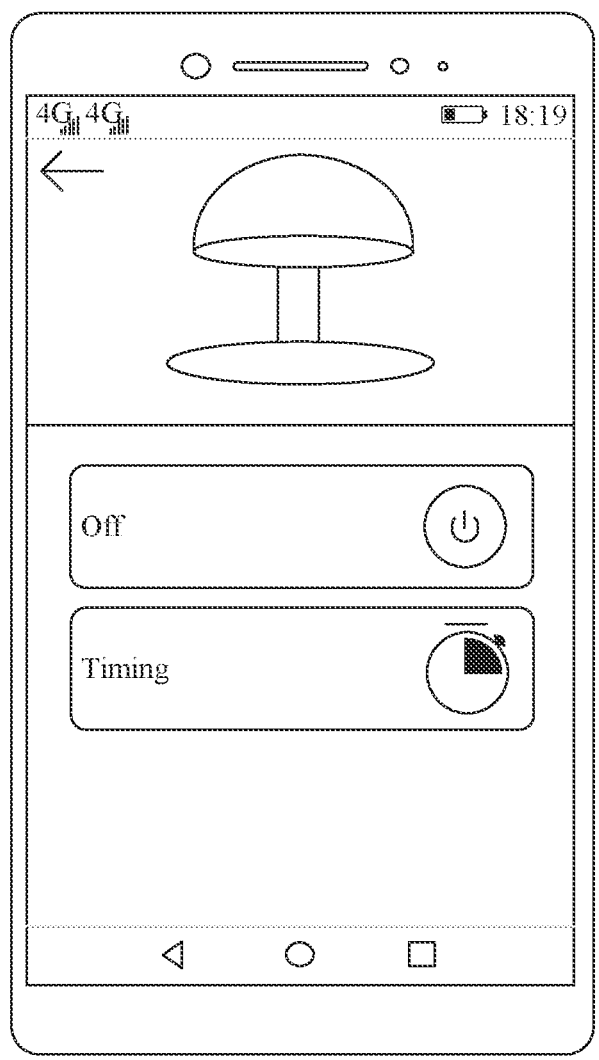

Refer to FIG. 5D. A GUI in FIG. 5D is a control interface of the intelligent desk lamp. After the mobile phone detects the operation of tapping the control 504 by the user, the mobile phone may send, to the intelligent desk lamp through the Wi-Fi sensing channel, the SSID of the Wi-Fi router and the password of the Wi-Fi router that are encrypted by using the encryption key. In addition, the mobile phone may display a control interface of the intelligent desk lamp.

It should be understood that, after receiving the SSID of the Wi-Fi router and the password of the Wi-Fi router that are encrypted by using the encryption key and that are sent by the mobile phone, the intelligent desk lamp starts provisioning. The intelligent desk lamp may decrypt the encrypted SSID of the Wi-Fi router and the encrypted password of the Wi-Fi router by using the encryption key, to obtain the SSID of the Wi-Fi router and the password of the Wi-Fi router. The intelligent desk lamp connects to the Wi-Fi router and the cloud based on the SSID of the Wi-Fi router and the password of the Wi-Fi router. In a provisioning process of the intelligent desk lamp, the mobile phone can also control the intelligent device through the Wi-Fi sensing channel.

In an embodiment, the encryption key may be obtained through identity authentication and key negotiation based on a PIN code after the PIN code is obtained through OOB between the mobile phone and the intelligent desk lamp.

Figure 5E:
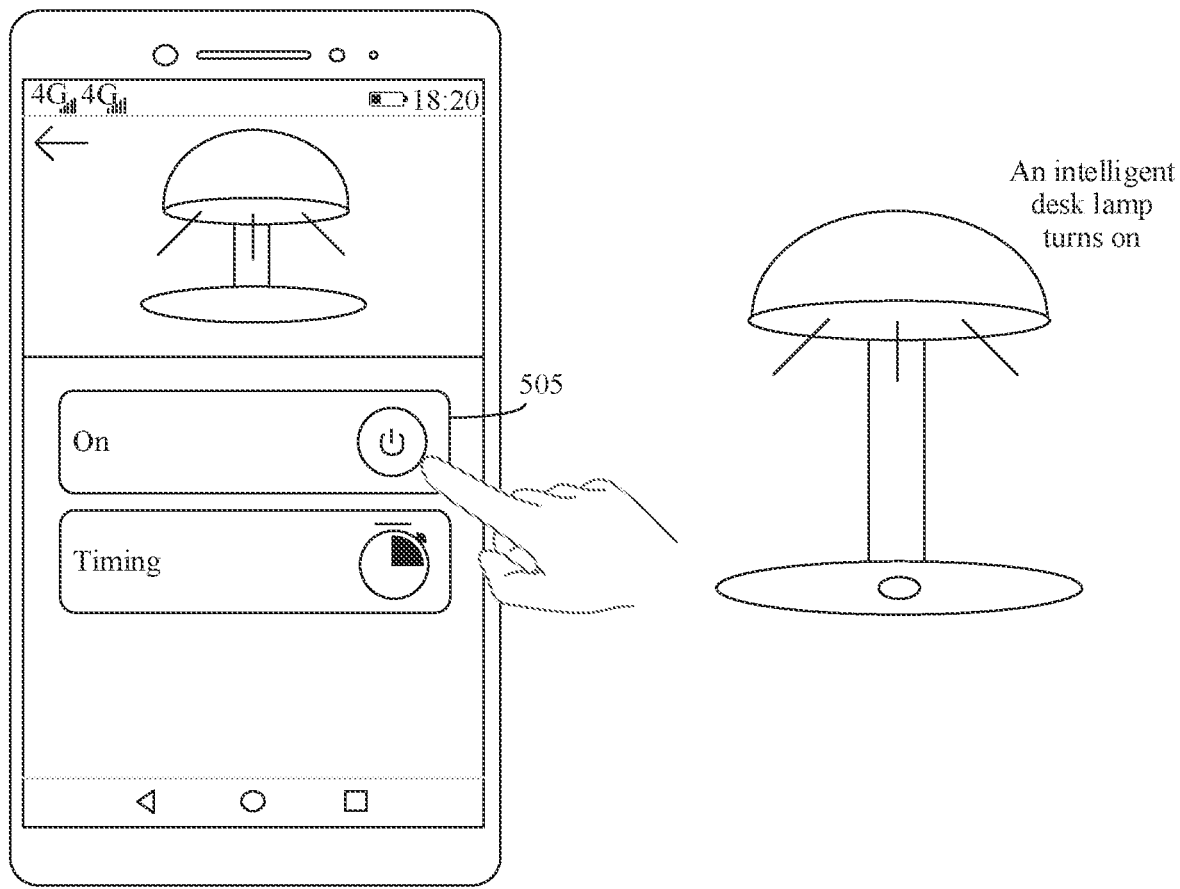

Refer to FIG. 5E. A GUI in FIG. 5E is another control interface of the intelligent desk lamp. After the mobile phone detects an operation of tapping a control 505 by the user, the mobile phone may send, to the intelligent desk lamp by Wi-Fi sensing, a control command encrypted by using the encryption key. The control command is used to indicate the intelligent desk lamp to turn on. After decrypting the encrypted control command, the intelligent desk lamp performs a turn-on operation according to the control command. After the intelligent desk lamp turns on, the intelligent desk lamp may further send status information encrypted by using the encryption key to the mobile phone, where the status information is used to indicate that the intelligent desk lamp is in an on state. After decrypting the encrypted status information, the mobile phone may update a status of the intelligent desk lamp. As shown in FIG. 5E, the display interface of the mobile phone shows that the desk lamp is in the on state.

FIG. 6A to FIG. 6E are another set of GUIs according to an embodiment of this application.

Figure 6A:
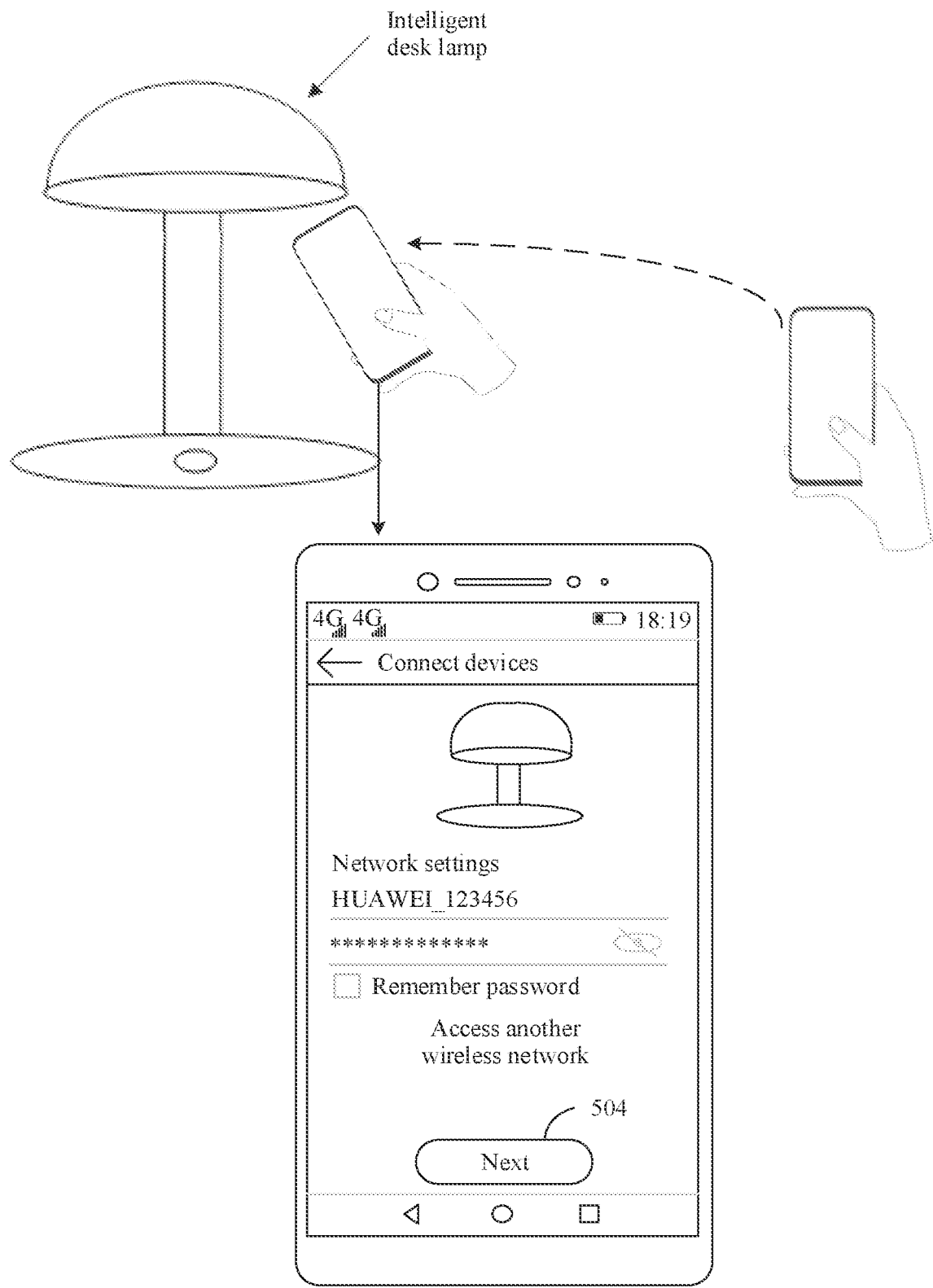
FIG. 6A to FIG. 6E are a set of graphical user interfaces according to an embodiment of this application.

A GUI shown in FIG. 6A is a display interface for connecting a device. The user may move the mobile phone from a location far away from the intelligent desk lamp to a location close to the intelligent desk lamp. The mobile phone may discover the ambient intelligent desk lamp by using a very short distance technology and a Wi-Fi sensing technology, and obtain the encryption key of the intelligent desk lamp when the intelligent desk lamp is discovered. After discovering the intelligent desk lamp, the mobile phone displays the information about the intelligent desk lamp.

After the mobile phone detects the operation of tapping the control 504 by the user, the mobile phone may send, to the intelligent desk lamp, the SSID of the Wi-Fi router and the password of the Wi-Fi router that are encrypted by using the encryption key. In addition, the mobile phone may display a control interface of the intelligent desk lamp. Refer to a GUI shown in FIG. 6B.

Figure 6B:
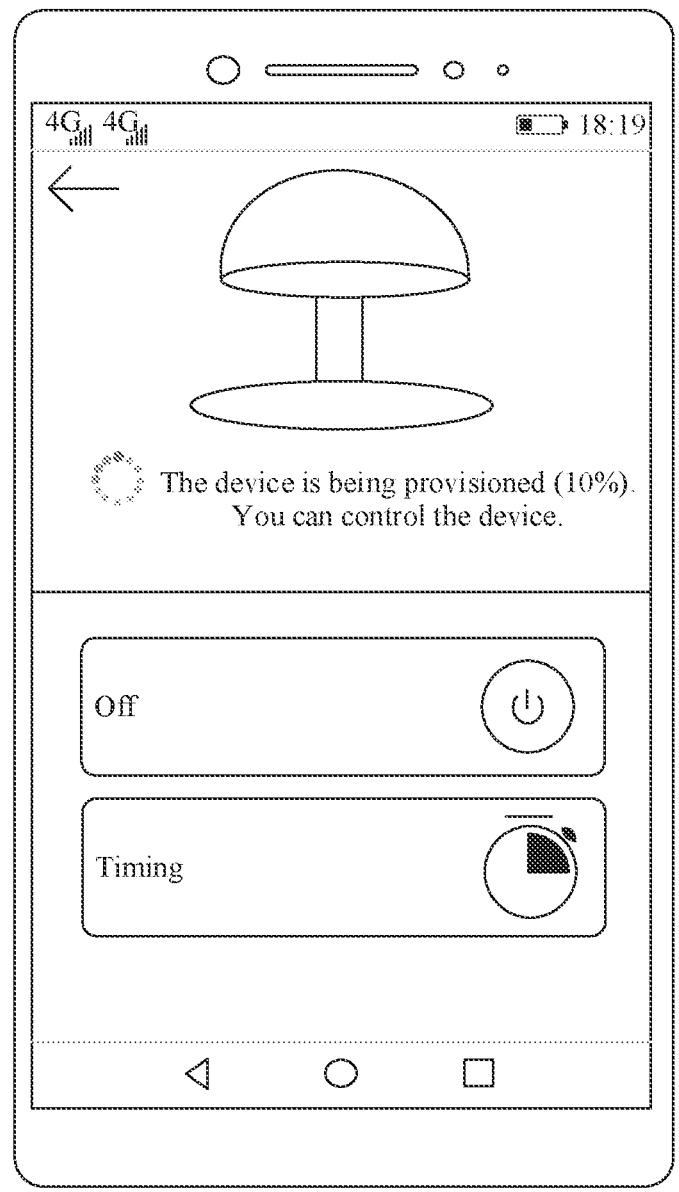

The GUI in FIG. 6B is another control interface of the intelligent desk lamp. Different from the GUI shown in FIG. 5D, in addition to some controls for the intelligent desk lamp, the control interface of the intelligent desk lamp may further display a progress bar of provisioning of the intelligent desk lamp. As shown in FIG. 6B, the control interface may prompt the user that "The device is being provisioned (10%). You can control the device".

Figure 6C:
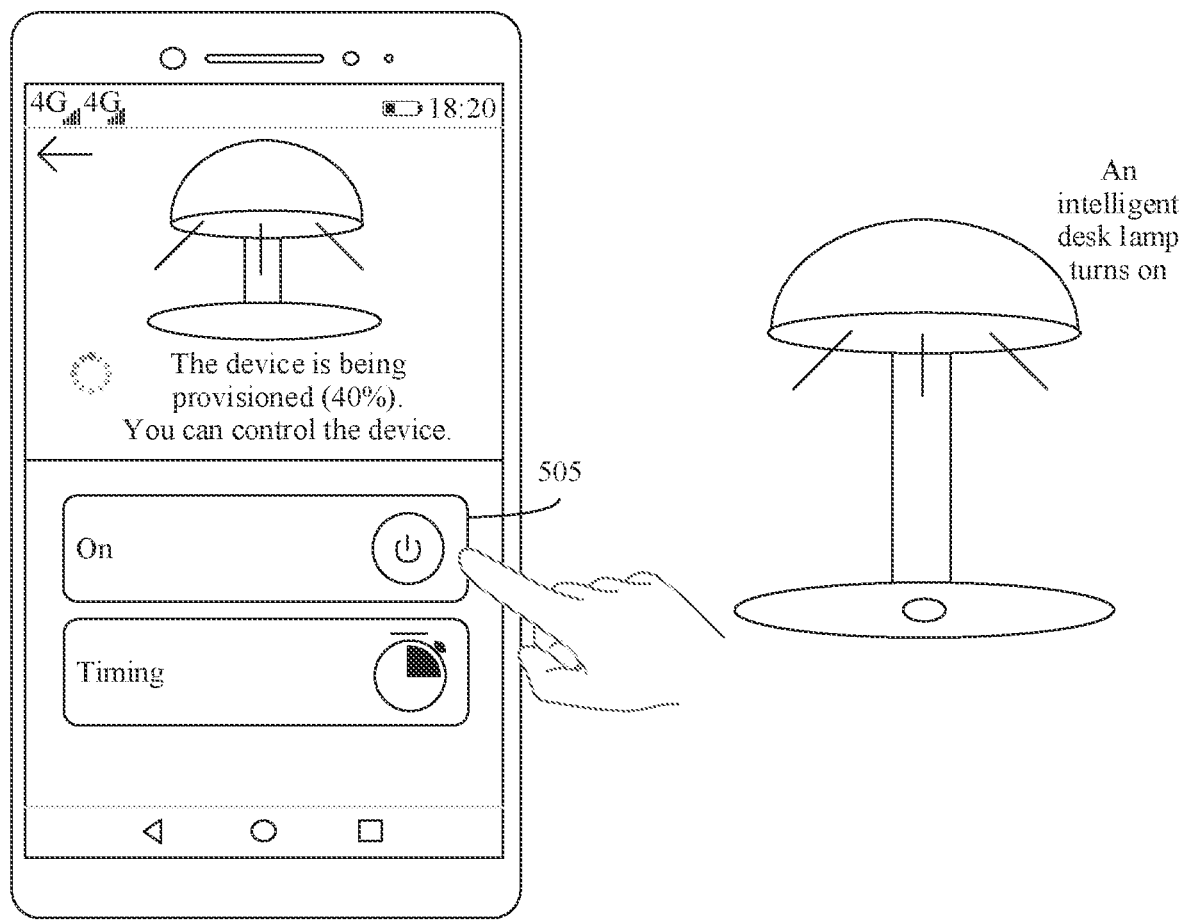

A GUI in FIG. 6C is another control interface of the intelligent desk lamp. After the mobile phone detects an operation of tapping a control 505 by the user, the mobile phone may send a control command encrypted by using the encryption key to the intelligent desk lamp. After decrypting the encrypted control command, the intelligent desk lamp obtains the control command and executes the control command (the intelligent desk lamp performs a turn-on operation). After the intelligent desk lamp executes the control command, the intelligent desk lamp may send status information encrypted by using the encryption key to the mobile phone. After receiving the encrypted status information, the mobile phone performs decryption to obtain the status information, so that the mobile phone may update the status information of the intelligent desk lamp displayed on the control interface (the mobile phone updates the status information of the intelligent desk lamp to "on"). In this case, the mobile phone may display "The device is being provisioned (40%). You can control the device".

Figure 6D:
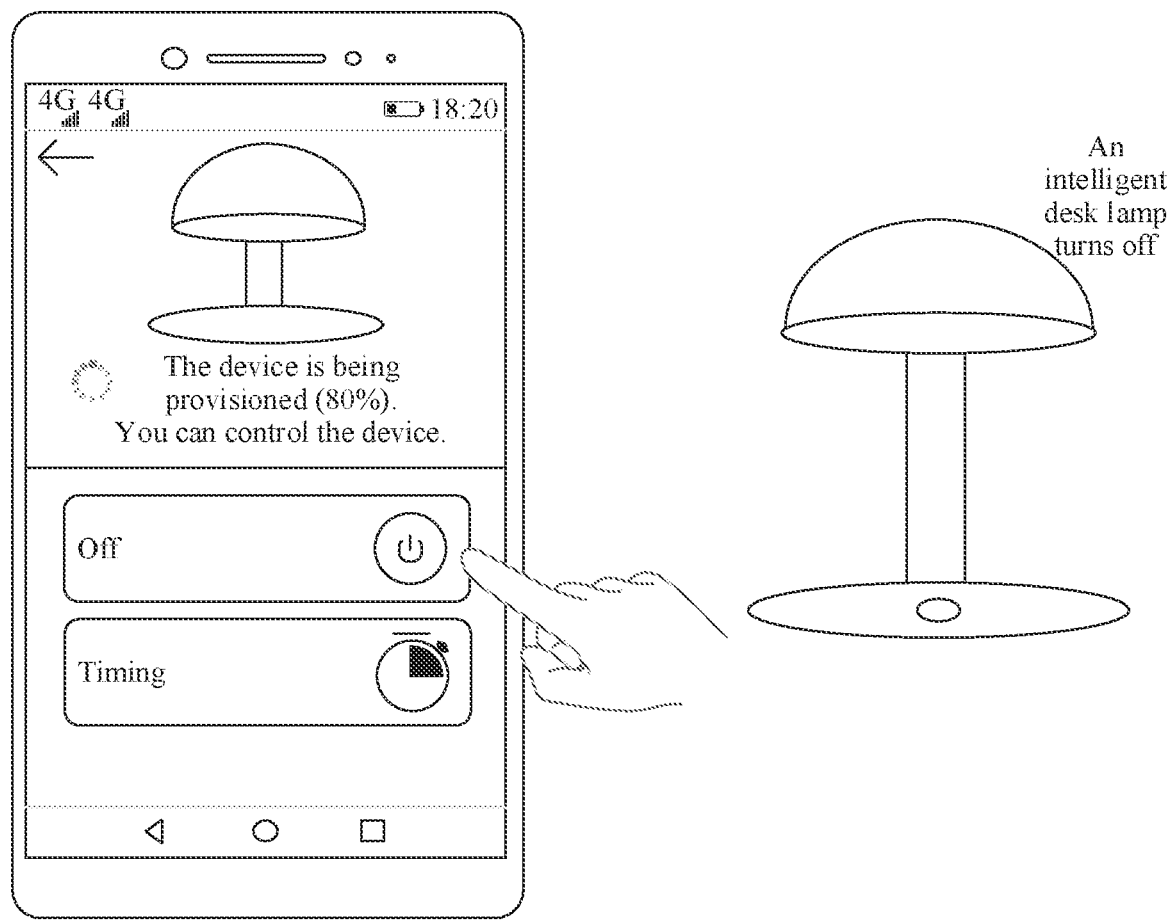

A GUI in FIG. 6D is another control interface of the intelligent desk lamp. After the mobile phone detects another operation of tapping the control 505 by the user, the mobile phone may send a control command encrypted by using the encryption key to the intelligent desk lamp. The control command is used to indicate the intelligent desk lamp to turn off. After receiving the encrypted control command, the intelligent desk lamp decrypts the control command to execute the control command (the intelligent desk lamp performs a turn-off operation). After the intelligent desk lamp executes the control command, the intelligent desk lamp may send status information encrypted by using the encryption key to the mobile phone. After receiving the encrypted status information, the mobile phone performs decryption to obtain the status information, so that the mobile phone may update the status information of the intelligent desk lamp displayed on the control interface (the mobile phone updates the status information of the intelligent desk lamp to "off"). In this case, the mobile phone may display "The device is being provisioned (80%). You can control the device".

Figure 6E:
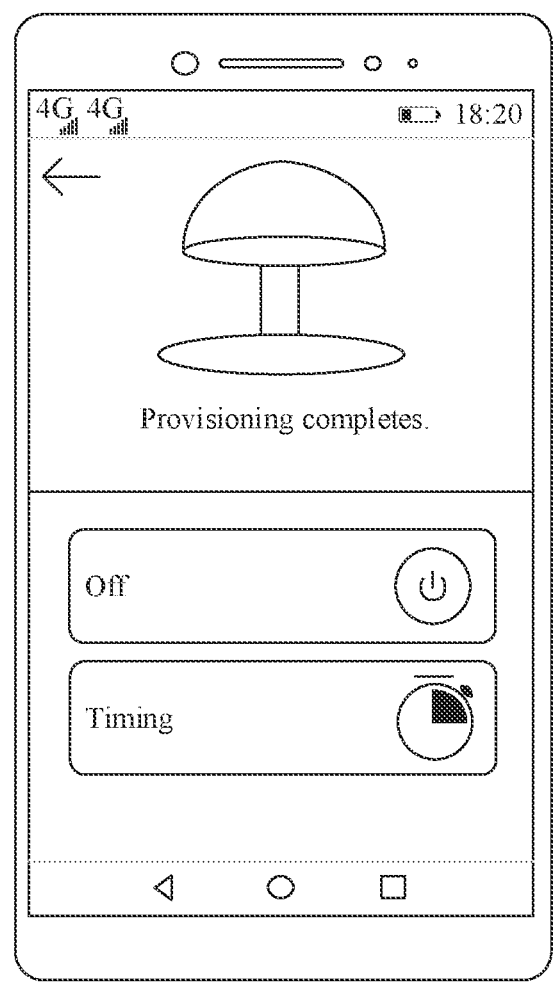

As shown in FIG. 6E, after the intelligent desk lamp completes provisioning, the intelligent desk lamp may send status information encrypted by using the encryption key to the mobile phone, where the status information is used to indicate that the intelligent desk lamp completes provisioning. After receiving the encrypted status information, the mobile phone decrypts the encrypted status information, to update a status of the intelligent desk lamp. As shown in FIG. 6E, the mobile phone may prompt the user that "Provisioning completes".

Figure 7A:
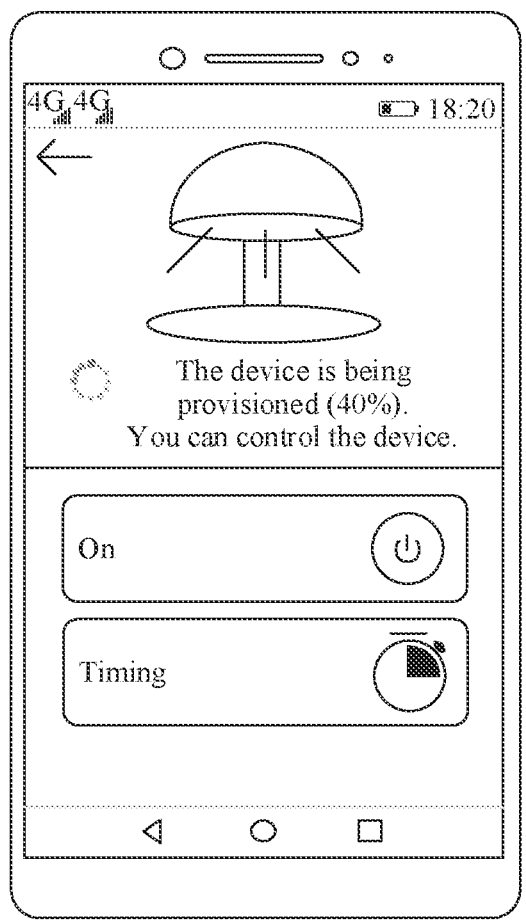
FIG. 7A and FIG. 7B are a set of graphical user interfaces according to an embodiment of this application.
Figure 7A:
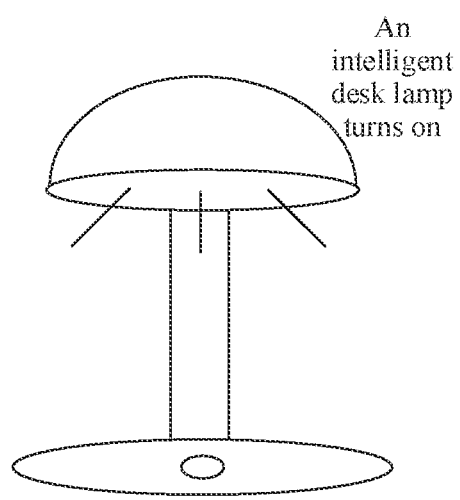
Figure 7B:
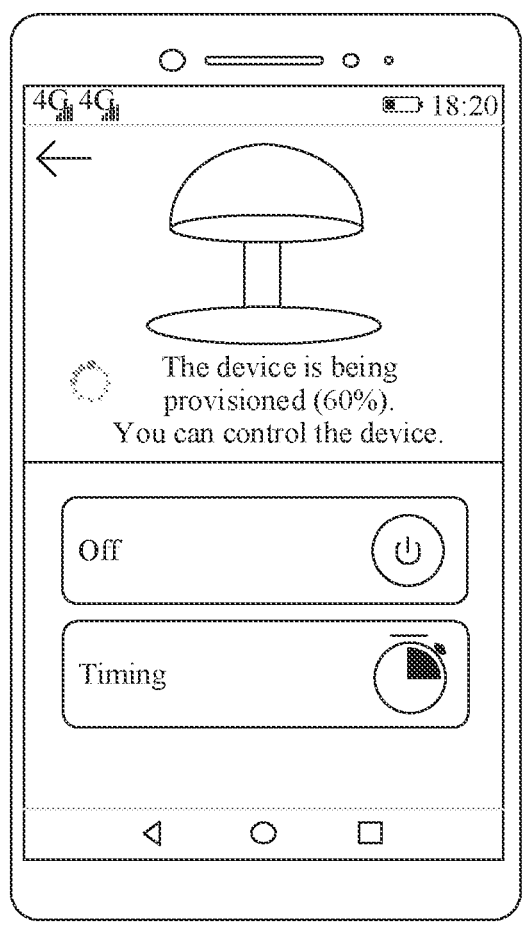
Figure 7B:
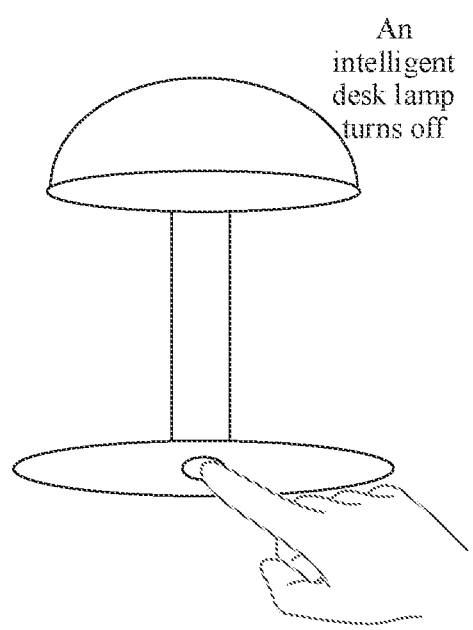

FIG. 7A and FIG. 7B are another set of GUIs according to an embodiment of this application.

As shown in FIG. 7A and FIG. 7B, after detecting an operation of tapping an on/off button by the user, the intelligent desk lamp may perform a turn-off operation in an on state. After the intelligent desk lamp performs a turn-on operation, the intelligent desk lamp may further send status information encrypted by using the encryption key to the mobile phone, where the status information is used to indicate that the intelligent desk lamp is in an off state. After receiving the encrypted status information, the mobile phone performs decryption, so that the mobile phone updates status information displayed on the control interface (the mobile phone updates the status information of the intelligent desk lamp to "off").

In this embodiment of this application, in provisioning of an intelligent device, when a status of the intelligent device changes, the intelligent device may send updated status information of the intelligent device to a mobile phone by Wi-Fi sensing, so that the mobile phone updates information of the intelligent device on a control interface in time.

FIG. 8A to FIG. 8D are another set of GUIs according to an embodiment of this application.

Figure 8A:
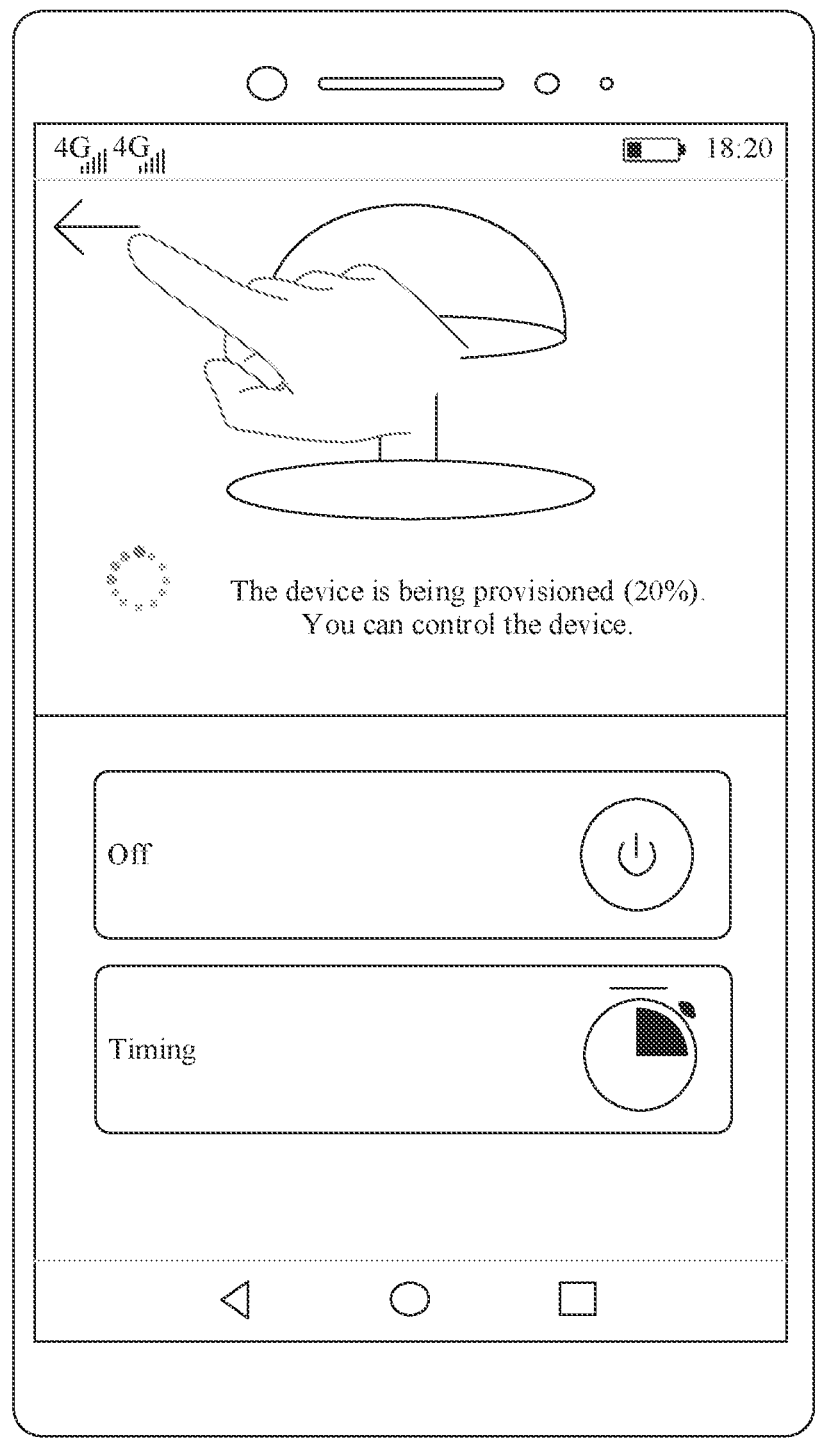
FIG. 8A to FIG. 8D are a set of graphical user interfaces according to an embodiment of this application.

A GUI in FIG. 8A is another control interface of the intelligent desk lamp. After the mobile phone detects an operation of tapping a return control by the user, the mobile phone may display a GUI shown in FIG. 8B.

Figure 8B:
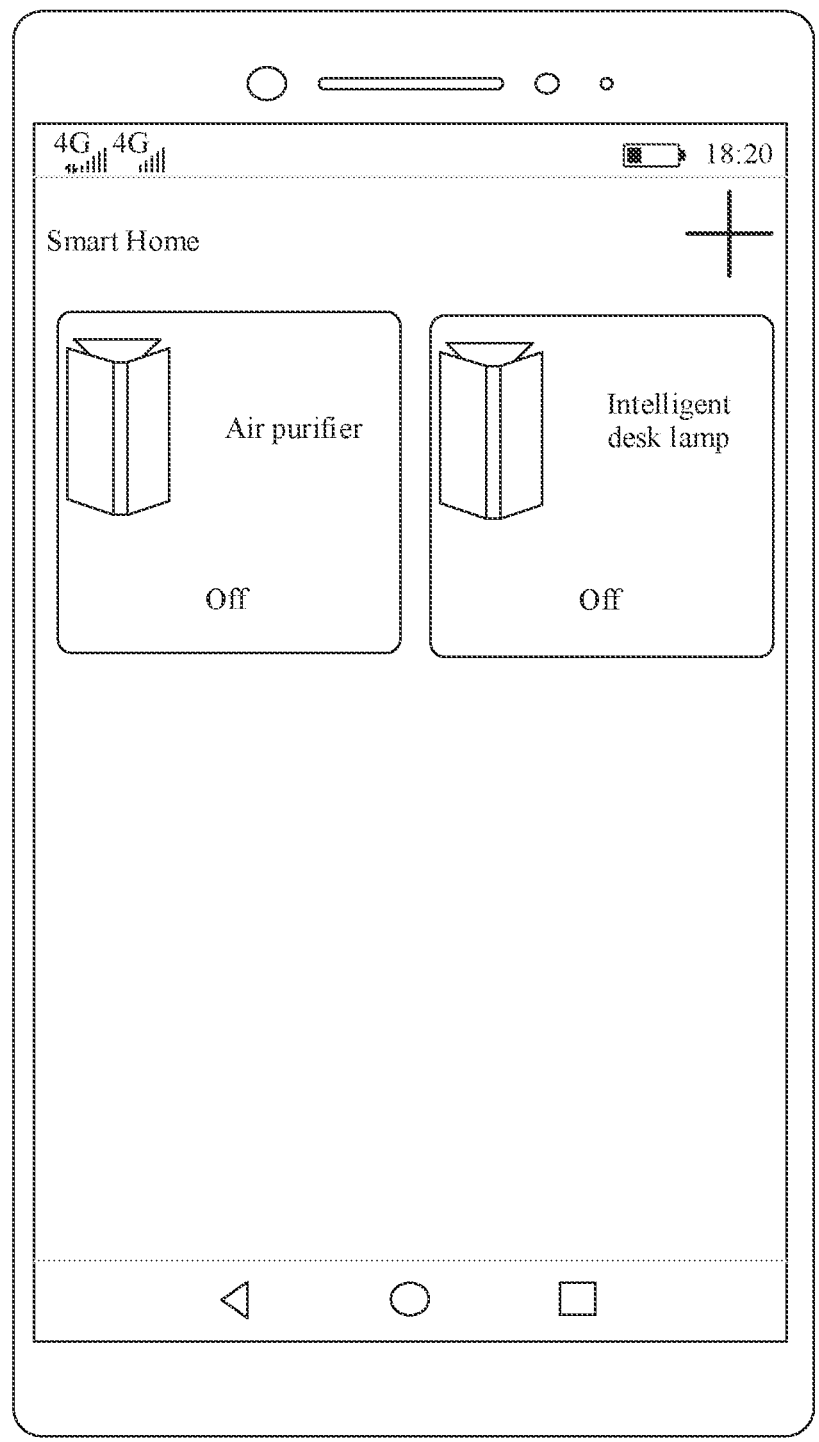

Refer to FIG. 8B. The GUI is another display interface that displays an added device in the Smart Home. The display interface includes information about an air purifier whose provisioning is completed and information about an intelligent desk lamp that is being provisioned.

Figure 8C:
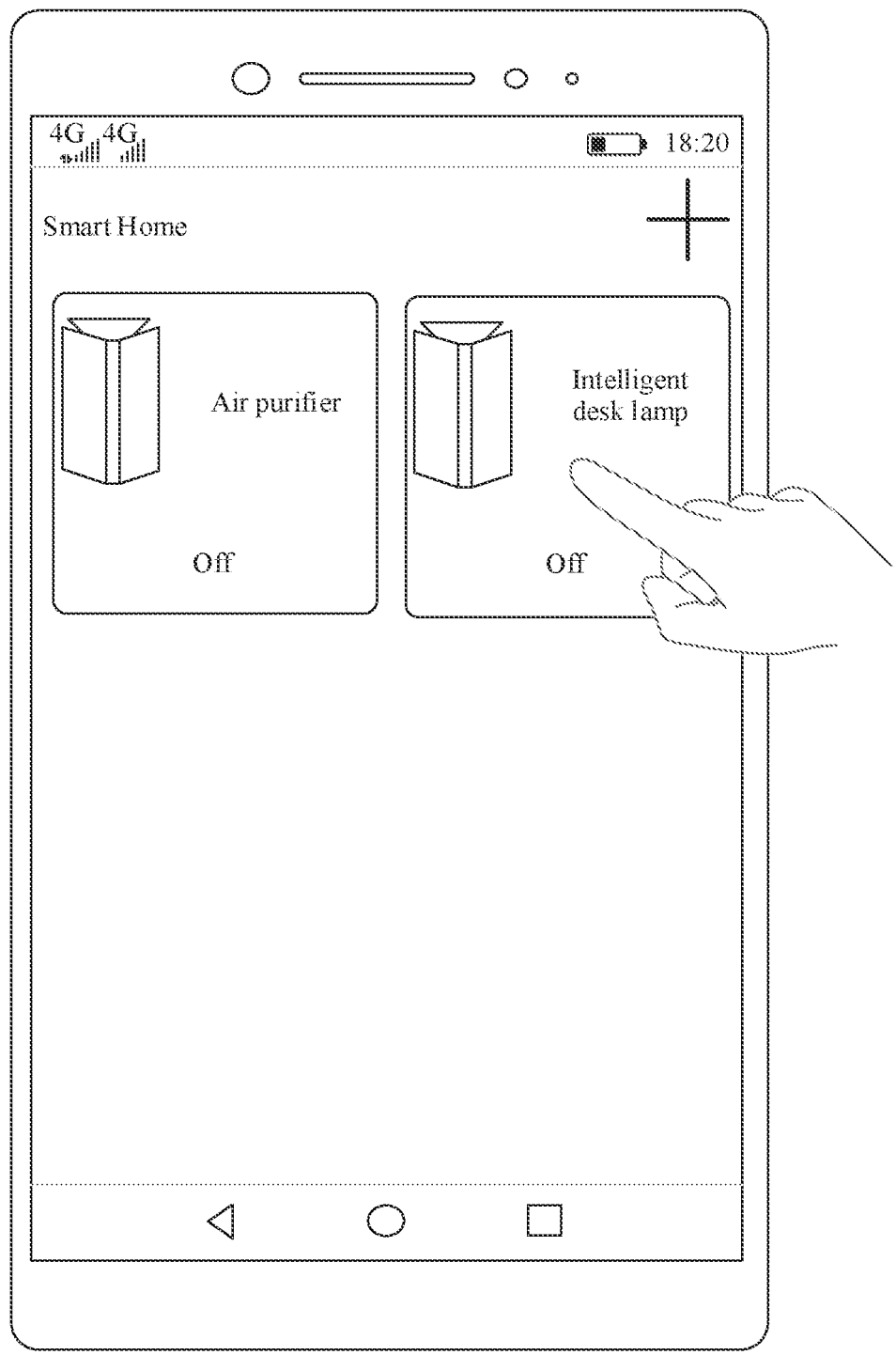
Figure 8D:
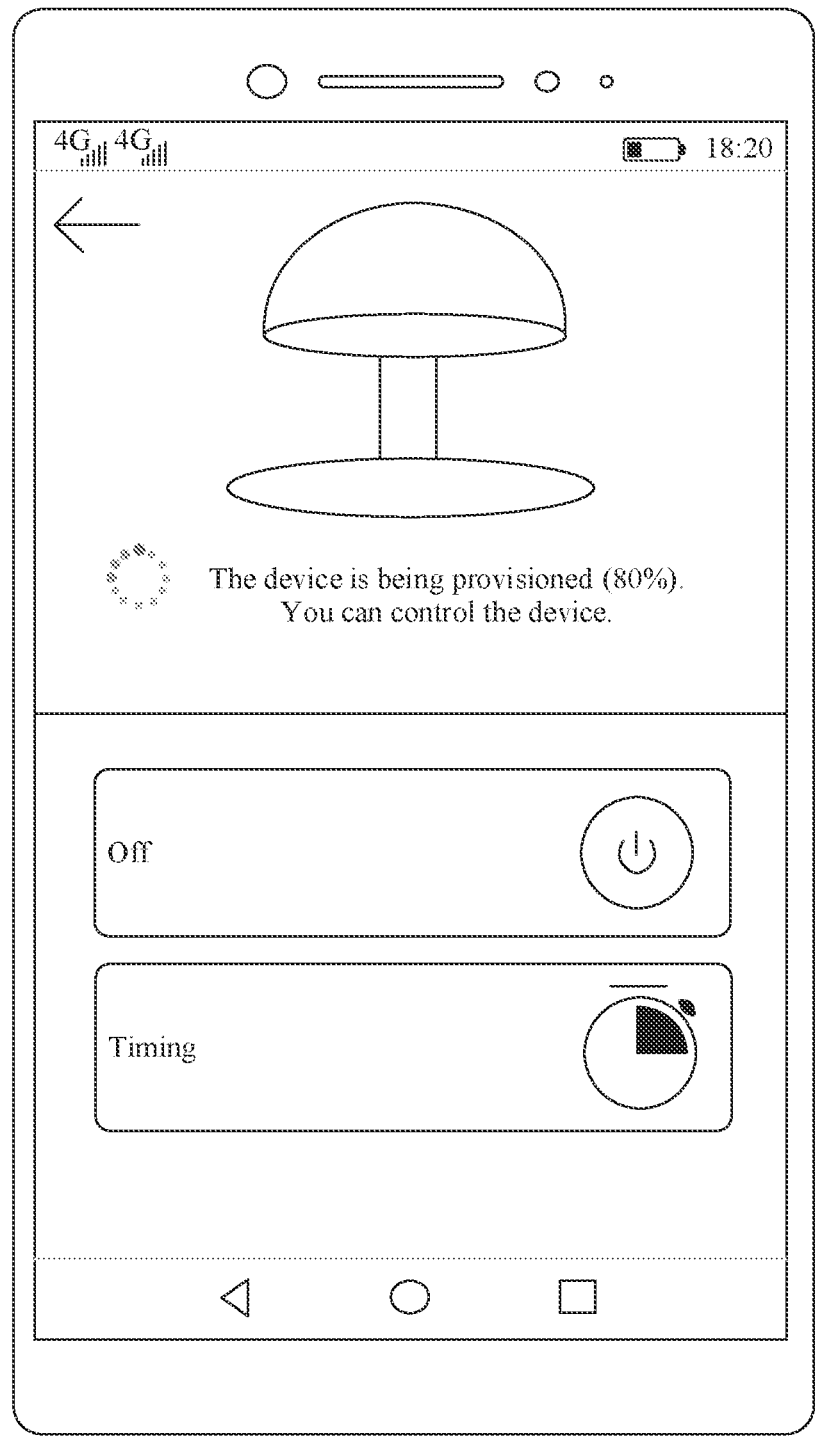

As shown in FIG. 8C, after the mobile phone detects an operation of tapping an icon of the intelligent desk lamp by the user, the mobile phone may display a GUI shown in FIG. 8D.

The GUI in FIG. 8D is another control interface of the intelligent desk lamp. The control interface includes a control of the intelligent desk lamp and provisioning information of the intelligent desk lamp, which is "The device is being provisioned (80%). You can control the device".

In this embodiment of this application, an intelligent device that is being provisioned may also be displayed in a list of provisioned devices. In this way, in a provisioning process of the intelligent device, a mobile phone may implement a control operation on the intelligent device, so that a user is unaware of provisioning of the intelligent device. This helps reduce time spent on waiting by the user and improve user experience in controlling the intelligent device.

An embodiment of this application further provides a method for discovery and provisioning of a BLE device. A first device may include a first antenna and a second antenna. A wireless transmit power of the first device operating by using the first antenna is less than a transmit power of the first device operating by using the second antenna. The first device may send a connectable advertising (ADV_IND) packet through the first antenna, where the connectable advertising packet may carny a device identifier of the first device and a Passkey or OOB information, and the Passkey or OOB information is used for pairing between the first device and a second device. Because the first device uses the first antenna, a communication distance between the first device and the second device is a safe distance (for example, within 30 cm). In this case, the first device may transmit the device identifier of the first device and the Passkey or OOB information in plaintext. In this way, the first device can be prevented from being discovered by another remote device and from pairing with a device in a neighbor's home. In addition, out-of-band (out of band, OOB) transmission does not need to be performed between the first device and the second device, and entering a Passkey by a user or numeric comparison is also omitted, which improves user experience and ensures security.

FIG. 9A to FIG. 9E are another set of GUIs according to an embodiment of this application.

Figure 9A:
FIG. 9A to FIG. 9E are a set of graphical user interfaces according to an embodiment of this application.

A GUI in FIG. 9A is a desktop of a mobile phone. The desktop of the mobile phone includes applications such as an App 1, an App 2, and an App 3. In addition, it can be learned from a status display bar 901 of the mobile phone that the mobile phone is currently in a state in which a Bluetooth function is enabled. After the mobile phone detects an operation of tapping an APP 3 icon 902 by a user, the mobile phone may display a GUI shown in FIG. 9B.

Figure 9B:
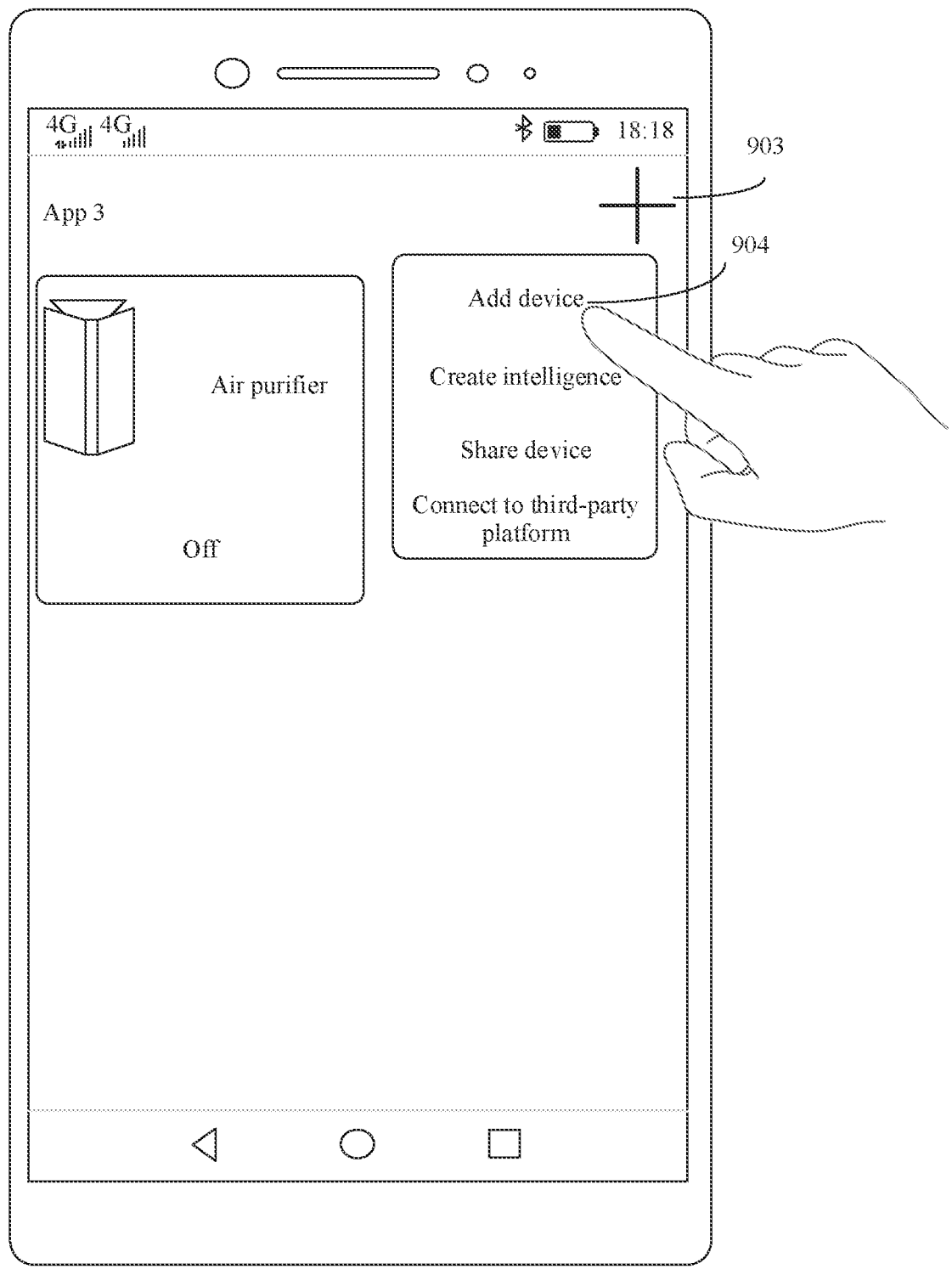

Refer to FIG. 9B. The GUI is a display interface that displays an added device in the APP 3. The display interface may include a device that connects to the cloud through the mobile phone, for example, an air purifier, and may further display a status of the device, for example, the air purifier is currently in an off state. After detecting an operation of tapping a control 903 by the user, the mobile phone may display a plurality of functional controls, including a control 904 for adding a device, a control for creating intelligence, a control for device sharing, and a control for connecting to a third-party platform. After the mobile phone detects an operation of tapping a control 904 by the user, the user may move the mobile phone from a location far away from an intelligent desk lamp to a location close to the intelligent desk lamp. After the intelligent desk lamp is discovered by the mobile phone, the mobile phone may display a GUI shown in FIG. 9C.

Figure 9C:
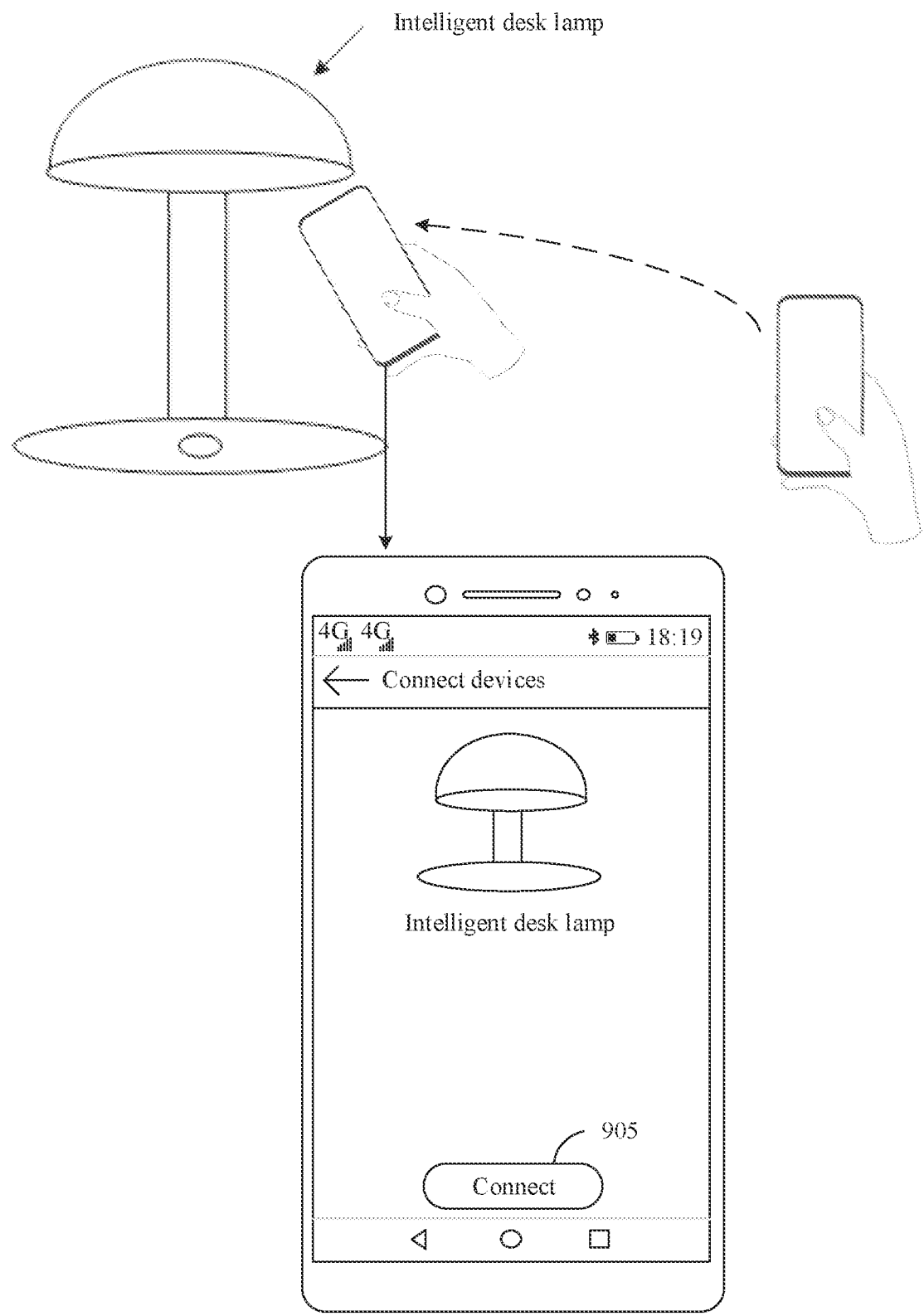

The GUI in FIG. 9C is a display interface of connecting a device. When the mobile phone approaches the intelligent desk lamp, the mobile phone may discover the intelligent desk lamp that uses a BLE very short distance technology. When the intelligent desk lamp is discovered, the mobile phone obtains a device identifier (for example, a Product ID) and a Passkey of the intelligent desk lamp. After discovering the intelligent desk lamp, the mobile phone displays information about the intelligent desk lamp. After the mobile phone detects an operation of tapping a control 905 by the user, the mobile phone initiates a connect request (connect request) to the intelligent desk lamp.

It should be understood that after the intelligent desk lamp is successfully discovered by the mobile phone (after the intelligent desk lamp is successfully discovered by the mobile phone, the mobile phone displays the display interface shown in FIG. 9C), the mobile phone does not need to further approach the intelligent desk lamp.

In an embodiment, the intelligent desk lamp includes a first antenna and a second antenna. A wireless transmit power of the intelligent desk lamp operating by using the first antenna is less than a transmit power of the intelligent desk lamp operating by using the second antenna. When the intelligent desk lamp is powered on and is in an unprovisioned state, the intelligent desk lamp may send a connectable advertising packet to an ambient device through the first antenna. The connectable advertising packet may carry the Product ID and the Passkey of the intelligent desk lamp. In this case, if the mobile phone is to receive the connectable advertising packet sent by the intelligent desk lamp, the mobile phone needs to be within a safe distance from the intelligent desk lamp (for example, a distance between the mobile phone and the intelligent desk lamp is less than 5 cm). Within the safe distance, the intelligent desk lamp can send the Passkey in plaintext. This ensures Passkey sending security and entering the Passkey by the user is omitted. This improves user experience and reduces provisioning time of the intelligent desk lamp.

In an embodiment, the intelligent desk lamp may further carry an encryption key of an application layer in the connectable advertising packet. Functions of the encryption key of the application layer are as follows.

(1) The encryption key is used for identify command encryption.

(2) Before the mobile phone discovers the intelligent desk lamp, and pairing and binding of the intelligent desk lamp and the mobile phone complete, the mobile phone and the intelligent desk lamp may transmit a control command and status information by using the encryption key of the application layer, so that the mobile phone can implement second-level control the intelligent desk lamp in a second.

(3) To prevent another application (for example, the App 1 and the App 2) in the mobile phone from obtaining Bluetooth data of the intelligent desk lamp, it is ensured that only the App 3 can obtain the Bluetooth data of the intelligent desk lamp.

In an embodiment, after receiving the Product ID and the Passkey of the intelligent desk lamp, the mobile phone may further send an identify command encrypted by using the encryption key to the intelligent desk lamp. The identify command may be used by the user to confirm a to-be-provisioned intelligent desk lamp. For example, after receiving the identify command encrypted by using the encryption key, the intelligent desk lamp obtains the identify command based on the encryption key. Then the intelligent desk lamp may blink for preset duration. In addition, after receiving a response of the intelligent desk lamp to the identify command, the mobile phone may display a blinking intelligent desk lamp by using an animation on the display interface shown in FIG. 9C, so that the user can determine that the to-be-provisioned intelligent desk lamp is the intelligent desk lamp close to the mobile phone.

It should be understood that, in this embodiment of this application, a Passkey and OOB information may be used for identity authentication in legacy pairing and secure connection pairing.

For legacy pairing (legacy pairing), a first device may send a Passkey to a second device by using a very short distance technology. The first device and the second device may generate a TK by using the Passkey, to perform identity authentication by using the TK. Alternatively, OOB information sent by the first device to the second device by using the very short distance technology may carry the TK. In this case, the first device and the second device may perform identity authentication by using the TK.

For secure connection pairing (secure connection pairing), a first device may send a Passkey to a second device by using a very short distance technology, so that the first device and the second device may perform identity authentication by using the Passkey. Alternatively, OOB information sent by the first device to the second device by using the very short distance technology may carry a device address of the first device, a random number, and a confirmation number. In this case, the first device and the second device may perform identity authentication by using the device address of the first device, the random number, and the confirmation number.

Figure 9D:
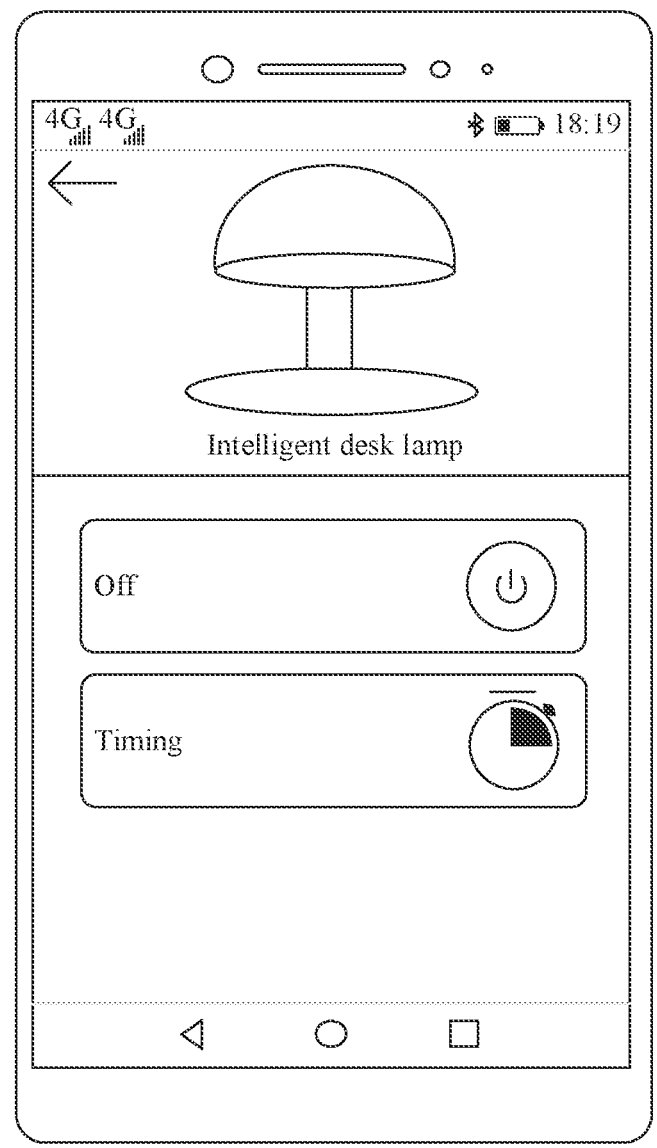

Refer to FIG. 9D. A GUI in FIG. 9D is a control interface of the intelligent desk lamp. After the mobile phone detects the operation of tapping the control 905 by the user, the mobile phone may obtain a control mapping file and a details page of the intelligent desk lamp from a server, and then display function options (for example, turning on/turning off and timing) of the intelligent desk lamp on the control interface shown in FIG. 9D.

In this embodiment of this application, after the mobile phone detects the operation of tapping the control 905 by the user, the mobile phone may initiate a connect request to the intelligent desk lamp, and then the mobile phone may perform pairing and binding with the intelligent desk lamp by using the Passkey. After pairing and binding of the mobile phone and the intelligent desk lamp complete, the mobile phone may further register the intelligent desk lamp with the cloud as a proxy. In a process from initiation of the connect request to the intelligent desk lamp by the mobile phone to registration, performed by the mobile phone as the proxy, of the intelligent desk lamp with the cloud, the mobile phone may obtain the control mapping file and the details page of the intelligent desk lamp from the server, to control the intelligent desk lamp.

Figure 9E:
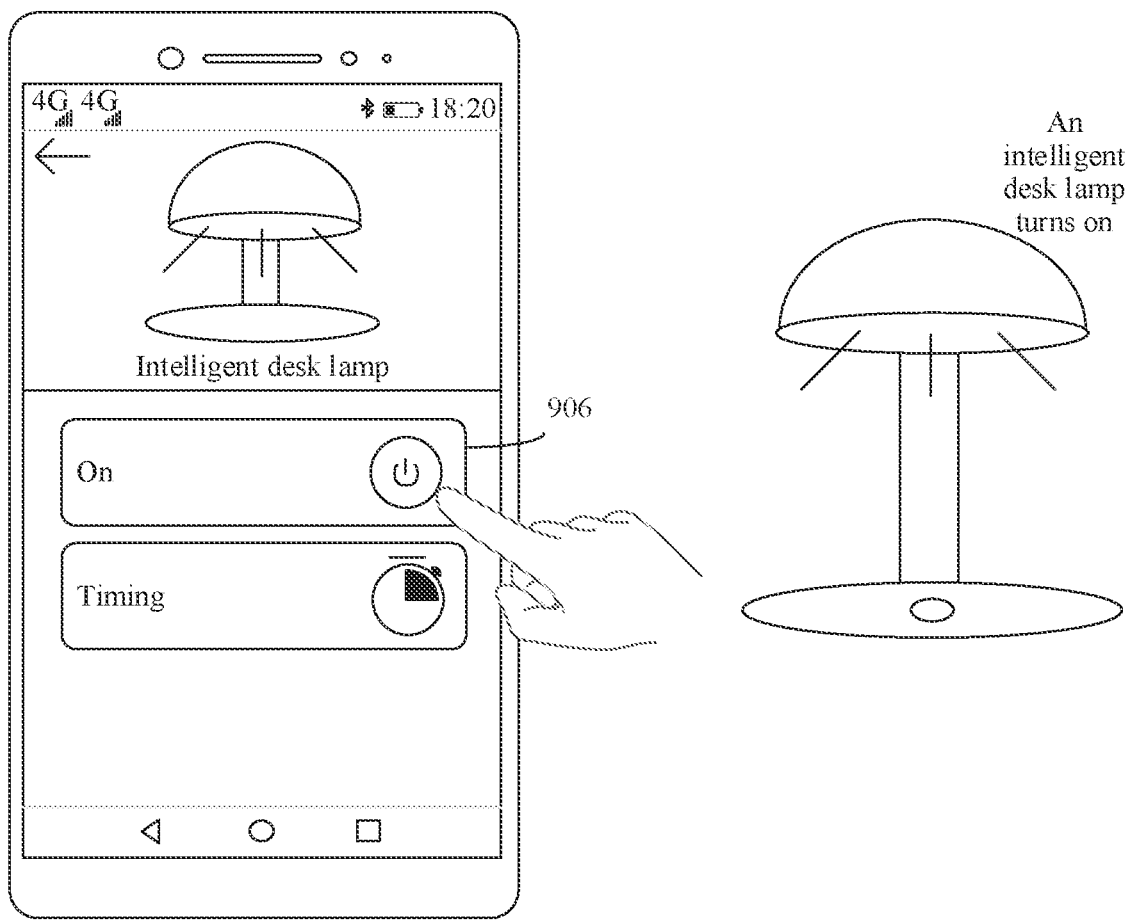

Refer to FIG. 9E. A GUI in FIG. 9E is another control interface of the intelligent desk lamp. After the mobile phone detects an operation of tapping a control 906 by the user, before the mobile phone discovers the intelligent desk lamp and pairing of the mobile phone and the intelligent desk lamp completes, the mobile phone may send a control command that is encrypted by using the encryption key of the application layer to the intelligent desk lamp by using a non-connectable advertising (ADV_NONCONN_IND) packet. The control command is used to indicate the intelligent desk lamp to turn on. After decrypting the encrypted control command, the intelligent desk lamp performs a turn-on operation according to the control command. After the intelligent desk lamp turns on, the intelligent desk lamp may further send status information encrypted by using the encryption key of the application layer to the mobile phone, where the status information is used to indicate that the intelligent desk lamp is in an on state. After decrypting the encrypted status information, the mobile phone may update a status of the intelligent desk lamp. As shown in FIG. 9E, the display interface of the mobile phone shows that the desk lamp is in the on state.

In this embodiment of this application, the mobile phone may send, to the intelligent desk lamp by using the non-connectable advertising packet, the control command encrypted by using the encryption key of the application layer, so that the user controls the intelligent desk lamp immediately after the intelligent desk lamp is discovered. This reduces waiting time of registering the intelligent desk lamp with the cloud by the mobile phone that is used as the proxy, and avoids a case in which the user cannot control the device in the waiting time of registering the intelligent desk lamp with the cloud by the mobile phone that is used as the proxy, which helps improve user experience.

FIG. 10A to FIG. 10E are another set of GUIs according to an embodiment of this application.

Figure 10A:
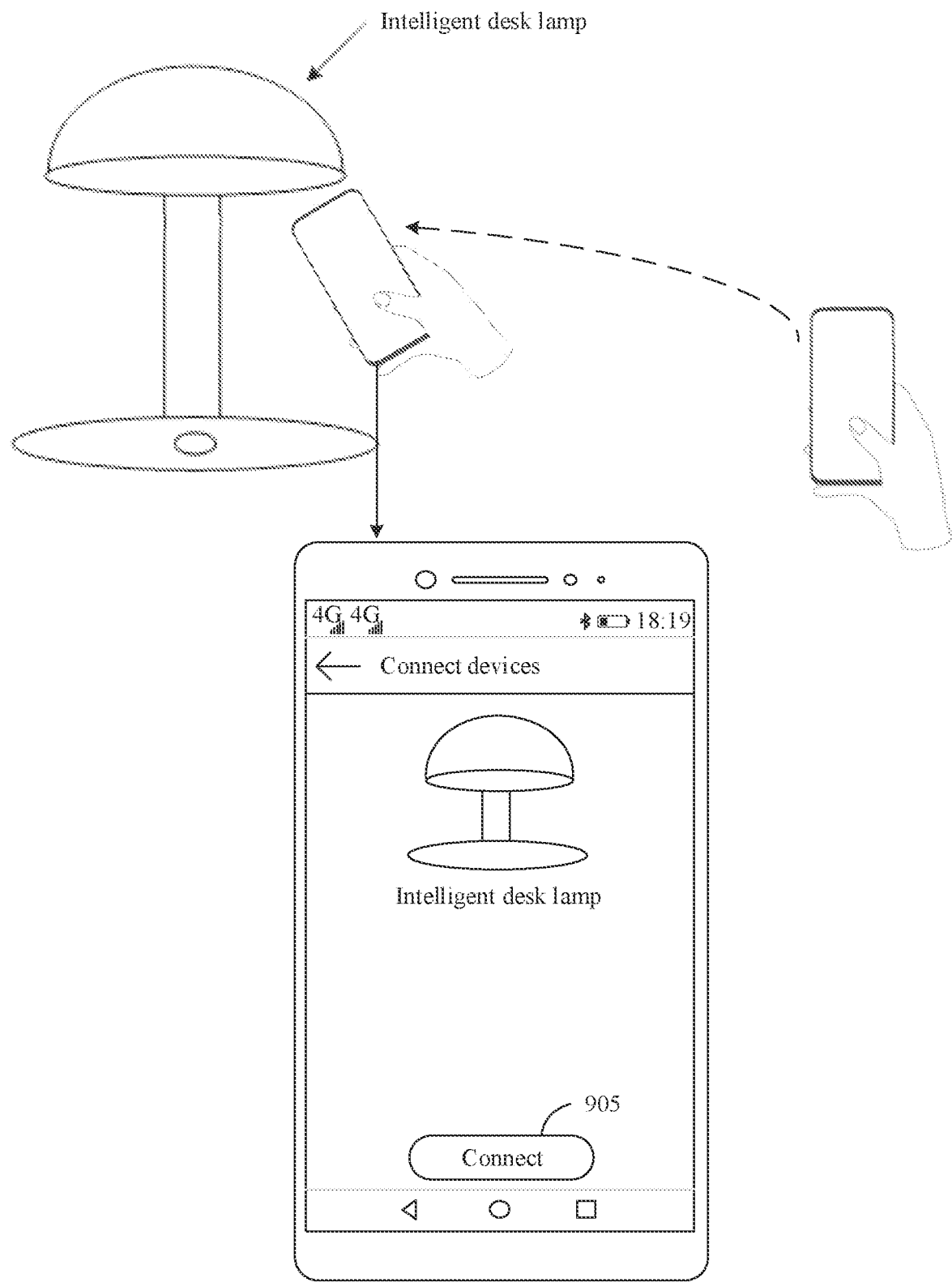
FIG. 10A to FIG. 10E are a set of graphical user interfaces according to an embodiment of this application.

A GUI shown in FIG. 10A is a display interface for connecting a device. The user may move the mobile phone from a location far away from the intelligent desk lamp to a location close to the intelligent desk lamp. The mobile phone may discover the ambient intelligent desk lamp by using a very short distance technology and the BLE technology. The mobile phone may obtain the Product ID, the Passkey, and the encryption key of the application layer of the intelligent desk lamp when the intelligent desk lamp is discovered. After discovering the intelligent desk lamp, the mobile phone displays information about the intelligent desk lamp.

After the mobile phone detects an operation of tapping the control 905 by the user, the mobile phone may initiate a connect request (connect request) to the intelligent desk lamp. Refer to a GUI shown in FIG. 10B.

Figure 10B:
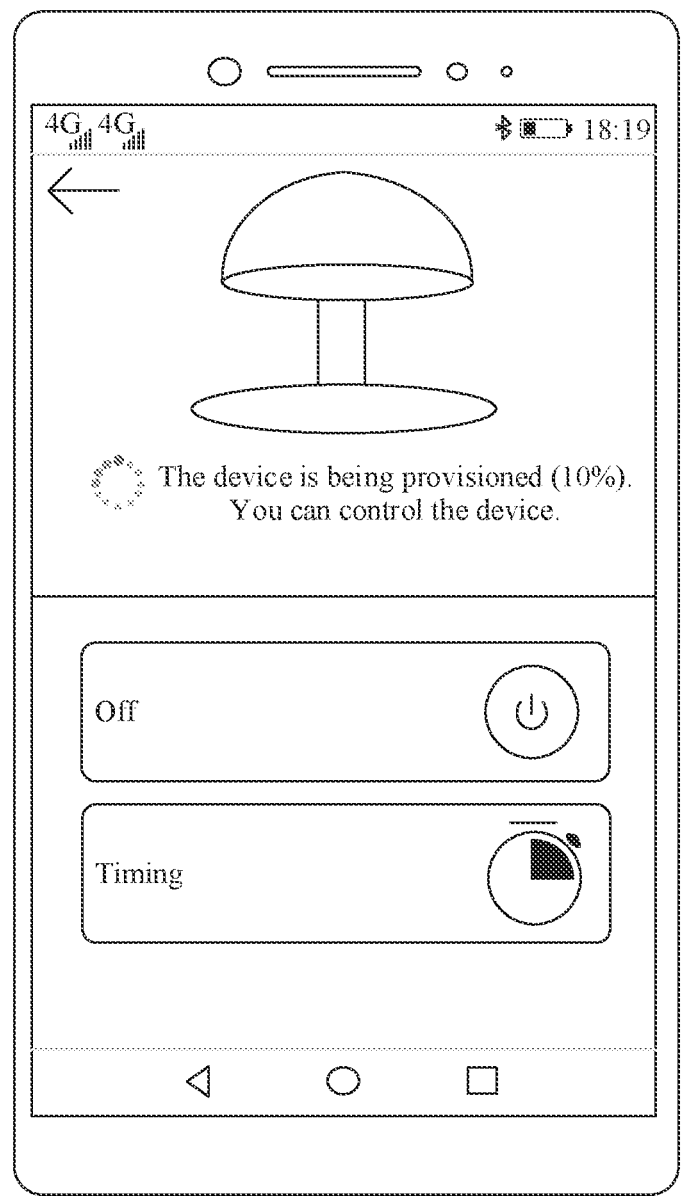

The GUI in FIG. 10B is another control interface of the intelligent desk lamp. Different from the GUI shown in FIG. 9D, in addition to some controls for the intelligent desk lamp, the control interface of the intelligent desk lamp may further display a progress bar of provisioning of the intelligent desk lamp. As shown in FIG. 10B, the control interface may prompt the user that "The device is being provisioned (10%). You can control the device".

Figure 10C:
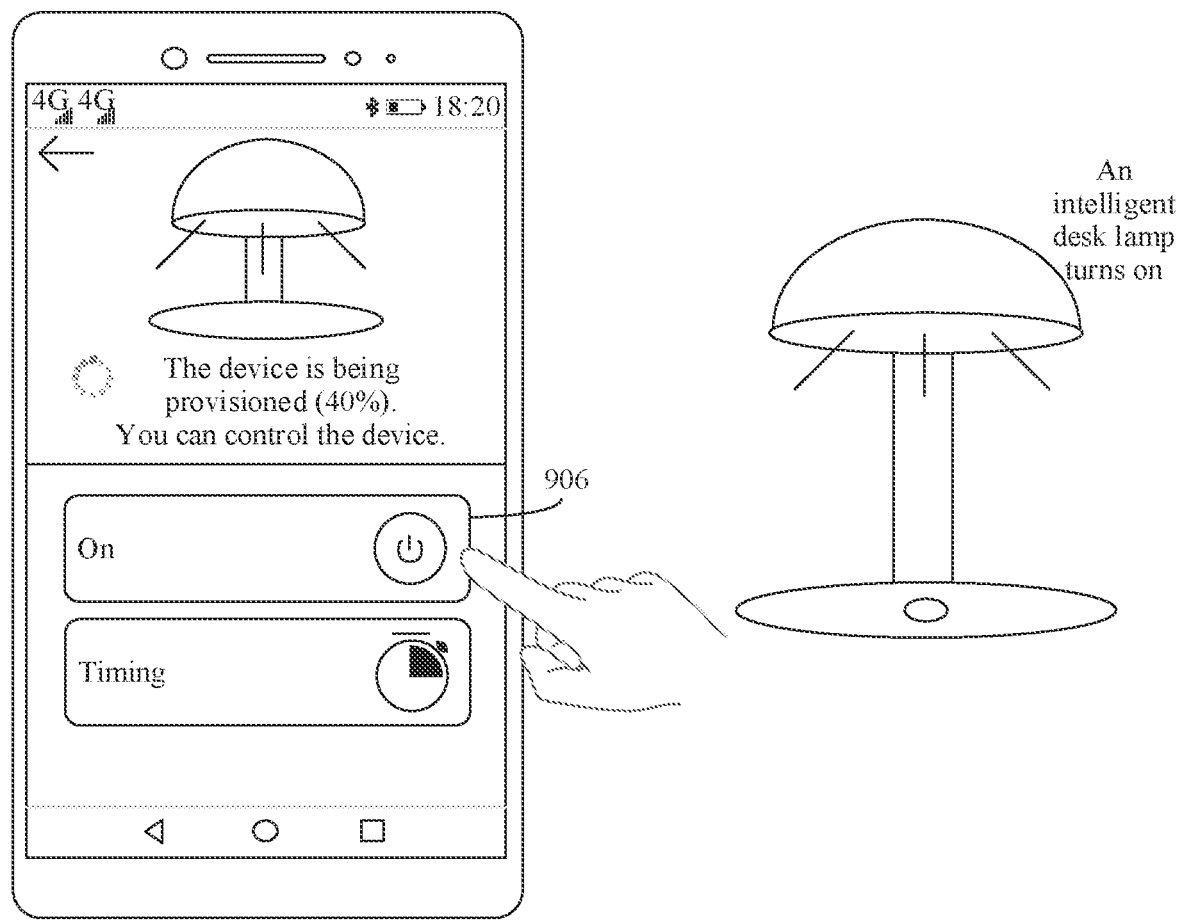

A GUI in FIG. 10C is another control interface of the intelligent desk lamp. Before the mobile phone discovers the intelligent desk lamp and pairing and binding of the intelligent desk lamp and the mobile phone complete, after the mobile phone detects an operation of tapping the control 906 by the user, the mobile phone may send a control command encrypted by using the encryption key of the application layer to the intelligent desk lamp. After decrypting the encrypted control command, the intelligent desk lamp obtains the control command and executes the control command (the intelligent desk lamp performs a turn-on operation). After the intelligent desk lamp executes the control command, the intelligent desk lamp may send status information encrypted by using the encryption key of the application layer to the mobile phone. After receiving the encrypted status information, the mobile phone performs decryption to obtain the status information, so that the mobile phone may update the status information of the intelligent desk lamp displayed on the control interface (the mobile phone updates the status information of the intelligent desk lamp to "on"). In this case, the mobile phone may display "The device is being provisioned (40%). You can control the device".

Figure 10D:
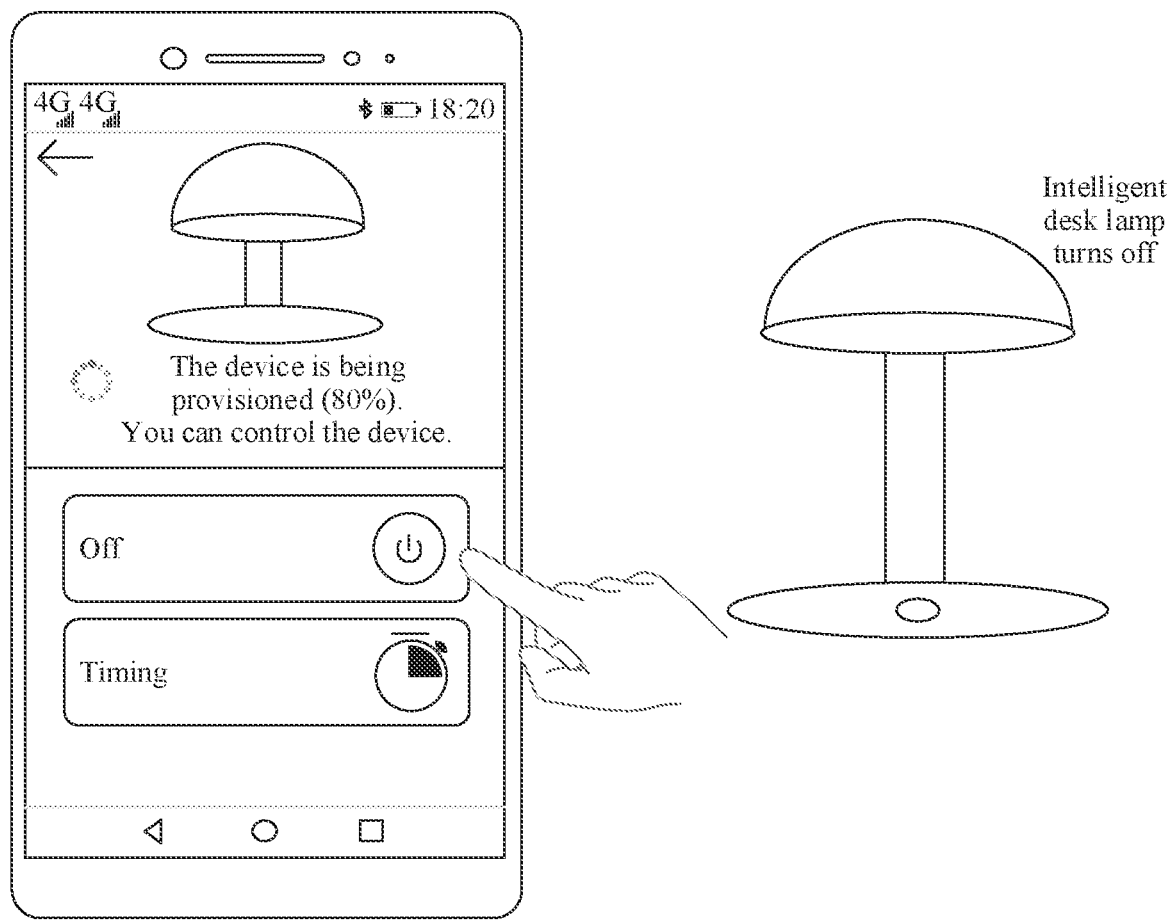

A GUI in FIG. 10D is another control interface of the intelligent desk lamp. After the mobile phone detects another operation of tapping the control 906 by the user, the mobile phone may send a control command encrypted by using the encryption key of the application layer to the intelligent desk lamp. The control command is used to indicate the intelligent desk lamp to turn off. After receiving the encrypted control command, the intelligent desk lamp decrypts the control command to execute the control command (the intelligent desk lamp performs a turn-off operation). After the intelligent desk lamp executes the control command, the intelligent desk lamp may send status information encrypted by using the encryption key of the application layer to the mobile phone. After receiving the encrypted status information, the mobile phone performs decryption to obtain the status information, so that the mobile phone may update the status information of the intelligent desk lamp displayed on the control interface (the mobile phone updates the status information of the intelligent desk lamp to "off"). In this case, the mobile phone may display "The device is being provisioned (80%). You can control the device".

Figure 10E:
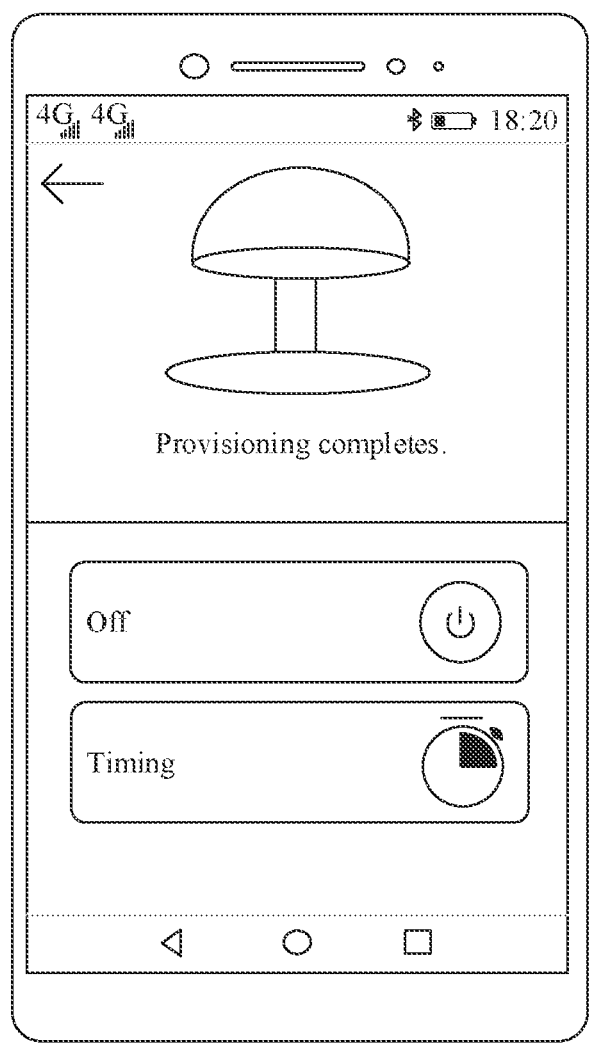

As shown in FIG. 10E, after the mobile phone completes a process of registering the intelligent desk lamp with the cloud as the proxy, the mobile phone may prompt the user that "Provisioning completes".

Figure 11A:
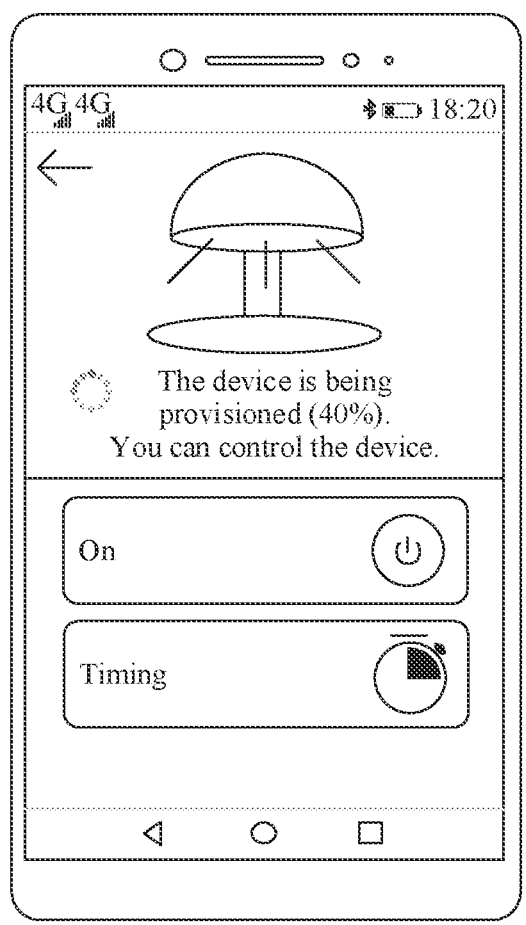
FIG. 11A and FIG. 11B are a set of graphical user interfaces according to an embodiment of this application.
Figure 11A:
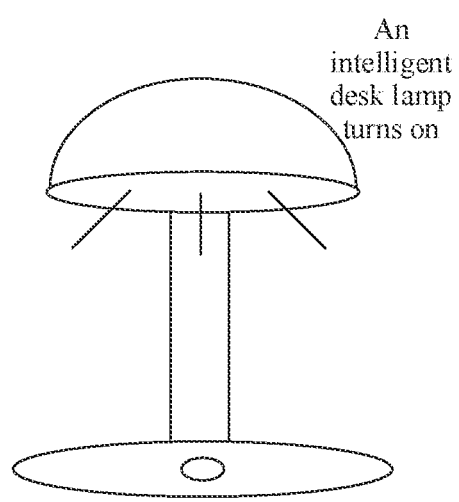
Figure 11B:
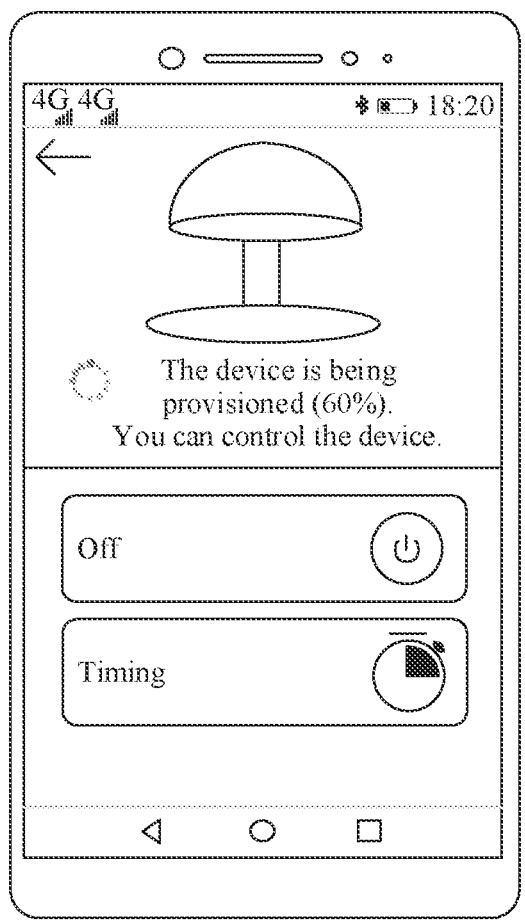
Figure 11B:
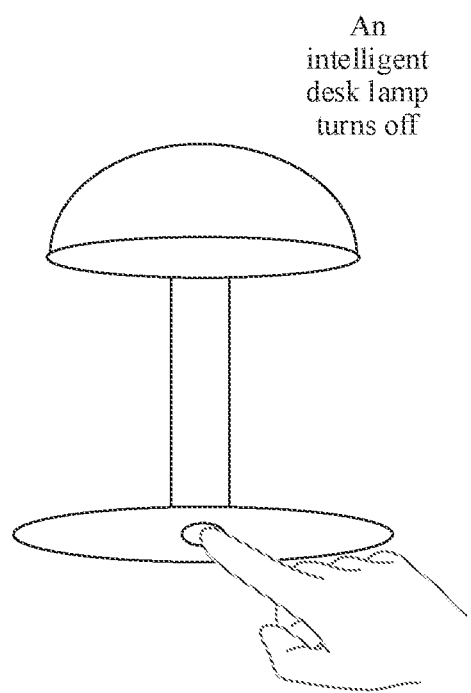

FIG. 11A and FIG. 11B are another set of GUIs according to an embodiment of this application.

As shown in FIG. 11A and FIG. 11B, after detecting an operation of tapping an on/off button by the user, the intelligent desk lamp may perform a turn-off operation in an on state. After the intelligent desk lamp performs a turn-off operation, the intelligent desk lamp may send a non-connectable advertising (ADV_NONCONN_IND) packet to the mobile phone, where the non-connectable advertising packet may carry status information encrypted by using the encryption key of the application layer, and the status information is used to indicate that the intelligent desk lamp is in an off state. After receiving the encrypted status information, the mobile phone performs decryption, so that the mobile phone updates status information displayed on the control interface (the mobile phone updates the status information of the intelligent desk lamp to "off").

In this embodiment of this application, before the mobile phone discovers the intelligent desk lamp and pairing and binding of the mobile phone and the intelligent desk lamp complete, when a status of the intelligent desk lamp changes, the intelligent desk lamp may send updated status information of the intelligent desk lamp to the mobile phone by using the non-connectable advertising packet, so that the mobile phone updates the information on the control interface of the intelligent desk lamp in time.

An embodiment of this application further provides a method for discovery and provisioning of a Bluetooth mesh device. A first device may include a first antenna and a second antenna. A wireless transmit power of the first device operating by using the first antenna is less than a transmit power of the first device operating by using the second antenna. The first device may send an advertising message through the first antenna. The advertising message may carry a device identifier of the first device, a public key (public key) of the first device, an authentication value (AuthValue), and an encryption key. The public key of the first device is used for exchanging public keys (exchange public keys) in a provisioning process of the first device, the authentication value is used for identity authentication (Authentication) in the provisioning process of the first device, and the encryption key may be used for transmission of a control command and status information between the first device and the second device after the first device is discovered by the second device and before provisioning of the first device completes. Because the first device uses the first antenna, a communication distance between the first device and the second device is a safe distance (for example, within 30 cm).

The first device may transmit the device identifier of the first device by using a very short distance technology. In this way, the first device can be prevented from being discovered by another remote device and from pairing with a device in a neighbor's home. In addition, inappropriate pairing caused by a user when there are a plurality of devices having a same product ID can be prevented.

The first device may also transmit the public key of the first device by using the very short distance technology. This avoids that the first device performs out-of-band (out of band) transmission when exchanging public keys.

The first device may further transmit the authentication value in plaintext by using the very short distance technology. This avoids a case in which the first device and the second device perform authentication in manners of input OOB (input OOB) and output OOB (output OOB) in an identity authentication process, and there is no need to add an additional input or input hardware device to the first device or the second device. Therefore, a manufacturer does not need to reconstruct a production line, and user assistance in identity authentication is omitted, which improves user experience. In addition, compared with static OOB or no OOB, security of the manner of transmitting the authentication value is higher.

The first device may further transmit the encryption key in plaintext by using the very short distance technology. In this way, after the first device is discovered by the second device and before provisioning of the first device completes, the control command and the status information may be transmitted between the first device and the second device. The user may directly control the first device by using the second device. In this way, the user does not need to wait for provisioning of the first device, which improves user experience.

It should be understood that the GUIs shown in FIG. 9A to FIG. 9E, FIG. 10A to FIG. 10E, FIG. 11A, and FIG. 11B are also applicable to Bluetooth mesh discovery and provisioning (a mobile phone is used as a provisioner (provisioner)). Therefore, the following describes Bluetooth mesh discovery and provisioning with reference to the GUIs shown in FIG. 9A to FIG. 9E, FIG. 10A to FIG. 10E, FIG. 11A, and FIG. 11B.

Refer to FIG. 9B. The GUI is the display interface that displays an added device in the APP 3. The display interface may include a device that connects to the cloud through the mobile phone, for example, an air purifier, and may further display a status of the device, for example, the air purifier is currently in an off state. After detecting an operation of tapping the control 903 by the user, the mobile phone may display a plurality of functional controls, including the control 904 for adding a device, the control for creating intelligence, the control for device sharing, the control for connecting to a third-party platform, and the like. After the mobile phone detects an operation of tapping the control 904 by the user, the mobile phone starts to scan for an advertising message (for example, an unprovisioned device beacon (unprovisioned device beacon) frame) sent by an ambient device, and the mobile phone may display the GUI shown in FIG. 9C.

In this embodiment of this application, if the mobile phone is a provisioner, starting, by the mobile phone, to scan for an unprovisioned device beacon frame sent by an ambient device is triggered by detecting, by the mobile phone, that the user opens an application (for example, the App 3), or may be triggered by detecting, by the mobile phone, that the user taps to add a device.

It should be understood that, starting, by the mobile phone, to scan for an unprovisioned device beacon frame sent by an ambient device may be triggered by approaching, by the mobile phone, a near field communication (near field communication, NFC) tag of the intelligent desk lamp, or may be triggered by distance measurement, by the mobile phone, on a received signal strength indication (received signal strength indication, RSSI) of the intelligent desk lamp. This is system triggering. When the mobile phone scans the unprovisioned device beacon frame, a system pop-up window is displayed.

The GUI in FIG. 9C is a display interface for connecting a device. When the intelligent desk lamp is powered on and is in an unprovisioned state, the intelligent desk lamp may send an advertising message through the first antenna, and the advertising message may carry a device identifier (for example, a Product ID) of the intelligent desk lamp. The user may move the mobile phone from a location far away from the intelligent desk lamp to a location close to the intelligent desk lamp. When a distance between the mobile phone and the intelligent desk lamp is less than or equal to a preset distance, the mobile phone may receive an unprovisioned device beacon frame sent by the intelligent desk lamp. After discovering the intelligent desk lamp, the mobile phone displays information about the intelligent desk lamp (the mobile phone may display a device name of the intelligent desk lamp, as shown in FIG. 9C). After the mobile phone detects an operation of tapping the control 905 by the user, the mobile phone initiates a provisioning invite (provisioning invite) to the intelligent desk lamp.

In an embodiment, after the intelligent desk lamp receives the provisioning invite sent by the mobile phone, the intelligent desk lamp may switch from the first antenna to the second antenna.

It should be understood that, in this embodiment of this application, provisioning of the first device (for example, the intelligent desk lamp) includes: advertising a beacon frame (for example, the first device advertises an unprovisioned device beacon frame), initiating, by the second device (for example, the mobile phone or a mesh gateway), a provisioning invite (provisioning invite) to the first device, and exchanging public keys (exchange public keys) between the first device and the second device, identity authentication (authentication), and distribution of provisioning data (distribution of provisioning data), and registering, by the second device, with a cloud server as a proxy of the first device.

In an embodiment, the intelligent desk lamp includes the first antenna and the second antenna. A wireless transmit power of the intelligent desk lamp operating by using the first antenna is less than a transmit power of the intelligent desk lamp operating by using the second antenna. When the intelligent desk lamp is powered on and is in an unprovisioned state, the intelligent desk lamp may send an advertising message through the first antenna, and the advertising message may carry the Product ID of the intelligent desk lamp. In this case, if the mobile phone is to receive the advertising message sent by the intelligent desk lamp, the mobile phone needs to be within a safe distance from the intelligent desk lamp (for example, a distance between the mobile phone and the intelligent desk lamp is less than 5 cm). In this way, the intelligent desk lamp can be prevented from being discovered by another remote device and from pairing with a device in a neighbor's home. In addition, inappropriate pairing caused by the user when there are a plurality of intelligent desk lamps having a same product ID can be prevented.

In an embodiment, the advertising message of the intelligent desk lamp may further carny an authentication value. The intelligent desk lamp may send the authentication value in the advertising message in plaintext within the safe distance. This ensures security of sending the authentication value and avoids a case in which the mobile phone and the intelligent desk lamp perform authentication in manners of input OOB and output OOB, and there is no need to add an additional input or output hardware device to the first device or the second device. Therefore, a manufacturer does not need to reconstruct a production line, and user assistance in identity authentication is omitted, which improves user experience. In addition, compared with static OOB or no OOB, security is also improved.

In an embodiment, the advertising message of the intelligent desk lamp may further carry a public key of the intelligent device. Within the safe distance, the intelligent desk lamp may send the public key of the intelligent desk lamp. This ensures security of sending the public key of the intelligent desk lamp, and avoids out-of-band transmission performed by the intelligent desk lamp in exchanging public keys.

In an embodiment, the advertising message of the intelligent desk lamp may further carry an encryption key. After the mobile phone discovers the intelligent desk lamp and before the intelligent desk lamp completes provisioning, the mobile phone may send a control command encrypted by using the encryption key to the intelligent desk lamp, and the intelligent desk lamp may send status information encrypted by using the encryption key to the mobile phone. The user can directly control the intelligent desk lamp by using the mobile phone, so that the user does not need to wait in the provisioning process of the intelligent desk lamp. This improves user experience.

In an embodiment, after receiving the advertising message of the intelligent desk lamp, the mobile phone may further send an identify command to the intelligent desk lamp. The identify command may be used by the user to confirm a to-be-provisioned intelligent desk lamp. For example, after receiving the identify command, the intelligent desk lamp may blink for preset duration. In addition, after receiving a response of the intelligent desk lamp to the identify command, the mobile phone may display a blinking intelligent desk lamp by using an animation on the display interface shown in FIG. 9C, so that the user can determine that the to-be-provisioned intelligent desk lamp is the intelligent desk lamp close to the mobile phone. Therefore, a man-in-the-middle attack by using an amplifier can be avoided.

Refer to FIG. 9D. The GUI in FIG. 9D is a control interface of the intelligent desk lamp. After the mobile phone detects the operation of tapping the control 905 by the user, the mobile phone may obtain a control mapping file and a details page of the intelligent desk lamp from a server, and then display function options (for example, turning on/turning off and timing) of the intelligent desk lamp on the control interface shown in FIG. 9D.

In this embodiment of this application, after the mobile phone detects the operation of tapping the control 905 by the user, the mobile phone may initiate the provisioning invite (provisioning invite) to the intelligent desk lamp, exchange public keys (exchange public keys), perform identity authentication (authentication), and perform distribution of provisioning data (distribution of provisioning data) with the intelligent desk lamp. After distribution of provisioning data between the intelligent desk lamp and the mobile phone completes, the mobile phone can register the intelligent desk lamp with the cloud server as the proxy.

Refer to FIG. 9E. The GUI in FIG. 9E is another control interface of the intelligent desk lamp. Before the mobile phone discovers the intelligent desk lamp and provisioning of the intelligent desk lamp completes, and after the mobile phone detects an operation of tapping the control 906 by the user, the mobile phone may send, to the intelligent desk lamp by using a PB-ADV beacon frame, a control command encrypted by using the encryption key. The control command is used to indicate the intelligent desk lamp to turn on. After decrypting the encrypted control command, the intelligent desk lamp performs a turn-on operation according to the control command. After the intelligent desk lamp turns on, the intelligent desk lamp may further send status information encrypted by using the encryption key to the mobile phone, where the status information is used to indicate that the intelligent desk lamp is in an on state. After decrypting the encrypted status information, the mobile phone may update a status of the intelligent desk lamp. As shown in FIG. 9E, the display interface of the mobile phone shows that the desk lamp is in the on state.

In this embodiment of this application, the mobile phone may send, to the intelligent desk lamp by using the PB-ADV beacon frame, the control command encrypted by using the encryption key, so that the user controls the intelligent desk lamp immediately after the intelligent desk lamp is discovered. This reduces waiting time of registering the intelligent desk lamp with the cloud by the mobile phone that is used as the proxy, which helps improve user experience.

The GUI shown in FIG. 10A is a display interface for connecting a device. The user may move the mobile phone from a location far away from the intelligent desk lamp to a location close to the intelligent desk lamp. The mobile phone may discover the ambient intelligent desk lamp by using the very short distance technology and the Bluetooth mesh technology. The mobile phone may obtain the Product ID, the public key, the authentication value, and the encryption key of the intelligent desk lamp when the intelligent desk lamp is discovered. After discovering the intelligent desk lamp, the mobile phone displays information about the intelligent desk lamp.

After the mobile phone detects an operation of tapping the control 905 by the user, the mobile phone may initiate a provisioning invite (provisioning invite) to the intelligent desk lamp, and displays the GUI shown in FIG. 10B.

The GUI in FIG. 10B is another control interface of the intelligent desk lamp. Different from the GUI shown in (d) in FIG. 10, in addition to some controls for the intelligent desk lamp, the control interface of the intelligent desk lamp may further display a progress bar of provisioning of the intelligent desk lamp. As shown in FIG. 10B, the control interface may prompt the user that "The device is being provisioned (10%). You can control the device".

The GUI in FIG. 10C is another control interface of the intelligent desk lamp. After the mobile phone discovers the intelligent desk lamp and before provisioning of the intelligent desk lamp completes, when the mobile phone detects an operation of tapping the control 906 by the user, the mobile phone may send a control command encrypted by using the encryption key to the intelligent desk lamp. After decrypting the encrypted control command, the intelligent desk lamp obtains the control command and executes the control command (the intelligent desk lamp performs a turn-on operation). After the intelligent desk lamp executes the control command, the intelligent desk lamp may send status information encrypted by using the encryption key to the mobile phone. After receiving the encrypted status information, the mobile phone performs decryption to obtain the status information, so that the mobile phone may update the status information of the intelligent desk lamp displayed on the control interface (the mobile phone updates the status information of the intelligent desk lamp to "on"). In this case, the mobile phone may display "The device is being provisioned (40%). You can control the device".

In an embodiment, the mobile phone may send a first PB-ADV beacon frame to the intelligent desk lamp, where the first PB-ADV beacon frame includes the control command encrypted by using the encryption key. The intelligent desk lamp may send a second PB-ADV beacon frame to the mobile phone, and the second PB-ADV beacon frame includes the status information encrypted by using the encryption key.

The GUI in FIG. 10D is another control interface of the intelligent desk lamp. After the mobile phone detects another operation of tapping the control 906 by the user, the mobile phone may send a control command encrypted by using the encryption key to the intelligent desk lamp. The control command is used to indicate the intelligent desk lamp to turn off. After receiving the encrypted control command, the intelligent desk lamp decrypts the control command to execute the control command (the intelligent desk lamp performs a turn-off operation). After the intelligent desk lamp executes the control command, the intelligent desk lamp may send status information encrypted by using the encryption key to the mobile phone. After receiving the encrypted status information, the mobile phone performs decryption to obtain the status information, so that the mobile phone may update the status information of the intelligent desk lamp displayed on the control interface (the mobile phone updates the status information of the intelligent desk lamp to "off"). In this case, the mobile phone may display "The device is being provisioned (80%). You can control the device".

As shown in FIG. 10E, after the mobile phone completes a process of registering with the cloud server as the proxy, the mobile phone may prompt the user that "Provisioning completes".

As shown in FIG. 11A and FIG. 11B, after detecting an operation of tapping the on/off button by the user, the intelligent desk lamp may perform a turn-off operation in the on state. After the intelligent desk lamp performs a turn-off operation, the intelligent desk lamp may further send a PB-ADV beacon frame to the mobile phone, where the PB-ADV beacon frame may carry status information encrypted by using the encryption key, and the status information is used to indicate that the intelligent desk lamp is in an off state. After receiving the encrypted status information, the mobile phone performs decryption, so that the mobile phone updates status information displayed on the control interface (the mobile phone updates the status information of the intelligent desk lamp to "off").

In this embodiment of this application, after the mobile phone discovers the intelligent desk lamp and before provisioning of the intelligent desk lamp completes, when the status of the intelligent desk lamp changes, the intelligent desk lamp may send updated status information of the intelligent desk lamp to the mobile phone by using the PB-ADV beacon frame, so that the mobile phone updates the information on the control interface of the intelligent desk lamp in time.

With reference to FIG. 9A to FIG. 9E, FIG. 10A to FIG. 10E, FIG. 11A, and FIG. 11B, the foregoing describes the GUIs displayed when the mobile phone is used as the provisioner. With reference to FIG. 12A to FIG. 12D, the following describes GUIs displayed when a mesh gateway device is used as a provisioner.

FIG. 12A to FIG. 12D are a set of graphical user interfaces (graphical user interfaces, GUIs) according to an embodiment of this application.

Figure 12A:
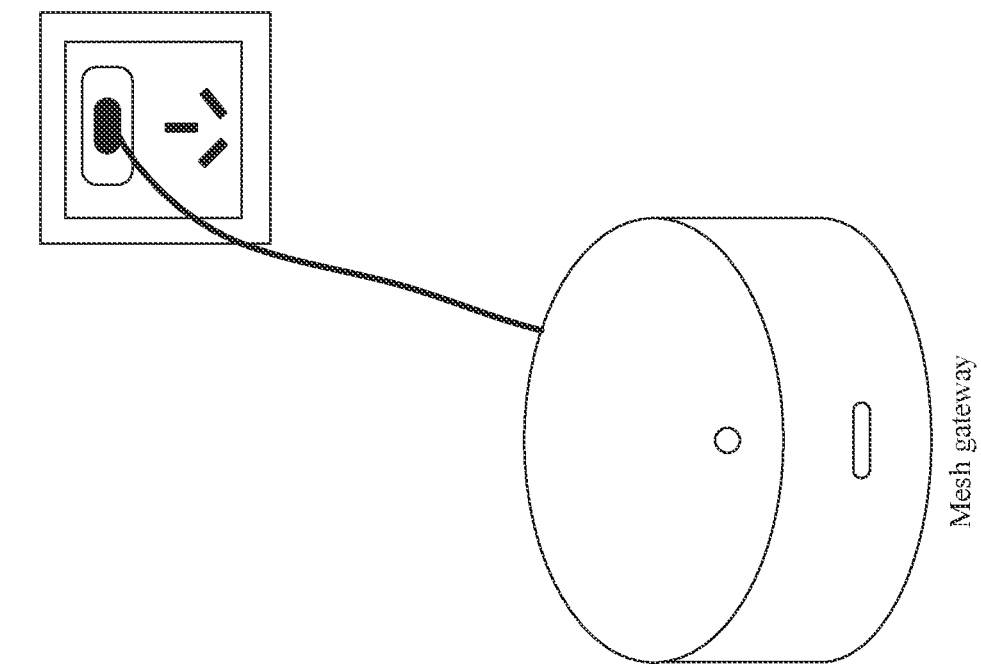
FIG. 12A to FIG. 12D are a set of graphical user interfaces according to an embodiment of this application.
Figure 12A:
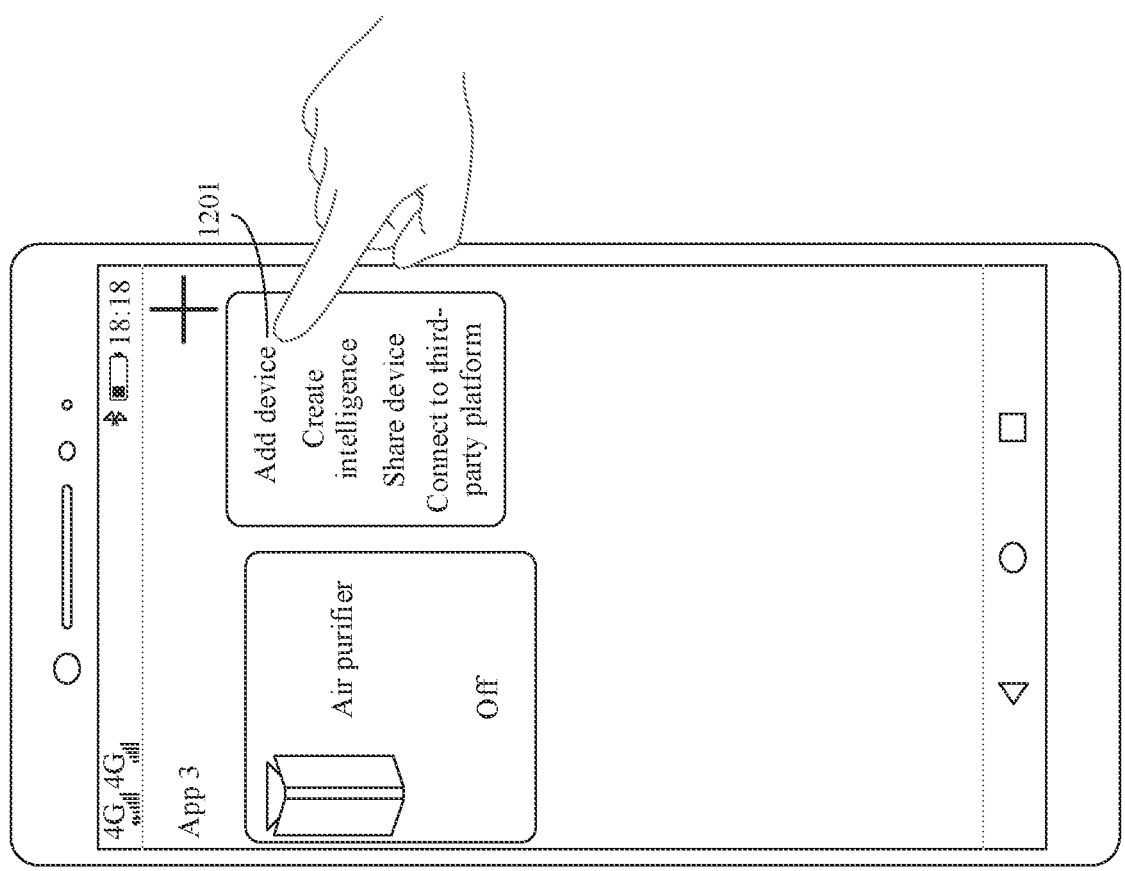

Refer to FIG. 12A. A GUI in FIG. 12A is a display interface that displays an added device in the APP 3. The display interface may include a device that connects to the cloud through a mobile phone, for example, an air purifier, and may further display a status of the device, for example, the air purifier is currently in an off state. After the mobile phone detects an operation of tapping a control 1201 by the user, the mobile phone may send indication information to the mesh gateway. The indication information is used to indicate the mesh to start to scan for an advertising message (for example, an unprovisioned device beacon frame) sent by an ambient device.

Figure 12B:
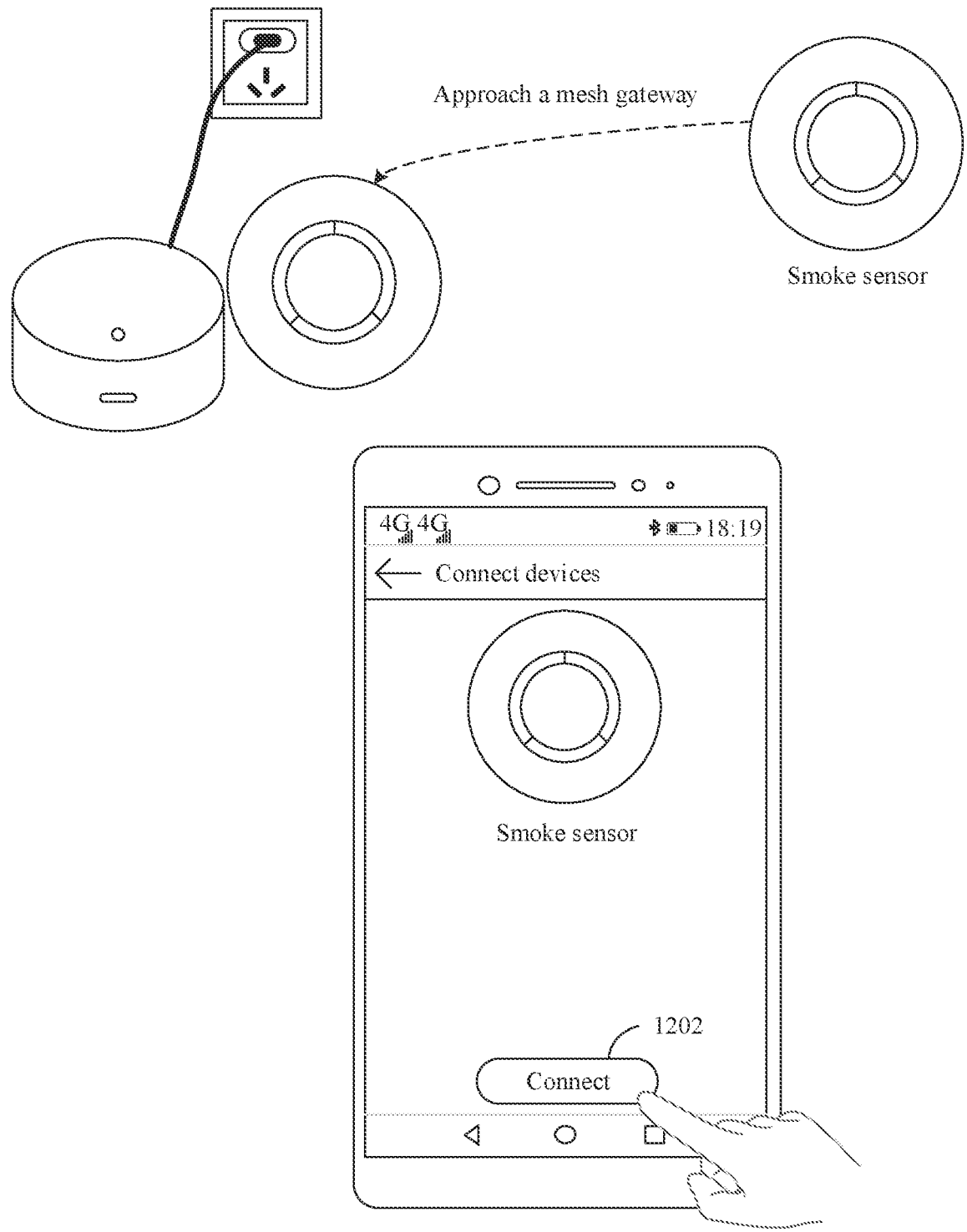

Refer to FIG. 12B. A GUI in FIG. 12B is a display interface for connecting a device. When a smoke sensor is powered on and is in an unprovisioned state, the smoke sensor may send an advertising message through a first antenna, and the advertising message may carry a device identifier (for example, a Product ID) of the smoke sensor. The user can put the smoke sensor close to the mesh gateway. When a distance between the mesh gateway and the smoke sensor is less than or equal to a preset distance, the mesh gateway can receive the advertising message sent by the smoke sensor. The mesh gateway may obtain the device identifier of the smoke sensor from the advertising message. After obtaining the device identifier of the smoke sensor, the mesh gateway may send the device identifier of the smoke sensor to the mobile phone. After receiving the device identifier of the smoke sensor sent by the mesh gateway, the mobile phone may display information about the smoke sensor on a display screen (as shown in FIG. 12B, the mobile phone may display a device name of the smoke sensor). After the mobile phone detects an operation of tapping a control 1202 by the user, the mobile phone may indicate the mesh gateway to provision the smoke sensor.

In an embodiment, the advertising message may further carry a public key, an authentication value, and an encryption key of the smoke sensor.

It should be understood that a communication manner between the mobile phone and the mesh gateway is not limited in this embodiment of this application. For example, the mobile phone and the mesh gateway may communicate by using an internet protocol (internet protocol).

Figure 12C:
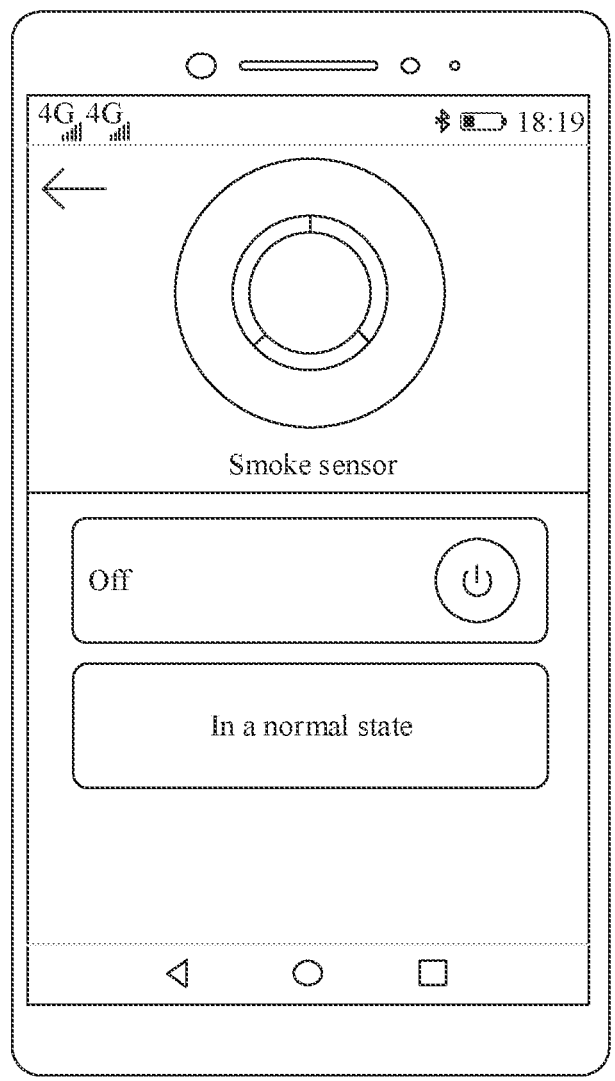

Refer to FIG. 12C. A GUI in FIG. 12C is a control interface of the smoke sensor. After the mobile phone detects the operation of tapping the control 1202 by the user, the mobile phone may indicate the mesh gateway to provision the smoke sensor and obtain a control mapping file and a details page of the smoke sensor from a server, and then display function options (for example, turning on/turning off and being in a normal state (or being in an alerting state)) of the smoke sensor on the control interface shown in FIG. 12C.

In this embodiment of this application, after the mesh gateway receives an indication that the mobile phone provisions the smoke sensor, the mesh gateway may initiate a provisioning invite (provisioning invite) to the smoke sensor, exchange public keys (exchange public keys), perform identity authentication (authentication), and perform distribution of provisioning data (distribution of provisioning data) with the smoke sensor. After the provisioning data is distributed between the smoke sensor and mobile phone, the mesh gateway can register the smoke sensor with the cloud server as a proxy.

Figure 12D:
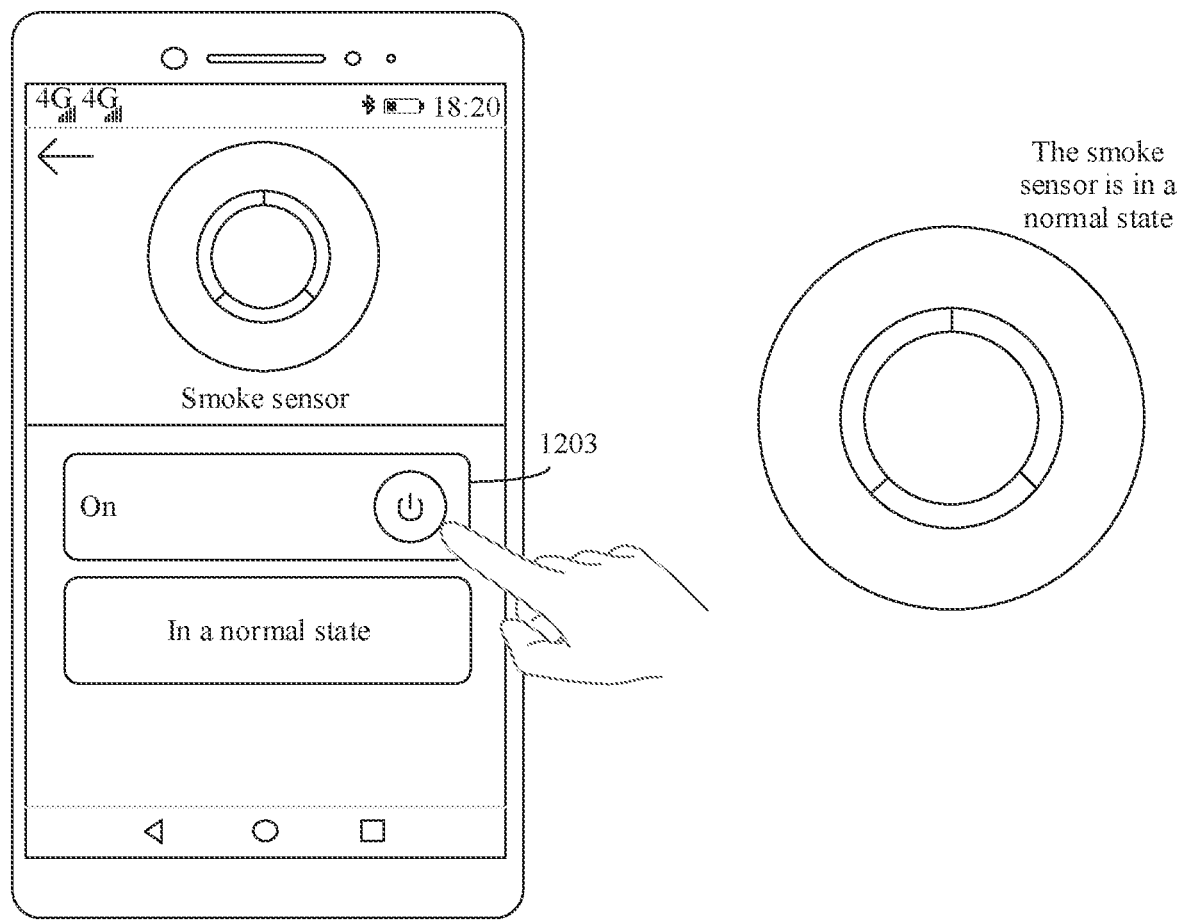

Refer to FIG. 12D. A GUI in FIG. 12D is another control interface of the smoke sensor. After the mesh gateway discovers the smoke sensor and before provisioning of the smoke sensor completes, when the mobile phone detects an operation of tapping a control 1203 by the user, the mobile phone may send a control command to the mesh gateway (for example, send the control command to the mesh gateway through an IP connection). After receiving the control command, the mesh gateway may send, by using a PB-ADV beacon frame, a control command encrypted by using the encryption key to the smoke sensor, where the control command is used to indicate the smoke sensor to turn on. After decrypting the encrypted control command, the smoke sensor turns on according to the control command.

After the smoke sensor turns on, the smoke sensor may further send status information encrypted by using the encryption key to the mesh gateway, where the status information is used to indicate that the smoke sensor is in a normal state. The mesh gateway obtains the status information after decrypting the encrypted status information. The mesh gateway may send the status information to the mobile phone (for example, the mesh gateway may send the status information to the mobile phone through an IP connection). The mobile phone may update a status of the smoke sensor. As shown in FIG. 12D, the display interface of the mobile phone shows that the smoke sensor is in the normal state.

An embodiment of this application further provides a method for discovery and provisioning of a ZigBee device. A first device may include a first antenna and a second antenna. A wireless transmit power of the first device operating by using the first antenna is less than a transmit power of the first device operating by using the second antenna. The first device may send a beacon request (beacon request) frame or an association request (association request) frame through the first antenna, where the beacon request frame or the association request frame may carry an install code (install code) or a pre-configured link key (pre-configured link key). Because the first device uses the first antenna, a communication distance between the first device and an intelligent gateway (or a router) is within a safe distance (for example, 30 cm). In this case, the first device may transmit the install code or the pre-configured link key in plaintext. In this way, the first device can be prevented from being discovered by a remote device and from pairing with a device in a neighbor's home. In addition, out-of-band (out of band, OOB) transmission does not need to be performed between the first device and a gateway device, so that additional hardware costs of the first device are avoided, and a user operation is also omitted. In this way, user experience can be improved and security can be ensured.

FIG. 13A to FIG. 13D are another set of GUIs according to an embodiment of this application.

Figure 13A:
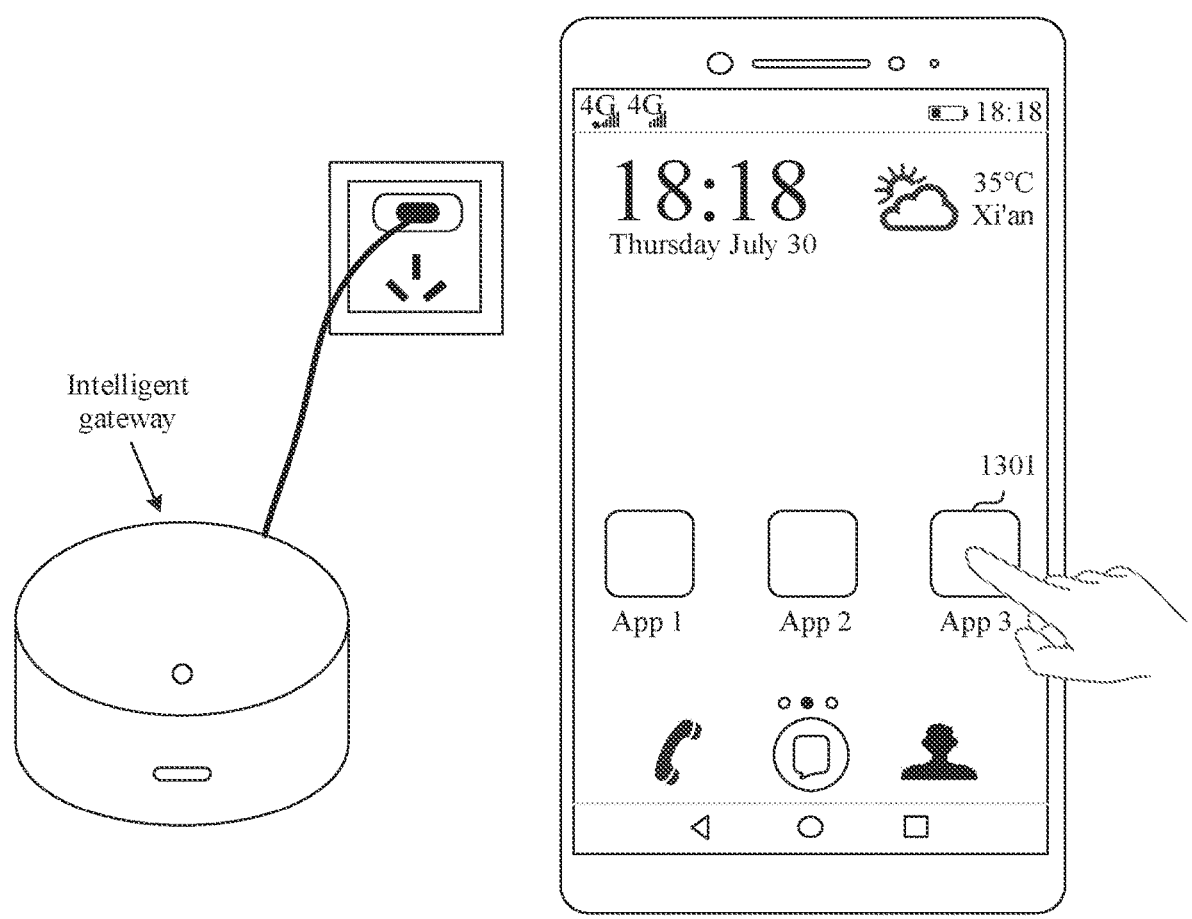
FIG. 13A to FIG. 13D are a set of graphical user interfaces according to an embodiment of this application.

A GUI in FIG. 13A is a desktop of a mobile phone. The desktop of the mobile phone includes applications such as an App 1, an App 2, and an App 3. After the mobile phone detects an operation of tapping an APP 3 icon 1301 by a user, the mobile phone may display a GUI shown in FIG. 13B. The App 3 may be an application for intelligent device control.

Figure 13B:
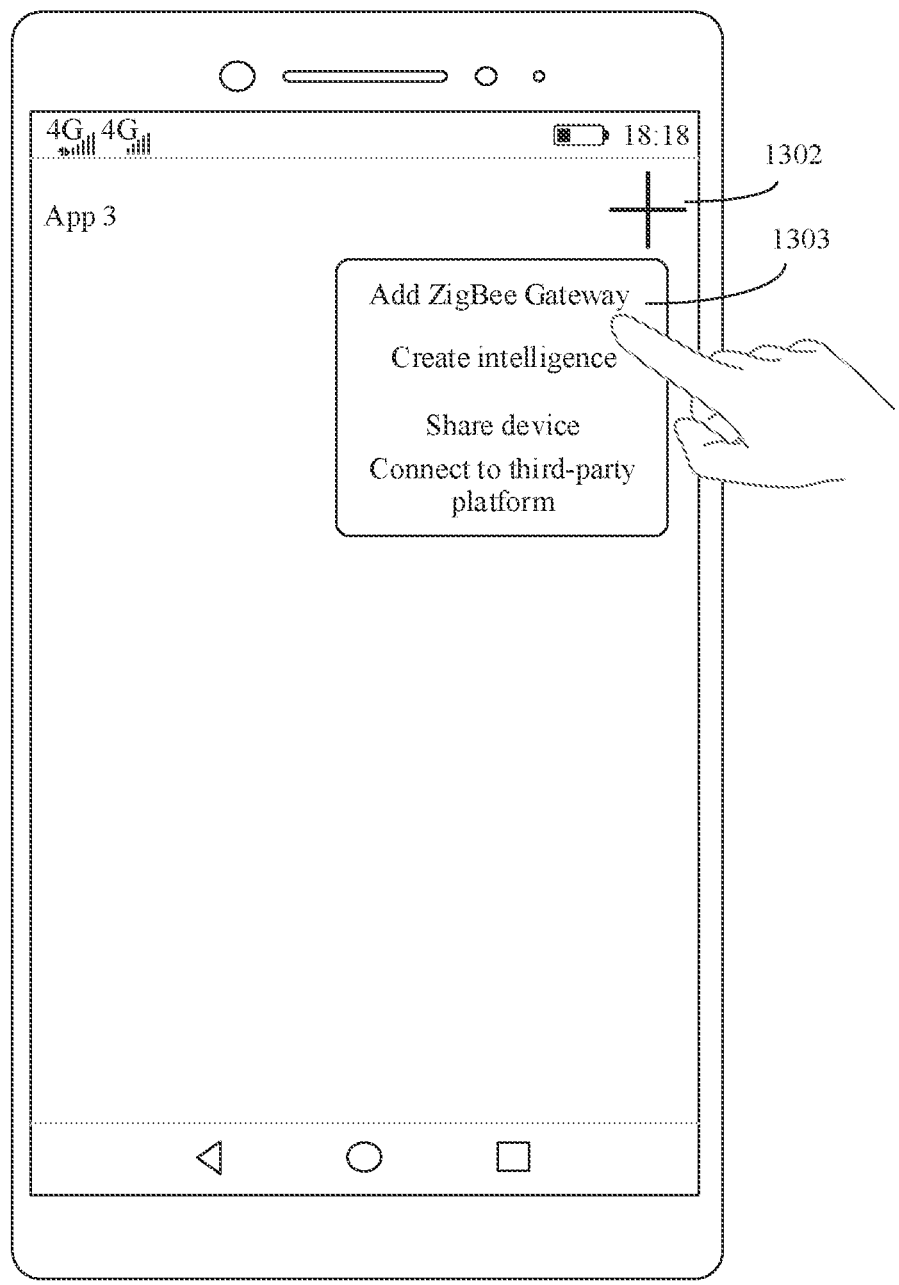

Refer to FIG. 13B. The GUI in FIG. 13B is a display interface of the App 3. After detecting an operation of tapping a control 1302 by the user, the mobile phone may display a plurality of functional controls, including a control 1303 for adding a ZigBee gateway device, a control for creating intelligence, a control for device sharing, a control for connecting to a third-party platform, and the like. After the mobile phone detects an operation of tapping the control 1303 by the user, the mobile phone may search for an ambient gateway device, and the mobile phone may display a GUI shown in FIG. 13C.

Figure 13C:
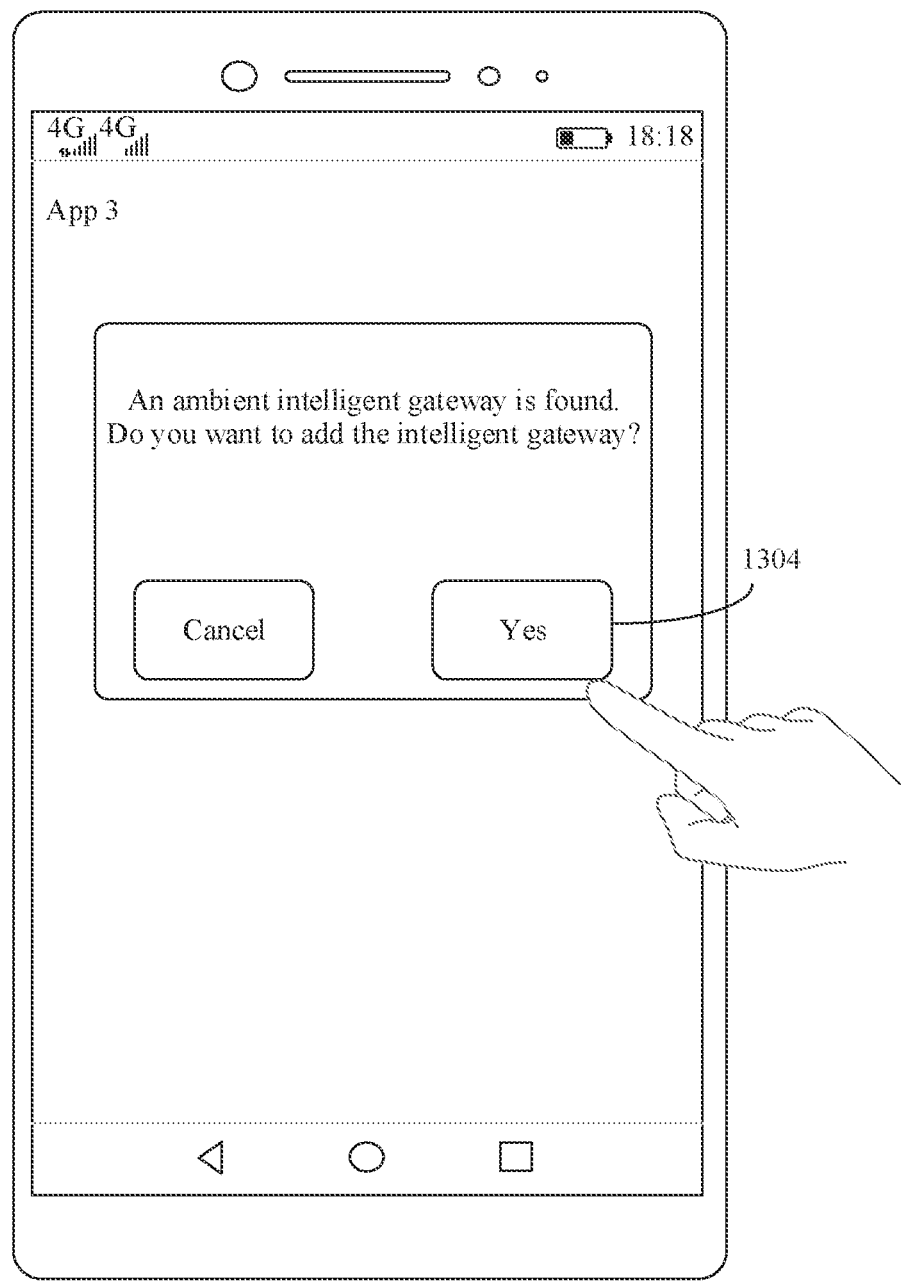

Refer to FIG. 13C. The GUI in FIG. 13C is another display interface of the App 3. The display interface includes a prompt box 1304. The prompt box 1304 includes prompt information "An ambient intelligent gateway is found. Do you want to add the intelligent gateway?" After the mobile phone detects an operation of tapping a control 1305 by the user, the mobile phone may display a GUI shown in FIG. 13D.

Figure 13D:
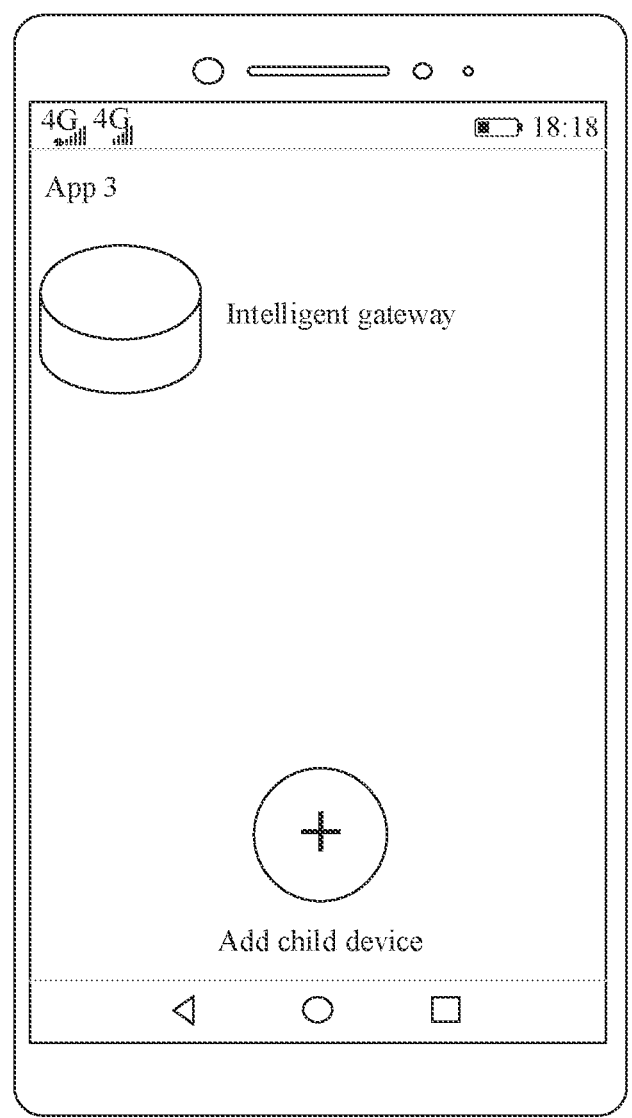

Refer to FIG. 13D. The GUI in FIG. 13D is another display interface of the App 3. The display interface includes a ZigBee gateway device "Intelligent Gateway" added by the mobile phone.

It should be understood that, for a process in which the mobile phone adds the intelligent gateway, refer to the existing technologies.

Figure 14A:
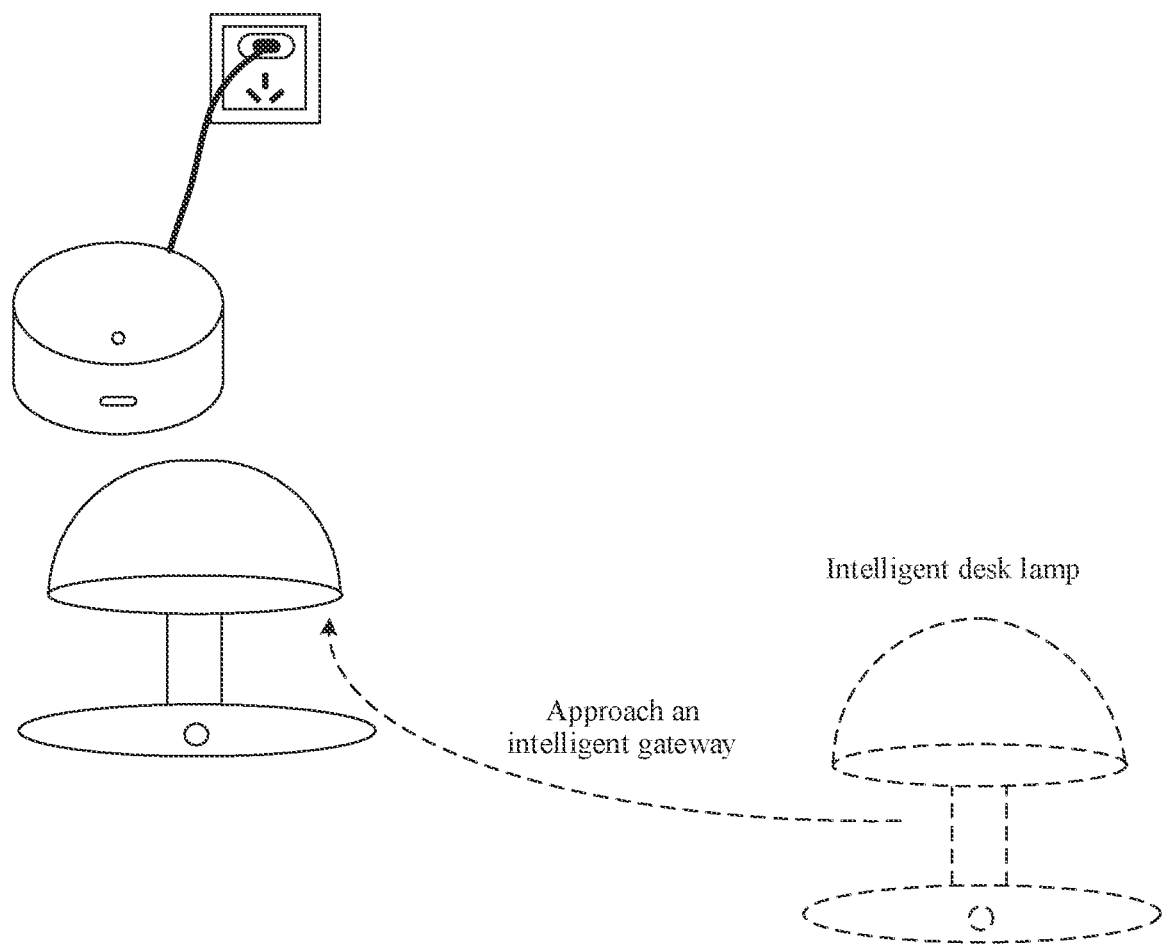
FIG. 14A to FIG. 14C are a set of graphical user interfaces according to an embodiment of this application.
Figure 14B:
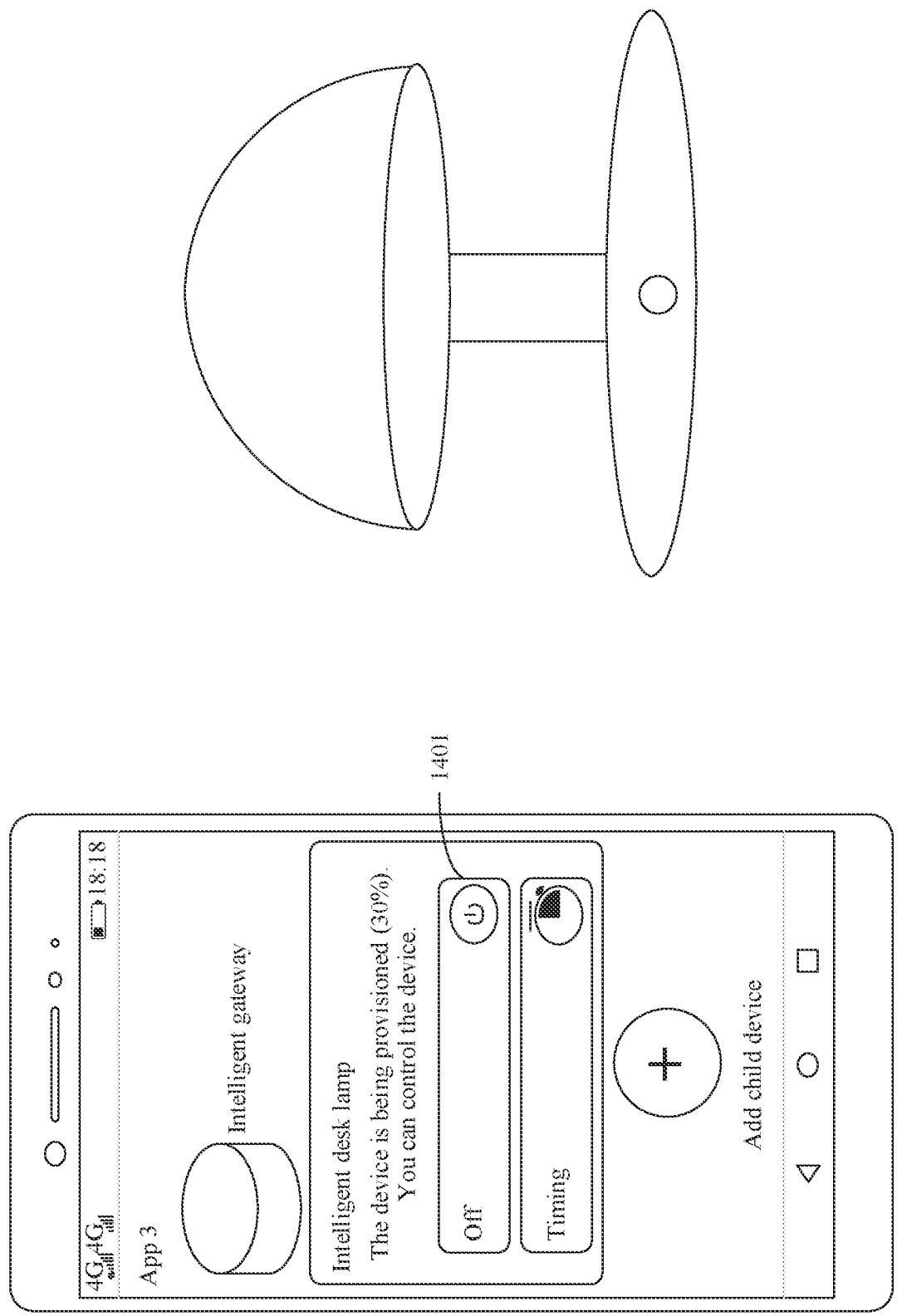
Figure 14C:
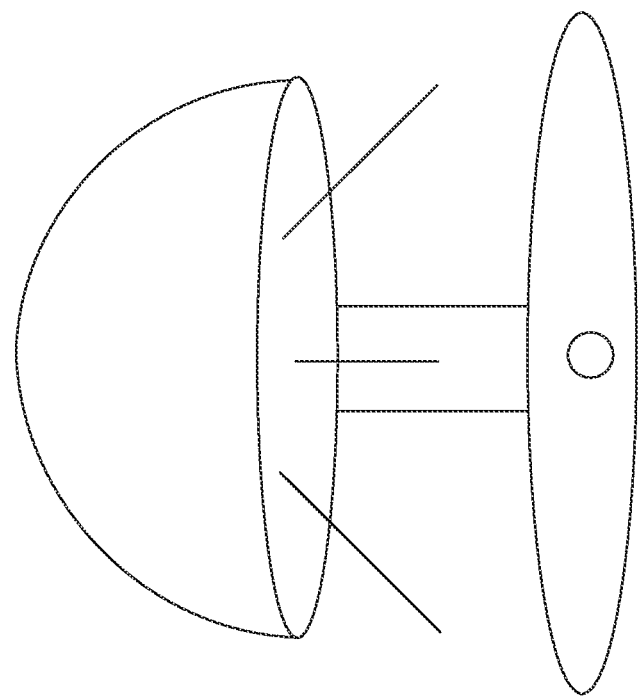
Figure 14C:
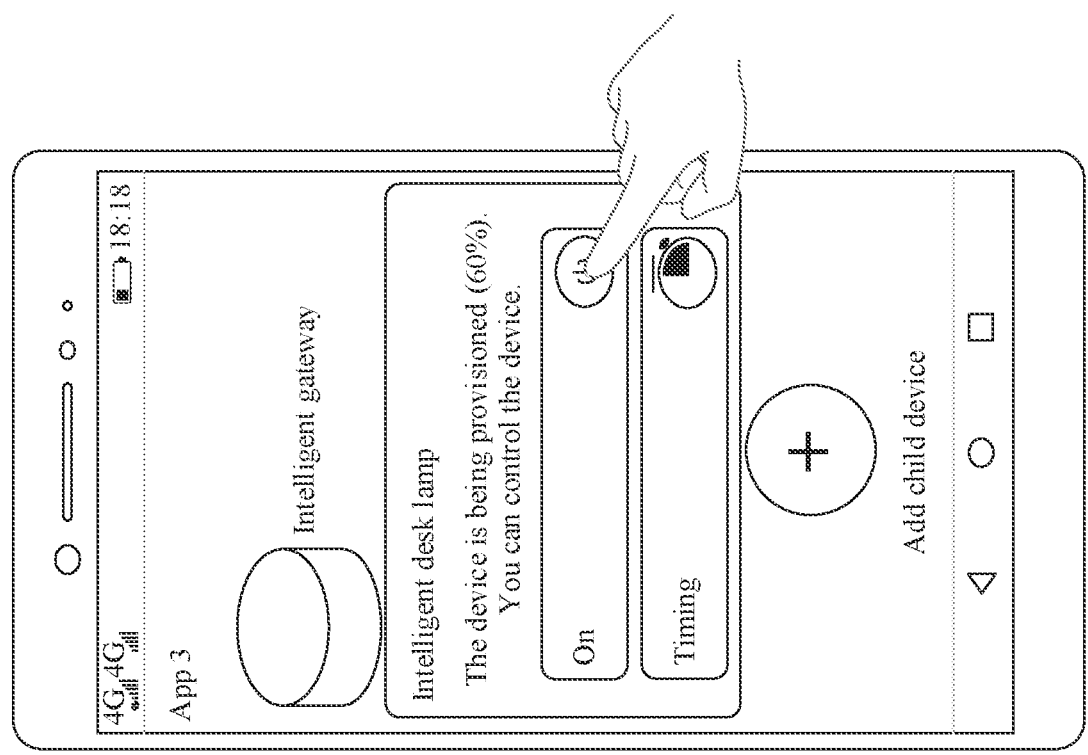

FIG. 14A to FIG. 14C are another set of GUIs according to an embodiment of this application.

As shown in FIG. 14A, when an intelligent desk lamp needs to be provisioned, the user may put the intelligent desk lamp close to the intelligent gateway, and the intelligent desk lamp may send a beacon request (beacon request) frame to an ambient device through a first antenna, where the beacon request frame may carry an install code. When a distance between the intelligent gateway and the intelligent desk lamp is less than or equal to a preset distance, the intelligent gateway may receive the beacon request frame. After receiving the beacon request frame, the intelligent gateway may send a beacon (beacon) frame to the intelligent desk lamp. The intelligent desk lamp may switch from the first antenna to a second antenna after receiving the beacon frame. The intelligent gateway and the intelligent desk lamp can use the install code to generate a pre-configured link key (pre-configured link key). In this way, the intelligent gateway sends a network key (network key) encrypted by using the pre-configured link key to the intelligent desk lamp.

Provisioning of the intelligent desk lamp can be understood as a process in which the intelligent desk lamp joins (joins) a ZigBee network.

In this embodiment of this application, after the intelligent gateway allocates the network key to the intelligent desk lamp, encrypts the network key by using the pre-configured link key, and sends the encrypted network key to the intelligent desk lamp, authentication and access based on the ZigBee protocol between the intelligent gateway and the intelligent desk lamp is completed. In this case, the intelligent gateway can directly control a child device. The intelligent gateway may also notify the mobile phone that the intelligent desk lamp accesses the intelligent gateway, and the mobile phone may display a GUI shown in FIG. 14B.

The GUI in FIG. 14B is another display interface of the App 3. The display interface includes related control functions (for example, a turning on/turning off control 301 and a timer) of the intelligent desk lamp. The user can use the mobile phone to locally control the intelligent desk lamp through the ZigBee gateway. In this embodiment of this application, the intelligent gateway may further register the intelligent desk lamp with a cloud as a proxy, so that the mobile phone can remotely control the intelligent desk lamp by using the intelligent gateway.

Refer to a GUI in FIG. 14C. The GUI is another display interface of the App 3. After the intelligent desk lamp joins the ZigBee network and before the intelligent gateway registers the intelligent desk lamp with the cloud as the proxy, when the mobile phone detects an operation of tapping the control 1401 by the user, the mobile phone may send a control command to the intelligent desk lamp through the intelligent gateway, where the control command is used to indicate the intelligent desk lamp to turn on. After receiving the control command, the intelligent desk lamp may perform a turn-on operation.

In this embodiment of this application, after the intelligent desk lamp joins the ZigBee network and before the intelligent gateway registers the intelligent desk lamp with the cloud as the proxy, the user can implement second-level control on the intelligent desk lamp by using the mobile phone, so that the user does not need to wait in a process in which the intelligent desk lamp registers with the cloud server. This improves user experience.

Figure 15A:
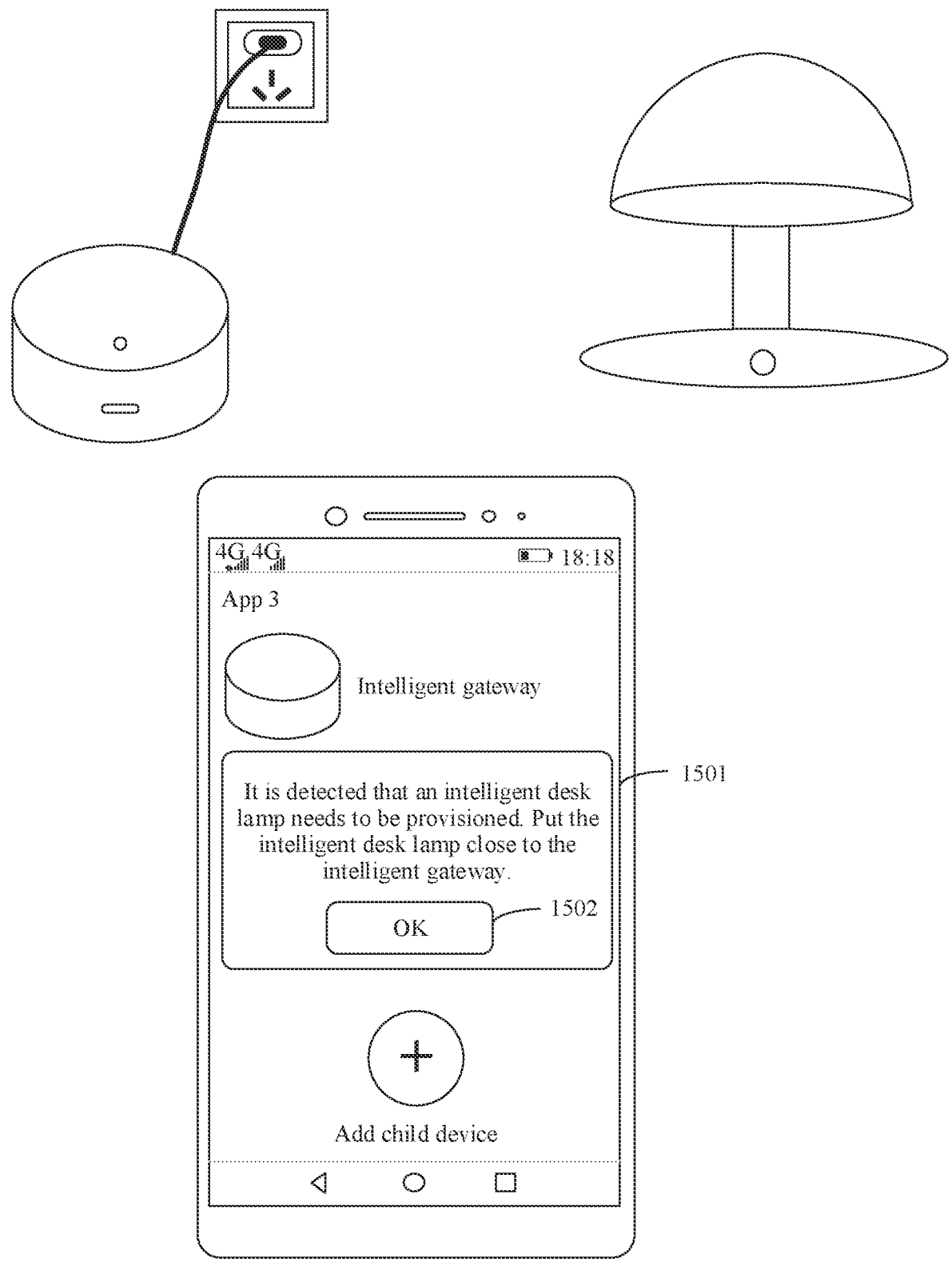
FIG. 15A and FIG. 15B are a set of graphical user interfaces according to an embodiment of this application.
Figure 15B:
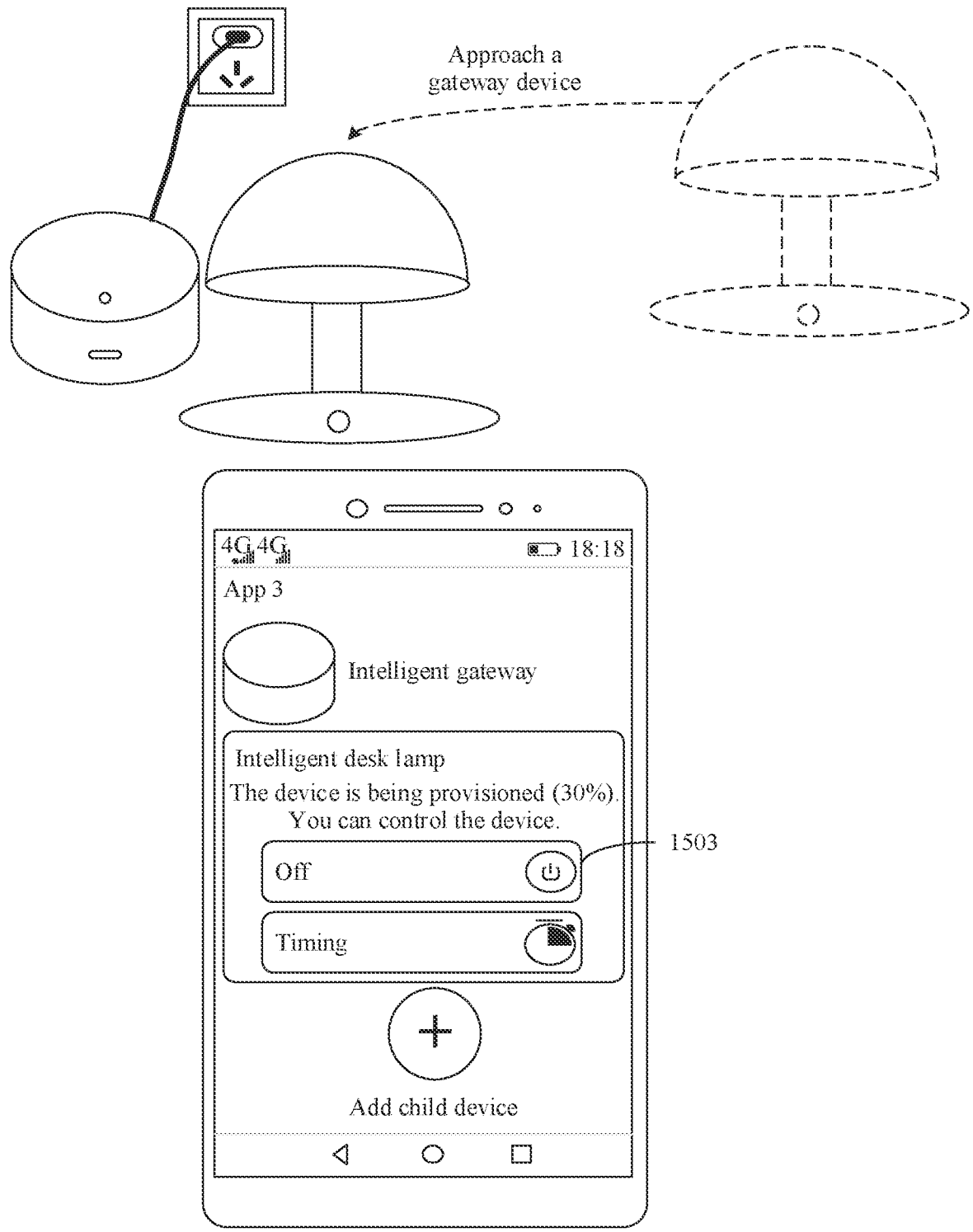

FIG. 15A and FIG. 15B are another set of GUIs according to an embodiment of this application.

As shown in FIG. 15A, when the intelligent desk lamp needs to be provisioned, the intelligent desk lamp may send a beacon request frame to an ambient device through the second antenna, where the beacon request frame indicates that the intelligent desk lamp needs to be provisioned. After receiving the beacon request frame, the intelligent gateway determines that the intelligent desk lamp needs to be provisioned. The intelligent gateway may send indication information to the mobile phone, where the indication information is used to indicate for the mobile phone that the intelligent desk lamp needs to be provisioned.

In an embodiment, the beacon request frame may further carry a Product ID of the intelligent desk lamp. When receiving the indication information sent by the intelligent gateway, the mobile phone may display a prompt box 1501. The prompt box 1501 includes prompt information "It is detected that the intelligent desk lamp needs to be provisioned. Put the intelligent desk lamp close to the intelligent gateway".

After the mobile phone detects an operation of tapping a control 1502 by the user, the mobile phone may send acknowledge information to the intelligent gateway. The acknowledge information is used to indicate that the intelligent gateway can connect the intelligent desk lamp to the ZigBee network. After receiving the acknowledge information sent by the mobile phone, the intelligent gateway may send a beacon frame to the intelligent desk lamp, where the beacon frame is used to indicate that the intelligent gateway is a device that can connect the intelligent desk lamp to the ZigBee network. After the intelligent desk lamp receives the beacon frame sent by the intelligent gateway, the intelligent desk lamp may switch from the second antenna to the first antenna. After seeing the prompt information on the mobile phone, the user may put the intelligent desk lamp close to the intelligent gateway. The intelligent desk lamp may send an association request (association request) frame to the intelligent gateway through the first antenna, where the association request frame may carry the install code or the pre-configured link key, and the association request frame may be used to request to connect the intelligent desk lamp to the ZigBee network by using the intelligent gateway. After receiving the association request frame, the intelligent gateway may send a beacon association response (association response) frame to the intelligent desk lamp. The association response frame may indicate that the intelligent gateway agrees to connect the intelligent desk lamp to the ZigBee network. The intelligent desk lamp may switch from the first antenna to the second antenna after receiving the association response frame. If the association request frame can carry the install code, the intelligent gateway and the intelligent desk lamp can use the install code to generate the pre-configured link key. In this way, the intelligent gateway sends the network key (network key) encrypted by using the pre-configured link key to the intelligent desk lamp. The intelligent gateway may notify the mobile phone that the intelligent desk lamp accesses the intelligent gateway, and the mobile phone may display a GUI shown in FIG. 15B.

The GUI in FIG. 15B is another display interface of the App 3. The display interface includes related control functions (for example, a turning on/turning off control 1503 and a timer) of the intelligent desk lamp. The user can use the mobile phone to access the intelligent gateway, and locally control the intelligent desk lamp by using the mobile phone.

It should be understood that, in the GUIs shown in FIG. 14, the mobile phone does not need to prompt the user, and the intelligent desk lamp may directly transmit the install code by using a very short distance technology. In the GUIs shown in FIG. 15, after the intelligent desk lamp is discovered by the mobile phone from a long distance, the mobile phone prompts the user to approach the intelligent gateway, so that the intelligent desk lamp transmits the install code by using the very short distance technology.

Figure 16:
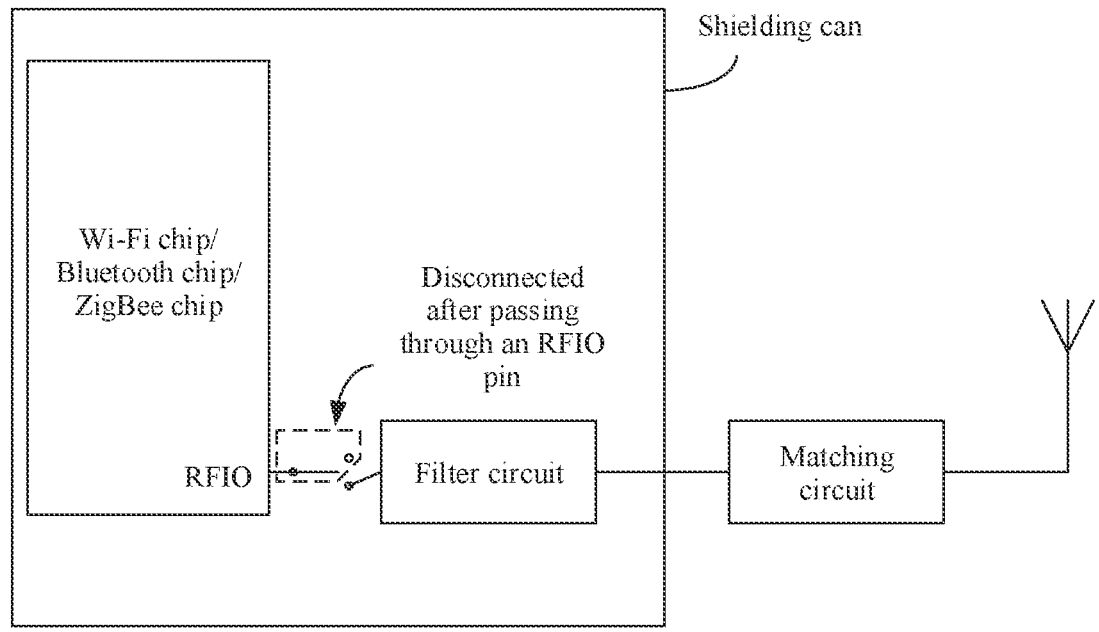
FIG. 16 is a schematic diagram of a structure of an antenna of an intelligent device according to an embodiment of this application.
Figure 17:
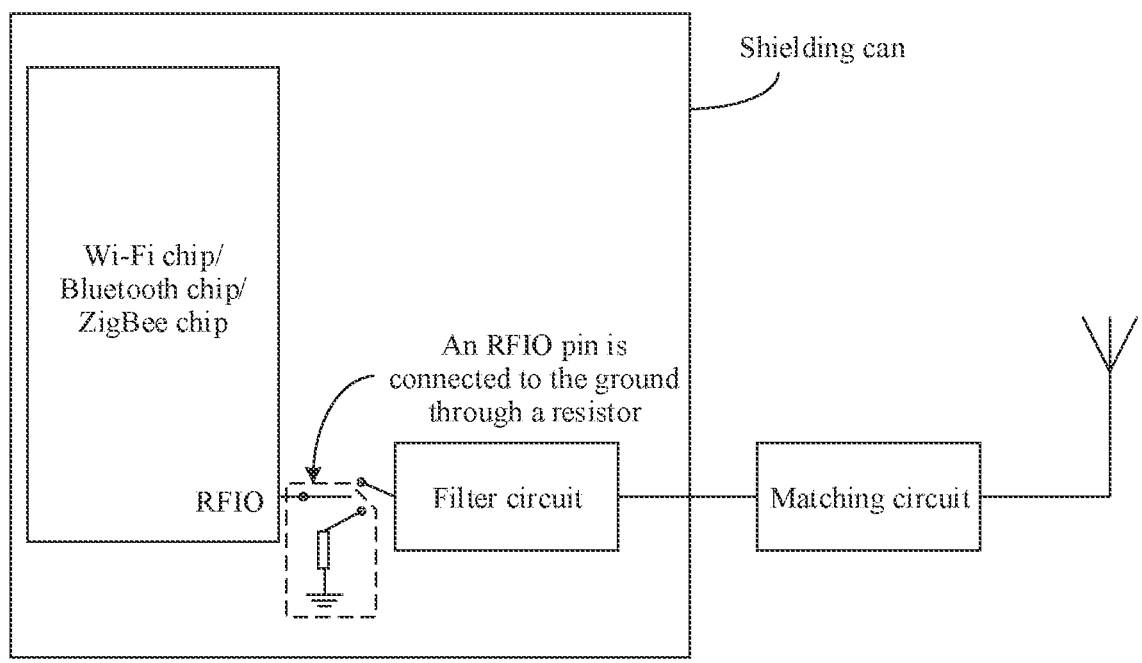
FIG. 17 is a schematic diagram of another structure of an antenna of an intelligent device according to an embodiment of this application.
Figure 18:
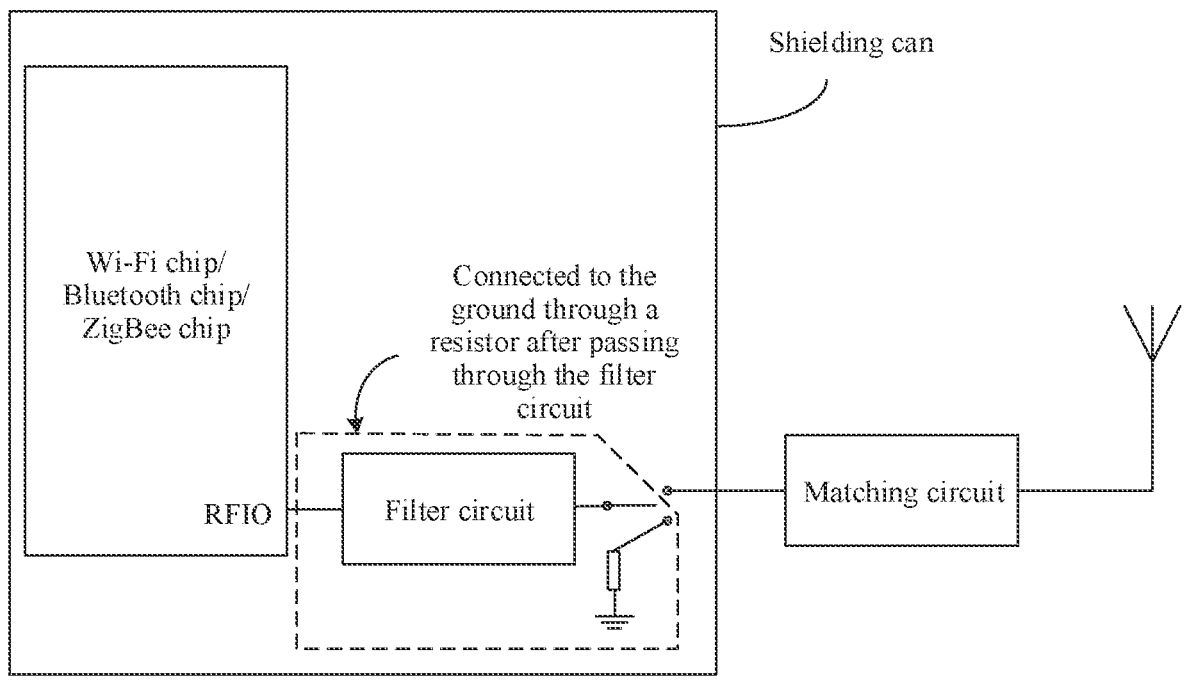
FIG. 18 is a schematic diagram of another structure of an antenna of an intelligent device according to an embodiment of this application.

In this embodiment of this application, the first device implements very short distance communication through the first antenna. In this embodiment of this application, the dual antennas (the first antenna and the second antenna) in the first device (for example, the intelligent desk lamp) may be switched by using a radio frequency switch. Physically, both the first antenna and the radio frequency switch (the first antenna is shown in a dashed box in FIG. 16 to FIG. 18) may be disposed in a shielding can. FIG. 16 to FIG. 18 are schematic diagrams of three structures of the first antenna.

A purpose of using a first antenna in embodiments of this application is to minimize a transmission distance. A principle of constructing the first antenna may be as follows.

(1) Reduce an antenna length to reduce electromagnetic waves radiated to the air.

(2) Reduce radiation efficiency by converting part of electromagnetic wave radiation into heat energy through a resistor to consume the electromagnetic wave radiation.

(3) Reduce return loss and reflect part of RF energy to the inside of a chip.

A specific implementation of the first antenna may be as follows.

(1) Shorten the antenna.

(2) A path to a real antenna is broken from a point, or is connected to the ground from the point through a resistor, an inductor, or a capacitor.

(3) Use a shielding can and the like.

It should be understood that the specific implementations (1) and (2) of the first antenna may be implemented on a PCB board or inside a chip (a Wi-Fi chip, a Bluetooth chip, or a ZigBee chip).

It should be further understood that the shielding can is used to block a path through which the antenna radiates an electromagnetic wave to a receiver, so that weakening radiation can be achieved.

It should be further understood that shortening the antenna means that the first antenna is shorter than the second antenna. The three structures of the first antenna are shown in FIG. 16 to FIG. 18. The first antenna is shown in dashed boxes in FIG. 16 to FIG. 18. In structures of the second antenna shown in FIG. 16 to FIG. 18, an RFIO pin is used to connect a filter circuit (for example, a n filter), a matching circuit (for example, a n circuit), and an antenna entity outside the matching circuit (for example, the antenna entity may be a section of a metal cable). A first antenna a, a first antenna b, and a first antenna c have different lengths, but are all shorter than the second antenna. The filter circuit is used to prevent interference, and the matching circuit is used to match the second antenna.

For example, as shown in FIG. 16, the first antenna a may be directly broken by using a radio frequency input/output (radio frequency input/output, RFIO) pin of a chip (a Wi-Fi chip, a Bluetooth chip, or a ZigBee chip) in a shielding can. The first antenna a may be composed of the RFIO pin, a cable, and a first-way switch in a two-way switch (the first-way switch does not connect to any component). The two-way switch is a switch between the RFIO and the filter circuit, and the RFIO pin may be connected to or disconnected from the filter circuit by using the switch. As shown in FIG. 16, the first-way switch is a switch that is connected to the RFIO pin and disconnected from the filter circuit.

It should be understood that the two-way switch in this embodiment of this application may be a single pole double throw switch.

For example, as shown in FIG. 17, the first antenna b may be connected to the ground by using an RFIO inside a chip (a Wi-Fi chip, a Bluetooth chip, or a ZigBee chip) in the shielding can through a matching component (for example, a resistor). The first antenna b may be composed of the RFIO pin, a cable, a first-way switch in a two-way switch (the first-way switch connects to a resistor), and the resistor. Through resistance grounding, part of electromagnetic wave radiation may be converted into heat energy and consumed. In this way, radiation efficiency of the first antenna b is reduced. The two-way switch refers to a switch between the RFIO pin, the resistor, and the filter circuit. By using the switch, the RFIO pin may be connected to the resistor and disconnected from the filter circuit, or the RFIO pin may be disconnected from the resistor and connected to the filter circuit. The first-way switch is a switch connected to the resistor and disconnected from the filter circuit.

For example, as shown in FIG. 18, through a matching filter circuit and a matching component (for example, a resistor) connected to the circuit, the first antenna c may be connected to the ground by using an RFIO pin inside a chip (a Wi-Fi chip, a Bluetooth chip, or a ZigBee chip) in the shielding can. The first antenna c may be composed of the RFIO pin, a cable, a filter circuit, a first-way switch in a two-way switch (the first-way switch connects to a resistor), and the resistor. Through resistance grounding, part of electromagnetic wave radiation may be converted into heat energy and consumed. In this way, radiation efficiency of the first antenna b is reduced. The two-way switch is a switch between the filter circuit inside the shielding can, the resistor, and the matching circuit outside the shielding can. By using the switch, the filter circuit inside the shielding can be connected to the resistor and disconnected from the matching circuit outside the shielding can, or the filter circuit inside the shielding can be disconnected from the resistor and connected to the matching circuit outside the shielding can. The first-way switch is a switch that connects the filter circuit inside the shielding can and the resistor.

It should be understood that the second antenna in FIG. 16 and FIG. 17 may be composed of the RFIO pin, the cable, a second-way switch in the two-way switch, the filter circuit, the matching circuit, and the antenna entity externally connected to the matching circuit. The second-way switch is a switch that connects the RFIO pin and the filter circuit.

The second antenna in FIG. 18 may be composed of the RFIO pin, the filter circuit, the cable, a second-way switch in the two-way switch, the matching circuit, and the antenna entity externally connected to the matching circuit. The second-way switch is a switch that connects the filter circuit inside the shielding can and the matching circuit outside the shielding can.

The foregoing different first-antenna structures are used, and a chip (a Wi-Fi chip, a Bluetooth chip, or a ZigBee chip) has different transmit powers (Tx powers). In this case, different very short distance communication requirement can be met.

For example, Table 1 shows communication distances covered when different first-antenna structures and different transmit powers of a Wi-Fi chip are used.

TABLE 1

| Antenna structure | Transmit power | |
|---|---|---|
| | Distance covered by the maximum transmit power | Distance covered by the minimum transmit power |
| First antenna a | 1 m | 10 cm |

TABLE 1-continued

| Antenna structure | Transmit power | |
|---|---|---|
| | Distance covered by the maximum transmit power | Distance covered by the minimum transmit power |
| First antenna b | 1.5 m | 50 cm |
| First antenna c | 2 m | 1 m |

For example. Table 2 shows communication distances covered when different first-antenna structures and different transmit powers of a Bluetooth chip are used.

TABLE 2

| Antenna structure | Transmit power | |
|---|---|---|
| | Distance covered by the maximum transmit power | Distance covered by the minimum transmit power |
| First antenna a | 0.6 m | 5 cm |
| First antenna b | 0.8 m | 30 cm |
| First antenna c | 1.1 m | 45 cm |

For example. Table 3 shows communication distances covered when different first-antenna structures and different transmit powers of a ZigBee chip are used.

TABLE 3

| Antenna structure | Transmit power | |
|---|---|---|
| | Distance covered by the maximum transmit power | Distance covered by the minimum transmit power |
| First antenna a | 0.5 m | 3 cm |
| First antenna b | 0.7 m | 25 cm |
| First antenna c | 0.9 m | 39 cm |

Due to features of physical components in a chip, a difference between the maximum transmit power and the minimum transmit power of an antenna is correlated. If the minimum transmit power of a first device is reduced to a low value, the maximum transmit power is also reduced. As a result, a distance requirement for operation cannot be met. In embodiments of this application, because different intelligent devices have different structures and security requirements for the intelligent devices are different, manufacturers of the intelligent devices may use different first-antenna structures and transmit powers to ensure communication distances of the intelligent devices. For example, for different intelligent air conditioner manufacturers, thicknesses of housings of intelligent air conditioners may be different. In this case, when first-antenna structures and transmit powers are same, communication distances at which the intelligent air conditioners can be discovered may be different. Different intelligent device manufacturers may obtain, through testing with first-antenna structures and specific transmit powers based on structures of intelligent devices of the manufacturers, safe distances at which the intelligent devices can be discovered.

It should be understood that, in this embodiment of this application, if the first device includes a plurality of chips (for example, the first device includes a Wi-Fi chip, a Bluetooth chip, and a ZigBee chip), the Wi-Fi chip, the Bluetooth chip, and the ZigBee chip in the first device may share the first antenna and the second antenna in FIG. 16; or the Wi-Fi chip, the Bluetooth chip, and the ZigBee chip in the first device may share the first antenna and the second antenna in FIG. 17; or the Wi-Fi chip, the Bluetooth chip, and the ZigBee chip in the first device may share the first antenna and the second antenna in FIG. 18.

Alternatively, the Wi-Fi chip, the Bluetooth chip, and the ZigBee chip in the first device may not share the first antenna and the second antenna.

It should be further understood that the first antenna and the second antenna in FIG. 16 to FIG. 18 are physical antennas, and the first device may switch between the physical first antenna and the physical second antenna by using a radio frequency switch. In this embodiment of this application, alternatively, the first device may have only one antenna physically, but logically, the first device includes a first antenna and a second antenna.

A logical first antenna and a logical second antenna may be implemented by adjusting transmit powers of a physical antenna, where the adjusting is performed by the first device. For example, when a transmit power of the physical antenna is a first transmit power, the physical antenna may be considered as the logical first antenna; and when a transmit power of the physical antenna is a second transmit power, the physical antenna may be considered as the logical second antenna, where the first transmit power is less than the second transmit power.

In a possible implementation, the first device may adjust the transmit power of the physical antenna by adjusting a component inside the chip. For example, the first device may adjust the transmit power of the physical antenna by using a multistage amplifier inside the chip.

For example, the first device may shield the multistage amplifier inside the chip by adjusting a value of a register, so that a transmit power of the physical antenna is the first transmit power, and the physical antenna may be considered as the logical first antenna. The first device may adjust a value of the register, so that a transmit power of the physical antenna is the second transmit power, and the physical antenna may be considered as the logical second antenna. The first transmit power is less than the second transmit power.

In another possible implementation, the first device may adjust the transmit power of the physical antenna through a peripheral circuit outside the chip.

The first antenna and the second antenna in embodiments of this application may be physical or logical.

In embodiments of this application, the first device switching the logical first antenna and the logical second antenna may achieve a same effect as the first device switching the physical first antenna and the physical second antenna by using the radio frequency switch.

Figure 19:
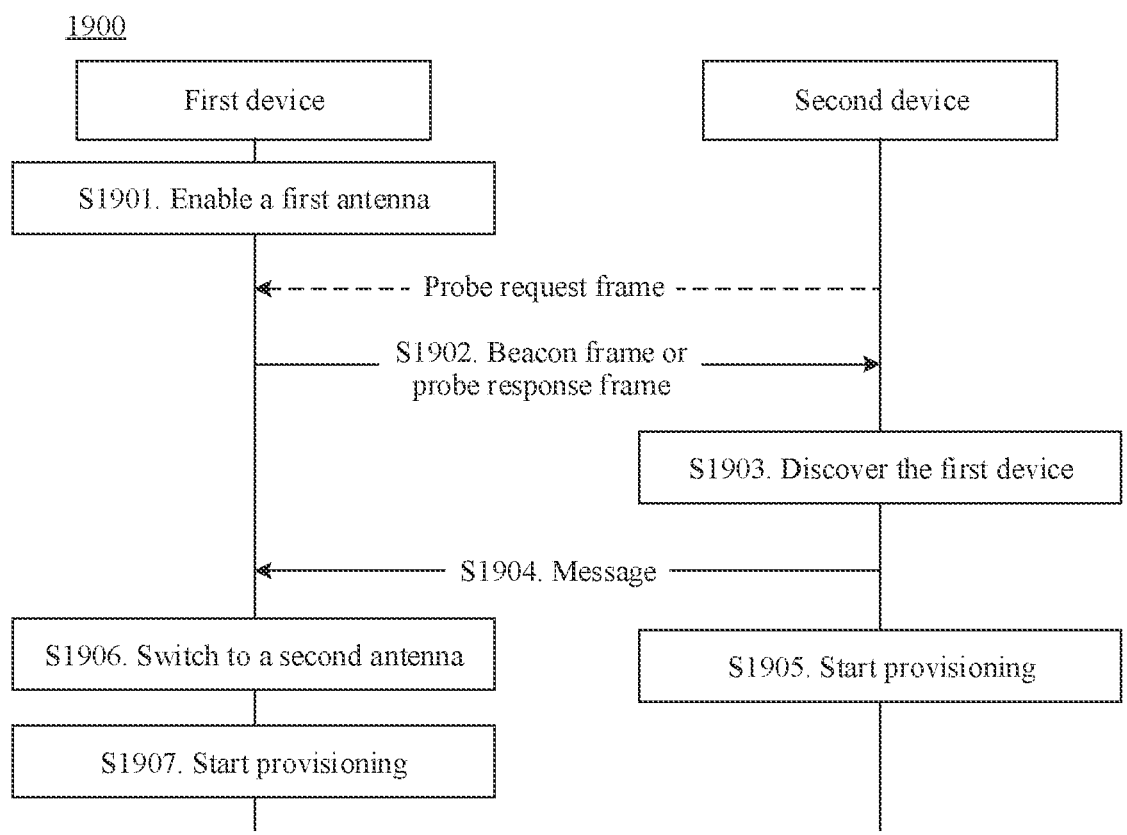
FIG. 19 is a schematic flowchart of a discovery and provisioning method according to an embodiment of this application.

FIG. 19 is a schematic flowchart of a method 1900 for discovery and provisioning of a Wi-Fi device through a SoftAP according to an embodiment of this application. The method 1900 includes the following steps.

S1901. A first device enables a first antenna.

For example, the first device may enable a physical first antenna by using a radio frequency switch, or the first device may enable a logical first antenna by using a register inside a chip.

In this embodiment of this application, the first device may include a first antenna and a second antenna. A wireless transmit power of the first device operating by using the first antenna is less than a transmit power of the first device operating by using the second antenna.

For example, when the first device detects that the first device is powered on and the first device is in an unprovisioned state, the first device enables the first antenna by using a radio frequency switch.

It should be understood that, in this embodiment of this application, the wireless transmit power of the first device operating by using the first antenna being less than the wireless transmit power of the first device operating by using the second antenna may be understood as a minimum wireless transmit power of the first device operating by using the first antenna being less than a minimum wireless transmit power of the first device operating by using the second antenna.

It should be further understood that, in this embodiment of this application, the first device being in the unprovisioned state may include but is not limited to restoring factory settings or performing provisioning for the first time. For example, the first device stores a status variable, and a value of the status variable indicates a status of the first device. If the value of the status variable is "false", it represents that the first device is in an unprovisioned state, that is, the first device does not connect to a home router.

It should be understood that the first device may include the first antenna and the second antenna. The two antennas may be switched by using the radio frequency switch. Isolation between the two antennas of the switch sometimes needs to meet an actual requirement. Therefore, there may be one switch or may be cascaded switches.

S1902. The first device sends a beacon frame or a probe response frame through the first antenna, where the beacon frame or the probe response frame includes identify information of the first device.

S1902 may be considered as a process in which a second device discovers the first device.

The manner in which the first device sends the beacon frame through the first antenna is a manner in which the second device passively discovers the first device.

A manner in which the first device sends a probe response frame through the first antenna is a manner in which the second device actively discovers the first device. For example, the second device may first send a probe request frame to the first device, and the first device sends the probe response frame to the second device in response to receiving the probe request frame, where the probe response frame may include a device identifier of the first device.

For example, information about the first device includes a device type of the first device and the like.

In an embodiment, if the first device uses the first antenna and a communication distance at a specific transmit power is within a safe distance (for example, 30 cm), the first device may further use the beacon frame or the probe response frame to carry a PIN code used for encryption key negotiation between the first device and the second device; or the first device may directly use the beacon frame or the probe response frame to carry an encryption key.

In an embodiment, if the beacon frame or the probe response frame carries a PIN code, the PIN code may be included in the identify information (for example, a name field of an SSID of the first device) of the first device in the beacon frame or the probe response frame.

In an embodiment, if the beacon frame or the probe response frame carries the encryption key, the encryption key may be included in an information element (information element, IE) extension field in the beacon frame or the probe response frame.

In an embodiment, the beacon frame or the probe response frame may not carry the PIN code or the encryption key, and the first device may send the PIN code or the encryption key to the second device through the first antenna after sending the beacon frame or the probe response frame.

In this embodiment of this application, if the first device sends the PIN code to the second device, after receiving the PIN code, the second device may perform identity authentication and encryption key negotiation with the first device by using the PIN code.

It should be understood that the second device may transmit provisioning information or network transmission data to the first device by using the encryption key.

For example, during Wi-Fi discovery and provisioning, after obtaining the encryption key, the second device may encrypt an SSID of a Wi-Fi router and a password of the Wi-Fi router by using the encryption key, and send the encrypted SSID of the Wi-Fi router and the encrypted password of the Wi-Fi router to the first device. After receiving the encrypted SSID of the Wi-Fi router and the encrypted password of the Wi-Fi router, the first device may perform decryption by using the encryption key, to obtain the SSID of the Wi-Fi router and the password of the Wi-Fi router.

It should be understood that, because a transmission distance of the first device is within the safe distance, data sent by the first device is free from eavesdropping and a man-in-the-middle attack. Therefore, the first device can send the PIN code or the encryption key in plaintext.

S1903. The second device discovers the first device through scanning for the beacon frame or the probe response frame.

In this embodiment of this application, because the first device sends the beacon frame or the probe response frame through the first antenna, if the second device needs to discover the first device, the second device needs to be within a specific communication distance. In this way, the second device may receive the beacon frame or the probe response frame sent by the first device, and discover the first device.

S1904. The second device sends a message to the first device based on the beacon frame or the probe response frame, where the message may enable the first device to determine that the first device is discovered by the second device.

It should be understood that the message may include but is not limited to a message in a standard provisioning procedure or a customized message.

For example, for Wi-Fi discovery and provisioning, the message may be an authentication request (authentication request, AUTH request).

S1905. The second device starts provisioning.

For example, if the beacon frame or the probe response frame carries the PIN code used for encryption key negotiation, the second device may perform identity authentication and encryption key negotiation with the first device by using the PIN code, to encrypt the SSID of the Wi-Fi router and the password of the Wi-Fi router by using the encryption key during provisioning.

For example, if the beacon frame or the probe response frame sent through the first antenna carries the encryption key, the second device may directly encrypt the SSID of the Wi-Fi router and the password of the Wi-Fi router by using the encryption key during provisioning.

For example, the first antenna may be used by the first device only for device discovery. If the beacon frame or the probe response frame does not carry the PIN code used for encryption key negotiation or does not carry the encryption key, after the second device discovers the first device by using a very short distance technology, the second device may directly send the SSID of the Wi-Fi router and the password of the Wi-Fi router to the first device (for some scenarios in which a security requirement is not high). Alternatively, for some scenarios in which a security requirement is high, the second device may perform identity authentication and encryption key negotiation with the first device through out-of-band transmission or by preconfiguring a PIN code, and then encrypt the SSID of the Wi-Fi router and the password of the Wi-Fi router by using an encryption key.

It should be understood that, in this embodiment of this application, the second device starting provisioning may include: the second device sending the SSID of the Wi-Fi router and the password of the Wi-Fi router that are encrypted by using the encryption key to the first device.

S1906. After receiving the message, the first device determines that the first device is discovered by the second device, and the first device switches to the second antenna.

For example, the first device may switch to a physical second antenna by using the radio frequency switch, or the first device may switch to a logical second antenna by using the register inside the chip.

S1907. The first device starts provisioning after switching to the second antenna.

It should be understood that, in this embodiment of this application, provisioning of the first device may include processes such as the first device receiving the SSID of the Wi-Fi router and the password of the Wi-Fi router that are sent by the second device and that are encrypted by using the encryption key; the first device decrypting the SSID of the Wi-Fi router and the password of the Wi-Fi router by using the encryption key, to obtain the SSID of the Wi-Fi router and the password of the Wi-Fi router; and the first device connecting to the Wi-Fi router and a cloud server by using the SSID of the Wi-Fi router and the password of the Wi-Fi router.

In the method 1900, the first device switches to the second antenna after receiving the message sent by the second device.

For example, for Wi-Fi discovery and provisioning, the first device switches to the second antenna because the first device receives a network access request message from the second device and determines that the first device is discovered by the second device; or the first antenna may send, through the first antenna, the beacon frame or the probe response frame that identifies the first antenna for a period of time, and then switch to the second antenna to monitor whether there is a network access request message or a provisioning message from the second device. If the network access request message or the provisioning message is not received within a period of time, the first device switches to the first antenna to send a beacon frame or a probe response frame. If the network access request message or the provisioning message is received, it indicates that the first device is discovered by the second device, and provisioning continues.

It should be further understood that the network access request message may be a message defined in a Wi-Fi protocol, or may be a new message. This is not limited in this embodiment of this application.

Figure 20:
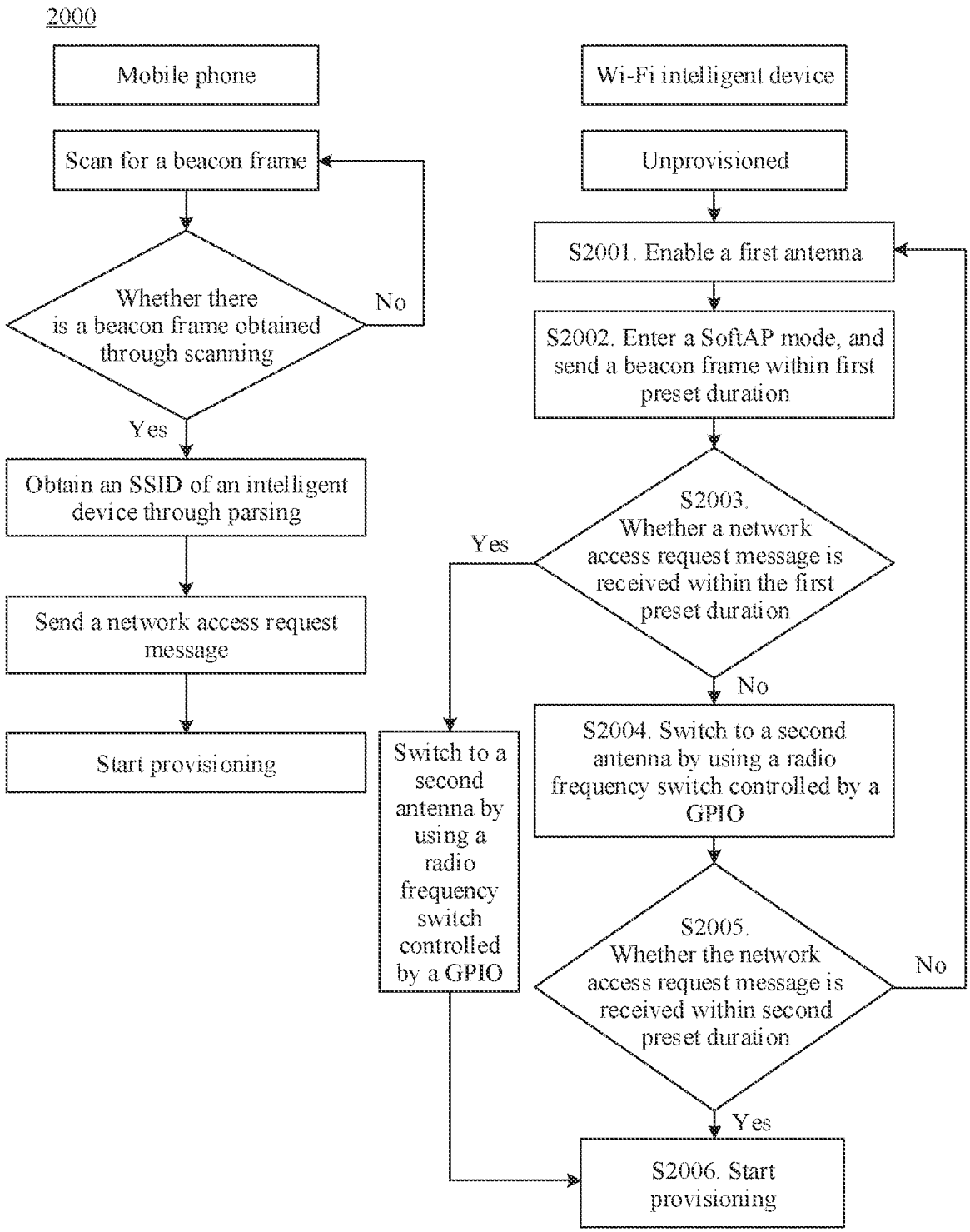
FIG. 20 is a schematic flowchart of another discovery and provisioning method according to an embodiment of this application.

FIG. 20 is a schematic flowchart of a method 2000 for discovery and provisioning of a Wi-Fi device through a SoftAP according to an embodiment of this application. The method 2000 may be performed by a second device (for example, a mobile phone) and a first device (for example, a Wi-Fi intelligent device). The method 2000 includes the following steps.

S2001. A Wi-Fi intelligent device enables a first antenna.

For example, the Wi-Fi intelligent device may enable the first antenna by using a radio frequency switch controlled by a general-purpose input/output (general-purpose input/output, GPIO).

For the Wi-Fi intelligent device, because the first antenna is used to send a beacon frame, only a mobile phone within a very short distance can discover the Wi-Fi intelligent device. In this way, it can be ensured that a mobile phone in a neighbor's home cannot discover the Wi-Fi intelligent device.

If only a transmit power is reduced, a communication distance of the Wi-Fi intelligent device can only be reduced to 3 meters. Because the first antenna is used during provisioning, a communication distance can be significantly reduced (ranging from 30 cm to 2 m), so that the Wi-Fi intelligent device is not discovered by a remote mobile phone, and a possibility that the Wi-Fi intelligent device is discovered by a device in a neighbor's home is reduced. This reduces a probability of inappropriate pairing of the Wi-Fi intelligent device.

When there are a large quantity of intelligent devices (for example, intelligent lamps) of a same type at home, when the mobile phone approaches an intelligent lamp at one location, an intelligent lamp at another location is not displayed in a list of intelligent lamps obtained through scanning by the mobile phone because of a long distance. This reduces a possibility of inappropriate pairing.

S2002. The Wi-Fi intelligent device enters a SoftAP mode, and sends beacon (beacon) advertising frames to an ambient device within first preset duration, where the beacon frame includes an SSID of a SoftAP enabled by the Wi-Fi intelligent device.

In an embodiment, the Wi-Fi intelligent device may periodically send beacon frames to an ambient device within the first preset duration.

For example, within 2 seconds after the Wi-Fi intelligent device switches to the first antenna, the Wi-Fi intelligent device sends a beacon frame every 4 milliseconds. In this case, the Wi-Fi intelligent device sends a total of 500 beacon frames within 2 seconds. When the Wi-Fi intelligent device operates by using the first antenna, because signal strength is low, a possibility of successfully receiving the beacon frame by the second device is low. The Wi-Fi intelligent device sends a large quantity of beacon frames within preset duration, so that a probability of discovering the Wi-Fi intelligent device by the second device can be improved.

When the beacon frames are sent, if the mobile phone receives the beacon frame, that is, the mobile phone discovers the Wi-Fi intelligent device, the mobile phone may send a network access request message (for example, an authentication request (authentication request, AUTH request)) to the Wi-Fi intelligent device, and the mobile phone may start provisioning. After receiving the network access request message sent by the mobile phone, the Wi-Fi intelligent device may switch to a second antenna by using the radio frequency switch controlled by the GPIO, to start provisioning. For example, the Wi-Fi intelligent device can receive an SSID of a Wi-Fi router and a password of the Wi-Fi router that are sent by the mobile phone and that are encrypted by using an encryption key. The Wi-Fi intelligent device can decrypt the SSID of the Wi-Fi router and the password of the Wi-Fi router by using the encryption key, to obtain the SSID of the Wi-Fi router and the password of the Wi-Fi router. The Wi-Fi intelligent device connects to the corresponding Wi-Fi router and a cloud server by using the SSID of the Wi-Fi router and the password of the Wi-Fi router.

In an embodiment, if the Wi-Fi intelligent device can ensure that the communication distance is within a safe distance (for example, 30 cm) in manners such as determining the first antenna and reducing or controlling the transmit power, the Wi-Fi intelligent device may use the beacon frame to carry a PIN code or the encryption key.

In this embodiment of this application, within the safe distance (for example, 30 cm), the PIN code or even the encryption key can be transmitted in plaintext, so that out-of-band transmission of the PIN code is omitted, and overheads of identity authentication and key negotiation are also omitted. In this way, user experience is improved and security is ensured.

After detecting that a user starts an APP to scan for ambient Wi-Fi intelligent devices, the mobile phone may start to scan for an ambient beacon frame. If the mobile phone receives the beacon frame, the mobile phone may obtain an SSID of the Wi-Fi intelligent device through parsing. Alternatively, if the beacon frame carries the PIN code or the encryption key, the mobile phone may further obtain the PIN code or the encryption key through parsing.

S2003. The Wi-Fi intelligent device determines whether the network access request message is received within the first preset duration. If the network access request message is received, the Wi-Fi intelligent device performs S2006 after switching to the second antenna by using the radio frequency switch. If the network access request message is not received, the Wi-Fi intelligent device performs S2004.

S2004. The Wi-Fi intelligent device switches to the second antenna by using the radio frequency switch controlled by the general-purpose GPIO.

For example, if the Wi-Fi intelligent device does not receive the network access request message within the first preset duration (for example, 2 seconds), the Wi-Fi intelligent device switches from the first antenna to the second antenna by using the radio frequency switch controlled by the general-purpose GPIO.

S2005. The Wi-Fi intelligent device determines whether the network access request message is received within second preset duration. If the network access request message is received, the Wi-Fi intelligent device performs S2006. If the network access request message is not received, the Wi-Fi intelligent device continues to perform S2001 to S2004.

For example, the second preset duration is 2 seconds.

S2006. The Wi-Fi intelligent device starts provisioning.

For example, the Wi-Fi intelligent device starting provisioning may include the Wi-Fi intelligent device receiving the SSID of the Wi-Fi router and the password of the Wi-Fi router that are sent by the mobile phone and that are encrypted by using the encryption key. The Wi-Fi intelligent device can decrypt the SSID of the Wi-Fi router and the password of the Wi-Fi router by using the encryption key, to obtain the SSID of the Wi-Fi router and the password of the Wi-Fi router. The Wi-Fi intelligent device may connect to the Wi-Fi router according to the SSID of the Wi-Fi router and the password of the Wi-Fi router, to connect to the cloud server or the like.

With reference to the method 1900 and the method 2000, the foregoing describes a case in which the first device switches to the second antenna after discovery and before provisioning. In this embodiment of this application, the first device may alternatively switch to the second antenna after receiving the SSID and the password of the Wi-Fi router that are sent by the second device.

Figure 21:
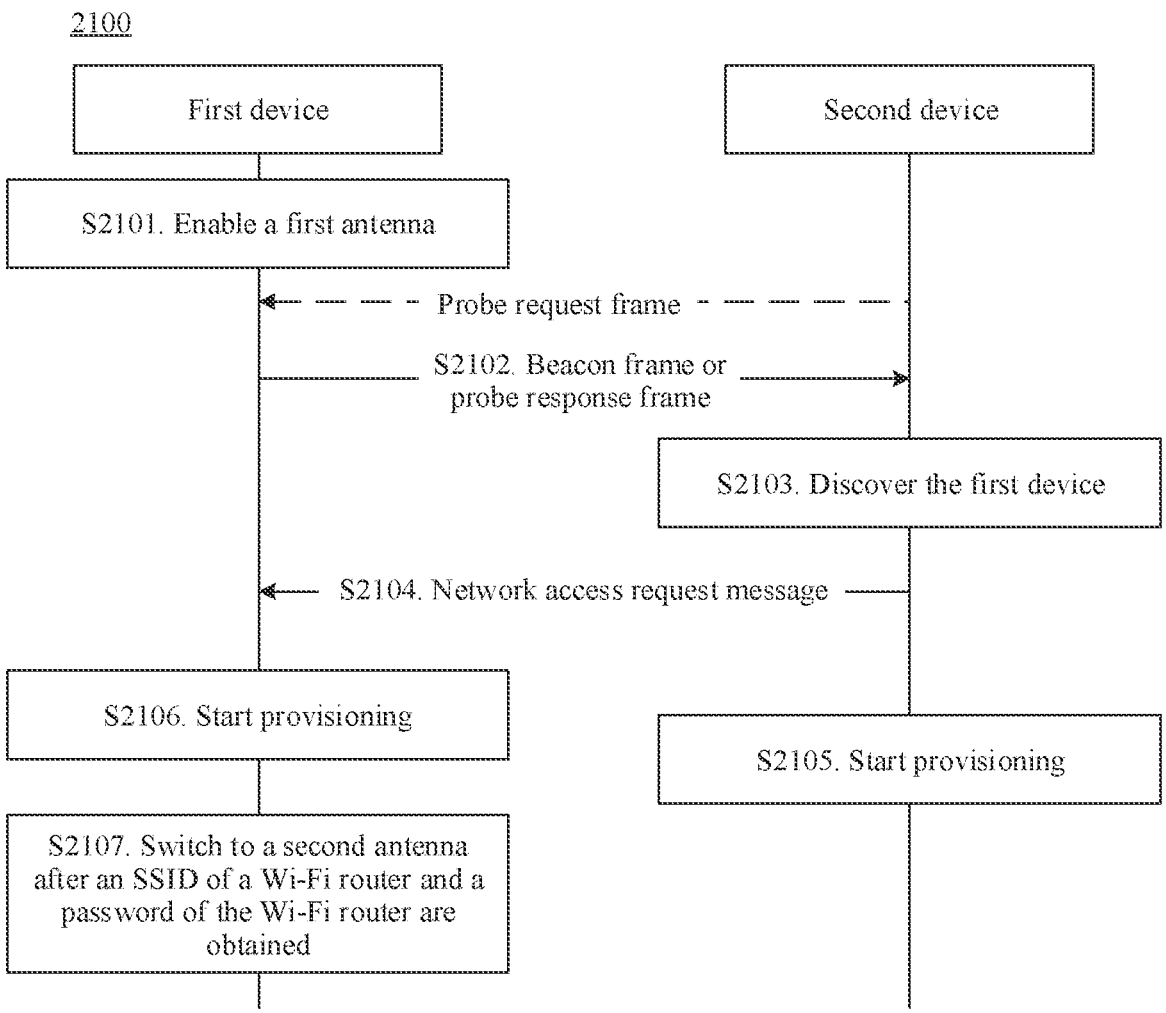
FIG. 21 is a schematic flowchart of another discovery and provisioning method according to an embodiment of this application.

FIG. 21 is a schematic flowchart of a method 2100 for discovery and provisioning of a Wi-Fi device through a SoftAP according to an embodiment of this application. The method 2100 includes the following steps.

S2101. A first device enables a first antenna.

For example, the first device enables a physical first antenna by using a radio frequency switch, or the first device may enable a logical first antenna by using a register inside a chip.

For example, when a second device determines that the first device is in an unprovisioned state, the first device may use the first antenna to perform a procedure in which the second device can discover the first device.

S2102. The first device sends a beacon frame or a probe response frame, where the beacon frame or the probe response frame includes identify information of the first device.

S2103. The second device discovers the first device through scanning for the beacon frame or the probe response frame.

S2104. The second device sends a network access request message to the first device, where the network access request message is used to indicate that the first device is discovered by the second device.

S2105. The second device starts provisioning.

It should be understood that for details of S2101 to S2105, reference should be made to the description of S1901 to S1905. For brevity, the details are not described herein again.

S2106. After receiving the network access request message, the first device determines that the first device is discovered by the second device, and the first device starts provisioning.

It should be understood that a difference between S2106 and S1906 is as follows. In S1906, after receiving the network access request message, the first device may switch to the second antenna by using the radio frequency switch, and perform provisioning by using the second antenna. However, in S2106, after receiving the network access request message, the first device may continue to perform provisioning by using the first antenna, obtain, by using the first antenna, an SSID of a Wi-Fi router and a password of the Wi-Fi router that are sent by the second device and that are encrypted by using an encryption key, switch to a second antenna by using a radio frequency switch, and perform remaining provisioning steps by using the second antenna.

It should be further understood that, in this embodiment of this application, provisioning of the first device includes interaction between the second device and the first device, that is, the first device obtains provisioning information (for example, the SSID of the Wi-Fi router and the password of the Wi-Fi router that are encrypted by using the encryption key) sent by the second device. Provisioning of the first device further includes a process in which the first device connects to the Wi-Fi router and to a cloud server, where the process may be implemented after the first device switches to the second antenna by using the radio frequency switch. When the first antenna is used, it is almost impossible for the first device to connect to the Wi-Fi router unless the first device and the Wi-Fi router are within a very short distance.

S2107. After obtaining the SSID of the Wi-Fi router and the password of the Wi-Fi router, the first device switches to the second antenna.

In some possible implementations, if the process is a Wi-Fi provisioning process, the method 2100 further includes:

The first device continues provisioning.

It should be understood that after obtaining the SSID of the Wi-Fi router and the password of the Wi-Fi router that are encrypted by using the encryption key, the first device switches to the second antenna by using the radio frequency switch. The first device can decrypt the SSID of the Wi-Fi router and the password of the Wi-Fi router by using the encryption key, to obtain the SSID of the Wi-Fi router and the password of the Wi-Fi router. The first device may connect to the Wi-Fi router according to the SSID of the Wi-Fi router and the password of the Wi-Fi router, to connect to the cloud server or the like.

In an embodiment, the first device may perform an operation of receiving signaling or data always through the second antenna. For example, after sending the beacon frame or the probe response frame, the first device may immediately switch to the second antenna to receive the network access request message sent by the second device. It should be understood that duration in which the first device switches from the first antenna to the second antenna by using the radio frequency switch may be very short. Therefore, it may be considered that the first device always uses the second antenna to receive the network access request message sent by the second device.

Figure 22:
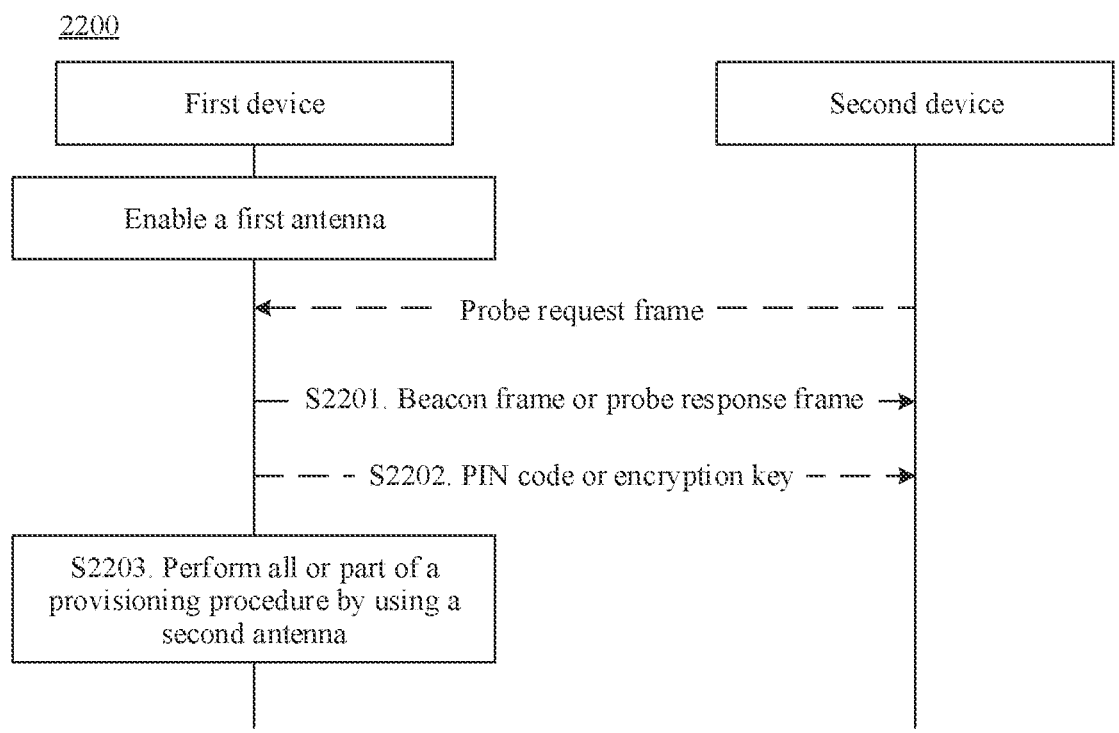
FIG. 22 is a schematic flowchart of another discovery and provisioning method according to an embodiment of this application.

FIG. 22 is a schematic flowchart of a method 2200 for discovery and provisioning of a Wi-Fi device through a SoftAP according to an embodiment of this application. As shown in FIG. 22, the method 2200 may be implemented by a first device, where the first device includes a first antenna and a second antenna. The method 2200 includes the following steps.

S2201. When the first device is in an unprovisioned state, the first device sends a beacon frame or a probe response frame through a first antenna, where the beacon frame or the probe response frame is used by a second device to discover the first device.

When the first device is powered on and is in the unprovisioned state, the first device may switch to the first antenna by using a radio frequency switch, and advertise a beacon frame to an ambient device through the first antenna, where the beacon frame may carry a device identifier of the first device. Alternatively, after receiving a probe request frame sent by the second device, the first device may send the probe response frame to the second device through the first antenna, where the probe response frame carries the device identifier of the first device.

In an embodiment, the method 2200 further includes the following steps.

S2202. The first device sends a PIN code or an encryption key to the second device through the first antenna.

In this embodiment of this application, the first device sends the PIN code to the second device through the first antenna, and therefore an additional hardware device is not required for out-of-band transmission. This reduces production costs. Compared with a manner of preconfiguring the PIN code or the encryption key, security of this manner is higher, so that user experience is improved.

In an embodiment, the method further includes: The first device negotiates with the second device by using the PIN code, to obtain the encryption key.

In this embodiment of this application, the first device may directly send the PIN code to the second device through the first antenna, and the first device may negotiate with the second device by using the PIN code to obtain the encryption key, so that the second device encrypts an SSID of a Wi-Fi router and a password of the Wi-Fi router.

The first device sends the encryption key to the second device through the first antenna, and therefore an additional hardware device is not required for out-of-band transmission. This reduces production costs. Compared with a manner of preconfiguring the PIN code or the encryption key, security of this manner is higher. In addition, this can reduce a provisioning latency of the first device, reduce resources occupied in an identity authentication process and a key negotiation process, and help improve user experience.

In an embodiment, the first device may use the beacon frame or the probe response frame to carry the PIN code or the encryption key, and send the beacon frame or the probe response frame to the second device.

In this embodiment of this application, the first device may use the beacon frame or the probe response frame to carry the PIN code or the encryption key, and send the beacon frame or the probe response frame to the second device. In this way, the beacon frame or the probe response frame may carry both a device identifier of the first device and the PIN code (or the encryption key), and therefore the first device does not need additional signaling to send the PIN code or the encryption key. In this way, signaling overheads of the first device are reduced.

In an embodiment, when the first device sends the PIN code or the encryption key through the first antenna, the first device does not encrypt the PIN code or the encryption key.

In this embodiment of this application, when a communication distance between the first device and the second device is within a preset security distance (for example, 30 cm), it may be considered that the PIN code or the encryption key may be transmitted in plaintext between the first device and the second device. In this case, the first device may not encrypt the PIN code or the encryption key.

S2203. After the first device is discovered by the second device, the first device performs all or part of a provisioning procedure by using the second antenna.

A trigger condition for the first device to switch from the first antenna to the second antenna may be that the first device receives a message indicating that the first device is discovered by the second device.

In an embodiment, in a Wi-Fi discovery and provisioning process, a trigger condition for the first device to switch to the second antenna may be that the first device receives a network access request message (for example, an AUTH request) sent by the second device.

It should be understood that, in this embodiment of this application, in Wi-Fi, Bluetooth BLE, or ZigBee discovery and provisioning, or in another discovery and provisioning manner, the first device is first discovered by the second device and then performs provisioning. In a discovery process, because the first device uses the first antenna, a communication distance between the first device and the second device is reduced, so that the first device at a user's home is prevented from being discovered and paired by a second device in a neighbor's home. In addition, when there are a plurality of first devices of a same type, the user may accurately find the first device that the user needs by using the second device. In addition, because the communication distance between the first device and the second device is reduced, the first device may send the PIN code or the encryption key in plaintext to the second device through the first antenna. In this way, subsequent encryption key negotiation between the first device and the second device through out-of-band transmission is not needed, which shortens the provisioning latency of the first device, and improves user experience.

The provisioning procedure is not specifically limited in this embodiment of this application. After the first device is discovered by the second device, the first device may perform all or part of the provisioning procedure by using the second antenna. A person skilled in the art should know that when the first device performs provisioning, the first device may perform part of the provisioning procedure, and another device performs remaining steps in the provisioning procedure. For example, for a case in which the first device is discovered and provisioned by the second device by using ZigBee, after being discovered by the second device, the first device may complete the part of connecting to a gateway device by using the second antenna in the provisioning procedure, and the gateway device may complete remaining steps in the provisioning procedures such as connecting to a cloud server.

Alternatively, the first device may execute part of the provisioning procedure by using the first antenna, and execute remaining provisioning procedure by using the second antenna. For example, for Wi-Fi discovery and provisioning of the first device, the first device may perform, by using the first antenna, the part of receiving the SSID of the Wi-Fi router and the password of the Wi-Fi router that are encrypted by using the encryption key in the provisioning procedure. After obtaining the SSID and the password that are encrypted by using the encryption key, the first device switches from the first antenna to the second antenna, and then performs the remaining provisioning procedure by using the second antenna.

In this embodiment of this application, a time at which the first device switches from the first antenna to the second antenna by using the radio frequency switch is not specifically limited.

In an embodiment, when the first device receives the network access request message of the second device, the first device may switch from the first antenna to the second antenna.

In another embodiment, the first device sends the beacon frame or the probe response frame to the ambient device within first preset duration. If no network access request message is received within the first preset duration, the first device may switch to the second antenna to receive the network access request message. If the first device receives the network access request message within second preset duration starting from the first device switching to the second antenna by using the radio frequency switch, the first device performs all or part of the provisioning procedure by using the second antenna. If the first device does not receive the network access request message within the second preset duration starting from the first device switching to the second antenna by using the radio frequency switch, the first device switches to the first antenna again by using the radio frequency switch to continue to send the beacon frame or the probe response frame, and repeats the foregoing procedure.

In another embodiment, when the first device is discovered and provisioned by the second device by using Wi-Fi, after receiving the network access request message, the first device receives, through the first antenna, the SSID of the Wi-Fi router and the password of the Wi-Fi router that are encrypted by using the encryption key and that are sent by the second device. When the first device obtains the SSID of the Wi-Fi router and the password of the Wi-Fi router by using the encryption key, the first device switches from the first antenna to the second antenna by using the radio frequency switch.

Figure 23A:
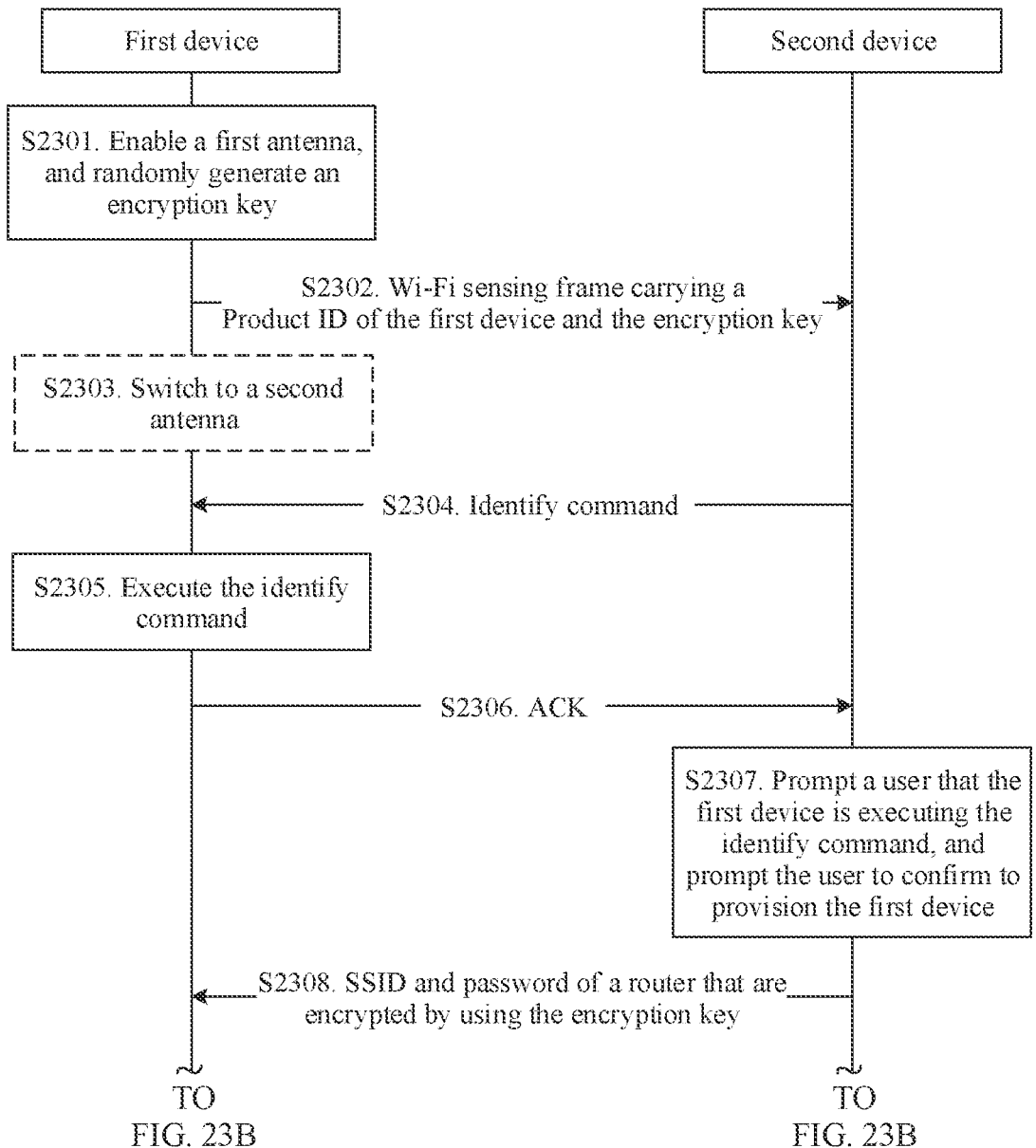
FIG. 23A and FIG. 23B are a schematic flowchart of another discovery and provisioning method according to an embodiment of this application.
Figure 23B:
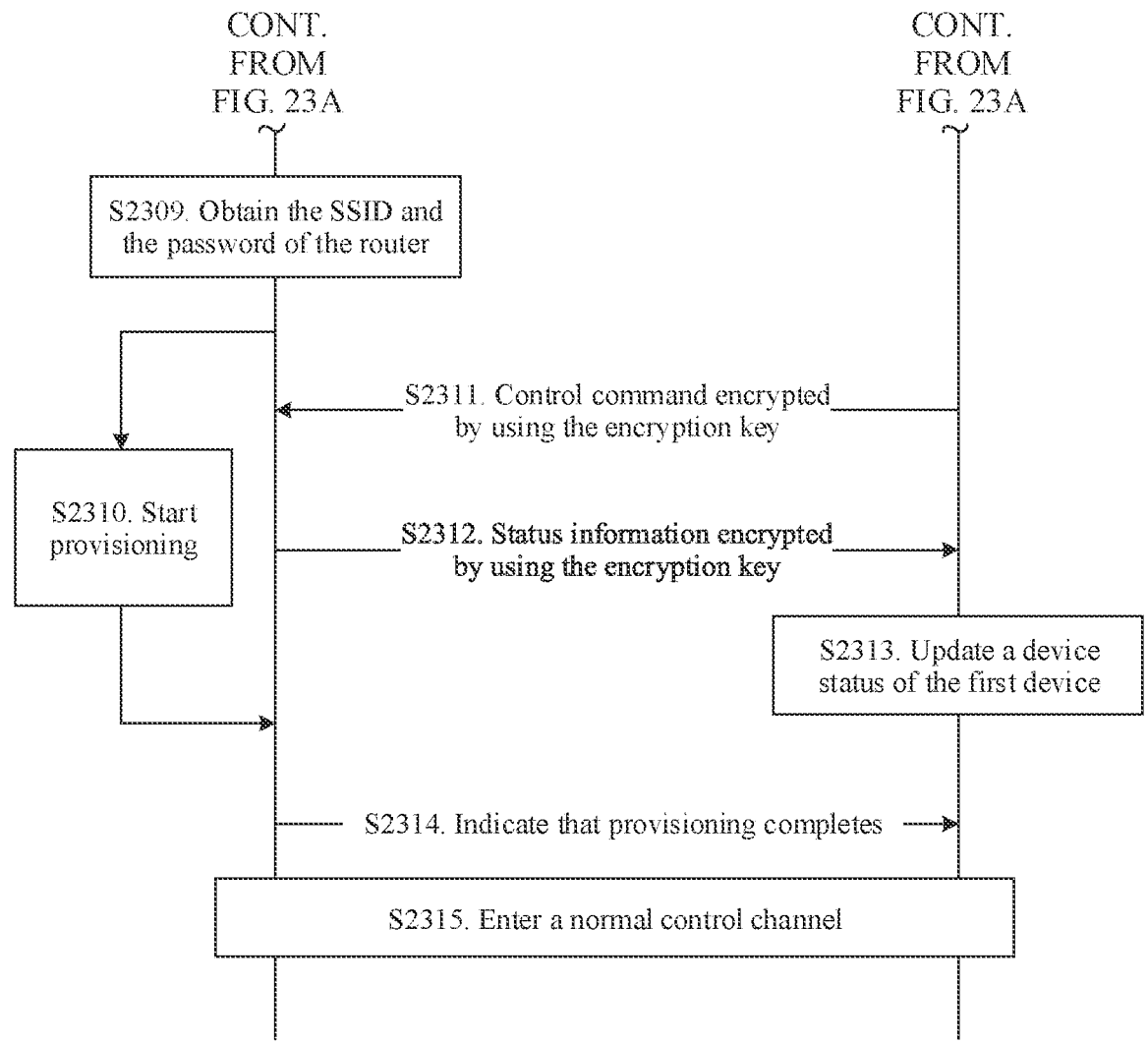

FIG. 23A and FIG. 23B are a schematic flowchart of a method 2300 for discovery and provisioning of a Wi-Fi device by using Wi-Fi sensing according to an embodiment of this application. The method 2300 includes the following steps.

S2301. A first device enables a first antenna, and randomly generates an encryption key.

For example, the first device may enable a physical first antenna by using a radio frequency switch, or the first device may enable a logical first antenna by using a register inside a chip.

In this embodiment of this application, the first device may include a first antenna and a second antenna. A wireless transmit power of the first device operating by using the first antenna is less than a transmit power of the first device operating by using the second antenna.

For example, when the first device detects that the first device is powered on and the first device is in an unprovisioned state, the first device enables the first antenna by using a radio frequency switch.

It should be understood that, in this embodiment of this application, the wireless transmit power of the first device operating by using the first antenna being less than the wireless transmit power of the first device operating by using the second antenna may be understood as a minimum wireless transmit power of the first device operating by using the first antenna being less than a minimum wireless transmit power of the first device operating by using the second antenna.

It should be further understood that, in this embodiment of this application, the first device being in the unprovisioned state may include but is not limited to restoring factory settings or performing provisioning for the first time. For example, the first device stores a status variable, and a value of the status variable indicates a status of the first device. For example, the value of the status variable being "false" represents that the first device is in an unprovisioned state, that is, the first device does not connect to a home router.

It should be further understood that the first device may include the first antenna and the second antenna. The two antennas may be switched by using the radio frequency switch. Isolation between the two antennas of the switch sometimes needs to meet an actual requirement. Therefore, there may be one switch or may be cascaded switches.

S2302. The first device sends a Wi-Fi sensing frame through the first antenna, where the Wi-Fi sensing frame includes a Product ID of the first device and the encryption key. A device within a communication distance may receive the Wi-Fi sensing frame.

In this scenario, when the first device sends, through the first antenna, the Wi-Fi sensing frame used for device discovery, only a second device within a communication distance of the first antenna can discover and provision the first device. A device far away from the first device cannot receive the Wi-Fi sensing frame. For example, a device in a neighbor's home cannot receive the Wi-Fi sensing frame. In this way, the first device can be prevented from pairing with the device in the neighbor's home.

In an embodiment, if the first device uses the first antenna and a communication distance at a specific transmit power is within a safe distance (for example, 5 cm), the first device may further use the Wi-Fi sensing frame to carry a PIN code used for encryption key negotiation between the first device and the second device; or the first device may directly use the Wi-Fi sensing frame to carry the encryption key.

For example, the Wi-Fi sensing frame includes but is not limited to a publish (Publish) frame, a follow-up frame, or a subscribe (Subscribe) frame.

FIG. 24 to FIG. 27 show several processes in which the second device discovers the first device according to an embodiment of this application. Processes shown in FIG. 24 to FIG. 27 are detailed description of S2302.

Figure 24:
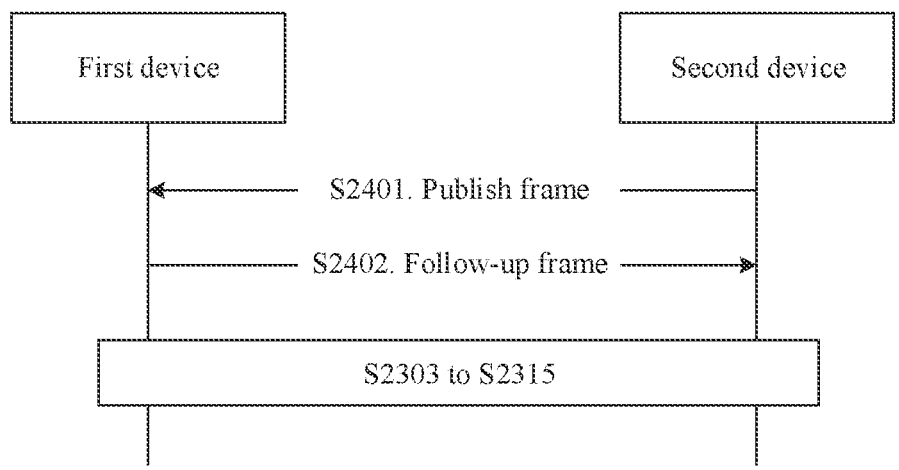
FIG. 24 is a schematic flowchart of another discovery and provisioning method according to an embodiment of this application.

As shown in FIG. 24, a process in which the second device discovers the first device may include the following steps.

S2401. The second device sends a publish frame, where the publish frame is used by a device around the second device to discover the second device.

S2402. The first device sends a follow-up frame to the second device through the first antenna, where the follow-up frame includes the Product ID of the first device and the encryption key.

For example, the publish frame may include a service identifier (service ID), and the service identifier may be further used to indicate the second device to provide a provisioning service. In this case, after receiving the publish frame, first devices around the second device may learn that the second device provides the provisioning service. If an ambient first device needs to be provisioned, the first device may send a follow-up frame to the second device, where the follow-up frame may carry a Product ID of the first device and an encryption key.

In an embodiment, if the Wi-Fi sensing frame is the follow-up frame in S2402, the Product ID of the first device and the encryption key may be carried in a payload field of the follow-up frame.

Figure 25:
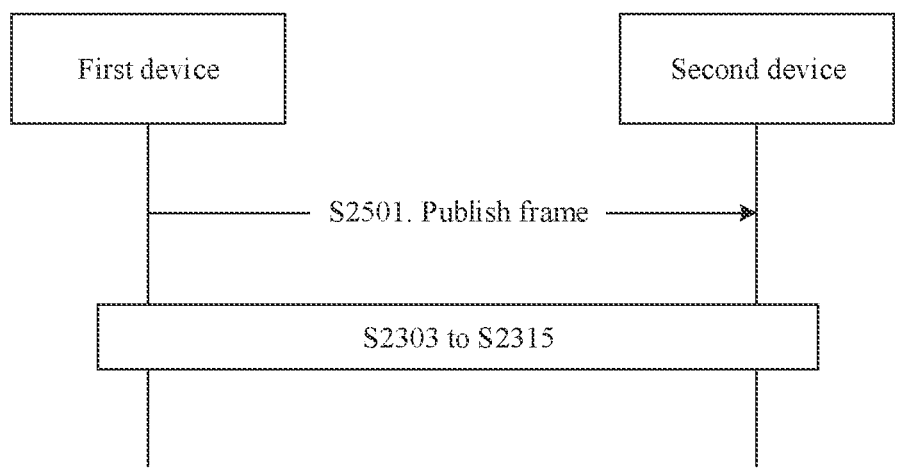
FIG. 25 is a schematic flowchart of another discovery and provisioning method according to an embodiment of this application.

A difference between FIG. 25 and FIG. 24 is that the second device may not need to first send the publish frame, but actively sends the publish frame to the ambient device when the first device is powered on and determines that the first device is in an unprovisioned state. As shown in FIG. 25, a process in which the second device discovers the first device may include the following steps.

S2501. The first device sends a publish frame through the first antenna, where the publish frame includes the Product ID of the first device and the encryption key.

In an embodiment, if the Wi-Fi sensing frame is the publish frame in S2501, the Product ID of the first device and the encryption key may be carried in a vendor specific attribute (Vendor Specific Attribute) of the publish frame.

Figure 26:
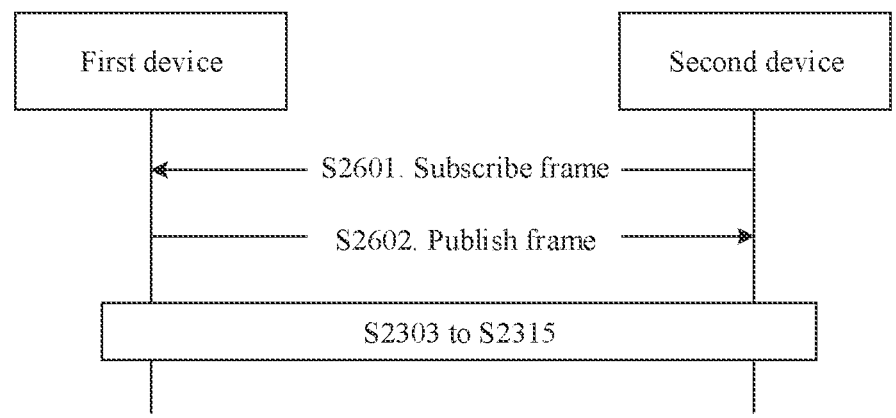
FIG. 26 is a schematic flowchart of another discovery and provisioning method according to an embodiment of this application.
Figure 27:
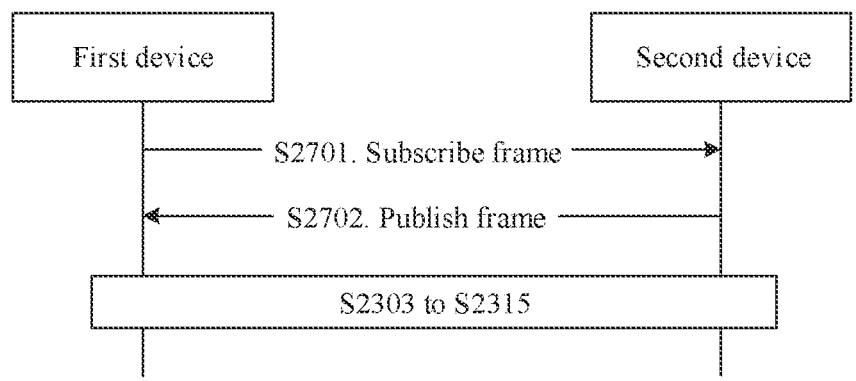
FIG. 27 is a schematic flowchart of another discovery and provisioning method according to an embodiment of this application.

In the foregoing process of discovering the first device by the second device shown in FIG. 24 and FIG. 25, an example in which the second device actively sends the publish frame or the first device actively sends the publish frame is used for description. With reference to FIG. 26 and FIG. 27, the following describes a process in which the first device or the second device passively sends a publish frame.

FIG. 26 shows another process in which the second device discovers the first device. As shown in FIG. 26, the process includes the following steps.

S2601. The second device sends a subscribe frame, where the subscribe frame may be used to query whether there is an ambient device that needs a provisioning service.

S2602. The first device sends a publish frame to the second device through the first antenna, where the publish frame includes the Product ID of the first device and the encryption key.

For example, the second device sends the subscribe frame to an ambient device, where the subscribe frame may be used to query whether there is an ambient device that needs the provisioning service. After an ambient first device receives the subscribe frame, if the first device determines that the first device needs the provisioning service, the first device may send a publish frame to the second device, where the publish frame includes a Product ID of the first device and an encryption key.

In an embodiment, if the Wi-Fi sensing frame is the publish frame in S2602, the Product ID of the first device and the encryption key may be carried in a vendor specific attribute of the publish frame.

FIG. 27 shows another process in which the second device discovers the first device. As shown in FIG. 27, the process includes the following steps.

S2701. The first device sends a subscribe frame through the first antenna, where the subscribe frame is used to query whether there is an ambient second device that provides a provisioning service, and the subscribe frame includes the Product ID of the first device and the encryption key.

S2702. The second device sends a publish frame to the first device, where the publish frame is used to indicate the second device to provide the provisioning service.

For example, when the first device detects that the first device is powered on and is in an unprovisioned state, the first device may send the subscribe frame to an ambient device, where the subscribe frame may be used to query whether there is an ambient second device that provides the provisioning service. After the second device receives the subscribe frame sent by the first device, if the second device can provide the provisioning service, the second device may send the publish frame to the first device, to notify the first device that the second device can provide the provisioning service.

In an embodiment, if the Wi-Fi sensing frame is the subscribe frame in S2701, the Product ID of the first device and the encryption key may be carried in a vendor specific attribute of the subscribe frame.

In an embodiment, the Wi-Fi sensing frame in S2302 may further carry the Product ID of the first device and the PIN code. After receiving the Wi-Fi sensing frame sent by the first device, the second device may perform identity authentication and encryption key negotiation with the first device by using the PIN code through a Wi-Fi sensing channel. For example, the Product ID of the first device and the PIN code may be carried in the payload field in the follow-up frame, the vendor specific attribute of the publish frame, or the vendor specific attribute of the subscribe frame.

In an embodiment, the Wi-Fi sensing frame may not carry the PIN code or the encryption key. The first device may send, through the first antenna, another Wi-Fi sensing frame including the PIN code or the encryption key to the second device after sending the Wi-Fi sensing frame. For example, the first device sends the PIN code or the encryption key to the second device by using another Wi-Fi sensing frame.

It should be understood that the second device may transmit provisioning information (for example, an SSID of a Wi-Fi router and a password of the Wi-Fi router) or a control command (for example, indicating the first device to turn on or turn off) to the first device by using the encryption key. The first device may transmit status information or indication information (indicating that provisioning of the first device completes) of the first device to the second device by using the encryption key. For example, the first device sends updated status information to the second device after executing the control command; or the first device sends the updated status information to the second device after detecting that a user changes a status of the first device; or the first device sends the indication information to the second device after determining that provisioning completes.

It should be understood that, because a transmission distance of the first device using the first antenna is within the safe distance, data sent by the first device is free from eavesdropping and a man-in-the-middle attack. Therefore, the first device can send the PIN code or the encryption key in plaintext through the first antenna. In this way, out-ofband PIN code transmission is omitted, and overheads of identity authentication and key negotiation are also omitted. In this way, user experience is improved and security is ensured. S2303. The first device switches to the second antenna.

In an embodiment, the first device may send the Wi-Fi sensing frame to the second device within first preset duration. Because the first device sends the Wi-Fi sensing frame by using a very short distance technology, a receiving success rate of the second device is low. Therefore, the first device may continuously send a plurality of same Wi-Fi sensing frames within preset duration through the first antenna. In this way, the success rate of receiving the Wi-Fi sensing frame by the second device is improved. In addition, the first device needs to receive an identify command sent by the second device through the first antenna within the first preset duration.

If the identify command sent by the second device is received by the first device within the first preset duration, the first device may switch to the second antenna when receiving the identify command, and execute the identify command.

If no identify command is received when the first preset duration ends, the first device may switch from the first antenna to the second antenna, so as to receive, within second preset duration through the second antenna, the identify command sent by the second device. If the identify command is received within the second preset duration, the first device may execute the identify command. Subsequently, the first device exchanges information or data with the second device through the second antenna.

If the first device does not receive, within the second preset duration, the identify command sent by the second device, the first device switches from the second antenna to the first antenna, and continues to send the Wi-Fi sensing frame through the first antenna within the first preset duration. In this way, the foregoing process is repeated until the first device receives the identify command sent by the second device.

In an embodiment, the first device may also receive the identify command of the second device through the first antenna after sending the Wi-Fi sensing frame. After receiving the identify command sent by the second device, the first device switches to the second antenna.

For example, the first device may switch to a physical second antenna by using the radio frequency switch, or the first device may switch to a logical second antenna by using the register inside the chip.

It should be understood that S2401 and S2402, S2501, S2601 and S2602, and S2701 and S2702 describe several processes of discovering the first device by using the Wi-Fi sensing technology. After S2402, S2501, S2602, or S2702, the first device and the second device may continue to perform a process described in S2303 to S2315.

It should be understood that, when the first device uses the first antenna, success rates of sending data and receiving data by the first device are reduced. In this case, after the first device switches to the second antenna, the success rates of sending data and receiving data by the first device may become normal.

S2304. The second device sends the identify command encrypted by using the encryption key to the first device, where the identify command is used to indicate the first device to identify the first device.

For example, if the first device is an intelligent desk lamp, after receiving the identify command, the intelligent desk lamp may blink for preset duration, so that the user determines that a device currently to be provisioned is a device close to the mobile phone.

S2305. After receiving the identify command encrypted by using the encryption key, the first device executes the identify command.

S2306. The first device sends response information for the identify command to the second device through the second antenna, where the response information is used to indicate that the first device successfully receives the identify command.

After the first device receives the identify command, the first device may send, to the second device, the response information (for example, acknowledge (acknowledge, ACK) information) encrypted by using the encryption key. The response information is used to indicate that the first device receives the identify command. After receiving the response information, the second device may prompt the user of the status of the first device by using an animation on a display interface.

For example, as shown in FIG. 5C, the mobile phone may send the identify command to the intelligent desk lamp. In this case, the intelligent desk lamp may blink for the preset duration, to prompt the user that the intelligent desk lamp is a device currently to be provisioned. The intelligent desk lamp blinks for the preset duration to identify itself, so that the user can determine the intelligent desk lamp, to prevent attack performed by a hacker by using an amplifier. In addition, the intelligent desk lamp may further send the response information to the mobile phone, to prompt, on the display interface of the mobile phone by using the animation, the user that the intelligent desk lamp currently to be provisioned is blinking. The user may learn, by observing the animation on the mobile phone and the blinking intelligent desk lamp, that the device to be provisioned is a device close to the mobile phone.

It should be understood that, in this embodiment of this application, after the second device obtains the encryption key sent by the first device, or after the second device obtains the encryption key through negotiation performed with the first device in a manner of OOB, information or data communication between the first device and the second device needs to be encrypted by using the encryption key.

S2307. The second device prompts the user that the first device is executing the identify command, and receives a confirmation from the user to provision the first device.

For example, the second device may prompt, by using an animation displaying a changing status of the first device, the user that the first device is executing the identify command, and then the user performs confirmation. It should be understood that, identify commands of different devices may be different, and may be vibration, buzzing, LED light blink, and the like.

For example, as shown in FIG. 5C, a trigger condition for the second device to determine to provision the first device may be that the mobile phone detects an operation of tapping the control 504 by the user.

S2308. The second device sends, to the first device in response to an operation of the user, the SSID of the Wi-Fi router and the password of the Wi-Fi router that are encrypted by using the encryption key.

For example, if the Wi-Fi sensing frame carries the PIN code used for encryption key negotiation, the second device may perform identity authentication and encryption key negotiation with the first device by using the PIN code, and send the SSID of the Wi-Fi router and the password of the Wi-Fi router encrypted by using the encryption key to the first device.

For example, if the Wi-Fi sensing frame carries the encryption key, the second device may directly send the SSID of the Wi-Fi router and the password of the Wi-Fi router that are encrypted by using the encryption key to the first device.

For example, if the Wi-Fi sensing frame does not carry the PIN code used for encryption key negotiation or does not carry the encryption key, the second device may choose to directly send the SSID of the Wi-Fi router and the password of the Wi-Fi router in plaintext to the first device (for some scenarios in which a security requirement is not high). Alternatively, for some scenarios in which a security requirement is high, the second device may perform identity authentication and encryption key negotiation with the first device through OOB or by preconfiguring the PIN code, and then send the SSID of the Wi-Fi router and the password of the Wi-Fi router encrypted by using the encryption key to the first device.

S2309. After receiving the encrypted SSID of the Wi-Fi router and the encrypted password of the Wi-Fi router, the first device may perform decryption by using the encryption key, to obtain the SSID of the Wi-Fi router and the password of the Wi-Fi router.

S2310. The first device starts provisioning.

It should be understood that, in this embodiment of this application, provisioning of the first device may refer to processes such as the first device receiving the SSID of the Wi-Fi router and the password of the Wi-Fi router that are sent by the second device and that are encrypted by using the encryption key; the first device decrypting the SSID of the Wi-Fi router and the password of the Wi-Fi router by using the encryption key, to obtain the SSID of the Wi-Fi router and the password of the Wi-Fi router; and the first device connecting to the Wi-Fi router and a cloud server by using the SSID of the Wi-Fi router and the password of the Wi-Fi router.

In this embodiment of this application, the Wi-Fi sensing channel may be established between the first device and the second device by using a Wi-Fi sensing technology. In this way, in the provisioning process of the first device, the second device can control the first device. In the provisioning manner shown in FIG. 2, the second device controls the first device after provisioning of the first device completes. Because the control command needs to pass through transmission control protocol/internet protocol (transmission control protocol/internet protocol, TCP/IP) layers of the first device and the second device, the first device needs to first connect to the router. However, in this embodiment of this application, the Wi-Fi sensing channel is established between the first device and the second device by using the Wi-Fi sensing technology. In this case, the control command or the status information does not need to be forwarded by the router, the TCP/IP layers are bypassed in both the first device and the second device, and application layers directly communicate through MAC layers. Therefore, in the provisioning process of the first device, the second device can control the first device.

In this embodiment of this application, compared a latency of the existing manner of local control based on an IP connection, a latency of the manner of control by using Wi-Fi sensing is reduced from hundreds of milliseconds to a minimum of dozens of milliseconds. This helps improve user experience when the user controls the first device.

S2311. In a process in which the first device performs provisioning, the second device may send the control command encrypted by using the encryption key to the first device.

In an embodiment, the first device may use a first Wi-Fi sensing frame to carry the Product ID of the first device. After obtaining the Product ID of the first device, the second device may request a control mapping file and a details page (for example, a function or a picture included in the first device) of the first device from the server. After sending, to the first device, the SSID of the Wi-Fi router and the password of the Wi-Fi router that are encrypted by using the encryption key, the second device may display a control interface of the first device based on the control mapping file and the details page.

For example, as shown in FIG. 5E, after the mobile phone detects an operation of tapping the control 505 by the user, the mobile phone may send the control command encrypted by using the encryption key to the intelligent desk lamp. The control command is used to indicate the intelligent desk lamp to turn on.

S2312. In the process in which the first device performs provisioning, the first device may send the status information encrypted by using the encryption key to the second device.

S2313. The second device updates the status information of the first device.

For example, as shown in FIG. 5E, after the intelligent desk lamp turns on, the intelligent desk lamp may further send the status information encrypted by using the encryption key to the mobile phone, where the status information is used to indicate that the intelligent desk lamp is in the on state. After the mobile phone obtains the status information of the intelligent desk lamp, the mobile phone may update the status information of the intelligent desk lamp (as shown in FIG. 5E, the mobile phone shows that the intelligent desk lamp is on).

For example, as shown in FIG. 7B, when the intelligent desk lamp detects that the user taps a switch of the intelligent desk lamp, the intelligent desk lamp changes from the on state to the off state. The intelligent desk lamp may send the status information encrypted by using the encryption key to the mobile phone, where the status information is used to indicate that the intelligent desk lamp is in the off state. After the mobile phone obtains the status information of the intelligent desk lamp, the mobile phone may update the status information of the intelligent desk lamp (as shown in FIG. 7B, the mobile phone shows that the intelligent desk lamp is off).

S2314. After provisioning completes, the first device sends the indication information to the second device, where the indication information is used to indicate that provisioning of the first device completes.

It should be understood that, after provisioning completes, the first device may send the indication information encrypted by using the encryption key to the second device.

S2315. The first device and the second device enter a normal control channel.

In this embodiment of this application, the normal control channel includes cloud control and local control, and the local control may include a local IP connection, Wi-Fi Direct (Wi-Fi P2P), and Wi-Fi sensing.

In this embodiment of this application, the first device may send the Wi-Fi sensing frame to the second device through the first antenna, and the Wi-Fi sensing frame may carry the Product ID of the first device. In this way, it can be ensured that the first device is discovered only by the second device within the safe distance, and is not paired with the device in the neighbor's home. In addition, when the user wants to provision one device in a plurality of same devices, a probability of inappropriate pairing of the device can be greatly reduced. For example, there are a total of five intelligent lamps in a living room and a bedroom at home. In this case, the user wants to provision only an intelligent lamp in the living room. The first device sends a Wi-Fi sensing frame through the first antenna. The second device approaches the intelligent lamp in the living room, that is, the second device is in a transmission range of a first antenna of the intelligent lamp in the living room, but is not in a transmission range of another device. Therefore, only the intelligent lamp in the living room may be displayed on the second device. In this way, it can be ensured that the user clearly knows that an intelligent lamp currently displayed on the second device is the intelligent lamp in the living room, thereby inappropriate pairing is avoided.

The encryption key may be carried in the Wi-Fi sensing frame sent by the first device to the second device through the first antenna, and therefore an additional hardware device is not required for out-of-band transmission. This reduces production costs, and security is improved. In addition, this can reduce provisioning time of the first device, reduce resources occupied in the identity authentication process and the key negotiation process, and help improve user experience.

The Wi-Fi sensing channel is established between the first device and the second device by using the Wi-Fi sensing technology, so that a process in which the first device enables a SoftAP and the second device needs to first access the SoftAP to transmit the SSID of the router and the password of the router is omitted. In addition, after discovering the first device, the second device may immediately control the first device, thereby waiting time spent by the user during provisioning of the first device can be saved, and user experience is greatly improved.

If a Wi-Fi intelligent device cannot be discovered and provisioned based on a safe distance due to a location (such as a location of ceiling lamp or a wall-mounted air conditioner), Wi-Fi sensing can be used for discovery and provisioning. After a mobile phone discovers the Wi-Fi intelligent device based on a Wi-Fi sensing frame, the mobile phone may directly send an SSID of a Wi-Fi router and a password of the Wi-Fi router to the Wi-Fi intelligent device by using the Wi-Fi sensing frame in a provisioning process. Alternatively, in the provisioning process, the mobile phone may perform identity authentication and encryption key negotiation with the Wi-Fi intelligent device by using the Wi-Fi sensing frame through out-of-band transmission or in a manner of preconfiguring a PIN code; encrypt the SSID of the Wi-Fi router and the password of the Wi-Fi router by using an encryption key; and send the encrypted SSID of the Wi-Fi router and the encrypted password of the Wi-Fi router to the Wi-Fi intelligent device by using the Wi-Fi sensing frame. In this case, a distance (for example, within 2 m) from which the Wi-Fi intelligent device is discovered can still be reduced.

Figure 28:
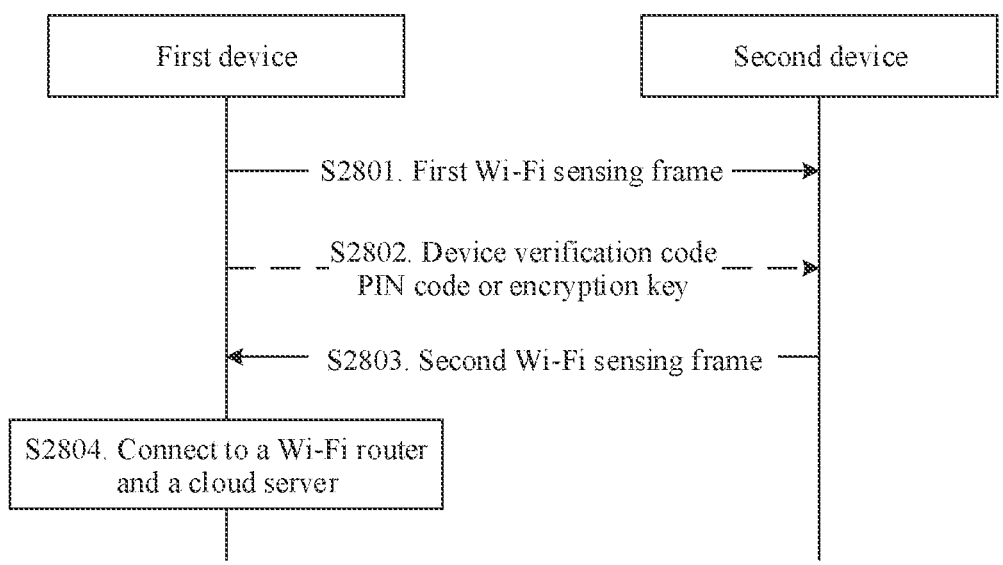
FIG. 28 is a schematic flowchart of another discovery and provisioning method according to an embodiment of this application.

FIG. 28 is a schematic flowchart of a discovery and provisioning method 2800 according to an embodiment of this application. As shown in FIG. 28, the method may be implemented by a first device. The method 2800 includes the following steps.

S2801. The first device sends a first Wi-Fi sensing frame when the first device is in an unprovisioned state, where the first Wi-Fi sensing frame is used to enable a second device to discover the first device.

For example, the first Wi-Fi sensing frame may be a follow-up frame in FIG. 24.

For example, the first Wi-Fi sensing frame may be a publish frame in FIG. 25.

For example, the first Wi-Fi sensing frame may be a publish frame in FIG. 26.

For example, the first Wi-Fi sensing frame may be a subscribe frame in FIG. 27.

In an embodiment, the first device includes a first antenna and a second antenna. The first device sends the first Wi-Fi sensing frame to the second device through the first antenna, where the first Wi-Fi sensing frame is used by the second device to discover the first device. The first Wi-Fi sensing frame may carry a Product ID of the first device.

In an embodiment, the method 2800 further includes the following steps.

S2802. The first device sends a PIN code or an encryption key to the second device through the first antenna.

In this embodiment of this application, the first device sends the PIN code to the second device through the first antenna, and therefore an additional hardware device is not required for out-of-band transmission (for example, a two-dimensional code needs to be printed or NFC hardware needs to be configured on the first device). This reduces production costs. Compared with a manner of preconfiguring the PIN code or the encryption key, security of this manner is higher. Compared with a manner of user input or scanning the PIN code, user experience of this manner is better.

In an embodiment, the method further includes: The first device negotiates with the second device by using the PIN code, to obtain the encryption key.

In this embodiment of this application, the first device may directly send the PIN code to the second device through the first antenna, and the first device may perform negotiation with the second device by using the PIN code to obtain the encryption key, so that the second device encrypts an SSID of a Wi-Fi router and a password of the Wi-Fi router.

In this embodiment of this application, the first device sends the encryption key to the second device through the first antenna, and therefore an additional hardware device is not required for out-of-band transmission. This reduces production costs. Compared with a manner of preconfiguring the PIN code or the encryption key, security of this manner is higher. In addition, this can reduce a provisioning latency of the first device, reduce resources occupied in an identity authentication process and a key negotiation process, and help improve user experience.

In an embodiment, the first device may use the first Wi-Fi sensing frame to carry the PIN code or the encryption key, and send the first Wi-Fi sensing frame to the second device.

In this embodiment of this application, the first device may use the first Wi-Fi sensing frame to carry the PIN code or the encryption key, and send the first Wi-Fi sensing frame to the second device. In this way, the first Wi-Fi sensing frame may carry both a device identifier of the first device and the PIN code (or the encryption key), and therefore the first device does not need additional signaling to send the PIN code or the encryption key. In this way, signaling overheads of the first device are reduced.

In an embodiment, when the first device sends the PIN code or the encryption key through the first antenna, the first device does not encrypt the PIN code or the encryption key.

In this embodiment of this application, when a communication distance between the first device and the second device is within a preset security distance (for example, 30 cm), it may be considered that the PIN code or the encryption key may be transmitted in plaintext between the first device and the second device. In this case, the first device may not encrypt the PIN code or the encryption key.

S2803. After the first device is discovered by the second device, the first device receives a second Wi-Fi sensing frame sent by the second device, where the second Wi-Fi sensing frame includes the SSID of the Wi-Fi router and the password of the Wi-Fi router.

In an embodiment, the first device receives, through the second antenna, the SSID of the Wi-Fi router and the password of the Wi-Fi router that are sent by the second device and that are encrypted by using the encryption key. The first device decrypts the SSID of the Wi-Fi router and the password of the Wi-Fi router by using the encryption key, to obtain the SSID of the Wi-Fi router and the password of the Wi-Fi router.

It should be understood that, for a process in which the first device switches to the second antenna, reference should be made to the description in S2303. For brevity, details are not described herein again.

In an embodiment, before the first device receives the second Wi-Fi sensing frame sent by the second device, the method 2800 further includes:

The first device receives an identify command sent by the second device:
  the first device identifies the first device according to the identify command; and
  the first device sends response information to the second device, where the response information is used to enable the second device to prompt a user that the first device is executing the identify command.

For example, as shown in FIG. 5C, the mobile phone may send the identify command to the intelligent desk lamp. In this case, the intelligent desk lamp may blink for the preset duration, to prompt the user that the intelligent desk lamp is a device currently to be provisioned. In addition, the intelligent desk lamp may further send the response information to the mobile phone, to prompt, on the display interface of the mobile phone by using the animation, the user that a device currently to be provisioned is a device close to the mobile phone. The user may learn, by observing the animation on the mobile phone and the blinking intelligent desk lamp, that the device to be provisioned is the device close to the mobile phone.

S2804. The first device connects to the Wi-Fi router and a cloud server according to the SSID and the password.

In an embodiment, in a process in which the first device connects to the Wi-Fi router and the cloud server, the method further includes:

The first device receives a control command sent by the second device; and
  the first device executes the control command and sends status information to the second device.

For example, as shown in FIG. 5E, after the mobile phone detects an operation of tapping the control 505 by the user, the mobile phone may send the control command encrypted by using the encryption key to the intelligent desk lamp. The control command is used to indicate the intelligent desk lamp to turn on. After the intelligent desk lamp turns on, the intelligent desk lamp may send the status information encrypted by using the encryption key to the mobile phone, where the status information is used to indicate that the intelligent desk lamp is in an on state. After the mobile phone obtains the status information of the intelligent desk lamp, the mobile phone may update the status information of the intelligent desk lamp (as shown in FIG. 5E, the mobile phone shows that the intelligent desk lamp is on).

In an embodiment, in a process in which the first device connects to the Wi-Fi router and the cloud server, the method further includes:

The first device detects a status update operation performed by the user on the first device; and
  the first device sends updated status information to the second device in response to the operation.

For example, as shown in FIG. 7B, when the intelligent desk lamp detects that the user taps the switch of the intelligent desk lamp, the intelligent desk lamp changes from the on state to the off state. The intelligent desk lamp may send the status information encrypted by using the encryption key to the mobile phone, where the status information is used to indicate that the intelligent desk lamp is in the off state.

In an embodiment, that the first device sends a first Wi-Fi sensing frame in S2801 includes: The first device sends the first Wi-Fi sensing frame at a first wireless transmit power.

In S2802, the first device sends the PIN code or the encryption key at the first wireless transmit power.

In a step after S2802, the first device sends information or data at a second wireless transmit power.

The first wireless transmit power is less than the second wireless transmit power.

In this embodiment of this application, a Wi-Fi sensing channel is established between the first device and the second device by using a Wi-Fi sensing technology, so that a process in which the first device enables a SoftAP and the second device needs to first access the SoftAP to transmit the SSID of the router and the password of the router is omitted. In addition, after discovering the first device, the second device may immediately control the first device, thereby waiting time spent by the user during provisioning of the first device can be saved, and user experience is greatly improved.

Figure 29A:
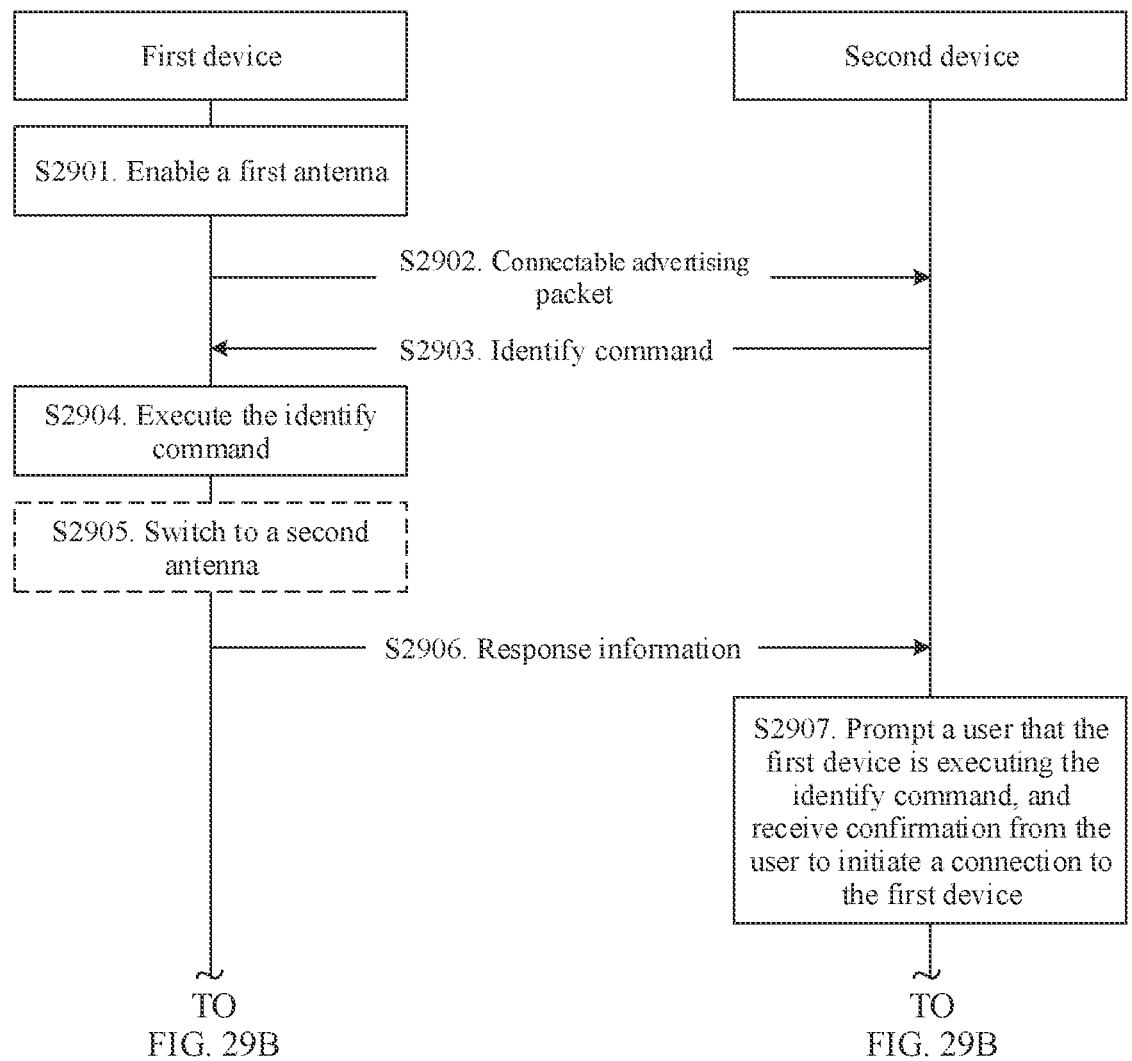
FIG. 29A and FIG. 29B are a schematic flowchart of another discovery and provisioning method according to an embodiment of this application.
Figure 29B:
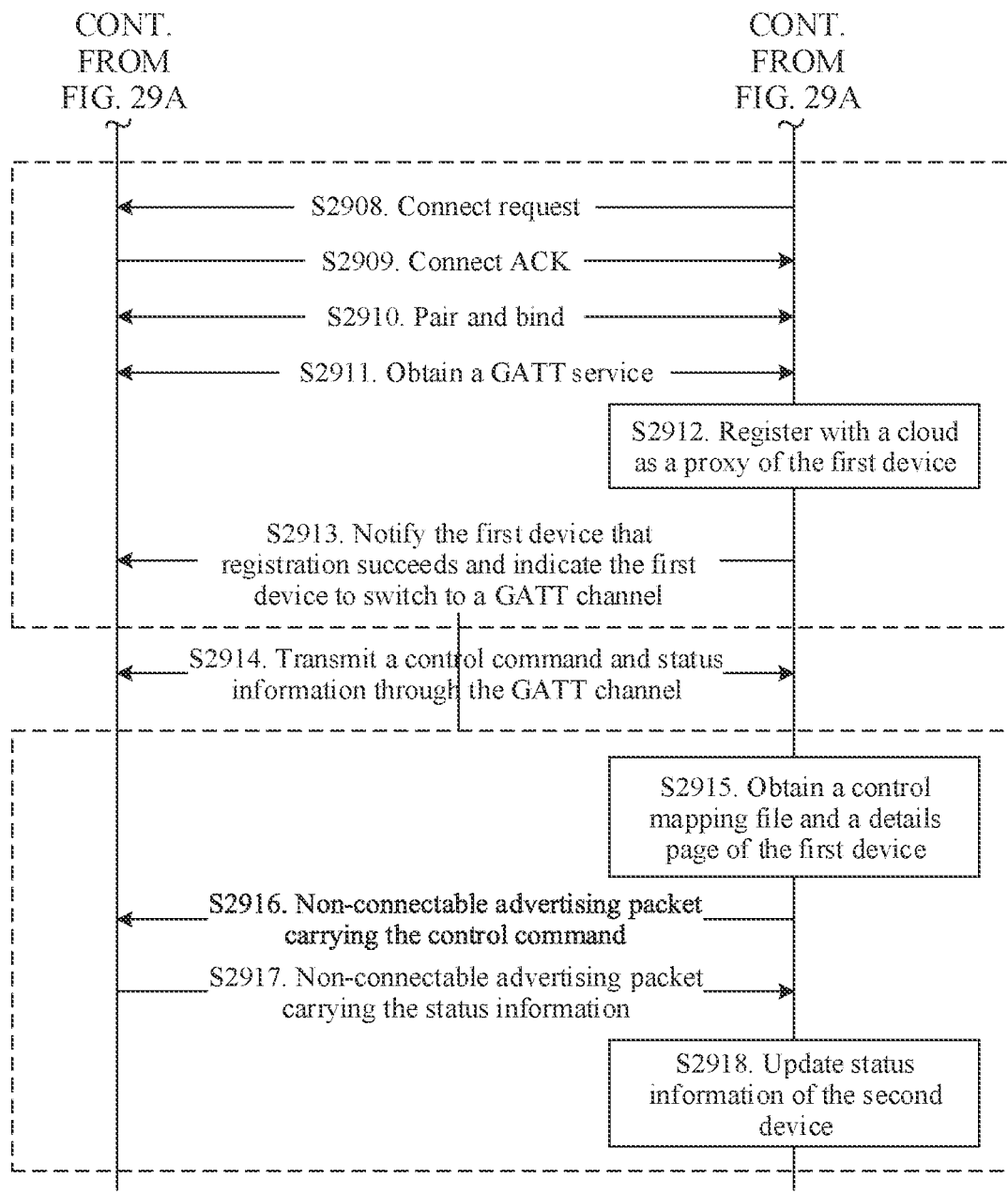

FIG. 29A and FIG. 29B are a schematic flowchart of a method 2900 for discovery and provisioning of a Bluetooth BLE device according to an embodiment of this application. The method 2900 may be executed by a first device and a second device. The first device is a device to be provisioned (for example, a BLE intelligent device). The method includes the following steps.

S2901. The first device enables a first antenna.

In this embodiment of this application, the first device may include a first antenna and a second antenna. A wireless transmit power of the first device operating by using the first antenna is less than a transmit power of the first device operating by using the second antenna. For example, the first device may enable a physical first antenna by using a radio frequency switch, or the first device may enable a logical first antenna by using a register inside a chip.

In an embodiment, when the first device detects that the first device is powered on and the first device is in an unprovisioned state, the first device enables the first antenna by using a radio frequency switch.

It should be understood that, in this embodiment of this application, the wireless transmit power of the first device operating by using the first antenna being less than the wireless transmit power of the first device operating by using the second antenna may be understood as a minimum wireless transmit power of the first device operating by using the first antenna being less than a minimum wireless transmit power of the first device operating by using the second antenna.

It should be further understood that, in this embodiment of this application, the first device being in the unprovisioned state may include but is not limited to restoring factory settings or performing provisioning for the first time. For example, the first device stores a status variable, and a value of the status variable indicates a status of the first device. For example, the value of the status variable being "false" represents that the first device is in an unprovisioned state.

It should be further understood that the first device may include the first antenna and the second antenna. The two antennas may be switched by using the radio frequency switch. Isolation between the two antennas of the switch sometimes needs to meet an actual requirement. Therefore, there may be one switch or may be cascaded switches.

S2902. The first device sends a connectable advertising (ADV_IND) packet through the first antenna, where the connectable advertising packet may carry a Passkey or OOB information, and the Passkey or the OOB information may be used for legacy pairing or secure connection pairing.

It should be understood that the OOB information may be information transmitted through OOB in the existing Bluetooth protocol, or may be information transmitted through OOB in a subsequent Bluetooth protocol. Content that may be carried in the connectable advertising packet includes: a TK that is transmitted through out-of-band transmission when the first device performs legacy pairing (legacy pairing); or a device address of the first device, a random number, and a confirmation number that are transmitted through out-of-band transmission when the first device performs secure connection pairing (secure connection pairing).

If the first device performs legacy pairing (legacy pairing), the first device may carry the Passkey or the TK in the connectable advertising (ADV_IND) packet.

If the first device uses the connectable advertising packet to carry the Passkey, the first device and the second device may obtain the TK through calculation based on the Passkey, and perform identity authentication based on the TK in legacy pairing. If the first device uses the connectable advertising packet to carry the TK, the first device and the second device may perform identity authentication based on the TK in legacy pairing.

It should be understood that for a process of calculating the TK based on the Passkey and performing identity authentication based on the TK, reference should be made to the existing Bluetooth protocol. For brevity, details are not described herein again.

If the first device and the second device perform secure connection pairing (secure connection pairing), the first device may use the connectable advertising packet to carry the Passkey or the OOB information. The OOB information may include the device address (B) of the first device, the random number (rb), and the confirmation number (Cb).

If the first device uses the connectable advertising packet to carry the Passkey, the first device and the second device may perform identity authentication based on the Passkey in secure connection pairing. Alternatively, if the first device uses the connectable advertising packet to carry the device address of the first device, the random number, and the confirmation number, the first device and the second device may perform identity authentication in secure connection pairing based on the device address of the first device, the random number, and the confirmation number.

It should be understood that for a process of identity authentication based on the Passkey and identity authentication based on the device address of the first device, the random number, and the confirmation number, reference should be made to the existing Bluetooth protocol. For brevity, details are not described herein again.

In this embodiment of this application, because a transmission distance of the first device is within a safe distance, data sent by the first device is free from eavesdropping and a man-in-the-middle attack. Therefore, the first device can send the Passkey or the OOB information used for legacy pairing or secure connection pairing in plaintext. In this way, out-of-band transmission of the TK or the OOB information is omitted, and entering a Passkey by a user or numeric comparison is omitted. In this way, user experience is improved and security is ensured.

In an embodiment, the connectable advertising packet may further carry an encryption key of an application layer. For example, the second device (such as a mobile phone) may discover an intelligent desk lamp by using an App 3, and register with a cloud as a proxy of the intelligent desk lamp. After that, the mobile phone may save data of the intelligent desk lamp in the App 3. In this case, a function of the encryption key of the application layer is to encrypt an identify command, and prevent another application (for example, an App 1 or an App 2) in the mobile phone from obtaining the data of the intelligent desk lamp stored in the App 3. Another function of the encryption key of the application layer is that after the second device discovers the first device and before pairing and binding of the first device and the second device complete, the second device may use the encryption key of the application layer to transmit a control command and status information. In addition, the encryption key of the application layer can prevent another App in the mobile phone from obtaining Bluetooth data.

S2903. The second device sends, to the first device, the identify command encrypted by using the encryption key of the application layer, where the identify command is used to indicate the first device to identify the first device.

S2904. After receiving the identify command encrypted by using the encryption key, the first device executes the identify command.

For example, if the first device is an intelligent desk lamp, after receiving the identify command, the intelligent desk lamp may blink for preset duration, so that the user determines that a device currently to be provisioned is a device close to the second device.

S2905. The first device switches to the second antenna.

For example, the first device may switch to a physical second antenna by using the radio frequency switch, or the first device may switch to a logical second antenna by using a register inside a chip.

In an embodiment, the first device may send the connectable advertising packet to the second device through the first antenna within first preset duration. Because the first device sends the connectable advertising packet by using a very short distance technology, a receiving success rate of the second device is low. Therefore, the first device may continuously send a plurality of same connectable advertising packets within preset duration through the first antenna. In this way, the success rate of receiving the connectable advertising packet by the second device is improved. In addition, the first device needs to receive the identify command sent by the second device within the first preset duration.

If the identify command that is sent by the second device and that is encrypted by using the encryption key is received by the first device within the first preset duration, the first device may switch to the second antenna when receiving the identify command, and execute the identify command.

If no identify command is received when the first preset duration ends, the first device may switch from the first antenna to the second antenna, so as to receive, within second preset duration through the second antenna, the identify command sent by the second device. If the identify command is received within the second preset duration, the first device may execute the identify command. Subsequently, the first device exchanges information or data with the second device through the second antenna.

If the first device does not receive, within the second preset duration, the identify command sent by the second device, the first device switches from the second antenna to the first antenna, and continues to send the connectable advertising packet through the first antenna within the first preset duration. In this way, the foregoing process is repeated until the first device receives the identify command sent by the second device.

In an embodiment, the first device may also receive the identify command of the second device through the first antenna after sending the connectable advertising packet. After receiving the identify command sent by the second device, the first device switches to the second antenna.

It should be understood that the sequence of S2904 and S2905 is not limited.

S2906. The first device sends response information for the identify command to the second device, where the response information is used to indicate that the first device successfully receives the identify command.

After the first device receives the identify command, the first device may send, to the second device, the response information (for example, acknowledge (acknowledge, ACK) information) encrypted by using the encryption key of the application layer. The response information is used to indicate that the first device receives the identify command. After receiving the response information, the second device may prompt the user of a status that the first device is executing the identify command by using an animation on a display interface.

S2907. The second device prompts the user that the first device is executing the identify command, and receives a confirmation from the user to initiate a connection to the first device.

For example, the second device may prompt, by using an animation displaying a changing status of the first device, the user that the first device is executing the identify command.

S2908. After the second device detects an operation of initiating a connection to the first device, the second device sends a connect request (connect request) to the first device.

S2909. After receiving the connect request, the first device sends a connect ACK (connect ACK) to the second device.

In an embodiment, in S2906, a trigger condition for the first device to switch to the second antenna may alternatively be that the first device receives the connect ACK (connect ACK) sent by the second device.

S2910. The first device and the second device perform pairing and binding based on the Passkey or the OOB information.

In an embodiment, the first device and the second device may perform legacy pairing or secure connection pairing based on the Passkey or the OOB information.

It should be understood that, for a process in which the first device and the second device perform legacy pairing or secure connection pairing based on the Passkey or the OOB information, reference should be made to the description in S2902. For brevity, details are not described herein again.

S2911. The first device and the second device obtain a generic attribute profile (generic attribute profile, GATT) service.

S2912. The second device registers with the cloud as a proxy of the first device.

S2913. After completing registering with the cloud as the proxy of the first device, the second device notifies the first device that registration succeeds, and indicates the first device to switch to a GATT channel.

S2914. Transmission of the control command and the status information between the first device and the second device is performed through the GATT channel.

In this embodiment of this application, after the GATT channel is established between the first device and the second device, transmission of the control command and the status information between the first device and the second device being performed through the GATT channel may include: sending, by the second device to the first device through the GATT channel, the control command encrypted by using a session key (session key); and decrypting, by the first device, the control command by using the session key, to obtain the control command. The first device executes the control command and sends the status information encrypted by using the session key to the second device. The second device may decrypt the encrypted status information by using the session key to obtain the status information.

It should be understood that, for details about the process described in S2910 to S2913, reference should be made to the existing BLE provisioning procedure. For brevity, the details are not described herein again.

In an embodiment, after the second device discovers the first device, and before pairing and binding of the first device and the second device complete, the method 2900 further includes the following steps.

S2915. The second device requests a control mapping file and a details page of the first device from the server.

In an embodiment, the second device may obtain a Product ID of the first device from the connectable advertising packet, and the second device may request the control mapping file and the details page of the first device from the server.

For example, as shown in FIG. 9D, the control mapping file and the details page of the first device may include functional controls (for example, a turning on/turning off control and a timer) of the first device, pictures, and the like.

S2916. The second device sends a non-connectable advertising packet to the first device, where the non-connectable advertising packet carries the control command encrypted by using the encryption key of the application layer.

For example, as shown in FIG. 10C, in the process in which the mobile phone registers with the cloud as the proxy of the intelligent desk lamp, if the mobile phone detects an operation of tapping the control 906 by the user, the mobile phone may send the non-connectable advertising packet. The non-connectable advertising packet may carry the control command encrypted by using the encryption key of the application layer, and the control command is used to indicate the intelligent desk lamp to turn on. After receiving the non-connectable advertising packet, the intelligent desk lamp decrypts the encrypted control command to execute the control command. As shown in FIG. 10C, the intelligent desk lamp performs a turn-on operation.

S2917. The first device sends a non-connectable advertising packet to the second device, where the non-connectable advertising packet carries the status information encrypted by using the encryption key of the application layer.

S2918. The second device performs decryption by using the encryption key of the application layer, to obtain the status information and update the status information of the first device.

In this embodiment of this application, S2908 to S2913 and S2915 to S2918 may be performed concurrently. To be specific, after the second device discovers the first device and before pairing of the first device and the second device completes, the control command and the status information may be transmitted between the first device and the second device by using the non-connectable advertising packet.

For example, as shown in FIG. 10C, after the intelligent desk lamp turns on, the intelligent desk lamp may send the non-connectable advertising packet to the mobile phone, where the non-connectable advertising packet carries the status information encrypted by using the encryption key of the application layer, where the status information is used to indicate that the intelligent desk lamp is in the on state. After obtaining the non-connectable advertising packet, the mobile phone may decrypt the encrypted status information to obtain the status information of the intelligent desk lamp, so that the mobile phone may update the status information of the intelligent desk lamp (as shown in FIG. 10C, the mobile phone shows that the intelligent desk lamp is on).

For example, as shown in FIG. 11B, when the intelligent desk lamp detects that the user taps the switch of the intelligent desk lamp, the intelligent desk lamp changes from the on state to the off state. The intelligent desk lamp may send a non-connectable advertising packet to the mobile phone, where the non-connectable advertising packet carries the status information encrypted by using the encryption key of the application layer, and the status information is used to indicate that the intelligent desk lamp is in an off state. After obtaining the non-connectable advertising packet, the mobile phone may decrypt the encrypted status information to obtain the status information of the intelligent desk lamp, so that the mobile phone may update the status information of the intelligent desk lamp (as shown in FIG. 11B, the mobile phone shows that the intelligent desk lamp is off).

It should be understood that, after the second device registers with the cloud as the proxy of the first device, the second device may perform S2913. Then the second device and the first device perform transmission of the control command and the status information through the GATT channel.

In this embodiment of this application, the first device may send the connectable advertising packet to the second device through the first antenna, and the connectable advertising packet may carry the Product ID of the first device. In this way, it can be ensured that the first device is discovered only by the second device within the safe distance, and is not paired with a device in a neighbor's home. In addition, when the user wants to provision one device in a plurality of same devices, a probability of inappropriate pairing of the device can be greatly reduced. For example, there are a total of five intelligent lamps in a living room and a bedroom at home. In this case, the user wants to provision only an intelligent lamp in the living room. The first device sends a connectable advertising packet through the first antenna, so that the second device displays only the intelligent lamp in the living room rather than another intelligent lamp. In this way, it can be ensured that the user clearly knows that an intelligent lamp currently displayed on the second device is the intelligent lamp in the living room, thereby inappropriate pairing is avoided.

The Passkey or the OOB information may be carried in the connectable advertising packet sent by the first device to the second device through the first antenna, and therefore an additional hardware device is not required for out-of-band transmission. This reduces production costs, and security is improved. In addition, this can reduce provisioning time of the first device. Entering the Passkey by the user or numeric comparison is omitted. In this way, user experience is improved.

In addition, after discovering the first device, the second device may immediately control the first device by using the non-connectable advertising packet, and does not need to wait for device pairing and binding to control the first device. Device connection, pairing, and binding are implemented in background, and a foreground user may directly control the first device by using the second device, which greatly improves user experience.

Figure 30:
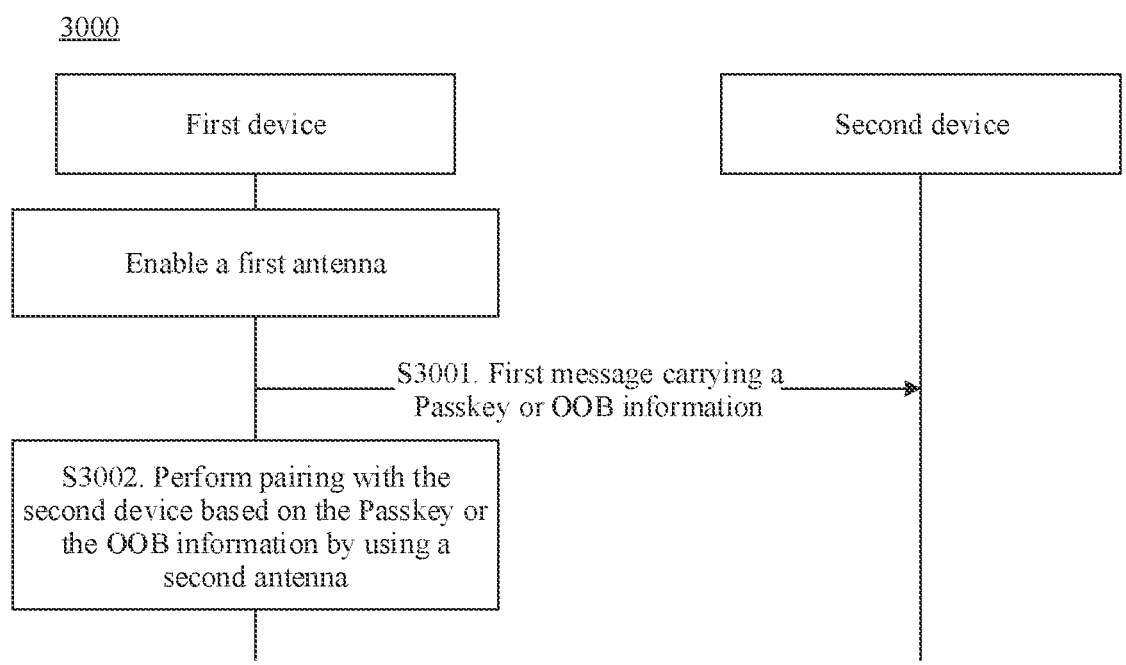
FIG. 30 is a schematic flowchart of another discovery and provisioning method according to an embodiment of this application.

FIG. 30 is a schematic flowchart of a discovery and provisioning method 3000 according to an embodiment of this application. The method 3000 may be executed by a first device and a second device. The first device is a device to be provisioned (for example, a BLE intelligent device). A wireless transmit power of the first device operating by using a first antenna is less than a wireless transmit power of the first device operating by using a second antenna. The method 3000 includes the following steps.

S3001. When the first device is in an unprovisioned state, the first device sends a first message through the first antenna, where the first message includes a Passkey or out-of-band OOB information.

Correspondingly, when a distance between the second device and the first device is less than or equal to a preset distance, the second device receives the first message sent by the first device, where the preset distance is a distance covered by a wireless transmit power of the first antenna in operation.

It should be understood that the first message in this embodiment of this application may be a message in the existing Bluetooth protocol (for example, a connectable advertising packet), or may be a message newly defined in a subsequent Bluetooth protocol. This is not limited in this embodiment of this application.

S3002. The first device performs Bluetooth pairing with the second device based on the Passkey or the OOB information by using the second antenna.

In this embodiment of this application, the first device sends the Passkey or the out-of-band OOB information through the first antenna, and therefore out-of-band transmission between the first device and the second device is not performed. As a result, an additional hardware device is not added to the first device or the second device; and entering the Passkey by a user or numeric comparison is omitted. In this way, user experience is improved and security is ensured.

Optionally, the first message is a connectable advertising packet.

Optionally, the Bluetooth pairing includes legacy pairing or secure connection pairing.

For legacy pairing (legacy pairing), a first device may send a Passkey to a second device by using a very short distance technology. The first device and the second device may generate a TK by using a Passkey, to perform identity authentication by using the TK in legacy pairing. Alternatively, OOB information sent by the first device to the second device by using the very short distance technology may carry the TK. In this case, the first device and the second device may directly perform identity authentication by using the TK in legacy pairing.

For secure connection pairing (secure connection pairing), a first device may send a Passkey to a second device by using a very short distance technology, so that the first device and the second device may perform identity authentication by using the Passkey in secure connection pairing. Alternatively, OOB information sent by the first device to the second device by using the very short distance technology may carry a device address of the first device, a random number, and a confirmation number. In this case, the first device and the second device may perform identity authentication by using the device address of the first device, the random number, and the confirmation number in secure connection pairing.

Optionally, the method 3000 further includes: Before the first device performs Bluetooth pairing with the second device based on the Passkey or the OOB information, the first device sends a device identifier of the first device to the second device through the first antenna.

In this embodiment of this application, the first device sends the device identifier of the first device through the first antenna. In this way, the first device can be prevented from being discovered by another remote device and from pairing with a device in a neighbors home. When there are a plurality of devices with a same device identifier, inappropriate pairing is also avoided.

Optionally, the device identifier of the first device is carried in the first message.

In this embodiment of this application, the first device may send the first message through the first antenna, and use the first message to carry the Passkey (or the out-of-band OOB information) and the device identifier of the first device. This helps reduce signaling overheads of the first device.

In an embodiment, the first device may also send the device identifier of the first device through the second antenna. After the first device is discovered by the second device, the first device may switch to the first antenna, and send the Passkey or the OOB information to the second device through the first antenna.

Optionally, the method 3000 further includes: The first device sends an encryption key to the second device through the first antenna; and after the first device is discovered by the second device, and before pairing of the first device and the second device completes, the first device sends status information encrypted by using the encryption key to the second device.

Optionally, the first device sends a non-connectable advertising packet to the second device, where the non-connectable advertising packet includes the status information encrypted by using the encryption key.

Optionally, the first device sends the status information encrypted by using the encryption key to the second device in response to a status update operation performed by the user on the first device.

Optionally, the first device sends the encryption key to the second device through the first antenna; and the second device is configured to send, after the first device is discovered by the second device and before pairing of the first device and the second device completes, a control command encrypted by using the encryption key to the first device.

Optionally, the second device sends a non-connectable advertising packet to the first device, where the non-connectable advertising packet includes the control command encrypted by using the encryption key.

Optionally, the second device displays a control interface of the first device after discovering the first device and before pairing with the first device completes, where the control interface is used to control the first device; and the second device sends the control command encrypted by using the encryption key to the first device in response to an operation on the control interface.

Optionally, the second device displays the control interface of the first device on a display screen after discovering the first device and before pairing with the first device completes. The control interface is used to control the first device, and the control interface further includes prompt information, where the prompt information is used to indicate that the first device is being provisioned.

In this embodiment of this application, after the first device is discovered by the second device, and before pairing of the first device and the second device completes, the first device and the second device may transmit the status information or the control command to each other by using the encryption key. The user does not need to wait for device pairing and binding to control the first device. Device connection, pairing, and binding are implemented in background, and a foreground user may directly control the first device by using the second device, which greatly improves user experience.

Optionally, the second device is further configured to obtain the device identifier of the first device after the first device is discovered; and the second device is further configured to obtain the control interface of the first device based on the device identifier of the first device.

Optionally, the encryption key is carried in the first message.

In this embodiment of this application, the first device may send the first message through the first antenna, where the first message carries the Passkey (or the out-of-band OOB information) and the encryption key. This helps reduce signaling overheads of the first device.

Optionally, the first message includes the Passkey (or the out-of-band OOB information), the device identifier of the first device, and the encryption key.

Figure 31A:
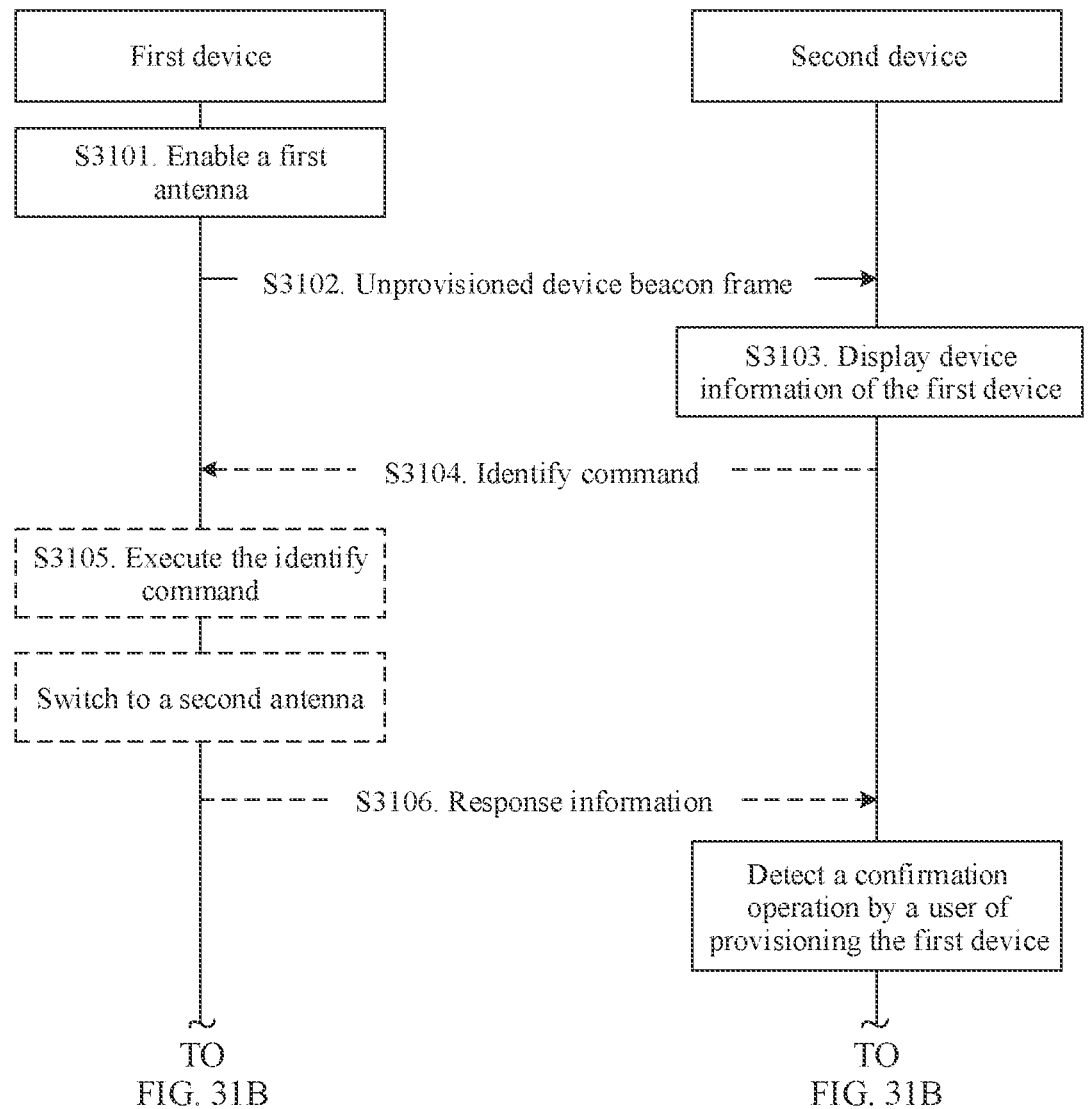
FIG. 31A and FIG. 31B are a schematic flowchart of another discovery and provisioning method according to an embodiment of this application.
Figure 31B:
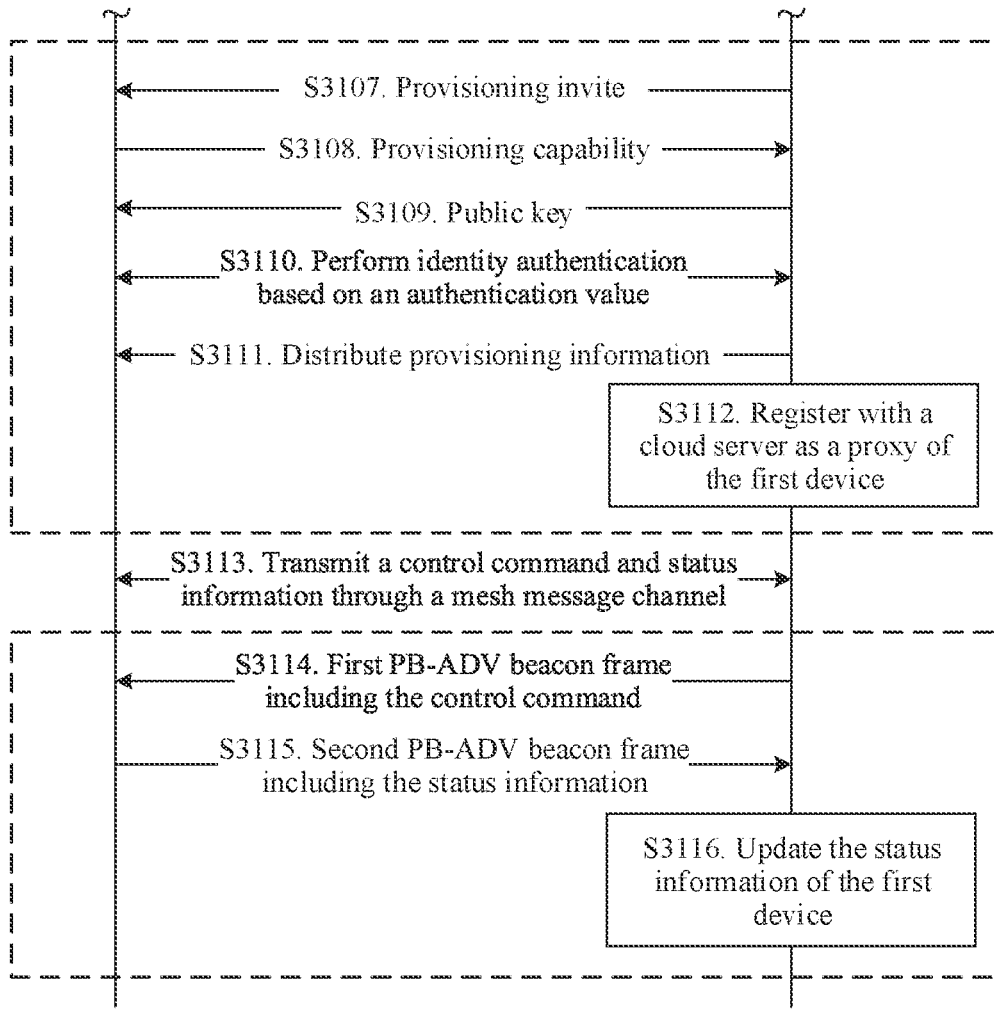

FIG. 31A and FIG. 31B are a schematic flowchart of a method 3100 for discovery and provisioning of a Bluetooth mesh device according to an embodiment of this application. The method 3100 may be performed by a first device and a second device. The first device may be the foregoing intelligent device, and the second device may be a provisioner (provisioner). In the method 3100, an example in which the second device is a mobile phone is used for description. The method 3100 includes the following steps.

S3101. The first device enables a first antenna.

In this embodiment of this application, the first device may include a first antenna and a second antenna. A wireless transmit power of the first device operating by using the first antenna is less than a transmit power of the first device operating by using the second antenna. For example, the first device may enable a physical first antenna by using a radio frequency switch, or the first device may enable a logical first antenna by using a register inside a chip.

In an embodiment, when the first device detects that the first device is powered on and the first device is in an unprovisioned state, the first device enables the first antenna by using a radio frequency switch.

It should be understood that, in this embodiment of this application, the wireless transmit power of the first device operating by using the first antenna being less than the wireless transmit power of the first device operating by using the second antenna may be understood as a minimum wireless transmit power of the first device operating by using the first antenna being less than a minimum wireless transmit power of the first device operating by using the second antenna.

It should be further understood that, in this embodiment of this application, the first device being in the unprovisioned state may include but is not limited to restoring factory settings or performing provisioning for the first time. For example, the first device stores a status variable, and a value of the status variable indicates a status of the first device. For example, the value of the status variable being "false" represents that the first device is in an unprovisioned state.

It should be further understood that the first device may include the first antenna and the second antenna. The two antennas may be switched by using the radio frequency switch. Isolation between the two antennas of the switch sometimes needs to meet an actual requirement. Therefore, there may be one switch or may be cascaded switches.

S3102. The first device sends an unprovisioned device beacon (unprovisioned device beacon) frame through the first antenna, where the unprovisioned device beacon frame carries a device identifier (for example, a Product ID) and an authentication value (AuthValue) of the first device.

In this embodiment of this application, the authentication value may be used for identity authentication (Authentication) in a provisioning process of the first device.

In an embodiment, the unprovisioned device beacon frame may also include a public key of the first device. The public key of the first device is used for exchanging public keys in the provisioning process.

In an embodiment, the unprovisioned device beacon frame may also include an encryption key. The encryption key may be used to encrypt, after the second device discovers the first device and before provisioning of the first device completes, an identify command, response information, a control command, and status information exchanged between the first device and the second device.

S3103. After receiving the unprovisioned device beacon frame, the second device may display device information of the first device on a display screen.

Optionally, if the unprovisioned device beacon frame sent by the first device through the first antenna carries the encryption key, the method 3100 further includes the following steps.

S3104. The second device sends the identify command encrypted by using the encryption key to the first device, where the control command is used to indicate the first device to identify the first device.

For example, if the first device is an intelligent desk lamp, after receiving the identify command, the intelligent desk lamp may blink for preset duration, so that the user determines that a device currently to be provisioned is a device close to the mobile phone.

S3105. After receiving the identify command encrypted by using the encryption key, the first device executes the identify command.

After receiving the identify command encrypted by using the encryption key, the first device may decrypt the identify command by using the encryption key to obtain the identify command, so that the first device executes the identify command.

S3106. The first device sends the response information for the identify command to the second device through the second antenna, where the response information is used to indicate that the first device successfully receives the identify command.

After the first device receives the identify command, the first device may send, to the second device, the response information (for example, acknowledge (acknowledge, ACK) information) encrypted by using the encryption key. The response information is used to indicate that the first device receives the identify command. After receiving the response information, the second device may prompt the user of a status that the first device is executing the identify command by using an animation on a display interface.

For example, as shown in FIG. 9C, the mobile phone may send the identify command to the intelligent desk lamp. In this case, the intelligent desk lamp may blink for the preset duration, to prompt the user that the intelligent desk lamp is a device currently to be provisioned. In addition, the intelligent desk lamp may further send the response information to the mobile phone, to prompt, on the display interface of the mobile phone by using the animation, the user that the intelligent desk lamp currently to be provisioned is blinking. The user may learn, by observing the animation on the mobile phone and the blinking intelligent desk lamp, that the device to be provisioned is a device close to the mobile phone.

In an embodiment, the first device may send the unprovisioned device beacon frame to the second device within first preset duration. Because the first device sends the unprovisioned device beacon frame by using a very short distance technology, a receiving success rate of the second device is low. Therefore, the first device may continuously send a plurality of same unprovisioned device beacon frames within preset duration through the first antenna. In this way, the success rate of receiving the unprovisioned device beacon frame by the second device is improved. In addition, the first device needs to receive the identify command sent by the second device through the first antenna within the first preset duration.

If the identify command sent by the second device is received by the first device within the first preset duration, the first device may switch to the second antenna when receiving the identify command, and execute the identify command.

If no identify command is received when the first preset duration ends, the first device may switch from the first antenna to the second antenna, so as to receive, within second preset duration through the second antenna, the identify command sent by the second device. If the identify command is received within the second preset duration, the first device may execute the identify command. Subsequently, the first device exchanges information or data with the second device through the second antenna.

If the first device does not receive, within the second preset duration, the identify command sent by the second device, the first device switches from the second antenna to the first antenna, and continues to send the unprovisioned device beacon frame through the first antenna within the first preset duration. In this way, the foregoing process is repeated until the first device receives the identify command sent by the second device.

In an embodiment, the first device may also receive the identify command of the second device through the first antenna after sending the unprovisioned device beacon frame. After receiving the identify command sent by the second device, the first device switches to the second antenna.

It should be understood that S3104 to S3106 are optional steps. Alternatively, after receiving the unprovisioned device beacon frame, the second device may directly send a provisioning invite to the first device.

S3107. The second device sends the provisioning invite to the first device in response to a confirmation operation performed by the user to provision the first device.

For example, as shown in FIG. 9C, after the mobile phone detects an operation of tapping the control 905 by the user, the mobile phone may send the provisioning invite to the intelligent desk lamp.

S3108. After receiving the provisioning invite, the first device sends a provisioning capability (provisioning capability) to the second device.

It should be understood that for description about a process in which the second device sends the provisioning invite to the first device and a process in which the first device sends the provisioning capability to the second device, reference should be made to the existing Bluetooth protocol. For brevity, details are not described herein.

It should be understood that, as described in S3106, a trigger condition for the first device to switch from the first antenna to the second antenna may be that the identify command sent by the second device is received. In this embodiment of this application, the trigger condition for the first device to switch from the first antenna to the second antenna may alternatively be that the first device receives the provisioning invite sent by the second device.

In an embodiment, the first device may send the unprovisioned device beacon frame to the second device within the first preset duration. Because the first device sends the unprovisioned device beacon frame by using the very short distance technology, the receiving success rate of the second device is low. Therefore, the first device may continuously send the plurality of same unprovisioned device beacon frames within the preset duration through the first antenna. In this way, the success rate of receiving the unprovisioned device beacon frame by the second device is improved. In addition, the first device needs to receive the provisioning invite sent by the second device through the first antenna within the first preset duration.

If the provisioning invite sent by the second device is received by the first device within the first preset duration, the first device may switch to the second antenna when receiving the provisioning invite, and execute the identify command.

If no provisioning invite is received when the first preset duration ends, the first device may switch from the first antenna to the second antenna, so as to receive, within second preset duration through the second antenna, the provisioning invite sent by the second device. If the provisioning invite is received within the second preset duration, the first device switches from the first antenna to the second antenna. In subsequent provisioning, information or data is exchanged between the first device and the second device.

If the first device does not receive, within the second preset duration, the provisioning invite sent by the second device, the first device switches from the second antenna to the first antenna, and continues to send the unprovisioned device beacon frame through the first antenna within the first preset duration. In this way, the foregoing process is repeated until the first device receives the provisioning invite sent by the second device.

S3109. The second device sends a public key to the first device.

In this embodiment of this application, the first device may send the public key of the first device to the second device through the first antenna. In this way, a case in which the first device transmits the public key of the first device in an out-of-band manner in a process of exchanging public keys is avoided.

In an embodiment, the first device may transmit the device identifier (or the device identifier and the authentication value) of the first device only by using a very short distance technology. If the unprovisioned device beacon frame does not carry the public key of the first device, before S3110, the first device may send the public key of the first device to the second device through in-band transmission or out-of-band transmission.

S3110. The first device and the second device perform identity authentication based on the authentication value.

It should be understood that for specific description about a process of identity authentication between the first device and the second device based on the authentication information, reference should be made to the existing Bluetooth protocol. For brevity, details are not described herein again.

In this embodiment of this application, the first device may send the authentication value to the second device through the first antenna. This avoids a case in which the first device and the second device perform authentication in manners of input OOB and output OOB in an identity authentication process, and there is no need to add an additional hardware device to the first device or the second device. Therefore, a manufacturer does not need to reconstruct a production line, and user input is omitted, which improves user experience. In addition, compared with security of static OOB or no OOB, security of the manner of sending the authentication value is higher.

S3111. The second device distributes provisioning data to the first device.

It should be understood that for description about a process in which the second device distributes the provisioning data to the first device, reference should be made to the existing Bluetooth protocol. For brevity, details are not described herein.

S3112. The second device registers with a cloud server as a proxy of the first device.

S3113. After the second device registers the first device with the cloud server, the control command and the status information is transmitted between the second device and the first device through a mesh message channel.

It should be understood that, after the second device connects the first device to a mesh network, the second device may send the control command encrypted by using a NetKey (NetKey) to the first device through the channel; or the second device may send the control command encrypted by using the NetKey and an AppKey (AppKey) to the first device through the channel. The first device may send the status information encrypted by using the NetKey to the second device through the channel, or the first device may send the status information encrypted by using the NetKey and the AppKey to the second device through the channel.

In an embodiment, if the first device sends the encryption key to the second device through the first antenna, before the second device discovers the first device and provisioning of the first device completes, the method 3100 further includes the following steps.

S3114. The second device sends a first PB-ADV beacon frame to the first device, where the first PB-ADV beacon frame includes the control command encrypted by using the encryption key.

In an embodiment, the first device may use the unprovisioned device beacon frame to carry the Product ID of the first device. After obtaining the Product ID of the first device, the second device may request a control mapping file and a details page (for example, a function or a picture included in the first device) of the first device from the server. After detecting the confirmation operation performed by the user to provision the first device, the second device may display a control interface of the first device based on the control mapping file and the details page.

For example, as shown in FIG. 9E, after the mobile phone detects an operation of tapping the control 906 by the user, the mobile phone may send the control command encrypted by using the encryption key to the intelligent desk lamp. The control command is used to indicate the intelligent desk lamp to turn on.

S3115. The first device may send a second PB-ADV beacon frame to the second device, where the second PB-ADV beacon frame includes the status information encrypted by using the encryption key.

S3116. The second device updates the status information of the first device.

For example, as shown in FIG. 9E, after the intelligent desk lamp turns on, the intelligent desk lamp may further send the status information encrypted by using the encryption key to the mobile phone, where the status information is used to indicate that the intelligent desk lamp is in the on state. After the mobile phone obtains the status information of the intelligent desk lamp, the mobile phone may update the status information of the intelligent desk lamp (as shown in FIG. 9E, the mobile phone shows that the intelligent desk lamp is on).

For example, as shown in FIG. 11B, when the intelligent desk lamp detects that the user taps the switch of the intelligent desk lamp, the intelligent desk lamp changes from the on state to the off state. The intelligent desk lamp may send the status information encrypted by using the encryption key to the mobile phone, where the status information is used to indicate that the intelligent desk lamp is in the off state. After the mobile phone obtains the status information of the intelligent desk lamp, the mobile phone may update the status information of the intelligent desk lamp (as shown in FIG. 11B, the mobile phone shows that the intelligent desk lamp is off).

In this embodiment of this application, S3107 to S3112 and S3114 to S3116 may be performed concurrently.

In this embodiment of this application, if the first device sends the encryption key to the second device through the first antenna, before the second device discovers the first device and provisioning of the first device completes, the user may directly control the first device by using the second device. In this way, the user does not need to wait for provisioning of the first device, which helps improve user experience.

An example in which the second device is a mobile phone is described above with reference to FIG. 31A and FIG. 31B. The following uses an example in which the second device is a mesh gateway for description with reference to FIG. 32A and FIG. 32B.

Figure 32A:
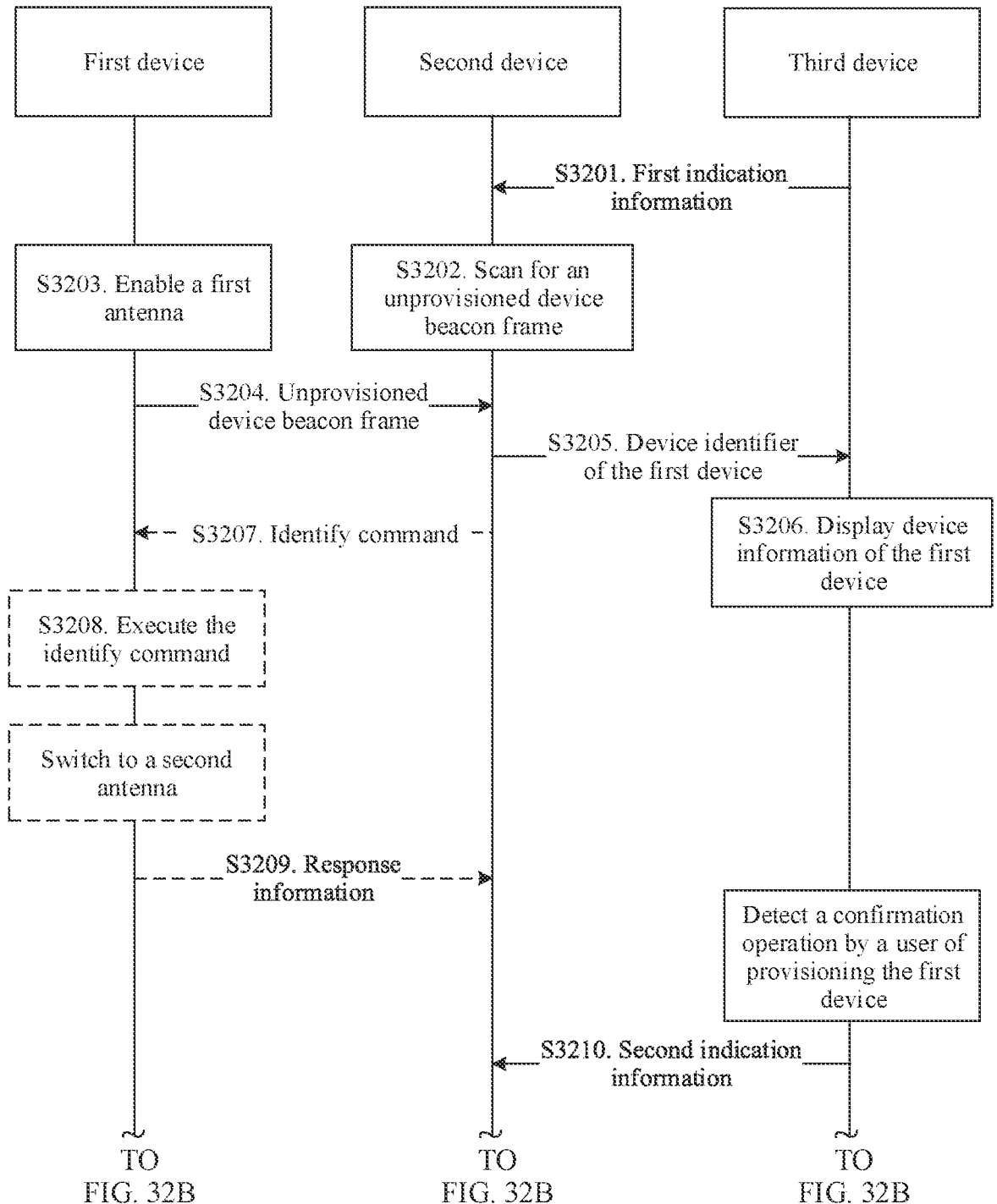
FIG. 32A and FIG. 32B are a schematic flowchart of another discovery and provisioning method according to an embodiment of this application.
Figure 32B:
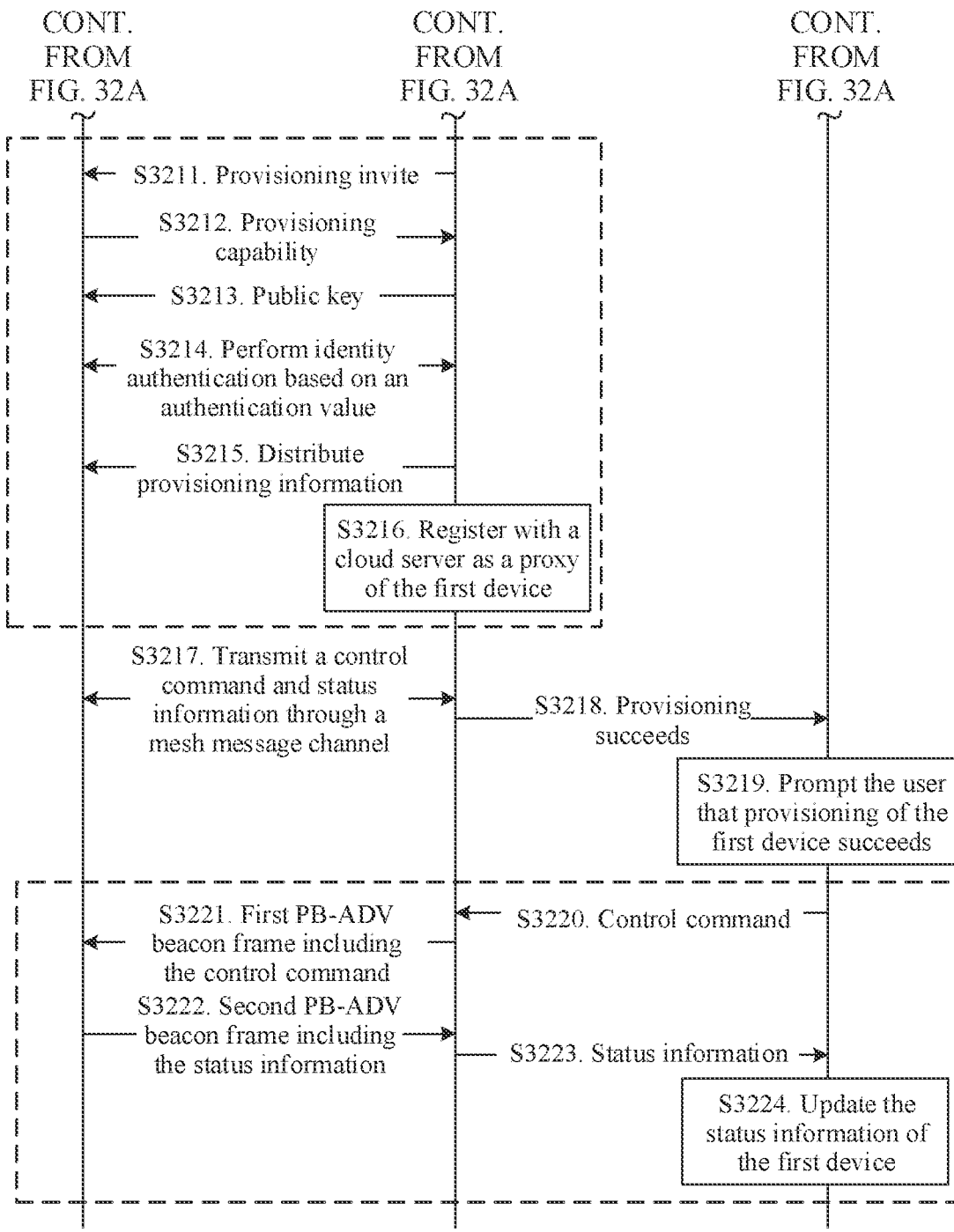

FIG. 32A and FIG. 32B are a schematic flowchart of a discovery and provisioning method 3200 according to an embodiment of this application. The method 3200 may be performed by a first device and a second device. The first device may be the foregoing intelligent device, and the second device may be a provisioner (provisioner). In the method 3200, an example in which the second device is a mesh gateway is used for description. The method 3200 includes the following steps.

S3201. The second device receives first indication information from a third device (for example, a mobile phone), where the first indication information is used to indicate the second device to start scanning for an unprovisioned device beacon frame sent by an ambient device.

In an embodiment, after the third device detects a preset operation of a user, the third device may send the first indication information to the second device.

For example, as shown in FIG. 9B, after the mobile phone detects tapping "add a device" by the user in the App 3, the mobile phone may send the first indication information to the mesh device. Alternatively, after the mobile phone scans the NFC tag on the first device, the mobile phone may send the first indication information to the mesh device.

S3202. After receiving the first indication information, the second device starts to scan for the unprovisioned device beacon frame sent by the ambient device.

S3203. The first device enables a first antenna.

S3204. The first device sends an unprovisioned device beacon (unprovisioned device beacon) frame through the first antenna, where the unprovisioned device beacon frame carries a device identifier (for example, a Product ID) and an authentication value (AuthValue) of the first device.

It should be understood that for details of S3203 and S3204, reference should be made to the description of S3101 and S3102. For brevity, the details are not described herein again.

S3205. After receiving the unprovisioned device beacon frame, the second device sends the device identifier of the first device to the third device.

S3206. The third device displays device information of the first device on a display screen.

For example, after receiving the device identifier that is of the first device and that is sent by the second device, the third device may request, from a server, information such as a control mapping file and a details page (for example, a function and a picture included in the first device) of the first device, and a device type of the first device. For example, as shown in FIG. 9C, the mobile phone may display the picture of the intelligent desk lamp and the device type.

Optionally, if the first device sends an encryption key to the second device by using the first antenna, the method 3200 further includes the following steps.

S3207. The second device sends an identify command encrypted by using the encryption key to the first device, where the control command is used to indicate the first device to identify the first device.

S3208. After receiving the identify command encrypted by using the encryption key, the first device executes the identify command.

S3209. The first device sends response information for the identify command to the second device through a second antenna, where the response information is used to indicate that the first device successfully receives the identify command.

It should be understood that for details of S3207 to S3209, reference should be made to the description of S3104 to S3106. For brevity, the details are not described herein again.

It should be further understood that, after sending the identify command encrypted by using the encryption key to the first device, the second device may further send an indication, to the third device, that the first device is executing the identify command. After receiving the indication of the second device, the third device may show that the first device is discovered in a pop-up window. After determining that an animation of the first device displayed on the third device is consistent with an animation of executing the identify command by the first device, the user may click "Connect". When detecting a confirmation operation by the user of provisioning the first device (for example, as shown in FIG. 12B, an operation by the user of tapping the connect control 1202), the third device sends second indication information to the second device.

S3210. When detecting the confirmation operation by the user of provisioning the first device, the third device sends the second indication information to the second device, where the second indication information is used to indicate to provision the first device.

It should be understood that an interaction manner between the second device and the third device is not limited in this embodiment of this application. For example, the second device and the third device may exchange data or signaling through an IP connection.

S3211. The second device sends a provisioning invite to the first device in response to receiving the second indication information.

S3212. After receiving the provisioning invite, the first device sends a provisioning capability to the second device.

S3213. The second device sends a public key to the first device.

S3214. The first device and the second device perform identity authentication based on the authentication value.

S3215. The second device distributes provisioning data to the first device.

S3216. The second device registers with a cloud server as a proxy of the first device.

S3217. After the second device registers the first device with the cloud server, a control command and status information is transmitted between the second device and the first device through a mesh message channel.

It should be understood that for details of S3211 to S3217, reference should be made to the description of S3107 to S3113. For brevity, the details are not described herein again.

S3218. The second device sends an indication, to the third device, that provisioning of the first device succeeds.

S3219. The third device prompts the user that provisioning of the first device succeeds.

After the third device prompts the user that provisioning of the first device succeeds, the user may send the control command to the first device by using the third device. For example, the third device may send the control command to the second device through the IP connection. After receiving the control command, the second device may send the control command encrypted by using a NetKey (or the NetKey and an AppKey) to the first device through the mesh message channel.

In an embodiment, if the first device sends the encryption key to the second device through the first antenna, before the second device discovers the first device and provisioning of the first device completes, the method 3200 further includes the following steps.

S3220. The third device sends the control command to the second device.

S3221. The second device sends a first PB-ADV beacon frame to the first device, where the first PB-ADV beacon frame includes the control command encrypted by using the encryption key.

In an embodiment, the third device may send the control command to the second device through the IP connection. After receiving the control command, the second device may send the control command encrypted by using the encryption key to the first device. The first device may decrypt the control command based on the encryption key, to obtain and execute the control command.

As shown in FIG. 12D, when the mobile phone detects an operation of tapping the control 1203 by the user, the mobile phone may send the control command to the mesh gateway through a local network or the cloud. After receiving the control command sent by the mobile phone, the mesh gateway may send the control command encrypted by using the encryption key to the smoke sensor. After receiving the control command encrypted by using the encryption key, the smoke sensor may decrypt the control command by using the encryption key, to obtain the control command. Then the smoke sensor can execute the control command.

S3222. The first device may send a second PB-ADV beacon frame to the second device, where the second PB-ADV beacon frame includes the status information encrypted by using the encryption key.

S3223. The second device may send the status information to the third device.

In an embodiment, the second device may obtain the status information after decrypting, based on the encryption key, the status information encrypted by using the encryption key, to send the status information to the third device through the IP connection.

S3224. The third device updates the status information of the first device.

As shown in FIG. 12D, after the smoke sensor turns on, the smoke sensor may further send the status information encrypted by using the encryption key to the mesh gateway, where the status information is used to indicate that the smoke sensor is in a normal state. The mesh gateway obtains the status information after decrypting the encrypted status information. The mesh gateway may send the status information to the mobile phone. The mobile phone may update the status of the smoke sensor. As shown in FIG. 12D, the display interface of the mobile phone shows that the smoke sensor is in the normal state.

It should be understood that S3211 to S3216 and S3220 to S3224 may be performed concurrently.

In this embodiment of this application, if the first device sends the encryption key to the second device through the first antenna, before the second device discovers the first device and provisioning of the first device completes, the second device may send the device identifier of the first device to the third device. The third device may display a control interface of the first device based on the device identifier of the first device, so that the user can directly control the first device by using the third device. In this way, a problem that the user cannot control the device when the user waits for provisioning of the first device can be avoided, which helps improve user experience.

Figure 33:
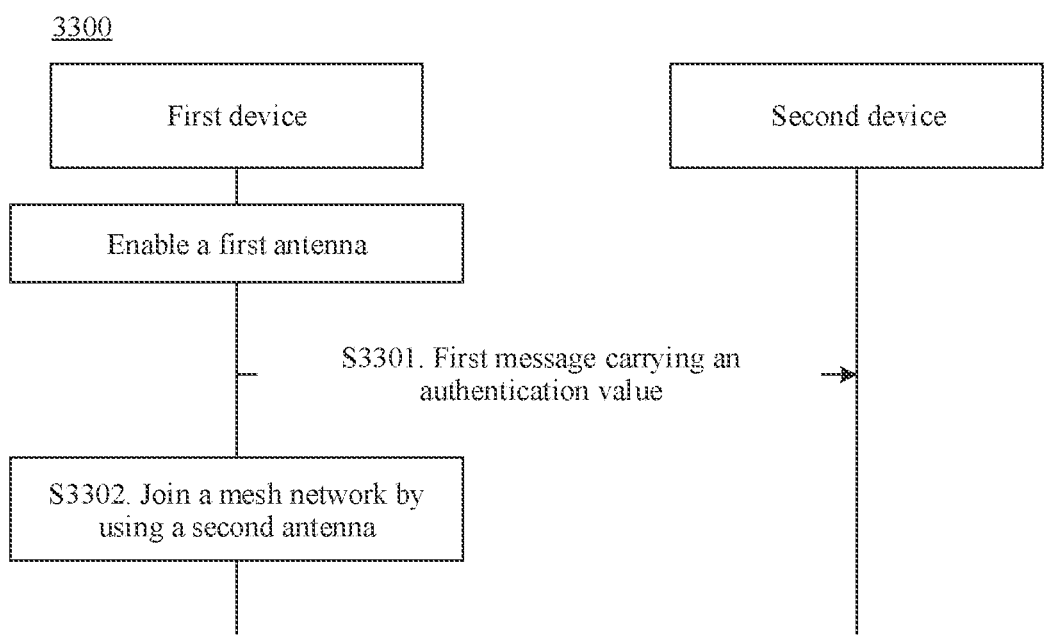
FIG. 33 is a schematic flowchart of another discovery and provisioning method according to an embodiment of this application.

FIG. 33 is a schematic flowchart of a discovery and provisioning method 3300 according to an embodiment of this application. The method 3300 may be implemented by a first device and a second device. The first device includes a first antenna and a second antenna. A wireless transmit power of the first device operating by using the first antenna is less than a wireless transmit power of the first device operating by using the second antenna. The second device may be a provisioner (for example, a mobile phone or a mesh gateway). The method 3300 includes the following steps.

S3301. When the first device is in an unprovisioned state, the first device sends a first message through the first antenna, where the first message includes an authentication value.

Content included in the first message may alternatively be information transmitted through OOB in a subsequent Bluetooth mesh protocol.

Correspondingly, when a distance between the second device and the first device is less than or equal to a preset distance, the second device receives the first message sent by the first device, where the preset distance is a distance covered by a wireless transmit power of the first antenna in operation.

S3302. The first device joins a mesh network of the second device based on the authentication value by using the second antenna.

In this embodiment of this application, the first device may transmit the authentication value in plaintext by using a very short distance technology. This avoids a case in which the first device and the second device perform authentication in manners of input OOB and output OOB in an identity authentication process, and there is no need to add an additional input or input hardware device to the first device or the second device. Therefore, a manufacturer does not need to reconstruct a production line, and user assistance in identity authentication is omitted, which improves user experience. In addition, compared with static OOB or no OOB, security of the manner of transmitting the authentication value is higher.

Optionally, the method 3300 further includes: The first device sends an encryption key through the first antenna; and after the first device is discovered by the second device, and before the first device joins the mesh network, the first device sends status information encrypted by using the encryption key to the second device.

Optionally, after the first device is discovered by the second device, and before the first device joins the mesh network, the first device sends a second message to the second device, where the second message includes the status information encrypted by using the encryption key.

Optionally, the second message is a PB-ADV beacon frame.

In this embodiment of this application, the first device may further transmit the encryption key in plaintext by using the very short distance technology. In this way, after the first device is discovered by the second device and before provisioning of the first device completes, a control command and the status information may be transmitted between the first device and the second device. The user may directly control the first device by using the second device. In this way, the user does not need to wait for provisioning of the first device, which improves user experience.

Optionally, the method 3300 further includes: The first device sends the encryption key through the first antenna; and after the first device is discovered by the second device, and before the first device joins the mesh network, the first device receives the control command that is sent by the second device and that is encrypted by using the encryption key.

Optionally, after the first device is discovered by the second device, and before the first device joins the mesh network, the first device receives a third message sent by the second device, where the third message includes the control command encrypted by using the encryption key.

Optionally, the third message is a PB-ADV beacon frame.

Optionally, the method 3300 further includes: The second device displays a control interface of the first device on a display screen after discovering the first device and before connecting the first device to the mesh network, where the control interface is used to control the first device; and in response to an operation on the control interface, the second device sends the control command encrypted by using the encryption key to the first device.

Optionally, the method 3300 further includes: The second device displays the control interface of the first device on the display screen after discovering the first device and before connecting the first device to the mesh network. The control interface is used to control the first device, and the control interface further includes prompt information, where the prompt information is used to indicate that the first device is being provisioned.

Optionally, the method 3300 further includes: The second device obtains a device identifier of the first device after discovering the first device; and the second device obtains the control interface of the first device based on the device identifier of the first device.

In this embodiment of this application, if the first device sends the encryption key to the second device through the first antenna, before the second device discovers the first device and the first device accesses the mesh network, the user may directly control the first device by using the second device. In this way, the user does not need to wait for provisioning of the first device, which helps improve user experience.

Optionally, the method 3300 further includes: After discovering the first device, the second device sends an identify command encrypted by using the encryption key to the first device; the first device obtains and executes the identify command based on the encryption key; and the first device sends response information encrypted by using the encryption key to the second device, where the response information is used to inform the user that the first device is executing the identify command.

In this embodiment of this application, the second device may send the identify command encrypted by using the encryption key to the first device. In this way, it can be convenient for the user to determine that the first device to be provisioned is a device close to the second device, and a man-in-the-middle attack by using an amplifier is avoided.

Optionally, the first device switches from the first antenna to the second antenna in response to receiving the identify command.

Optionally, the first message includes the encryption key.

In this embodiment of this application, the first message may include the authentication value and the encryption key. This helps reduce signaling overheads of the first device.

Optionally, the method 3300 further includes: Before joining the mesh network of the second device based on the authentication value, the first device sends the device identifier of the first device through the first antenna. Correspondingly, when the distance between the second device and the first device is less than or equal to the preset distance, the second device receives the device identifier of the first device sent by the first device.

In this embodiment of this application, the first device may transmit the device identifier of the first device by using the very short distance technology. In this way, the first device can be prevented from being discovered by another remote device and from pairing with a device in a neighbor's home. In addition, inappropriate pairing caused by the user when there are a plurality of devices having a same product ID can be prevented.

Optionally, the first message includes the device identifier of the first device.

In this embodiment of this application, the first message may include the device identifier of the first device and the authentication value. This helps reduce signaling overheads of the first device.

Optionally, the method 3300 further includes: Before joining the mesh network, the first device sends a public key of the first device through the first antenna. Correspondingly, when the distance between the second device and the first device is less than or equal to the preset distance, the second device receives the public key of the first device sent by the first device.

In this embodiment of this application, the first device may also transmit the public key of the first device by using the very short distance technology. This avoids that the first device performs out-of-band transmission in exchanging public keys.

Optionally, the first message includes the public key of the first device.

In this embodiment of this application, the first message may include the public key of the first device and the authentication value. This helps reduce signaling overheads of the first device.

Optionally, the second device is a mesh gateway, and the method 3300 further includes: Before the second device receives the first message, a third device sends first indication information to the mesh gateway, where the first indication information is used to indicate the mesh gateway to start scanning for the first message.

Optionally, the method 3300 further includes: Before the second device connects the first device to the mesh network, the third device sends second indication information to the second device in response to an operation by the user, where the second indication information is used to indicate to connect the first device to the mesh network.

Optionally, the method 3300 further includes: The second device sends a provisioning invite to the first device; the first device sends a provisioning capability to the second device in response to receiving the provisioning invite; the first device receives the public key of the first device that is sent by the second device; the first device performs identity authentication with the second device based on the authentication value; and the second device distributes provisioning data to the first device.

Optionally, the first device switches from the first antenna to the second antenna in response to receiving the provisioning invite.

Optionally, the first message is an unprovisioned device beacon frame.

Optionally, the first message includes the device identifier of the first device, the public key of the first device, the authentication value, and the encryption key.

Figure 34:
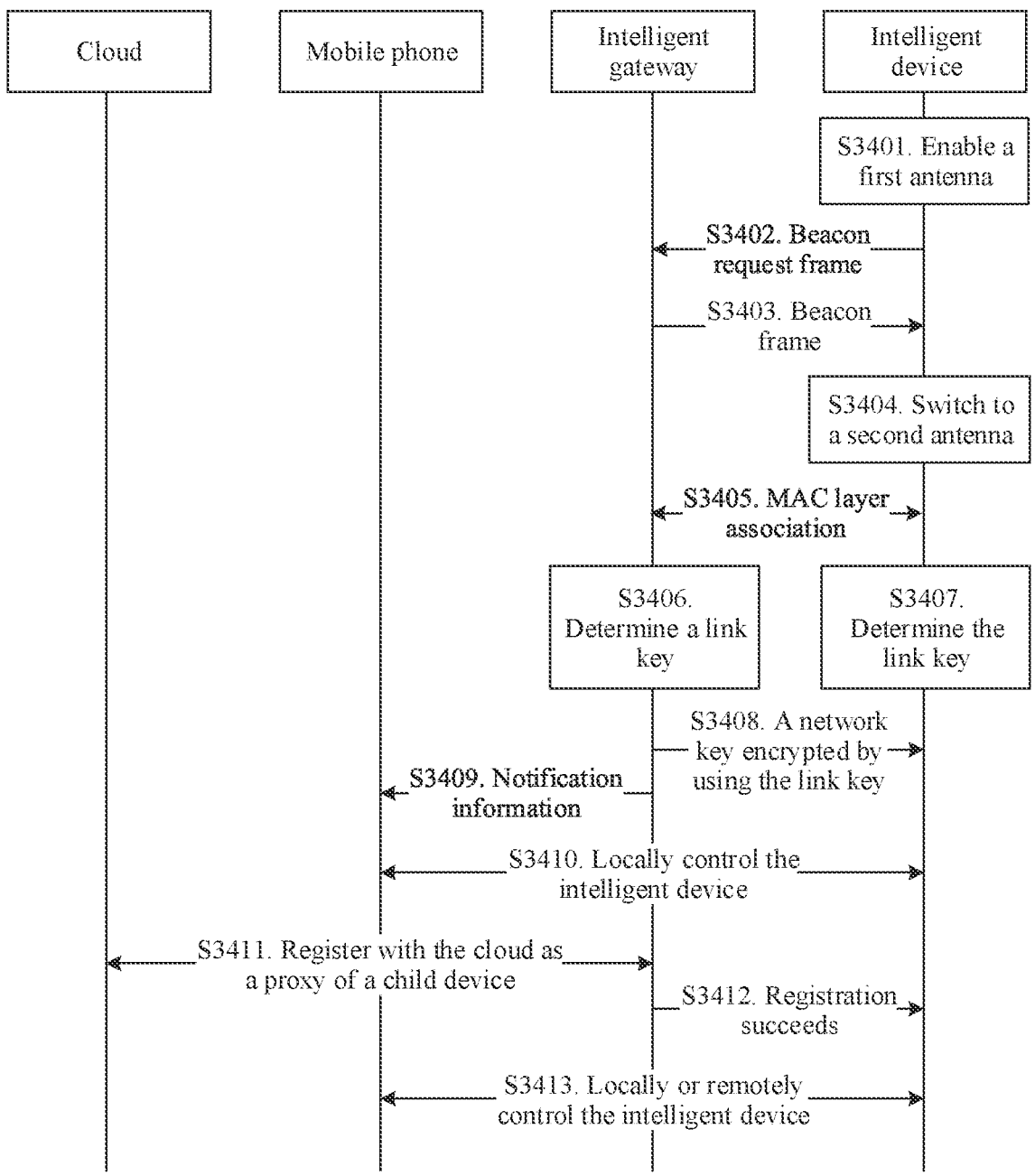
FIG. 34 is a schematic flowchart of another discovery and provisioning method according to an embodiment of this application.

FIG. 34 is a schematic flowchart of a method 3400 for discovery and provisioning of a ZigBee device according to an embodiment of this application. The method 3400 may include the following steps.

S3401. The first device enables a first antenna.

For example, the first device includes a button. When the first device detects that a user taps the button, the first device enables the first antenna.

In this embodiment of this application, the first device may include the first antenna and a second antenna. A wireless transmit power of the first device operating by using the first antenna is less than a transmit power of the first device operating by using the second antenna. For example, the first device may enable a physical first antenna by using a radio frequency switch, or the first device may enable a logical first antenna by using a register inside a chip.

In an embodiment, when the first device detects that the first device is powered on and the first device is in an unprovisioned state, the first device enables the first antenna by using a radio frequency switch. If the first device is not provisioned within preset duration (for example, 10 minutes), the first device stops sending a beacon request (beacon request) frame through the first antenna. When the first device is powered on again, or after the user taps the button, the beacon request frame may be sent again through the first antenna.

It should be understood that, in this embodiment of this application, the wireless transmit power of the first device operating by using the first antenna being less than the wireless transmit power of the first device operating by using the second antenna may be understood as a minimum wireless transmit power of the first device operating by using the first antenna being less than a minimum wireless transmit power of the first device operating by using the second antenna.

It should be further understood that, in this embodiment of this application, the first device being in the unprovisioned state may include but is not limited to restoring factory settings or performing provisioning for the first time. For example, the first device stores a status variable, and a value of the status variable indicates a status of the first device. For example, the value of the status variable being "false" represents that the first device is in an unprovisioned state.

It should be further understood that the first device may include the first antenna and the second antenna. The two antennas may be switched by using the radio frequency switch. Isolation between the two antennas of the switch sometimes needs to meet an actual requirement. Therefore, there may be one switch or may be cascaded switches.

S3402. The first device sends the beacon request (beacon request) frame through the first antenna, where the beacon request frame is used to query whether there is an ambient second device that can help the first device join a network, and the beacon request frame carries an install code.

In an embodiment, the beacon request frame may further include a device identifier (for example, a Product ID) of the first device.

In an embodiment, the beacon request frame is sent to an intelligent gateway through the first antenna, where the beacon request frame carries the install code and is signed by using a private key.

In this embodiment of this application, the first device may transmit the install code in plaintext within a safe distance while OOB or a user operation is avoided. Therefore, additional hardware costs in the first device are avoided. In addition, the first device may be prevented from being discovered by and paired with an intelligent gateway device in a neighbor's home. When there are a plurality of devices of a same type at home, interference between the plurality of devices with a same Product ID may be avoided.

For example, the second device may be a coordinator (for example, an intelligent gateway) or a router.

The following uses an example in which the second device is an intelligent gateway for description.

S3403. After receiving the beacon request frame, the intelligent gateway sends a beacon frame to the first device, where the beacon frame indicates that the intelligent gateway is a device that can connect the first device to a ZigBee network.

In an embodiment, if the beacon request frame carries the install code and is signed by using a private key, the intelligent gateway may verify a signature by using a preset public key, to obtain the install code.

It should be understood that the foregoing process in which the first device signs by using the private key and the intelligent gateway verifies the signature by using the public key is performed for authentication between the first device and the intelligent gateway.

S3404. After receiving the beacon frame sent by the intelligent gateway, the first device switches from the first antenna to the second antenna.

In an embodiment, the first device may send the beacon request frame to the intelligent gateway within first preset duration. Because the first device sends the beacon request frame by using a very short distance technology, a receiving success rate of the intelligent gateway is low. Therefore, the first device may continuously send a plurality of same beacon request frames within preset duration through the first antenna. In this way, the success rate of receiving the beacon request frame by the intelligent gateway is improved. In addition, the first device needs to receive the beacon frame sent by the intelligent gateway through the first antenna within the first preset duration.

If the beacon frame sent by the intelligent gateway is received by the first device within the first preset duration, the first device may switch to the second antenna when receiving the beacon frame.

If the beacon frame is not received when the first preset duration ends, the first device may switch from the first antenna to the second antenna, so as to receive, within second preset duration through the second antenna, the beacon frame sent by the intelligent gateway. If the beacon frame is received within the second preset duration, the first device joins the ZigBee network by using the second antenna.

If the first device does not receive, within the second preset duration, the beacon frame sent by the intelligent gateway, the first device switches from the second antenna to the first antenna, and continues to send the beacon request frame through the first antenna within the first preset duration. In this way, the foregoing process is repeated until the first device receives the beacon frame sent by the intelligent gateway, and then the first device switches to the second antenna.

S3405. Perform media access control (media access control, MAC) layer association between the first device and the intelligent gateway.

In an embodiment, a process of MAC association between the first device and the intelligent gateway includes the following steps. The first device sends an association request (association request) frame to the intelligent gateway; and after the intelligent gateway receives the association request frame, the intelligent gateway sends an association response (association response) frame to the first device.

In an embodiment, a trigger condition for the first device to switch from the first antenna to the second antenna may be that the first device receives the beacon frame sent by the intelligent gateway, or may be that the first device receives the association response frame sent by the intelligent gateway.

It should be understood that MAC layer association between the first device and the intelligent gateway may also be understood as connection establishment between the first device and the intelligent gateway.

S3406. The intelligent gateway determines a pre-configured link key based on the obtained install code.

S3407. The first device determines the pre-configured link key based on the install code.

It should be understood that a sequence of S806 and S807 is not limited.

It should be further understood that, for a manner of determining the pre-configured link key based on the install code by the intelligent gateway and the first device, reference should be made to practice in the existing technologies. This is not limited in this embodiment of this application.

For example, an install code is composed of 128-bit random data and 16-bit cyclic redundancy check (cyclic redundancy check, CRC), and the intelligent gateway and the first device may generate a pre-configured link key by using the Hash function.

In an embodiment, the first device may also use the beacon request frame sent by using a very short distance technology to carry the pre-configured link key.

S3408. The intelligent gateway encrypts a network key by using the pre-configured link key, and sends the network key encrypted by using the pre-configured link key to the first device.

In this embodiment of this application, the network key may be allocated by the intelligent gateway to the first device. After receiving the network key encrypted by using the pre-configured link key, the first device may decrypt the encrypted network key by using the install code, to obtain the network key. In this way, the first device joins the ZigBee network provided by the intelligent gateway. In this case, the intelligent gateway can directly control an intelligent device.

S3409. The intelligent gateway sends notification information to a mobile phone, where the notification information is used to notify that the first device accesses the intelligent gateway.

In an embodiment, the notification information may carry the Product ID of the first device.

S3410. The mobile phone may locally control the first device.

That the mobile phone locally controls the first device may be understood as that when the mobile phone and the intelligent gateway are within a specific distance, the mobile phone may send a control command to the intelligent gateway, so that the intelligent gateway may send the control command to the first device by using ZigBee.

In this embodiment of this application, after the mobile phone receives the notification information, and before the intelligent gateway registers with a cloud as a proxy of the first device, the mobile phone may request a control mapping file and a details page of the first device from the server based on the product ID in the notification information. For example, as shown in FIG. 14B, the mobile phone may display the related control functions (for example, the turning on/turning off control and timing) of the intelligent desk lamp. In an embodiment, the mobile phone may further obtain provisioning progress of the first device (for example, the intelligent desk lamp) from the intelligent gateway, so that the provisioning progress of the intelligent desk lamp can be displayed to the user on the control interface of the intelligent desk lamp, as shown in FIG. 14B and FIG. 14C.

In an embodiment, after the mobile phone detects a control command from the user (for example, the mobile phone detects that the user taps "turn on"), the mobile phone may send the control command to the first device through the intelligent gateway, so that the intelligent desk lamp executes the control command.

It should be understood that an encryption manner between the mobile phone and the intelligent gateway is not limited in this embodiment of this application. For example, after the intelligent gateway is added to the mobile phone, the mobile phone may bind, in the cloud, a logged-in account of the mobile phone to the intelligent gateway. After completing binding the intelligent gateway, the cloud may send a token obtained after account binding to the mobile phone and the intelligent gateway. When sending the control command to the intelligent gateway, the mobile phone may encrypt the control command by using the token. After receiving the control command encrypted by using the token, the intelligent gateway may decrypt the control command to obtain the control command. When the intelligent gateway sends the control command to the first device, the control command may be encrypted by using the network key.

After the status of the intelligent desk lamp changes (for example, the intelligent desk lamp detects the operation of turning on the intelligent desk lamp by the user), the intelligent desk lamp may send the status information to the mobile phone through the intelligent gateway, where the status information is used to indicate that the intelligent desk lamp is on. After receiving the status information, the mobile phone may update the status of the intelligent desk lamp. For example, the intelligent desk lamp may send the status information encrypted by using the network key to the intelligent gateway, and the intelligent gateway may decrypt the status information by using the network key, to obtain the status information. The intelligent gateway can send the status information encrypted by using the token to the mobile phone. The mobile phone may decrypt the encrypted status information by using the token to obtain the status information. Therefore, the mobile phone can update the status of the intelligent desk lamp displayed on the interface.

In this embodiment of this application, after the first device accesses the intelligent gateway, the intelligent gateway may immediately notify the mobile phone, so that the mobile phone can immediately open a control page of the first device, and the user can immediately use the mobile phone to control the first device. A time-consuming cloud registration process is performed in background, so that the user is unaware of the process. Because time spent on waiting for cloud registration is saved, user experience is improved.

S3411. The intelligent gateway registers with the cloud as the proxy of the first device.

After the intelligent gateway registers the first device with the cloud, the cloud may bind the first device, the intelligent gateway, and the account of the user. In an implementation, the intelligent gateway may send the device identifier of the first device to the mobile phone. After obtaining the device identifier of the first device, the mobile phone may bind the user account, the intelligent gateway, and the first device on the cloud. In another implementation, because the mobile phone authenticates the intelligent gateway, the intelligent gateway may directly send the device identifier of the first device to the cloud, so that the cloud binds the user account, the intelligent gateway, and the first device. After the first device is registered with the cloud, the user may view the intelligent gateway and the first device connected to the intelligent gateway on the mobile phone, and remotely control the first device.

It should be understood that, in this embodiment of this application, the account of the user may be an account logged in by the user to the mobile phone, for example, a Huawei account.

S3412. After completing registering with the cloud as the proxy of the first device, the intelligent gateway notifies the first device that registration succeeds.

S3413. The mobile phone may locally or remotely control the first device.

After the first device accesses the intelligent gateway and the intelligent gateway registers with the cloud as the proxy of the first device, the mobile phone may locally or remotely control the first device. For example, when in a company, the user may control an intelligent air conditioner at home by using the mobile phone, so that the intelligent air conditioner turns on in advance. The mobile phone may send a control command to the cloud, the cloud may send the control command to the intelligent gateway, and the intelligent gateway may send the control command encrypted by using a network key to the intelligent air conditioner.

In an embodiment, the foregoing S3409 to S3413 are optional steps. After the first device accesses the ZigBee gateway, the user may directly control the first device by using the intelligent gateway. For example, the intelligent gateway includes a switch, and the first device is an intelligent desk lamp. In this case, the user may control the intelligent desk lamp by tapping the switch on the intelligent gateway, so that the intelligent desk lamp turns on or off. For another example, the mobile phone and the intelligent gateway are in a same local area network. The intelligent gateway has a plurality of switches. In this case, the user may scan a configuration website on the intelligent gateway by using the mobile phone, and configure a correspondence between the switch and the first device on the website. The user may configure a switch 1 to control an intelligent desk lamp, a switch 2 to control a temperature sensor, a switch 3 to control a robot vacuum cleaner, and the like on the website. After configuration completes, the mobile phone may send configuration information of the first device and the switch to the intelligent gateway, so that the intelligent gateway can control the first device.

Figure 35A:
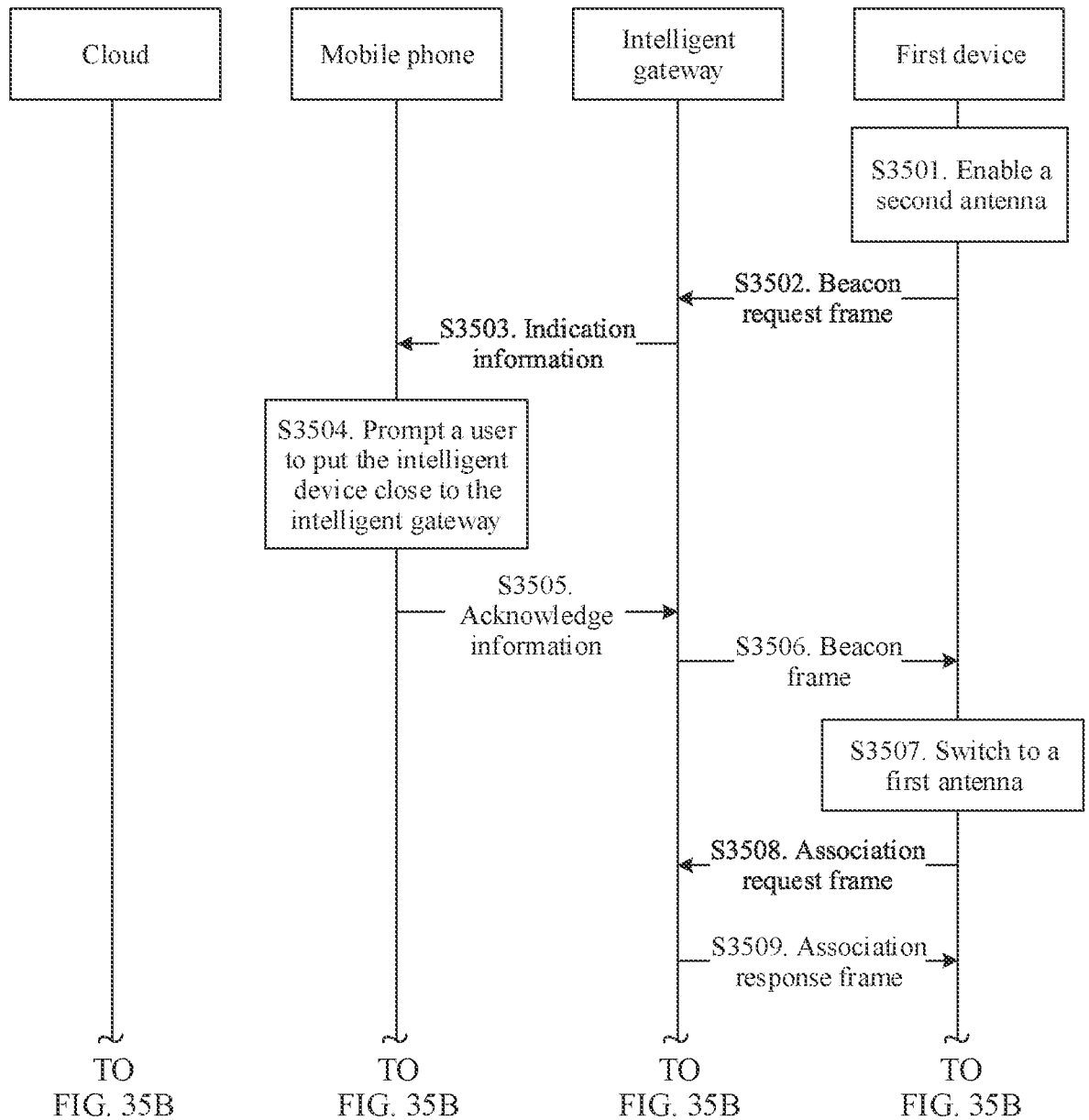
FIG. 35A and FIG. 35B are a schematic flowchart of another discovery and provisioning method according to an embodiment of this application.
Figure 35B:
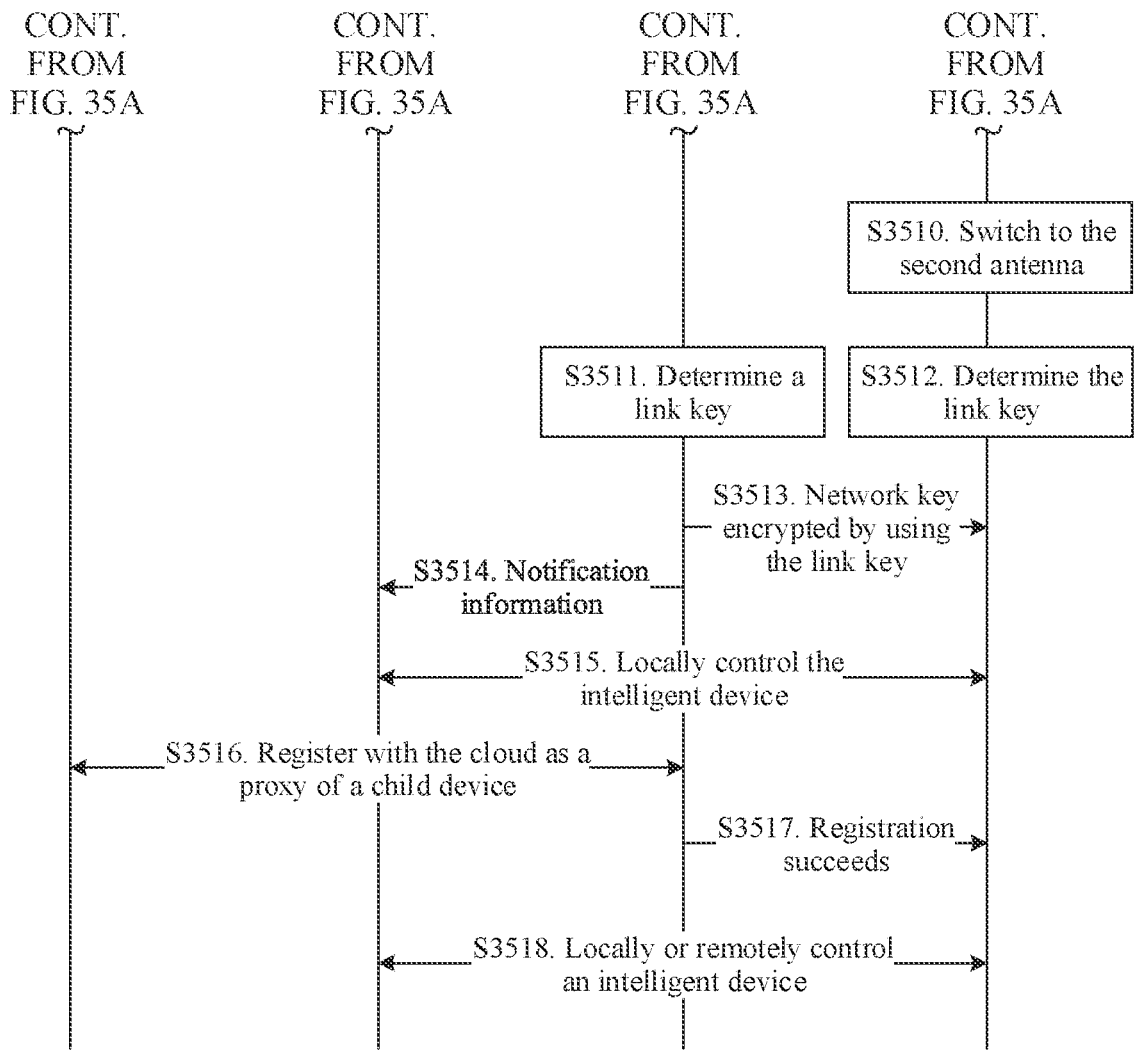

FIG. 35A and FIG. 35B are a schematic flowchart of a discovery and provisioning method 3500 according to an embodiment of this application. The method 3500 may include the following steps.

S3501. The first device enables a second antenna.

It should be understood that, for details about a process in which the first device enables the second antenna, reference should be made to the description about the process in which the first device enables the first antenna in S3401. For brevity, the details are not described herein again.

S3502. The first device sends a beacon request frame through the second antenna, where the beacon request frame is used to query whether there is an ambient second device that can help the first device join a network.

It should be understood that it is because the device needs to join (join) the network or because the device needs to rejoin (rejoin) the network after disconnecting from the network that the first device sends the beacon request frame through the second antenna. The beacon request frame may include a special identifier, and the special identifier is used to indicate that the first device needs to be provisioned.

For example, the second device may be a coordinator (for example, an intelligent gateway) or a router.

In an embodiment, the beacon request frame may carry a Product ID of the first device.

The following uses an example in which the second device is an intelligent gateway for description.

S3503. After receiving the beacon request frame, the intelligent gateway sends indication information to a mobile phone, where the indication information is used to indicate that the first device needs to be provisioned.

S3504. After receiving the indication information, the mobile phone prompts a user to put the first device close to the intelligent gateway.

For example, as shown in FIG. 15A, the mobile phone may prompt the user "It is detected that the intelligent desk lamp needs to be provisioned. Please put the intelligent desk lamp close to the intelligent gateway!"

S3505. The mobile phone sends acknowledge information to the intelligent gateway, where the acknowledge information is used to indicate the intelligent gateway to connect the first device to a ZigBee network.

For example, as shown in FIG. 15A, after the mobile phone detects an operation of tapping the control 402 by the user, the mobile phone may send the acknowledge information to the intelligent gateway.

S3506. After receiving the acknowledge information sent by the mobile phone, the intelligent gateway sends a beacon frame to the first device, where the beacon frame is used to respond to the beacon request frame and indicate that the intelligent gateway is a device that can connect the first device to the ZigBee network.

S3507. The first device switches from the second antenna to a first antenna after receiving the beacon frame.

S3508. The first device sends an association request frame to the intelligent gateway through the first antenna, where the association request frame carries an install code, and the association request frame is used to request the intelligent gateway to help connect the first device to the ZigBee network.

In an embodiment, the association request frame may carry a device identifier of the first device.

S3509. After receiving the association request frame, the intelligent gateway sends an association response frame to the first device. The association response frame indicates that intelligent gateway agrees to help the first device join the ZigBee network.

It should be understood that S3508 and S3509 are a process of performing MAC layer association between the intelligent gateway and the first device.

S3510. After receiving the association response frame sent by the intelligent gateway, the first device switches from the first antenna to the second antenna.

In an embodiment, the first device may send the association request frame to the intelligent gateway within first preset duration. Because the first device sends the association request frame by using a very short distance technology, a receiving success rate of the intelligent gateway is low. Therefore, the first device may continuously send a plurality of same association request frames within preset duration through the first antenna. In this way, the success rate of receiving the association request frame by the intelligent gateway is improved. In addition, the first device needs to receive the association response frame sent by the intelligent gateway through the first antenna within the first preset duration.

If the association response frame sent by the intelligent gateway is received by the first device within the first preset duration, the first device may switch to the second antenna when receiving the association response frame.

If the association response frame is not received when the first preset duration ends, the first device may switch from the first antenna to the second antenna, so as to receive, within second preset duration through the second antenna, the association response frame sent by the intelligent gateway. If the association response frame is received within the second preset duration, the first device joins the ZigBee network by using the second antenna.

If the first device does not receive, within the second preset duration, the association response frame sent by the intelligent gateway, the first device switches from the second antenna to the first antenna, and continues to send the association request frame through the first antenna within the first preset duration. In this way, the foregoing process is repeated until the first device receives the association response frame sent by the intelligent gateway, and then the first device switches to the second antenna.

S3511. The intelligent gateway determines a pre-configured link key based on the obtained install code.

S3512. The first device determines the pre-configured link key based on the install code.

S3513. The intelligent gateway encrypts a network key by using the pre-configured link key, and sends the network key encrypted by using the pre-configured link key to the first device.

In an embodiment, the first device may also use the association request frame to carry the pre-configured link key.

S3514. The intelligent gateway sends notification information to the mobile phone, where the notification information is used to notify that the first device accesses the intelligent gateway.

S3515. The mobile phone may locally control the first device.

S3516. The intelligent gateway registers with a cloud as a proxy of the first device.

S3517. After completing registering with the cloud as the proxy of the first device, the intelligent gateway notifies the first device that registration succeeds.

S3518. After the first device and the intelligent gateway complete device registration and network access, the mobile phone may locally or remotely control the first device.

It should be understood that for details of S3511 to S3518, reference should be made to the description of S3406 to S3413. For brevity, the details are not described herein again.

In this embodiment of this application, the first device is discovered by the intelligent gateway over a long distance. In this case, the existing provisioning habit of the user can be kept.

Figure 36:
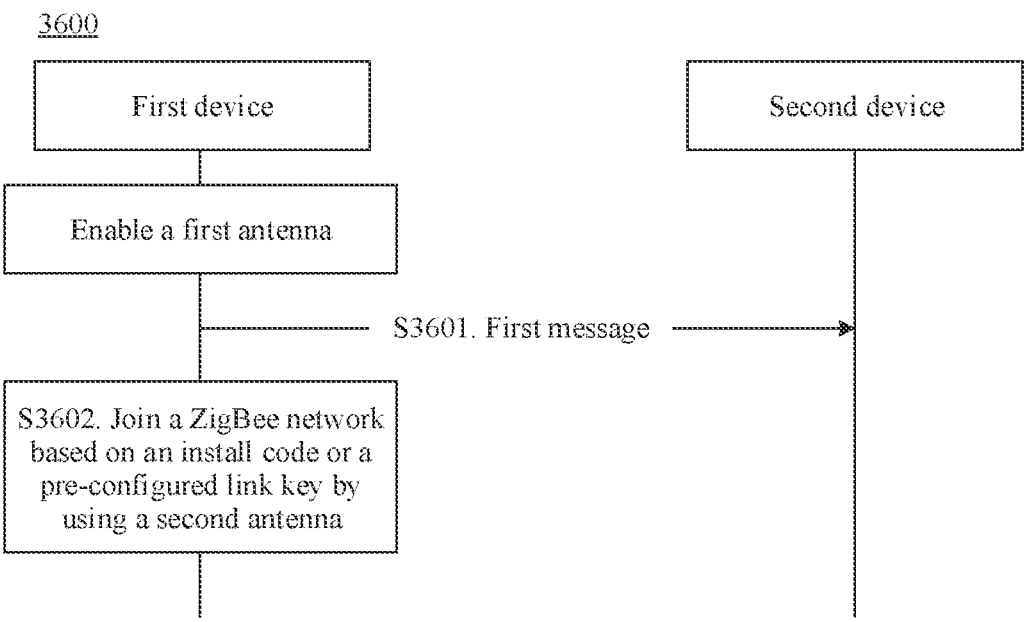
FIG. 36 is a schematic flowchart of another discovery and provisioning method according to an embodiment of this application.

FIG. 36 is a schematic flowchart of a discovery and provisioning method 3600 according to an embodiment of this application. The method may be implemented by a first device, where the first device includes a first antenna and a second antenna. A wireless transmit power of the first device operating by using the first antenna is less than a wireless transmit power of the first device operating by using the second antenna. The method 3600 includes the following steps.

S3601. When the first device is in an unprovisioned state, the first device sends a first message through the first antenna, where the first message carries an install code or a pre-configured link key.

In an embodiment, when a distance between a second device and the first device is less than or equal to a preset distance, the second device receives the first message, w % here the preset distance is a distance covered by a wireless transmit power of the first antenna in operation.

In an embodiment, the first message may be the beacon request frame in the method 3400 or the association request frame in the method 3500.

In this embodiment of this application, the first device may use the beacon request frame or the association request frame to carry the install code or the pre-configured link key, and send the beacon request frame or the association request frame to the second device. This avoids extra hardware costs (for example, costs of NFC or a two-dimensional code) of the first device, and a manufacturer does not need to reconstruct a production line. In addition, an extra user operation is avoided and high security is ensured.

It should be understood that the first message may be a beacon request frame or an association request frame, or may be a newly defined message. This is not limited in this application.

When the first device is powered on and is in the unprovisioned state, the first device may enable the first antenna by using a radio frequency switch, and sends the first message through the first antenna. Optionally, the first message includes a device identifier of the first device.

In this embodiment of this application, the first device sends the install code or the pre-configured link key through the first antenna, and therefore an additional hardware device is not required for out-of-band transmission. This reduces production costs. Compared with a manner of preconfiguring a fixed key (for example, ZigBeeAlliance09), security of this manner is higher, and user experience is also improved. If the first device sends the pre-configured link key through the first antenna, In an embodiment, when the first device sends the install code or the pre-configured link key through the first antenna, the first device may not encrypt the install code or the pre-configured link key.

In this embodiment of this application, when a communication distance between the first device and the second device is within a preset security distance (for example, 10 cm), it may be considered that the install code or the pre-configured link key may be transmitted in plaintext between the first device and an intelligent gateway. In this case, the first device may not encrypt the install code or the pre-configured link key.

In an embodiment, when the first device sends the install code or the pre-configured link key through the first antenna, the first device may sign the install code or the pre-configured link key by using a private key. When receiving the install code or the pre-configured link key, the second device may verify a signature by using a preset public key, to obtain the install code or the pre-configured link key.

S3602. The first device joins a ZigBee network of the second device by using the second antenna based on the install code or the pre-configured link key.

In an embodiment, the first message may be the beacon request frame. After receiving the beacon request frame sent by the first device through the first antenna, the second device may send a beacon frame to the first device, where the beacon frame is used to indicate that the second device is a device that can connect the first device to the ZigBee network. After receiving the beacon frame, the first device may switch from the first antenna to the second antenna, to join the ZigBee network by using the second antenna. A process in which the first device joins the ZigBee network by using the second antenna includes the following steps. The first device completes MAC layer association with the second device by using the second antenna; the first device and the second device determine the pre-configured link key based on the install code, and after receiving a network key that is sent by the second device and that is encrypted by using the pre-configured link key, the first device decrypts the network key by using the pre-configured link key, to obtain the network key.

In an embodiment, the first message may be the association request frame. After receiving the association request frame sent by the first device through the first antenna, the second device may send an association response frame to the first device, where the association response frame indicates that the second device agrees to help the first device join the ZigBee network. After receiving the association response frame, the first device may switch from the first antenna to the second antenna, to join the ZigBee network by using the second antenna A process in which the first device joins the ZigBee network by using the second antenna includes the following steps. The first device and the second device determine the pre-configured link key based on the install code; and after receiving a network key that is sent by the second device and that is encrypted by using the pre-configured link key, the first device decrypts the network key by using the pre-configured link key, to obtain the network key.

In this embodiment of this application, for the ZigBee discovery and provisioning manner, in a discovery process, the first device uses the first antenna, so that the communication distance between the first device and the second device is reduced. As a result, the first device is prevented from being discovered and paired by a device in a neighbor's home. Alternatively, when there are a plurality of devices of a same type (for example, having a same Product ID), the user may place a device that needs to be provisioned close to the second device. In this way, interference from the plurality of devices of the same type is avoided. In addition, because the communication distance between the first device and the second device is reduced, the first device may send the install code or the pre-configured link key in plaintext to the second device. In this way, out-of-band transmission between the first device and the second device is not required, and a user operation is also omitted, which helps improve user experience.

In an embodiment, after the first device joins the ZigBee network and before the second device registers with the cloud server as the proxy of the first device, the second device may send a control command encrypted by using a network key to the first device. Alternatively, after receiving a control command sent by a third device (for example, a mobile phone), the second device may send the control command encrypted by using the network key to the first device.

In an embodiment, after the first device joins the ZigBee network and before the second device registers with the cloud server as the proxy of the first device, the first device may send status information encrypted by using the network key to the second device. After receiving the status information encrypted by using the network key, the second device may decrypt the status information, to obtain the status information. The second device may further send the status information to the third device. In this way, the third device updates the status information of the first device.

Optionally, the second device may further connect to the cloud server as the proxy of the first device. The cloud server may bind the first device, the second device, and an account of the user. After the first device is registered with the cloud, the user may view the second device and the first device connected to the second device on the mobile phone, and remotely control the first device.

After the first device joins the ZigBee network, the second device sends an indication, to the third device, that the first device successfully joins the ZigBee network. The third device may request a control mapping file and a details page of the first device from the server by using the device identifier (for example, the Product ID) that is of the first device and that is sent by the second device, so that the third device can locally control the intelligent device. In this way, the user does not need to wait for a process in which the second device registers with the cloud server as the proxy of the first device, which helps improve user experience.

In an embodiment, if the first message is the association request frame, before S3601, the method 3600 further includes: The first device sends a second message through the second antenna, where the second message is used to query whether there is an ambient coordinator (for example, an intelligent gateway) or an ambient router that can help the first device join the network.

For example, the second message may be a beacon request frame.

After receiving the second message, the second device sends indication information to the third device, where the indication information is used to indicate that the first device needs to be provisioned. After receiving the indication information, the third device may prompt the user to put the first device close to the second device. The third device may send acknowledge information to the second device. After receiving the acknowledge information sent by the third device, the second device may send a beacon frame to the first device. The first device switches from the second antenna to the first antenna after receiving the beacon frame sent by the second device. In addition, after receiving prompt information from the third device (for example, receiving the prompt information on a display screen, through a voice prompt, or in other manners), the user may put the first device close to the second device. The first device may send the association request frame to the second device through the first antenna, where the association request frame carries the install code or the pre-configured link key. In this way, the first device sends the beacon request frame through the second antenna, and the current provisioning habit of the user is kept. In addition, after seeing the prompt information on the third device, the user may put the first device close to the second device. Because the first device switches to the first antenna to send the association request frame after receiving the beacon frame sent by the second device, the first device is not paired with the device in the neighbor's home, and interference between the plurality of devices of the same type is avoided. Out-of-band transmission does not need to be performed between the first device and the second device, so that additional hardware costs of the first device are avoided, and a user operation is also omitted. In this way, user experience can be improved and security can be ensured.

Figure 37:
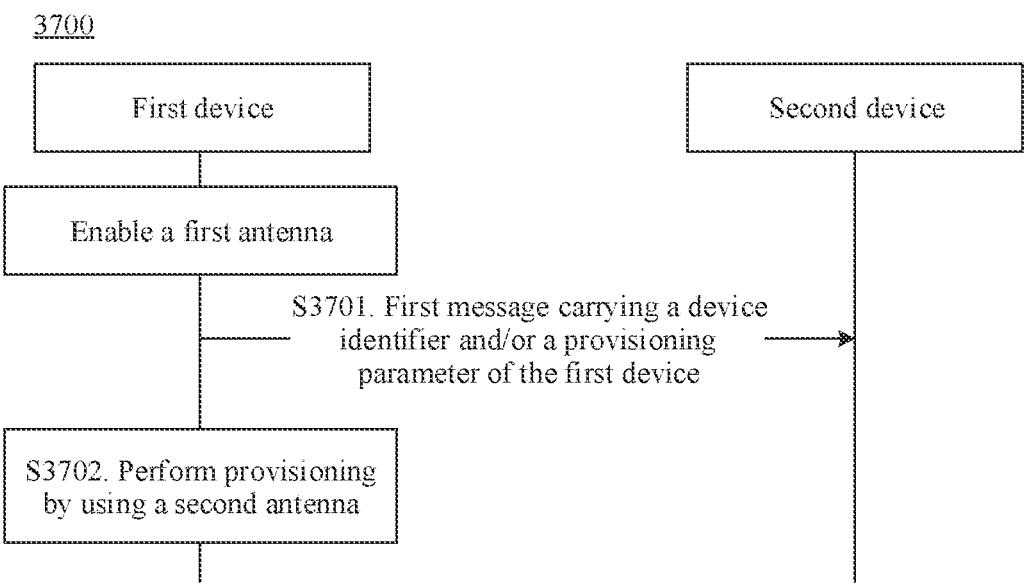
FIG. 37 is a schematic flowchart of another discovery and provisioning method according to an embodiment of this application.

FIG. 37 is a schematic flowchart of a discovery and provisioning method 3700 according to an embodiment of this application. The method may be implemented by a first device, where the first device includes a first antenna and a second antenna. A wireless transmit power of the first device operating by using the first antenna is less than a wireless transmit power of the first device operating by using the second antenna. The method 3700 includes the following steps.

S3701. When the first device is in an unprovisioned state, the first device sends a first message through the first antenna, where the first message carries a device identifier and/or a provisioning parameter of the first device.

In an embodiment, if the first device is provisioned by using Wi-Fi, the provisioning parameter may include an encryption key.

In an embodiment, if the first device is provisioned by using Wi-Fi sensing, the provisioning parameter may include an encryption key.

In an embodiment, if the first device is provisioned by using BLE, the provisioning parameter may include a Passkey or OOB information.

In an embodiment, if the first device is provisioned by using Bluetooth mesh, the provisioning parameter may include an authentication value (or the authentication value and a public key of the first device).

In an embodiment, if the first device is provisioned by using ZigBee, the provisioning parameter may include an install code or a pre-configured link key.

S3702. The first device performs provisioning by using the second antenna.

In an embodiment, if the first message carries the provisioning parameter, that the first device performs provisioning by using the second antenna includes: The first device performs provisioning based on the provisioning parameter by using the second antenna.

In an embodiment, for Wi-Fi discovery and provisioning, the provisioning parameter includes the encryption key, and that the first device performs provisioning based on the provisioning parameter by using the second antenna includes: After the second device discovers the first device, the second device sends, to the first device, a service set identifier SSID of a Wi-Fi router and a password of the Wi-Fi router that are encrypted by using the encryption key; and the first device connects to the Wi-Fi router according to the SSID and the password.

It should be understood that if the first device is provisioned by using Wi-Fi, for details of a provisioning process of the first device, reference should be made to description of the processes in the method 1900 to the method 2200. For brevity, the details are not described herein again.

It should be further understood that if the first device is provisioned by using Wi-Fi sensing, for a specific provisioning process of the first device, reference should be made to description of the processes in the method 2300 to the method 2800. For brevity, details are not described herein again.

In an embodiment, for BLE discovery and provisioning, the provisioning parameter includes the Passkey or the OOB information, and that the first device performs provisioning based on the provisioning parameter by using the second antenna includes: The first device performs Bluetooth pairing with the second device based on the Passkey or the OOB information by using the second antenna.

It should be understood that if the first device is provisioned by using BLE, for details of a provisioning process of the first device, reference should be made to description of the processes in the method 2900 to the method 3000. For brevity, details are not described herein again.

In an embodiment, for Bluetooth mesh discovery and provisioning, the provisioning parameter includes the authentication value (or the authentication value and the public key of the first device), and that the first device performs provisioning based on the provisioning parameter by using the second antenna includes: The first device joins a mesh network of the second device based on the authentication value by using the second antenna.

It should be understood that if the first device is provisioned by using Bluetooth mesh, for details of a provisioning process of the first device, reference should be made to description of the processes in the method 3100 to the method 3300. For brevity, the details are not described herein again.

In an embodiment, for ZigBee discovery and provisioning, the provisioning parameter includes the install code or the pre-configured link key, and that the first device performs provisioning based on the provisioning parameter by using the second antenna includes: The first device joins a ZigBee network of the second device based on the install code or the pre-configured link key by using the second antenna.

It should be understood that the first device may transmit OOB data in a current protocol and a subsequent protocol (for example, the BLE protocol, the Bluetooth mesh protocol, or the ZigBee protocol) by using a very short distance technology.

It should be understood that if the first device is provisioned by using ZigBee, for details of a provisioning process of the first device, reference should be made to description of the processes in the method 3400 to the method 3600. For brevity, the details are not described herein again.

Figure 38:
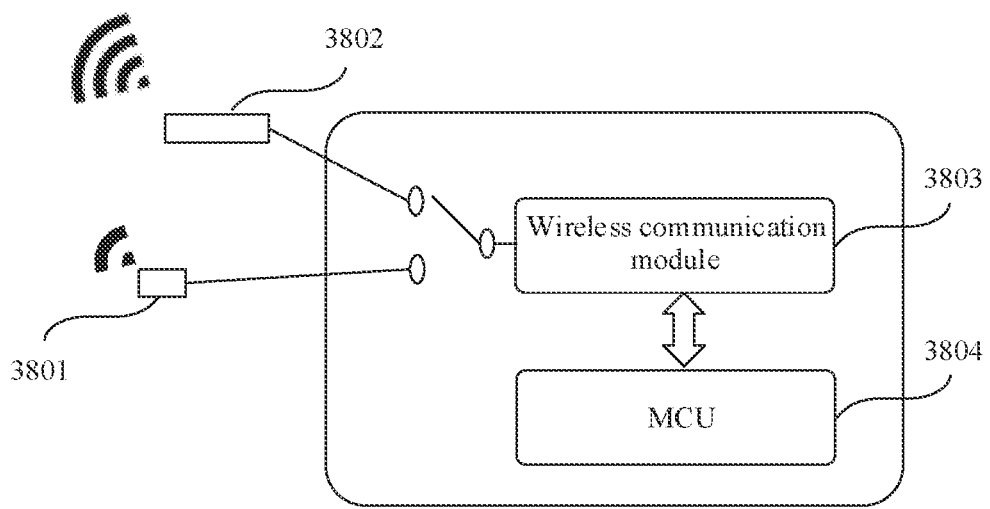
FIG. 38 is a schematic diagram of another structure of an antenna of an intelligent device according to an embodiment of this application.

In an embodiment, the first device may include one or more antennas. The one or more antennas may be classified into a first antenna and a second antenna. A transmission distance covered when the first antenna transmits a wireless signal is less than a transmission distance covered when the second antenna transmits a wireless signal. The first antenna and the second antenna may be switched. The first antenna and the second antenna implement network communication with another device by using a wireless communication module of the first device. FIG. 38 is a schematic diagram of another structure of an antenna in a first device according to an embodiment of this application.

In an example, the foregoing first antenna and the foregoing second antenna may be two different antennas. The first device may include a microcontroller unit (microcontroller unit, MCU) 3804, a wireless communication module 3803, an antenna 3801, and an antenna 3802.

The antenna 3802 shown in FIG. 38 may be the foregoing second antenna, and the antenna 3801 may be the foregoing first antenna. The wireless communication module 3803 shown in FIG. 38 may be implemented by the wireless communication module 150 in FIG. 1, and the MCU 3804 shown in FIG. 38 may be implemented by the processor 110 in FIG. 1.

The MCU 3804 may include a central processing unit, a memory, a counter, a clock, an interrupt, a serial peripheral interface (serial peripheral interface, SPI), a UART interface, a universal serial bus port, and the like. The UART interface is a universal serial data bus, and is used for asynchronous communication. The bus may be a two-way communication bus, and converts to-be-transmitted data between serial communication and parallel communication. In some embodiments, the MCU 3804 exchanges information with the wireless communication module 3803 through the UART interface. The wireless communication module 3803 is configured to implement wireless communication between the first device and another device.

The antenna 3801 and the antenna 3802 are configured to transmit and receive an electromagnetic wave. Further, the wireless communication module 3803 converts an electromagnetic wave received through the antenna 3801 or the antenna 3802 into a signal, and sends the signal to the MCU 3804 for processing; or the wireless communication module 3803 receives a to-be-transmitted signal from the MCU 3804, and converts, by using the antenna 3801 or the antenna 3802, the signal into an electromagnetic wave for radiation. In this embodiment of this application, a second distance of signal transmission by the antenna 3802 is greater than a first distance of signal transmission by the antenna 3801.

In some embodiments, the MCU 3804 may control switching between the antenna 3801 and the antenna 3802. When the first device uses the antenna 3802, if a distance between the first device and another device is less than the second distance, the another device can receive a signal transmitted by the first device through the antenna 3802. In this way, communication between the another device and the first device can be implemented. When the first device uses the antenna 3801, if the distance between the first device and the another device is less than the first distance, the another device can receive a signal transmitted by the first device through the antenna 3801. In this way, communication between the another device and the first device can be implemented.

For example, in the method 2800, the first device may send the first Wi-Fi sensing frame to the ambient device through the antenna 3801, and the first device may receive, through the antenna 3802, the second Wi-Fi sensing frame sent by the second device. The first device may further connect to the Wi-Fi router by using the antenna 3802.

For example, in the method 3000, the first device may send the first message to the ambient device through the antenna 3801, and the first device may receive, through the antenna 3802, the connect request sent by the second device.

For example, in the method 3300, the first device may send the first message to the ambient device through the antenna 3801, and the first device may receive, through the antenna 3802, the provisioning data distributed by the second device.

For example, in the method 3400, the first device may send the beacon request frame by advertising through the antenna 3801. For example, in the method 3500, the first device may send the association request frame to the second device through the antenna 3801. For example, in the method 3400, after receiving the beacon frame, the first device may switch from the first antenna to the second antenna, to join the ZigBee network by using the second antenna. For example, in the method 3500, after receiving the association response frame, the first device may switch from the first antenna to the second antenna, to join the ZigBee network by using the second antenna.

In specific implementation of the first antenna and the second antenna, the first antenna and the second antenna may share a part of a cable, as described in the embodiments shown in FIG. 16 to FIG. 18.

An embodiment of this application further provides an electronic device. The electronic device may include the processor 110 and the wireless communication module 150 shown in FIG. 1. The wireless communication module 150 may be configured to perform a step of receiving or sending information by the first device in the foregoing method embodiments. For example, the wireless communication module 150 may perform the step of sending the first message to the second device through the first antenna.

The processor 110 may be configured to perform the step of processing the received information by the first device in the foregoing method embodiments. For example, the processor 110 may be configured to perform steps such as enabling the first antenna and switching from the first antenna to the second antenna.

An embodiment of this application further provides a chip. The chip is included in an electronic device. The chip further includes one or more processors, one or more memories, and one or more computer programs. The one or more computer programs are stored in the one or more memories. The one or more computer programs include instructions. When the instructions are executed by the one or more processors, the chip is enabled to perform the steps in the foregoing methods.

In an embodiment, the chip is coupled to a first antenna and a second antenna. A wireless transmit power of the electronic device generated when the chip is coupled to the first antenna is less than a wireless transmit power of the electronic device generated when the chip is coupled to the second antenna.

An embodiment of this application further provides a computer storage medium, including computer instructions. When the computer instructions are run on an electronic device, the electronic device is enabled to perform the methods in the foregoing embodiments.

An embodiment of this application further provides a computer program product. When the computer program product runs on an electronic device, the electronic device is enabled to perform the methods in the foregoing embodiments.

A person of ordinary skill in the art may be aware that, the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference should be made to a corresponding process in the foregoing method embodiments, and details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing description is merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A discovery and provisioning method, wherein the method is applied to a first device and comprises:
    sending, by the first device, a first Wi-Fi sensing frame through a first antenna when the first device is in an unprovisioned state, wherein the first Wi-Fi sensing frame enables a second device to discover the first device, wherein the first device comprises the first antenna and a second antenna, and a wireless transmit power of the first device operating by using the first antenna is less than a wireless transmit power of the first device operating by using the second antenna;
    after the first device is discovered by the second device, receiving, by the first device through the second antenna, a second Wi-Fi sensing frame sent by the second device, wherein the second Wi-Fi sensing frame comprises a service set identifier (SSID) of a Wi-Fi router and a password of the Wi-Fi router; and
    connecting, by the first device, to the Wi-Fi router according to the SSID and the password.

2. The method according to claim 1, wherein after the first device is discovered by the second device, and before the first device connects to the Wi-Fi router, the method further comprises:
    receiving, by the first device, a control command sent by the second device; and
    executing, by the first device, the control command, and sending, by the first device, status information to the second device.

3. The method according to claim 1, wherein after the first device is discovered by the second device, and before the first device connects to the Wi-Fi router, the method further comprises:
    detecting, by the first device, a status update operation performed by a user on the first device; and
    sending, by the first device, updated status information to the second device in response to detecting the operation.

4. The method according to claim 1, wherein the sending, by the first device, a first Wi-Fi sensing frame comprises:
    sending, by the first device, the first Wi-Fi sensing frame at a first wireless transmit power; and
    the connecting, by the first device, to the Wi-Fi router comprises:
    connecting, by the first device, to the Wi-Fi router at a second wireless transmit power, wherein
    the first wireless transmit power is less than the second wireless transmit power.

5. The method according to claim 1, wherein before the receiving, by the first device, the second Wi-Fi sensing frame through the second antenna, the method further comprises:
    sending, by the first device, an encryption key to the second device through the first antenna.

6. The method according to claim 5, wherein the encryption key sent by the first device to the second device is not encrypted.

7. The method according to claim 5, wherein the first Wi-Fi sensing frame comprises the encryption key.

8. The method according to claim 1, wherein before the receiving, by the first device, the second Wi-Fi sensing frame through the second antenna, the method further comprises:

sending, by the first device, a verification code to the second device through the first antenna.

9. The method according to claim 8, wherein the verification code sent by the first device to the second device is not encrypted.

10. The method according to claim 8, wherein the first Wi-Fi sensing frame comprises the verification code.

11. The method according to claim 8, wherein the method further comprises:

negotiating, by the first device, with the second device by using the verification code, to obtain an encryption key.

12. The method according to claim 1, wherein the first Wi-Fi sensing frame is a publish frame, a follow-up frame, or a subscribe frame.

13. A discovery and provisioning method, wherein the method is applied to a second device and comprises:

when a distance between the second device and a first device is less than or equal to a preset distance, receiving, by the second device, a first Wi-Fi sensing frame sent by the first device through a first antenna, wherein the first Wi-Fi sensing frame enables the second device to discover the first device; and after the second device discovers the first device, sending, by the second device, a second Wi-Fi sensing frame to the first device, wherein the second Wi-Fi sensing frame comprises a service set identifier (SSID) of a Wi-Fi router and a password of the Wi-Fi router, and wherein second Wi-Fi sensing frame is received by the first device through a second antenna, wherein the first device comprises the first antenna and the second antenna, and a wireless transmit power of the first device operating by using the first antenna is less than a wireless transmit power of the first device operating by using the second antenna.

14. The method according to claim 13, wherein the method further comprises:

after the first device is discovered by the second device and before the first device connects to the Wi-Fi router, receiving, by the second device, status information sent by the first device.

15. The method according to claim 13, wherein the method further comprises:

after the first device is discovered by the second device and before the first device connects to the Wi-Fi router, sending, by the second device, a control command to the first device.

16. The method according to claim 15, wherein the method further comprises:

displaying, by the second device, a control interface of the first device on a display screen after the first device is discovered by the second device and before the first device connects to the Wi-Fi router, wherein the control interface is used to control the first device; and the sending, by the second device, a control command to the first device comprises: sending, by the second device, the control command to the first device in response to an operation on the control interface.

17. The method according to claim 13, wherein the method further comprises:

displaying, by the second device, a control interface of the first device on a display screen after the first device is discovered by the second device and before the first device connects to the Wi-Fi router, wherein the control interface is used to control the first device; and the control interface further comprises prompt information used to prompt that the first device is being provisioned.

18. The method according to claim 16, wherein the first Wi-Fi sensing frame further comprises a device identifier of the first device, and the method further comprises:

obtaining, by the second device, the device identifier of the first device from the first Wi-Fi sensing frame after the second device receives the first Wi-Fi sensing frame sent by the first device; and obtaining, by the second device, the control interface of the first device based on the device identifier of the first device.

19. A first device, comprising:

one or more processors;

one or more memories;

a first antenna and a second antenna, wherein a wireless transmit power of the first device operating by using the first antenna is less than a wireless transmit power of the first device operating by using the second antenna;

and one or more computer programs, wherein the one or more computer programs are stored in the one or more memories, the one or more computer programs comprise instructions, and when the instructions are executed by the one or more processors, the first device is enabled to perform:

sending a first Wi-Fi sensing frame through the first antenna when the first device is in an unprovisioned state, wherein the first Wi-Fi sensing frame enables a second device to discover the first device;

after the first device is discovered by the second device, receiving, through the second antenna, a second Wi-Fi sensing frame sent by the second device, wherein the second Wi-Fi sensing frame comprises a service set identifier (SSID) of a Wi-Fi router and a password of the Wi-Fi router; and connecting to the Wi-Fi router according to the SSID and the password.

* * * * *